US012210603B2

(12) United States Patent
Deng et al.

(10) Patent No.: US 12,210,603 B2
(45) Date of Patent: Jan. 28, 2025

(54) USER INTERFACE FOR ENROLLING A BIOMETRIC FEATURE

(71) Applicant: Apple Inc., Cupertino, CA (US)

(72) Inventors: Jiaying Deng, Sunnyvale, CA (US); Benjamin Biron, Saratoga, CA (US); Kyle C. Brogle, San Francisco, CA (US); Tomislav Suchan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 17/685,039

(22) Filed: Mar. 2, 2022

(65) Prior Publication Data
US 2022/0284084 A1 Sep. 8, 2022

Related U.S. Application Data

(60) Provisional application No. 63/156,847, filed on Mar. 4, 2021.

(51) Int. Cl.
*G06F 21/32* (2013.01)
*G06F 21/44* (2013.01)
(Continued)

(52) U.S. Cl.
CPC .............. *G06F 21/32* (2013.01); *G06F 21/44* (2013.01); *G06V 40/1365* (2022.01);
(Continued)

(58) Field of Classification Search
CPC .. G06F 21/32; G06F 21/44; G06F 2221/2103; G06F 2221/2117; H04W 4/80;
(Continued)

(56) References Cited

U.S. PATENT DOCUMENTS

| 5,229,764 A | 7/1993 | Matchett et al. |
| 5,237,159 A | 8/1993 | Stephens et al. |

(Continued)

FOREIGN PATENT DOCUMENTS

| AU | 2016100090 A4 | 3/2016 |
| AU | 2017100556 A4 | 6/2017 |

(Continued)

OTHER PUBLICATIONS

Sanchez-Reillo et al. "Strengths, weaknesses and recommendations in implementing biometrics in mobile devices." 2014 International Carnahan Conference on Security Technology (ICCST), IEEE. Oct. 2014. p. 1-6 (Year: 2014).*

(Continued)

*Primary Examiner* — Carol G Colin
*Assistant Examiner* — Zhe Liu
(74) *Attorney, Agent, or Firm* — DLA Piper LLP (US)

(57) ABSTRACT

The present disclosure generally relates to enrolling a biometric feature for use with a peripheral device. While a computer system is connected to an external device, the computer system receives a first request to enroll a biometric feature. In response to receiving the request and in accordance with a determination that the request satisfies a first set of one or more criteria, the computer system displays a user interface object prompting a user to provide an authorization input to one or more input devices physically connected to the computer system. While displaying the first user interface object, the computer system receives user input. In response to receiving the user input and in accordance with a determination that the user input includes the authentication input, the computer system initiates a process to enroll the biometric feature using a biometric sensor that is integrated with the external device.

48 Claims, 32 Drawing Sheets

(51) Int. Cl.
  *G06V 40/12* (2022.01)
  *G06V 40/16* (2022.01)
  *G06V 40/18* (2022.01)
  *G06V 40/50* (2022.01)
  *H04W 4/80* (2018.01)

(52) U.S. Cl.
  CPC .......... *G06V 40/172* (2022.01); *G06V 40/197* (2022.01); *G06V 40/50* (2022.01); *H04W 4/80* (2018.02); *G06F 2221/2103* (2013.01); *G06F 2221/2117* (2013.01)

(58) Field of Classification Search
  CPC ............. G06V 40/197; G06V 40/1365; G06V 40/172; G06V 40/50
  See application file for complete search history.

(56) References Cited

U.S. PATENT DOCUMENTS

| | | |
|---|---|---|
| 5,265,007 A | 11/1993 | Barnhard, Jr. et al. |
| 5,484,988 A | 1/1996 | Hills et al. |
| 5,615,384 A | 3/1997 | Allard et al. |
| 5,691,524 A | 11/1997 | Josephson |
| 5,717,868 A | 2/1998 | James |
| 5,767,457 A | 6/1998 | Gerpheide et al. |
| 5,783,808 A | 7/1998 | Josephson |
| 5,801,763 A | 9/1998 | Suzuki |
| 5,828,773 A | 10/1998 | Setlak et al. |
| 5,838,306 A | 11/1998 | O"connor et al. |
| 5,852,670 A | 12/1998 | Setlak et al. |
| 5,910,989 A | 6/1999 | Naccache |
| 5,933,134 A | 8/1999 | Shieh |
| 5,960,411 A | 9/1999 | Hartman et al. |
| 5,974,150 A | 10/1999 | Kaish et al. |
| 5,983,197 A | 11/1999 | Enta |
| 6,016,484 A | 1/2000 | Williams et al. |
| 6,064,429 A | 5/2000 | Belk et al. |
| 6,104,922 A | 8/2000 | Baumann |
| 6,111,517 A | 8/2000 | Atick et al. |
| 6,141,436 A | 10/2000 | Srey et al. |
| 6,151,208 A | 11/2000 | Bartlett |
| 6,151,593 A | 11/2000 | Cho et al. |
| 6,164,528 A | 12/2000 | Hills et al. |
| 6,173,402 B1 | 1/2001 | Chapman |
| 6,189,785 B1 | 2/2001 | Lowery |
| 6,192,380 B1 | 2/2001 | Light et al. |
| 6,193,152 B1 | 2/2001 | Fernando et al. |
| 6,219,793 B1 | 4/2001 | Li et al. |
| 6,230,148 B1 | 5/2001 | Pare, Jr. et al. |
| 6,260,027 B1 | 7/2001 | Takahashi et al. |
| 6,282,655 B1 | 8/2001 | Given |
| 6,289,114 B1 | 9/2001 | Mainguet |
| 6,317,835 B1 | 11/2001 | Bilger et al. |
| 6,323,846 B1 | 11/2001 | Westerman et al. |
| 6,328,207 B1 | 12/2001 | Gregoire et al. |
| 6,337,919 B1 | 1/2002 | Dunton |
| 6,374,145 B1 | 4/2002 | Lignoul |
| 6,398,646 B1 | 6/2002 | Wei et al. |
| 6,408,087 B1 | 6/2002 | Kramer |
| 6,421,453 B1 | 7/2002 | Kanevsky et al. |
| 6,560,711 B1 | 5/2003 | Given et al. |
| 6,570,557 B1 | 5/2003 | Westerman et al. |
| 6,573,883 B1 | 6/2003 | Bartlett |
| 6,581,042 B2 | 6/2003 | Pare, Jr. et al. |
| 6,618,806 B1 | 9/2003 | Brown et al. |
| 6,639,584 B1 | 10/2003 | Li |
| 6,644,546 B2 | 11/2003 | George et al. |
| 6,662,166 B2 | 12/2003 | Pare, Jr. et al. |
| 6,677,932 B1 | 1/2004 | Westerman |
| 6,709,333 B1 | 3/2004 | Bradford et al. |
| 6,714,665 B1 | 3/2004 | Hanna et al. |
| 6,720,860 B1 | 4/2004 | Narayanaswami |
| 6,795,569 B1 | 9/2004 | Setlak |
| 6,922,147 B1 | 7/2005 | Viksnins et al. |
| 6,941,001 B1 | 9/2005 | Bolle et al. |
| 6,950,810 B2 | 9/2005 | Lapsley et al. |
| 6,970,855 B2 | 11/2005 | Das et al. |
| 6,980,081 B2 | 12/2005 | Anderson |
| 7,027,619 B2 | 4/2006 | Pavlidis et al. |
| 7,030,860 B1 | 4/2006 | Hsu et al. |
| 7,039,221 B1 | 5/2006 | Tumey et al. |
| 7,046,838 B1 | 5/2006 | Sakagawa et al. |
| 7,057,607 B2 | 6/2006 | Mayoraz et al. |
| 7,079,652 B1 | 7/2006 | Harris |
| 7,081,905 B1 | 7/2006 | Raghunath |
| 7,086,085 B1 | 8/2006 | Brown et al. |
| 7,099,845 B2 | 8/2006 | Higgins et al. |
| 7,099,850 B1 | 8/2006 | Mann, II et al. |
| 7,124,300 B1 | 10/2006 | Lemke |
| 7,130,454 B1 | 10/2006 | Berube et al. |
| 7,190,816 B2 | 3/2007 | Mitsuyu et al. |
| 7,239,728 B1 | 7/2007 | Choi et al. |
| 7,346,778 B1 | 3/2008 | Guiter et al. |
| 7,356,516 B2 | 4/2008 | Richey et al. |
| 7,359,880 B2 | 4/2008 | Abel et al. |
| 7,414,613 B2 | 8/2008 | Simelius |
| 7,415,720 B2 | 8/2008 | Jung |
| 7,420,546 B2 | 9/2008 | Abdallah et al. |
| 7,430,537 B2 | 9/2008 | Templeton et al. |
| 7,535,344 B2 | 5/2009 | Obradovich |
| 7,542,592 B2 | 6/2009 | Singh et al. |
| 7,546,470 B2 | 6/2009 | Schultz |
| 7,630,522 B2 | 12/2009 | Popp et al. |
| 7,633,076 B2 | 12/2009 | Huppi et al. |
| 7,644,019 B2 | 1/2010 | Woda et al. |
| 7,657,441 B2 | 2/2010 | Richey et al. |
| 7,657,849 B2 | 2/2010 | Chaudhri et al. |
| 7,676,748 B1 | 3/2010 | Barrus et al. |
| 7,689,508 B2 | 3/2010 | Davis et al. |
| 7,697,729 B2 | 4/2010 | Howell et al. |
| 7,705,737 B2 | 4/2010 | Senga |
| 7,730,401 B2 | 6/2010 | Gillespie et al. |
| 7,734,930 B2 | 6/2010 | Kirovski et al. |
| 7,738,916 B2 | 6/2010 | Fukuda |
| 7,860,536 B2 | 12/2010 | Jobs et al. |
| 7,860,936 B1 | 12/2010 | Newstadt et al. |
| 7,921,297 B2 | 4/2011 | Ortiz et al. |
| 8,006,299 B2 | 8/2011 | Suominen |
| 8,018,440 B2 | 9/2011 | Townsend et al. |
| 8,042,157 B2 | 10/2011 | Bennett et al. |
| 8,050,997 B1 | 11/2011 | Nosek et al. |
| 8,060,571 B2 | 11/2011 | Rao |
| 8,095,634 B2 | 1/2012 | Rao et al. |
| 8,131,848 B1 | 3/2012 | Denise |
| 8,145,912 B2 | 3/2012 | Mclean |
| 8,157,164 B1 | 4/2012 | Billman |
| 8,195,507 B2 | 6/2012 | Postrel |
| 8,254,642 B2 | 8/2012 | Kobayashi et al. |
| 8,254,647 B1 | 8/2012 | Nechyba et al. |
| 8,311,514 B2 | 11/2012 | Bandyopadhyay et al. |
| 8,336,086 B2 | 12/2012 | Seo |
| 8,341,557 B2 | 12/2012 | Pisula et al. |
| 8,392,259 B2 | 3/2013 | Macgillivray et al. |
| 8,395,658 B2 | 3/2013 | Corson |
| 8,396,265 B1 | 3/2013 | Ross et al. |
| 8,438,400 B2 | 5/2013 | Hoghaug et al. |
| 8,452,654 B1 | 5/2013 | Wooters et al. |
| 8,452,978 B2 | 5/2013 | Alward et al. |
| 8,488,040 B2 | 7/2013 | Chen et al. |
| 8,526,915 B2 | 9/2013 | Kakiuchi et al. |
| 8,538,158 B1 | 9/2013 | Denise |
| 8,543,834 B1 | 9/2013 | Barra |
| 8,560,004 B1 | 10/2013 | Tsvetkov et al. |
| 8,581,877 B2 | 11/2013 | Yoo |
| 8,583,549 B1 | 11/2013 | Mohsenzadeh |
| 8,606,512 B1 | 12/2013 | Bogovich et al. |
| 8,606,640 B2 | 12/2013 | Brody et al. |
| 8,619,050 B2 | 12/2013 | Herz et al. |
| 8,638,385 B2 | 1/2014 | Bhogal |
| 8,639,621 B1 | 1/2014 | Kennedy et al. |
| 8,646,060 B1 | 2/2014 | Ben Ayed |
| 8,679,012 B1 | 3/2014 | Kayyali |
| 8,762,272 B1 | 6/2014 | Cozens et al. |

(56) References Cited

U.S. PATENT DOCUMENTS

| | | | |
|---|---|---|---|
| 8,763,896 B2 | 7/2014 | Kushevsky et al. |
| 8,769,624 B2 | 7/2014 | Cotterill |
| 8,782,775 B2 | 7/2014 | Fadell et al. |
| 8,788,838 B1 | 7/2014 | Fadell et al. |
| 8,826,415 B2 | 9/2014 | Last |
| 8,831,677 B2 | 9/2014 | Villa-real |
| 8,856,541 B1 | 10/2014 | Chaudhury et al. |
| 8,886,953 B1 | 11/2014 | Sipe et al. |
| 8,892,474 B1 | 11/2014 | Inskeep et al. |
| 8,904,479 B1 | 12/2014 | Johansson et al. |
| 8,943,580 B2 | 1/2015 | Fadell et al. |
| 8,949,618 B1 | 2/2015 | Lee et al. |
| 8,949,902 B1 | 2/2015 | Fabian-Isaacs et al. |
| 8,963,806 B1 | 2/2015 | Starner et al. |
| 8,983,846 B2 | 3/2015 | Di Profio et al. |
| 8,988,490 B2 | 3/2015 | Fujii |
| 8,994,499 B2 | 3/2015 | Zhao et al. |
| 9,002,322 B2 | 4/2015 | Cotterill |
| 9,031,847 B2 | 5/2015 | Sarin et al. |
| 9,038,167 B2 | 5/2015 | Fadell et al. |
| 9,053,293 B2 | 6/2015 | Latzina |
| 9,098,931 B2 | 8/2015 | Shpunt et al. |
| 9,128,601 B2 | 9/2015 | Fadell et al. |
| 9,134,896 B2 | 9/2015 | Fadell et al. |
| 9,170,645 B2 | 10/2015 | Park et al. |
| 9,177,130 B2 | 11/2015 | Nechyba et al. |
| 9,179,298 B2 | 11/2015 | Jung et al. |
| 9,250,795 B2 | 2/2016 | Fadell et al. |
| 9,253,375 B2 | 2/2016 | Milanfar et al. |
| 9,269,083 B1 | 2/2016 | Jarajapu et al. |
| 9,269,196 B1 | 2/2016 | Fan et al. |
| 9,274,647 B2 | 3/2016 | Fadell et al. |
| 9,294,476 B1 | 3/2016 | Lurey et al. |
| 9,304,624 B2 | 4/2016 | Fadell et al. |
| 9,305,155 B1 | 4/2016 | Vo et al. |
| 9,324,067 B2 | 4/2016 | Van Os et al. |
| 9,329,771 B2 | 5/2016 | Fadell et al. |
| 9,349,035 B1 | 5/2016 | Gerber et al. |
| 9,355,234 B1 | 5/2016 | Magi Shaashua et al. |
| 9,357,391 B1 | 5/2016 | Alsvig et al. |
| 9,411,460 B2 | 8/2016 | Dumont et al. |
| 9,451,210 B1 | 9/2016 | Smus |
| 9,477,872 B2 | 10/2016 | Sarve et al. |
| 9,483,763 B2 | 11/2016 | Van Os et al. |
| 9,495,531 B2 | 11/2016 | Fadell et al. |
| 9,519,771 B2 | 12/2016 | Fadell et al. |
| 9,519,901 B1 | 12/2016 | Dorogusker |
| 9,526,127 B1 | 12/2016 | Taubman et al. |
| 9,549,323 B2 | 1/2017 | Lee et al. |
| 9,558,636 B1 | 1/2017 | Burdick |
| 9,569,605 B1 | 2/2017 | Schneider et al. |
| 9,569,655 B2 | 2/2017 | Harper |
| 9,600,709 B2 | 3/2017 | Russo |
| 9,613,245 B1 | 4/2017 | Eltoft et al. |
| 9,678,571 B1 | 6/2017 | Robert et al. |
| 9,716,825 B1 | 7/2017 | Manzari et al. |
| 9,753,541 B1 | 9/2017 | Robert et al. |
| 9,788,203 B2 | 10/2017 | Dutt et al. |
| 9,817,549 B2 | 11/2017 | Chandrasekaran |
| 9,847,999 B2 | 12/2017 | Van Os et al. |
| 9,851,214 B1 | 12/2017 | Chintakindi |
| 9,876,788 B1 * | 1/2018 | Ziraknejad ............... G06F 21/34 |
| 9,881,198 B2 | 1/2018 | Lee et al. |
| 9,898,642 B2 | 2/2018 | Han et al. |
| 9,913,246 B1 | 3/2018 | Carey et al. |
| 9,922,317 B2 | 3/2018 | Bak et al. |
| 9,953,149 B2 | 4/2018 | Tussy |
| 9,984,270 B2 | 5/2018 | Yousefpor et al. |
| 10,003,738 B2 | 6/2018 | Lautenbach et al. |
| 10,019,904 B1 | 7/2018 | Chan et al. |
| 10,073,541 B1 | 9/2018 | Baldwin |
| 10,089,607 B2 | 10/2018 | Ziat et al. |
| 10,096,015 B2 | 10/2018 | Bak et al. |
| 10,163,105 B1 | 12/2018 | Ziraknejad et al. |
| 10,199,051 B2 | 2/2019 | Binder et al. |
| 10,334,054 B2 | 6/2019 | Van Os et al. |
| 10,410,035 B2 | 9/2019 | Han et al. |
| 10,440,574 B2 | 10/2019 | Ledvina et al. |
| 10,482,461 B2 | 11/2019 | Van Os et al. |
| 10,701,067 B1 | 6/2020 | Ziraknejad et al. |
| 10,749,967 B2 | 8/2020 | Van Os et al. |
| 10,803,281 B2 | 10/2020 | Han et al. |
| 10,805,758 B2 | 10/2020 | Norris et al. |
| 10,861,104 B1 | 12/2020 | Young |
| 10,931,813 B1 | 2/2021 | Kim et al. |
| 10,943,382 B2 | 3/2021 | Shapiro et al. |
| 10,971,171 B2 | 4/2021 | Davis et al. |
| 11,026,085 B2 | 6/2021 | Grange et al. |
| 11,100,349 B2 | 8/2021 | Cohen et al. |
| 11,751,053 B2 | 9/2023 | Lee et al. |
| 2001/0031072 A1 | 10/2001 | Dobashi et al. |
| 2001/0039497 A1 | 11/2001 | Hubbard |
| 2001/0044906 A1 | 11/2001 | Kanevsky et al. |
| 2001/0047365 A1 | 11/2001 | Yonaitis |
| 2001/0047488 A1 | 11/2001 | Verplaetse et al. |
| 2002/0002682 A1 | 1/2002 | Tsuchiyama et al. |
| 2002/0004760 A1 | 1/2002 | Yoshida et al. |
| 2002/0015024 A1 | 2/2002 | Westerman et al. |
| 2002/0046064 A1 | 4/2002 | Maury et al. |
| 2002/0059295 A1 | 5/2002 | Ludtke et al. |
| 2002/0061130 A1 | 5/2002 | Kirk et al. |
| 2002/0065774 A1 | 5/2002 | Young et al. |
| 2002/0095588 A1 | 7/2002 | Shigematsu et al. |
| 2002/0097145 A1 | 7/2002 | Tumey et al. |
| 2002/0109668 A1 | 8/2002 | Rosenberg et al. |
| 2002/0120867 A1 | 8/2002 | Mitchell et al. |
| 2002/0136435 A1 | 9/2002 | Prokoski |
| 2002/0141586 A1 | 10/2002 | Margalit et al. |
| 2002/0190960 A1 | 12/2002 | Kuo et al. |
| 2002/0191029 A1 | 12/2002 | Gillespie et al. |
| 2002/0191816 A1 | 12/2002 | Maritzen et al. |
| 2002/0191817 A1 | 12/2002 | Sato et al. |
| 2003/0006280 A1 | 1/2003 | Seita et al. |
| 2003/0028639 A1 | 2/2003 | Yamamoto et al. |
| 2003/0038754 A1 | 2/2003 | Goldstein et al. |
| 2003/0046557 A1 | 3/2003 | Miller et al. |
| 2003/0048173 A1 | 3/2003 | Shigematsu et al. |
| 2003/0059092 A1 | 3/2003 | Okubo et al. |
| 2003/0076298 A1 | 4/2003 | Rosenberg |
| 2003/0097413 A1 | 5/2003 | Vishik et al. |
| 2003/0103652 A1 | 6/2003 | Lee et al. |
| 2003/0115490 A1 | 6/2003 | Russo et al. |
| 2003/0118217 A1 | 6/2003 | Kondo et al. |
| 2003/0120934 A1 | 6/2003 | Ortiz |
| 2003/0132974 A1 | 7/2003 | Bodin |
| 2003/0138136 A1 | 7/2003 | Umezaki et al. |
| 2003/0141959 A1 | 7/2003 | Keogh et al. |
| 2003/0160815 A1 | 8/2003 | Muschetto |
| 2003/0163710 A1 | 8/2003 | Ortiz et al. |
| 2003/0188183 A1 | 10/2003 | Lee et al. |
| 2003/0200184 A1 | 10/2003 | Dominguez et al. |
| 2003/0210127 A1 | 11/2003 | Anderson |
| 2003/0236746 A1 | 12/2003 | Turner et al. |
| 2004/0010722 A1 | 1/2004 | Ha |
| 2004/0030934 A1 | 2/2004 | Mizoguchi et al. |
| 2004/0046638 A1 | 3/2004 | Kawasaki |
| 2004/0059590 A1 * | 3/2004 | Mercredi ............... G06F 21/41 726/5 |
| 2004/0073432 A1 | 4/2004 | Stone |
| 2004/0076310 A1 | 4/2004 | Hersch et al. |
| 2004/0085300 A1 | 5/2004 | Matusis et al. |
| 2004/0085351 A1 | 5/2004 | Tokkonen |
| 2004/0088564 A1 | 5/2004 | Norman |
| 2004/0091136 A1 | 5/2004 | Dombrowski |
| 2004/0113819 A1 | 6/2004 | Gauthey et al. |
| 2004/0122685 A1 | 6/2004 | Bunce |
| 2004/0131237 A1 | 7/2004 | Machida |
| 2004/0135801 A1 | 7/2004 | Thompson et al. |
| 2004/0137890 A1 | 7/2004 | Kalke |
| 2004/0143553 A1 | 7/2004 | Torget et al. |
| 2004/0151347 A1 | 8/2004 | Wisniewski |
| 2004/0172562 A1 | 9/2004 | Berger et al. |
| 2004/0181695 A1 | 9/2004 | Walker et al. |
| 2004/0190758 A1 | 9/2004 | Doi et al. |

(56) References Cited

U.S. PATENT DOCUMENTS

| | | |
|---|---|---|
| 2004/0196400 A1 | 10/2004 | Stavely et al. |
| 2004/0210771 A1 | 10/2004 | Wood et al. |
| 2004/0215572 A1 | 10/2004 | Uehara et al. |
| 2004/0229560 A1 | 11/2004 | Maloney |
| 2004/0230843 A1 | 11/2004 | Jansen |
| 2004/0239648 A1 | 12/2004 | Abdallah et al. |
| 2004/0239732 A1 | 12/2004 | Silverbrook |
| 2004/0242200 A1 | 12/2004 | Maeoka et al. |
| 2004/0250138 A1 | 12/2004 | Schneider |
| 2004/0252867 A1 | 12/2004 | Lan et al. |
| 2004/0254891 A1 | 12/2004 | Blinn et al. |
| 2004/0257196 A1 | 12/2004 | Kotzin |
| 2004/0260955 A1 | 12/2004 | Mantyla |
| 2005/0024341 A1 | 2/2005 | Gillespie et al. |
| 2005/0028082 A1 | 2/2005 | Topalov et al. |
| 2005/0040962 A1 | 2/2005 | Funkhouser et al. |
| 2005/0041841 A1 | 2/2005 | Yoo et al. |
| 2005/0060554 A1 | 3/2005 | O'Donoghue |
| 2005/0071188 A1 | 3/2005 | Thuerk |
| 2005/0071635 A1 | 3/2005 | Furuyama |
| 2005/0071647 A1 | 3/2005 | Fujinuma et al. |
| 2005/0074147 A1 | 4/2005 | Smith et al. |
| 2005/0078855 A1 | 4/2005 | Chandler et al. |
| 2005/0079896 A1 | 4/2005 | Kokko et al. |
| 2005/0091213 A1 | 4/2005 | Schutz et al. |
| 2005/0093834 A1 | 5/2005 | Abdallah et al. |
| 2005/0093868 A1 | 5/2005 | Hinckley |
| 2005/0096009 A1 | 5/2005 | Ackley |
| 2005/0097037 A1 | 5/2005 | Tibor |
| 2005/0097171 A1 | 5/2005 | Hikichi |
| 2005/0097608 A1 | 5/2005 | Penke et al. |
| 2005/0100198 A1 | 5/2005 | Nakano et al. |
| 2005/0105778 A1 | 5/2005 | Sung et al. |
| 2005/0110801 A1 | 5/2005 | Lin |
| 2005/0111708 A1 | 5/2005 | Chou |
| 2005/0113071 A1 | 5/2005 | Nagata |
| 2005/0114686 A1 | 5/2005 | Ball et al. |
| 2005/0116840 A1 | 6/2005 | Simelius |
| 2005/0117752 A1 | 6/2005 | Iima et al. |
| 2005/0144452 A1 | 6/2005 | Lynch et al. |
| 2005/0169503 A1 | 8/2005 | Howell et al. |
| 2005/0174325 A1 | 8/2005 | Setlak et al. |
| 2005/0177867 A1 | 8/2005 | Toutonghi |
| 2005/0187873 A1 | 8/2005 | Labrou et al. |
| 2005/0190059 A1 | 9/2005 | Wehrenberg |
| 2005/0204173 A1 | 9/2005 | Chang |
| 2005/0206501 A1 | 9/2005 | Farhat |
| 2005/0220304 A1 | 10/2005 | Lenoir et al. |
| 2005/0221798 A1 | 10/2005 | Sengupta et al. |
| 2005/0226472 A1 | 10/2005 | Komura et al. |
| 2005/0231625 A1 | 10/2005 | Parulski et al. |
| 2005/0250538 A1 | 11/2005 | Narasimhan et al. |
| 2005/0253817 A1 | 11/2005 | Rytivaara et al. |
| 2005/0254086 A1 | 11/2005 | Shouno |
| 2006/0017692 A1 | 1/2006 | Wehrenberg et al. |
| 2006/0021003 A1 | 1/2006 | Fisher et al. |
| 2006/0029262 A1 | 2/2006 | Fujimatsu et al. |
| 2006/0032908 A1 | 2/2006 | Sines |
| 2006/0036553 A1 | 2/2006 | Gupta et al. |
| 2006/0039686 A1 | 2/2006 | Soh et al. |
| 2006/0056664 A1 | 3/2006 | Iwasaki |
| 2006/0075228 A1 | 4/2006 | Black et al. |
| 2006/0075250 A1 | 4/2006 | Liao |
| 2006/0078176 A1 | 4/2006 | Abiko et al. |
| 2006/0080525 A1 | 4/2006 | Ritter et al. |
| 2006/0093183 A1 | 5/2006 | Hosoi et al. |
| 2006/0093192 A1 | 5/2006 | Bechtel |
| 2006/0097172 A1 | 5/2006 | Park |
| 2006/0102843 A1 | 5/2006 | Bazakos et al. |
| 2006/0104488 A1 | 5/2006 | Bazakos et al. |
| 2006/0107067 A1 | 5/2006 | Safal et al. |
| 2006/0115130 A1 | 6/2006 | Kozlay |
| 2006/0116555 A1 | 6/2006 | Pavlidis et al. |
| 2006/0120707 A1 | 6/2006 | Kusakari et al. |
| 2006/0136087 A1 | 6/2006 | Higashiura |
| 2006/0136734 A1 | 6/2006 | Telek et al. |
| 2006/0156028 A1 | 7/2006 | Aoyama et al. |
| 2006/0161870 A1 | 7/2006 | Hotelling et al. |
| 2006/0161871 A1 | 7/2006 | Hotelling et al. |
| 2006/0165060 A1 | 7/2006 | Dua et al. |
| 2006/0192775 A1 | 8/2006 | Nicholson et al. |
| 2006/0192868 A1 | 8/2006 | Wakamori |
| 2006/0206709 A1 | 9/2006 | Labrou et al. |
| 2006/0206724 A1 | 9/2006 | Schaufele et al. |
| 2006/0208065 A1 | 9/2006 | Mendelovich et al. |
| 2006/0214910 A1 | 9/2006 | Mizuno et al. |
| 2006/0215886 A1 | 9/2006 | Black |
| 2006/0219776 A1 | 10/2006 | Finn |
| 2006/0224645 A1 | 10/2006 | Kadi |
| 2006/0224882 A1 | 10/2006 | Chin |
| 2006/0234764 A1 | 10/2006 | Gamo et al. |
| 2006/0239517 A1 | 10/2006 | Creasey et al. |
| 2006/0250578 A1 | 11/2006 | Pohl et al. |
| 2006/0274920 A1 | 12/2006 | Tochikubo et al. |
| 2006/0280340 A1 | 12/2006 | Derakhshani et al. |
| 2006/0282671 A1 | 12/2006 | Burton |
| 2006/0282682 A1 | 12/2006 | Masaki et al. |
| 2006/0285663 A1 | 12/2006 | Rathus et al. |
| 2006/0288082 A1 | 12/2006 | Rosenberg et al. |
| 2006/0288226 A1 | 12/2006 | Kowal |
| 2006/0288234 A1 | 12/2006 | Azar et al. |
| 2006/0294007 A1 | 12/2006 | Barthelemy |
| 2006/0294025 A1 | 12/2006 | Mengerink |
| 2007/0008066 A1 | 1/2007 | Fukuda |
| 2007/0009139 A1 | 1/2007 | Landschaft et al. |
| 2007/0014439 A1 | 1/2007 | Ando et al. |
| 2007/0016958 A1 | 1/2007 | Bodepudi et al. |
| 2007/0021194 A1 | 1/2007 | Aida |
| 2007/0024579 A1 | 2/2007 | Rosenberg |
| 2007/0025723 A1 | 2/2007 | Baudisch et al. |
| 2007/0061126 A1 | 3/2007 | Russo et al. |
| 2007/0061889 A1 | 3/2007 | Sainaney et al. |
| 2007/0067642 A1 | 3/2007 | Singhal |
| 2007/0073649 A1 | 3/2007 | Kikkoji et al. |
| 2007/0075965 A1 | 4/2007 | Huppi et al. |
| 2007/0079137 A1 | 4/2007 | Tu |
| 2007/0081081 A1 | 4/2007 | Cheng |
| 2007/0089164 A1 | 4/2007 | Gao et al. |
| 2007/0106942 A1 | 5/2007 | Sanaka et al. |
| 2007/0109274 A1 | 5/2007 | Reynolds |
| 2007/0110287 A1 | 5/2007 | Kim et al. |
| 2007/0126859 A1 | 6/2007 | Choi et al. |
| 2007/0143628 A1 | 6/2007 | Genda |
| 2007/0150842 A1 | 6/2007 | Chaudhri et al. |
| 2007/0156521 A1 | 7/2007 | Yates |
| 2007/0162963 A1 | 7/2007 | Penet et al. |
| 2007/0180062 A1 | 8/2007 | Southerland et al. |
| 2007/0180492 A1 | 8/2007 | Hassan et al. |
| 2007/0186106 A1 | 8/2007 | Ting et al. |
| 2007/0189583 A1 | 8/2007 | Shimada et al. |
| 2007/0192168 A1 | 8/2007 | Van Luchene |
| 2007/0194113 A1 | 8/2007 | Esplin et al. |
| 2007/0200916 A1 | 8/2007 | Han |
| 2007/0201730 A1 | 8/2007 | Masaki et al. |
| 2007/0204037 A1 | 8/2007 | Kunz et al. |
| 2007/0208743 A1 | 9/2007 | Sainaney et al. |
| 2007/0219901 A1 | 9/2007 | Garbow et al. |
| 2007/0220273 A1 | 9/2007 | Campisi |
| 2007/0226778 A1 | 9/2007 | Pietruszka |
| 2007/0229221 A1 | 10/2007 | Saotome |
| 2007/0230773 A1 | 10/2007 | Nagao et al. |
| 2007/0236330 A1 | 10/2007 | Cho et al. |
| 2007/0236475 A1 | 10/2007 | Wherry |
| 2007/0239921 A1 | 10/2007 | Toorians et al. |
| 2007/0244811 A1 | 10/2007 | Tumminaro |
| 2007/0250573 A1 | 10/2007 | Rothschild et al. |
| 2007/0253604 A1 | 11/2007 | Inoue et al. |
| 2007/0255564 A1 | 11/2007 | Yee et al. |
| 2007/0259716 A1 | 11/2007 | Mattice et al. |
| 2007/0260547 A1 | 11/2007 | Little |
| 2007/0277224 A1 | 11/2007 | Osborn et al. |
| 2007/0280515 A1 | 12/2007 | Goto |
| 2007/0287423 A1 | 12/2007 | Kakiuchi et al. |
| 2007/0294182 A1 | 12/2007 | Hammad |

(56) References Cited

U.S. PATENT DOCUMENTS

| | | |
|---|---|---|
| 2008/0001703 A1 | 1/2008 | Goto |
| 2008/0017721 A1 | 1/2008 | Zehnacker |
| 2008/0027947 A1 | 1/2008 | Pritchett et al. |
| 2008/0032801 A1 | 2/2008 | Brunet De Courssou |
| 2008/0040786 A1 | 2/2008 | Chang et al. |
| 2008/0041936 A1 | 2/2008 | Vawter |
| 2008/0042866 A1 | 2/2008 | Morse et al. |
| 2008/0042983 A1 | 2/2008 | Kim et al. |
| 2008/0048878 A1 | 2/2008 | Boillot |
| 2008/0049984 A1 | 2/2008 | Poo et al. |
| 2008/0054081 A1 | 3/2008 | Mullen |
| 2008/0059351 A1 | 3/2008 | Richey et al. |
| 2008/0069412 A1 | 3/2008 | Champagne et al. |
| 2008/0072045 A1 | 3/2008 | Mizrah |
| 2008/0084539 A1 | 4/2008 | Daniel |
| 2008/0092245 A1 | 4/2008 | Alward et al. |
| 2008/0114678 A1 | 5/2008 | Bennett et al. |
| 2008/0114980 A1 | 5/2008 | Sridhar |
| 2008/0133931 A1 | 6/2008 | Kosaka |
| 2008/0140868 A1 | 6/2008 | Kalayjian et al. |
| 2008/0165255 A1 | 7/2008 | Christie et al. |
| 2008/0167834 A1 | 7/2008 | Herz et al. |
| 2008/0172598 A1 | 7/2008 | Jacobsen et al. |
| 2008/0178283 A1 | 7/2008 | Pratt et al. |
| 2008/0201454 A1 | 8/2008 | Soffer |
| 2008/0208762 A1 | 8/2008 | Arthur et al. |
| 2008/0212849 A1 | 9/2008 | Gao |
| 2008/0218535 A1 | 9/2008 | Forstall et al. |
| 2008/0218641 A1 | 9/2008 | Kjeldsen et al. |
| 2008/0229409 A1 | 9/2008 | Miller et al. |
| 2008/0231729 A1 | 9/2008 | Sato et al. |
| 2008/0246917 A1 | 10/2008 | Phinney et al. |
| 2008/0250481 A1 | 10/2008 | Beck et al. |
| 2008/0275779 A1 | 11/2008 | Lakshminarayanan |
| 2008/0292144 A1 | 11/2008 | Kim et al. |
| 2008/0309632 A1 | 12/2008 | Westerman et al. |
| 2008/0314971 A1 | 12/2008 | Faith et al. |
| 2008/0317292 A1 | 12/2008 | Baker et al. |
| 2008/0319875 A1 | 12/2008 | Levchin et al. |
| 2008/0320391 A1 | 12/2008 | Lemay et al. |
| 2009/0005165 A1 | 1/2009 | Arezina et al. |
| 2009/0006292 A1 | 1/2009 | Block |
| 2009/0006846 A1 | 1/2009 | Rosenblatt |
| 2009/0006991 A1 | 1/2009 | Lindberg et al. |
| 2009/0016574 A1 | 1/2009 | Tsukahara |
| 2009/0031375 A1 | 1/2009 | Sullivan et al. |
| 2009/0036165 A1 | 2/2009 | Brede |
| 2009/0037742 A1 | 2/2009 | Narayanaswami |
| 2009/0054044 A1 | 2/2009 | Ikemori et al. |
| 2009/0055484 A1 | 2/2009 | Vuong et al. |
| 2009/0061837 A1 | 3/2009 | Chaudhri et al. |
| 2009/0063851 A1 | 3/2009 | Nijdam |
| 2009/0064055 A1 | 3/2009 | Chaudhri et al. |
| 2009/0067685 A1 | 3/2009 | Boshra et al. |
| 2009/0074255 A1 | 3/2009 | Holm |
| 2009/0082066 A1 | 3/2009 | Katz |
| 2009/0083847 A1 | 3/2009 | Fadell et al. |
| 2009/0083850 A1 | 3/2009 | Fadell et al. |
| 2009/0094681 A1 | 4/2009 | Sadler et al. |
| 2009/0106558 A1 | 4/2009 | Delgrosso et al. |
| 2009/0119754 A1 | 5/2009 | Schubert |
| 2009/0122149 A1 | 5/2009 | Ishii |
| 2009/0144074 A1 | 6/2009 | Choi |
| 2009/0146779 A1 | 6/2009 | Kumar et al. |
| 2009/0158390 A1 | 6/2009 | Guan |
| 2009/0159696 A1 | 6/2009 | Mullen |
| 2009/0160609 A1 | 6/2009 | Lin et al. |
| 2009/0164878 A1 | 6/2009 | Cottrille |
| 2009/0165107 A1 | 6/2009 | Tojo et al. |
| 2009/0168756 A1 | 7/2009 | Kurapati et al. |
| 2009/0175509 A1 | 7/2009 | Gonion et al. |
| 2009/0176565 A1 | 7/2009 | Kelly et al. |
| 2009/0187423 A1 | 7/2009 | Kim |
| 2009/0193514 A1 | 7/2009 | Adams et al. |
| 2009/0199188 A1 | 8/2009 | Fujimaki |
| 2009/0201257 A1 | 8/2009 | Saitoh et al. |
| 2009/0210308 A1 | 8/2009 | Toomer et al. |
| 2009/0215533 A1 | 8/2009 | Zalewski et al. |
| 2009/0224874 A1 | 9/2009 | Dewar et al. |
| 2009/0228938 A1 | 9/2009 | White et al. |
| 2009/0241169 A1 | 9/2009 | Dhand et al. |
| 2009/0258667 A1 | 10/2009 | Suzuki et al. |
| 2009/0262947 A1 | 10/2009 | Karlsson et al. |
| 2009/0307139 A1 | 12/2009 | Mardikar et al. |
| 2009/0312049 A1 | 12/2009 | Isomursu |
| 2009/0327744 A1 | 12/2009 | Hatano et al. |
| 2009/0328162 A1 | 12/2009 | Kokumai et al. |
| 2010/0008545 A1 | 1/2010 | Ueki et al. |
| 2010/0011424 A1 | 1/2010 | Ushiku |
| 2010/0026640 A1 | 2/2010 | Kim et al. |
| 2010/0027854 A1 | 2/2010 | Chatterjee et al. |
| 2010/0034432 A1 | 2/2010 | Ono et al. |
| 2010/0042835 A1 | 2/2010 | Lee et al. |
| 2010/0066822 A1 | 3/2010 | Steinberg et al. |
| 2010/0075656 A1 | 3/2010 | Howarter et al. |
| 2010/0082462 A1 | 4/2010 | Yuan et al. |
| 2010/0082481 A1 | 4/2010 | Lin et al. |
| 2010/0088148 A1 | 4/2010 | Presswala et al. |
| 2010/0098300 A1 | 4/2010 | Otto et al. |
| 2010/0107229 A1 | 4/2010 | Najafi et al. |
| 2010/0114731 A1 | 5/2010 | Kingston et al. |
| 2010/0122327 A1 | 5/2010 | Linecker et al. |
| 2010/0124363 A1 | 5/2010 | Ek et al. |
| 2010/0131303 A1 | 5/2010 | Collopy et al. |
| 2010/0146384 A1 | 6/2010 | Peev et al. |
| 2010/0153265 A1 | 6/2010 | Hershfield et al. |
| 2010/0158327 A1 | 6/2010 | Kangas et al. |
| 2010/0164684 A1 | 7/2010 | Sasa et al. |
| 2010/0178873 A1 | 7/2010 | Lee et al. |
| 2010/0185871 A1 | 7/2010 | Scherrer et al. |
| 2010/0191570 A1 | 7/2010 | Michaud et al. |
| 2010/0205091 A1 | 8/2010 | Graziano et al. |
| 2010/0207721 A1 | 8/2010 | Nakajima et al. |
| 2010/0216425 A1 | 8/2010 | Smith |
| 2010/0223145 A1 | 9/2010 | Dragt |
| 2010/0225607 A1 | 9/2010 | Kim |
| 2010/0231356 A1 | 9/2010 | Kim |
| 2010/0240415 A1 | 9/2010 | Kim et al. |
| 2010/0243741 A1 | 9/2010 | Eng |
| 2010/0251243 A1 | 9/2010 | Gill et al. |
| 2010/0265204 A1 | 10/2010 | Tsuda |
| 2010/0267362 A1 | 10/2010 | Smith et al. |
| 2010/0269156 A1 | 10/2010 | Hohlfeld et al. |
| 2010/0273461 A1 | 10/2010 | Choi |
| 2010/0302016 A1 | 12/2010 | Zaborowski |
| 2010/0311397 A1 | 12/2010 | Li |
| 2010/0313263 A1 | 12/2010 | Uchida et al. |
| 2011/0010470 A1 | 1/2011 | Hulbert et al. |
| 2011/0013813 A1 | 1/2011 | Yamamoto et al. |
| 2011/0035799 A1 | 2/2011 | Handler |
| 2011/0050976 A1 | 3/2011 | Kwon |
| 2011/0052013 A1 | 3/2011 | Sasahara et al. |
| 2011/0054268 A1 | 3/2011 | Fidacaro et al. |
| 2011/0055763 A1 | 3/2011 | Utsuki et al. |
| 2011/0065479 A1 | 3/2011 | Nader |
| 2011/0067098 A1 | 3/2011 | Ruggiero et al. |
| 2011/0088086 A1 | 4/2011 | Swink et al. |
| 2011/0099079 A1 | 4/2011 | White et al. |
| 2011/0119610 A1 | 5/2011 | Hackborn et al. |
| 2011/0122294 A1 | 5/2011 | Suh et al. |
| 2011/0138166 A1 | 6/2011 | Peszek et al. |
| 2011/0142234 A1 | 6/2011 | Rogers |
| 2011/0145049 A1 | 6/2011 | Hertel et al. |
| 2011/0145051 A1 | 6/2011 | Paradise et al. |
| 2011/0149874 A1 | 6/2011 | Reif |
| 2011/0161116 A1 | 6/2011 | Peak et al. |
| 2011/0163969 A1 | 7/2011 | Freddy et al. |
| 2011/0164269 A1 | 7/2011 | Kamishiro |
| 2011/0175703 A1 | 7/2011 | Benkley, III |
| 2011/0187497 A1 | 8/2011 | Chin |
| 2011/0201306 A1 | 8/2011 | Ali Al-Harbi |
| 2011/0215921 A1 | 9/2011 | Ben et al. |
| 2011/0225057 A1 | 9/2011 | Webb et al. |
| 2011/0225069 A1 | 9/2011 | Cramer et al. |

(56) References Cited

U.S. PATENT DOCUMENTS

| | | |
|---|---|---|
| 2011/0225426 A1 | 9/2011 | Agarwal et al. |
| 2011/0230769 A1 | 9/2011 | Yamazaki |
| 2011/0231914 A1 | 9/2011 | Hung |
| 2011/0238514 A1 | 9/2011 | Ramalingam et al. |
| 2011/0251892 A1 | 10/2011 | Laracey |
| 2011/0254683 A1 | 10/2011 | Soldan et al. |
| 2011/0286640 A1 | 11/2011 | Kwon et al. |
| 2011/0288970 A1 | 11/2011 | Kidron et al. |
| 2011/0296324 A1 | 12/2011 | Goossens et al. |
| 2011/0300829 A1 | 12/2011 | Nurmi et al. |
| 2012/0009896 A1 | 1/2012 | Bandyopadhyay et al. |
| 2012/0023185 A1 | 1/2012 | Holden et al. |
| 2012/0023573 A1 | 1/2012 | Shi |
| 2012/0028659 A1 | 2/2012 | Whitney et al. |
| 2012/0028695 A1 | 2/2012 | Walker et al. |
| 2012/0032891 A1 | 2/2012 | Parivar et al. |
| 2012/0036556 A1 | 2/2012 | Lebeau et al. |
| 2012/0050152 A1 | 3/2012 | Salminen et al. |
| 2012/0069231 A1 | 3/2012 | Chao |
| 2012/0072546 A1 | 3/2012 | Etchegoyen |
| 2012/0078751 A1 | 3/2012 | Macphail et al. |
| 2012/0081282 A1 | 4/2012 | Chin |
| 2012/0089507 A1 | 4/2012 | Zhang et al. |
| 2012/0089835 A1 | 4/2012 | Peckover |
| 2012/0095853 A1 | 4/2012 | Von et al. |
| 2012/0095865 A1 | 4/2012 | Doherty et al. |
| 2012/0123806 A1 | 5/2012 | Schumann et al. |
| 2012/0123937 A1 | 5/2012 | Spodak et al. |
| 2012/0139698 A1 | 6/2012 | Tsui et al. |
| 2012/0197743 A1 | 8/2012 | Grigg et al. |
| 2012/0200489 A1 | 8/2012 | Miyashita et al. |
| 2012/0215553 A1 | 8/2012 | Leston |
| 2012/0218125 A1 | 8/2012 | Demirdjian et al. |
| 2012/0221427 A1 | 8/2012 | Woo |
| 2012/0221464 A1 | 8/2012 | Pasquero et al. |
| 2012/0235790 A1 | 9/2012 | Zhao et al. |
| 2012/0245985 A1 | 9/2012 | Cho et al. |
| 2012/0267432 A1 | 10/2012 | Kuttuva |
| 2012/0271712 A1 | 10/2012 | Katzin et al. |
| 2012/0280917 A1 | 11/2012 | Toksvig et al. |
| 2012/0283871 A1 | 11/2012 | Chai et al. |
| 2012/0284297 A1 | 11/2012 | Aguera-Arcas et al. |
| 2012/0290449 A1 | 11/2012 | Mullen et al. |
| 2012/0291121 A1 | 11/2012 | Huang et al. |
| 2012/0293438 A1 | 11/2012 | Chaudhri et al. |
| 2012/0295708 A1 | 11/2012 | Hernandez-Abrego et al. |
| 2012/0310760 A1 | 12/2012 | Phillips et al. |
| 2012/0311438 A1 | 12/2012 | Cranfill et al. |
| 2012/0311499 A1 | 12/2012 | Dellinger et al. |
| 2012/0316933 A1 | 12/2012 | Pentland et al. |
| 2012/0322370 A1 | 12/2012 | Lee |
| 2012/0322371 A1 | 12/2012 | Lee |
| 2012/0327183 A1 | 12/2012 | Fujii |
| 2013/0013499 A1 | 1/2013 | Kalgi |
| 2013/0015946 A1 | 1/2013 | Lau et al. |
| 2013/0024932 A1 | 1/2013 | Toebes et al. |
| 2013/0030934 A1 | 1/2013 | Bakshi et al. |
| 2013/0031217 A1 | 1/2013 | Rajapakse |
| 2013/0047233 A1 | 2/2013 | Fisk et al. |
| 2013/0047236 A1 | 2/2013 | Singh |
| 2013/0050263 A1 | 2/2013 | Khoe et al. |
| 2013/0054336 A1 | 2/2013 | Graylin |
| 2013/0060678 A1 | 3/2013 | Oskolkov et al. |
| 2013/0060687 A1 | 3/2013 | Bak et al. |
| 2013/0067545 A1 | 3/2013 | Hanes |
| 2013/0073321 A1 | 3/2013 | Hofmann et al. |
| 2013/0074194 A1 | 3/2013 | White et al. |
| 2013/0080272 A1 | 3/2013 | Ronca et al. |
| 2013/0080275 A1 | 3/2013 | Ronca et al. |
| 2013/0082819 A1 | 4/2013 | Cotterill |
| 2013/0082974 A1 | 4/2013 | Kerr et al. |
| 2013/0085931 A1 | 4/2013 | Runyan |
| 2013/0085936 A1 | 4/2013 | Law et al. |
| 2013/0086637 A1 | 4/2013 | Cotterill et al. |
| 2013/0102281 A1 | 4/2013 | Kanda et al. |
| 2013/0103519 A1 | 4/2013 | Kountotsis et al. |
| 2013/0110719 A1 | 5/2013 | Carter et al. |
| 2013/0122866 A1 | 5/2013 | Huang |
| 2013/0124423 A1 | 5/2013 | Fisher |
| 2013/0124855 A1 | 5/2013 | Varadarajan et al. |
| 2013/0127854 A1 | 5/2013 | Shpunt et al. |
| 2013/0129162 A1 | 5/2013 | Cheng et al. |
| 2013/0136341 A1 | 5/2013 | Yamamoto |
| 2013/0145448 A1 | 6/2013 | Newell |
| 2013/0148867 A1 | 6/2013 | Wang |
| 2013/0151414 A1 | 6/2013 | Zhu et al. |
| 2013/0160110 A1 | 6/2013 | Schechter et al. |
| 2013/0166325 A1 | 6/2013 | Ganapathy et al. |
| 2013/0169549 A1 | 7/2013 | Seymour et al. |
| 2013/0176208 A1 | 7/2013 | Tanaka et al. |
| 2013/0191911 A1 | 7/2013 | Dellinger et al. |
| 2013/0200146 A1 | 8/2013 | Moghadam et al. |
| 2013/0212655 A1 | 8/2013 | Hoyos et al. |
| 2013/0216108 A1 | 8/2013 | Hwang et al. |
| 2013/0218721 A1 | 8/2013 | Borhan et al. |
| 2013/0222323 A1 | 8/2013 | Mckenzie |
| 2013/0223696 A1 | 8/2013 | Azar et al. |
| 2013/0226792 A1 | 8/2013 | Kushevsky et al. |
| 2013/0231127 A1 | 9/2013 | Kildal et al. |
| 2013/0239202 A1 | 9/2013 | Adams et al. |
| 2013/0243264 A1 | 9/2013 | Aoki |
| 2013/0244615 A1 | 9/2013 | Miller |
| 2013/0247175 A1 | 9/2013 | Nechyba et al. |
| 2013/0254574 A1 | 9/2013 | Zacchio et al. |
| 2013/0254858 A1 | 9/2013 | Giardina et al. |
| 2013/0262857 A1 | 10/2013 | Neuman et al. |
| 2013/0279768 A1 | 10/2013 | Boshra |
| 2013/0282577 A1 | 10/2013 | Milne |
| 2013/0286161 A1 | 10/2013 | Lv et al. |
| 2013/0290187 A1 | 10/2013 | Itwaru |
| 2013/0301832 A1 | 11/2013 | Harper |
| 2013/0304514 A1 | 11/2013 | Hyde et al. |
| 2013/0304651 A1 | 11/2013 | Smith et al. |
| 2013/0307771 A1 | 11/2013 | Parker et al. |
| 2013/0312087 A1 | 11/2013 | Latzina |
| 2013/0317991 A1 | 11/2013 | Groat et al. |
| 2013/0332358 A1 | 12/2013 | Zhao |
| 2013/0332364 A1 | 12/2013 | Templeton et al. |
| 2013/0333006 A1 | 12/2013 | Tapling et al. |
| 2013/0336527 A1 | 12/2013 | Nechyba et al. |
| 2013/0336545 A1 | 12/2013 | Pritikin et al. |
| 2013/0342672 A1 | 12/2013 | Gray et al. |
| 2013/0346273 A1 | 12/2013 | Stockton et al. |
| 2013/0346302 A1 | 12/2013 | Purves et al. |
| 2014/0003677 A1 | 1/2014 | Han et al. |
| 2014/0006155 A1 | 1/2014 | Ramirez et al. |
| 2014/0006285 A1 | 1/2014 | Chi et al. |
| 2014/0013422 A1 | 1/2014 | Janus et al. |
| 2014/0019352 A1 | 1/2014 | Shrivastava |
| 2014/0025513 A1 | 1/2014 | Cooke et al. |
| 2014/0026188 A1 | 1/2014 | Gubler |
| 2014/0040120 A1 | 2/2014 | Cho et al. |
| 2014/0047560 A1 | 2/2014 | Meyer et al. |
| 2014/0056491 A1 | 2/2014 | Knight |
| 2014/0058860 A1 | 2/2014 | Roh et al. |
| 2014/0058935 A1 | 2/2014 | Mijares |
| 2014/0058939 A1 | 2/2014 | Savla |
| 2014/0058941 A1 | 2/2014 | Moon et al. |
| 2014/0062853 A1 | 3/2014 | Chaudhri et al. |
| 2014/0068740 A1 | 3/2014 | Lecun et al. |
| 2014/0068751 A1 | 3/2014 | Last |
| 2014/0070957 A1 | 3/2014 | Longinotti-Buitoni et al. |
| 2014/0074635 A1 | 3/2014 | Reese et al. |
| 2014/0074716 A1 | 3/2014 | Ni |
| 2014/0085191 A1 | 3/2014 | Gonion et al. |
| 2014/0085460 A1 | 3/2014 | Park et al. |
| 2014/0094143 A1 | 4/2014 | Ayotte |
| 2014/0100952 A1 | 4/2014 | Bart et al. |
| 2014/0101056 A1 | 4/2014 | Wendling |
| 2014/0104178 A1 | 4/2014 | Jo |
| 2014/0109018 A1 | 4/2014 | Casey et al. |
| 2014/0111420 A1 | 4/2014 | Ahn et al. |
| 2014/0112555 A1 | 4/2014 | Fadell et al. |
| 2014/0114856 A1 | 4/2014 | Jung et al. |

(56) References Cited

U.S. PATENT DOCUMENTS

| | | |
|---|---|---|
| 2014/0115695 A1 | 4/2014 | Fadell et al. |
| 2014/0118519 A1 | 5/2014 | Sahin |
| 2014/0119620 A1 | 5/2014 | Jung et al. |
| 2014/0122331 A1 | 5/2014 | Vaish et al. |
| 2014/0123275 A1 | 5/2014 | Azar et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0135631 A1 | 5/2014 | Brumback et al. |
| 2014/0143145 A1 | 5/2014 | Kortina et al. |
| 2014/0143693 A1 | 5/2014 | Goossens et al. |
| 2014/0155031 A1 | 6/2014 | Lee et al. |
| 2014/0157153 A1 | 6/2014 | Yuen et al. |
| 2014/0164082 A1 | 6/2014 | Sun et al. |
| 2014/0165000 A1 | 6/2014 | Fleizach et al. |
| 2014/0173450 A1 | 6/2014 | Akula |
| 2014/0187163 A1 | 7/2014 | Fujita |
| 2014/0188673 A1 | 7/2014 | Graham et al. |
| 2014/0189829 A1 | 7/2014 | Mclachlan et al. |
| 2014/0193783 A1 | 7/2014 | Jeong et al. |
| 2014/0205161 A1 | 7/2014 | Salatino et al. |
| 2014/0208417 A1 | 7/2014 | Robison |
| 2014/0222436 A1 | 8/2014 | Binder et al. |
| 2014/0222664 A1 | 8/2014 | Milne |
| 2014/0226131 A1 | 8/2014 | Lopez et al. |
| 2014/0244365 A1 | 8/2014 | Price et al. |
| 2014/0244493 A1 | 8/2014 | Kenyon et al. |
| 2014/0247229 A1 | 9/2014 | Cho et al. |
| 2014/0254891 A1 | 9/2014 | Lee et al. |
| 2014/0257871 A1 | 9/2014 | Christensen et al. |
| 2014/0258292 A1 | 9/2014 | Thramann et al. |
| 2014/0258828 A1 | 9/2014 | Lymer et al. |
| 2014/0270374 A1 | 9/2014 | Unzueta |
| 2014/0279442 A1 | 9/2014 | Luoma et al. |
| 2014/0279497 A1 | 9/2014 | Qaim-maqami et al. |
| 2014/0279556 A1 | 9/2014 | Priebatsch et al. |
| 2014/0283018 A1 | 9/2014 | Dadu et al. |
| 2014/0283128 A1 | 9/2014 | Shepherd et al. |
| 2014/0292641 A1 | 10/2014 | Cho et al. |
| 2014/0293079 A1 | 10/2014 | Milanfar et al. |
| 2014/0298432 A1 | 10/2014 | Brown |
| 2014/0300554 A1 | 10/2014 | Samuel et al. |
| 2014/0304809 A1 | 10/2014 | Fadell et al. |
| 2014/0311447 A1 | 10/2014 | Surnilla et al. |
| 2014/0313307 A1 | 10/2014 | Oh et al. |
| 2014/0337175 A1 | 11/2014 | Katzin et al. |
| 2014/0337221 A1 | 11/2014 | Hoyos |
| 2014/0337634 A1 | 11/2014 | Johnson et al. |
| 2014/0337931 A1 | 11/2014 | Cotterill |
| 2014/0344896 A1 | 11/2014 | Pak et al. |
| 2014/0344904 A1 | 11/2014 | Venkataramani et al. |
| 2014/0350924 A1 | 11/2014 | Zurek et al. |
| 2014/0354401 A1 | 12/2014 | Soni et al. |
| 2014/0354538 A1 | 12/2014 | Lee et al. |
| 2014/0359140 A1 | 12/2014 | Shankarraman |
| 2014/0359454 A1 | 12/2014 | Lee et al. |
| 2014/0365904 A1 | 12/2014 | Kim et al. |
| 2014/0366159 A1 | 12/2014 | Cohen |
| 2014/0375835 A1 | 12/2014 | Bos |
| 2014/0380465 A1 | 12/2014 | Fadell et al. |
| 2015/0002696 A1 | 1/2015 | He et al. |
| 2015/0006207 A1 | 1/2015 | Jarvis et al. |
| 2015/0020081 A1 | 1/2015 | Cho et al. |
| 2015/0033364 A1 | 1/2015 | Wong |
| 2015/0043790 A1 | 2/2015 | Ono et al. |
| 2015/0044965 A1 | 2/2015 | Kurimoto et al. |
| 2015/0049014 A1 | 2/2015 | Saito |
| 2015/0051846 A1 | 2/2015 | Masuya |
| 2015/0051913 A1 | 2/2015 | Choi |
| 2015/0054764 A1 | 2/2015 | Kim et al. |
| 2015/0058146 A1 | 2/2015 | Aissi et al. |
| 2015/0074418 A1 | 3/2015 | Lee et al. |
| 2015/0074615 A1 | 3/2015 | Han et al. |
| 2015/0095175 A1 | 4/2015 | Dua |
| 2015/0101041 A1 | 4/2015 | Devar et al. |
| 2015/0109191 A1 | 4/2015 | Johnson et al. |
| 2015/0111559 A1 | 4/2015 | Leaver et al. |
| 2015/0121251 A1 | 4/2015 | Siddhartha et al. |
| 2015/0124053 A1 | 5/2015 | Tamura et al. |
| 2015/0127539 A1 | 5/2015 | Ye et al. |
| 2015/0130716 A1 | 5/2015 | Sridharan et al. |
| 2015/0135282 A1 | 5/2015 | Kong et al. |
| 2015/0146945 A1 | 5/2015 | Han |
| 2015/0154001 A1 | 6/2015 | Knox et al. |
| 2015/0154589 A1 | 6/2015 | Li |
| 2015/0179008 A1 | 6/2015 | Sung et al. |
| 2015/0186152 A1 | 7/2015 | Jothiswaran et al. |
| 2015/0186860 A1 | 7/2015 | Rangarajan |
| 2015/0187019 A1 | 7/2015 | Fernandes et al. |
| 2015/0195277 A1 | 7/2015 | Faaborg et al. |
| 2015/0205353 A1 | 7/2015 | Feng et al. |
| 2015/0208244 A1 | 7/2015 | Nakao |
| 2015/0212681 A1 | 7/2015 | Shinozaki et al. |
| 2015/0213244 A1 | 7/2015 | Lymberopoulos et al. |
| 2015/0215128 A1 | 7/2015 | Pal |
| 2015/0220924 A1 | 8/2015 | Bakker |
| 2015/0235018 A1 | 8/2015 | Gupta et al. |
| 2015/0235055 A1 | 8/2015 | An et al. |
| 2015/0235098 A1 | 8/2015 | Lee et al. |
| 2015/0242611 A1 | 8/2015 | Cotterill |
| 2015/0245159 A1 | 8/2015 | Osman |
| 2015/0249540 A1 | 9/2015 | Khalil et al. |
| 2015/0254661 A1 | 9/2015 | Lanc |
| 2015/0257004 A1 | 9/2015 | Shanmugam et al. |
| 2015/0261292 A1 | 9/2015 | Conzola et al. |
| 2015/0261387 A1 | 9/2015 | Petersen et al. |
| 2015/0271175 A1 | 9/2015 | Je et al. |
| 2015/0295921 A1 | 10/2015 | Cao |
| 2015/0304330 A1 | 10/2015 | Soamboonsrup et al. |
| 2015/0310259 A1 | 10/2015 | Lau et al. |
| 2015/0324113 A1 | 11/2015 | Kapp et al. |
| 2015/0334567 A1 | 11/2015 | Chen et al. |
| 2015/0339652 A1 | 11/2015 | Park et al. |
| 2015/0341717 A1 | 11/2015 | Song et al. |
| 2015/0346845 A1 | 12/2015 | Di Censo et al. |
| 2015/0347738 A1 | 12/2015 | Ulrich et al. |
| 2015/0348001 A1 | 12/2015 | Van Os et al. |
| 2015/0348002 A1 | 12/2015 | Van et al. |
| 2015/0348014 A1 | 12/2015 | Van Os et al. |
| 2015/0348018 A1 | 12/2015 | Campos et al. |
| 2015/0348029 A1 | 12/2015 | Van Os et al. |
| 2015/0349959 A1 | 12/2015 | Marciniak |
| 2015/0358316 A1 | 12/2015 | Cronin |
| 2015/0362977 A1 | 12/2015 | Doniwa |
| 2015/0363632 A1 | 12/2015 | Ahn et al. |
| 2015/0365400 A1 | 12/2015 | Cox |
| 2015/0370323 A1 | 12/2015 | Cieplinski et al. |
| 2015/0379252 A1 | 12/2015 | Tang et al. |
| 2016/0005024 A1 | 1/2016 | Harrell |
| 2016/0006745 A1 | 1/2016 | Furuichi et al. |
| 2016/0019536 A1 | 1/2016 | Ortiz et al. |
| 2016/0025993 A1 | 1/2016 | Mor et al. |
| 2016/0026779 A1 | 1/2016 | Grigg et al. |
| 2016/0036965 A1 | 2/2016 | Kim |
| 2016/0037345 A1 | 2/2016 | Margadoudakis |
| 2016/0042166 A1 | 2/2016 | Kang et al. |
| 2016/0047666 A1 | 2/2016 | Fuchs |
| 2016/0048705 A1 | 2/2016 | Yang et al. |
| 2016/0050199 A1 | 2/2016 | Ganesan |
| 2016/0055323 A1 | 2/2016 | Stuntebeck et al. |
| 2016/0055324 A1 | 2/2016 | Agarwal |
| 2016/0063235 A1 | 3/2016 | Tussy |
| 2016/0063298 A1 | 3/2016 | Tuneld et al. |
| 2016/0063828 A1 | 3/2016 | Verweij et al. |
| 2016/0063850 A1 | 3/2016 | Yang et al. |
| 2016/0078281 A1 | 3/2016 | Gongaware et al. |
| 2016/0092665 A1 | 3/2016 | Cowan et al. |
| 2016/0094705 A1 | 3/2016 | Vendrow |
| 2016/0100156 A1 | 4/2016 | Zhou et al. |
| 2016/0104034 A1 | 4/2016 | Wilder et al. |
| 2016/0117681 A1 | 4/2016 | Jiao et al. |
| 2016/0127641 A1 | 5/2016 | Gove |
| 2016/0132840 A1* | 5/2016 | Bowles .............. G06Q 30/0278 |
| | | 705/306 |

(56) References Cited

U.S. PATENT DOCUMENTS

| | | |
|---|---|---|
| 2016/0134488 A1 | 5/2016 | Straub et al. |
| 2016/0147987 A1 | 5/2016 | Jang et al. |
| 2016/0148042 A1 | 5/2016 | Gonion et al. |
| 2016/0148384 A1 | 5/2016 | Bud et al. |
| 2016/0150124 A1 | 5/2016 | Panda et al. |
| 2016/0154956 A1 | 6/2016 | Fadell et al. |
| 2016/0165205 A1 | 6/2016 | Liu et al. |
| 2016/0171192 A1 | 6/2016 | Holz et al. |
| 2016/0188860 A1 | 6/2016 | Lee et al. |
| 2016/0189451 A1 | 6/2016 | Yoo et al. |
| 2016/0191506 A1 | 6/2016 | Wang |
| 2016/0192324 A1 | 6/2016 | Zhang et al. |
| 2016/0217310 A1 | 7/2016 | Shah et al. |
| 2016/0224966 A1 | 8/2016 | Van Os et al. |
| 2016/0224973 A1 | 8/2016 | Van Os et al. |
| 2016/0232513 A1 | 8/2016 | Purves et al. |
| 2016/0234023 A1 | 8/2016 | Mozer et al. |
| 2016/0239701 A1 | 8/2016 | Lee et al. |
| 2016/0241543 A1 | 8/2016 | Jung et al. |
| 2016/0253665 A1 | 9/2016 | Van Os et al. |
| 2016/0259936 A1 | 9/2016 | Mukherjee et al. |
| 2016/0261581 A1 | 9/2016 | Wang et al. |
| 2016/0267779 A1 | 9/2016 | Kuang |
| 2016/0275281 A1 | 9/2016 | Ranjit et al. |
| 2016/0277396 A1 | 9/2016 | Gardiner et al. |
| 2016/0284123 A1 | 9/2016 | Hare et al. |
| 2016/0292525 A1 | 10/2016 | Aoki |
| 2016/0294557 A1 | 10/2016 | Baldwin et al. |
| 2016/0294837 A1 | 10/2016 | Turgeman |
| 2016/0300100 A1 | 10/2016 | Shen et al. |
| 2016/0308859 A1 | 10/2016 | Barry et al. |
| 2016/0314290 A1 | 10/2016 | Baca et al. |
| 2016/0320838 A1 | 11/2016 | Teller et al. |
| 2016/0332025 A1 | 11/2016 | Repka |
| 2016/0335495 A1 | 11/2016 | Kim et al. |
| 2016/0342832 A1 | 11/2016 | Newell et al. |
| 2016/0345172 A1 | 11/2016 | Cotterill |
| 2016/0358180 A1 | 12/2016 | Van Os et al. |
| 2016/0364561 A1 | 12/2016 | Lee et al. |
| 2016/0364591 A1 | 12/2016 | El-Khoury et al. |
| 2016/0364600 A1 | 12/2016 | Shah et al. |
| 2016/0371438 A1 | 12/2016 | Annulis |
| 2016/0378961 A1 | 12/2016 | Park |
| 2016/0378966 A1 | 12/2016 | Alten |
| 2017/0004293 A1 | 1/2017 | Mantri et al. |
| 2017/0004828 A1 | 1/2017 | Lee et al. |
| 2017/0011395 A1 | 1/2017 | Pillai et al. |
| 2017/0017834 A1 | 1/2017 | Sabitov et al. |
| 2017/0032113 A1 | 2/2017 | Tunnell et al. |
| 2017/0032168 A1 | 2/2017 | Kim |
| 2017/0032375 A1 | 2/2017 | Van Os et al. |
| 2017/0039358 A1 | 2/2017 | Yuen et al. |
| 2017/0039567 A1 | 2/2017 | Stern et al. |
| 2017/0046507 A1 | 2/2017 | Archer et al. |
| 2017/0046508 A1 | 2/2017 | Shin et al. |
| 2017/0054731 A1 | 2/2017 | Cotterill |
| 2017/0063851 A1 | 3/2017 | Kim et al. |
| 2017/0063852 A1 | 3/2017 | Azar et al. |
| 2017/0070680 A1 | 3/2017 | Kobayashi |
| 2017/0076132 A1 | 3/2017 | Sezan et al. |
| 2017/0102916 A1 | 4/2017 | Noble et al. |
| 2017/0124328 A1 | 5/2017 | Krishnapura |
| 2017/0142584 A1 | 5/2017 | Oh et al. |
| 2017/0147681 A1 | 5/2017 | Tankersley et al. |
| 2017/0147802 A1 | 5/2017 | Li |
| 2017/0148010 A1 | 5/2017 | Bak et al. |
| 2017/0161750 A1 | 6/2017 | Yao et al. |
| 2017/0163588 A1 | 6/2017 | Devasthali et al. |
| 2017/0169202 A1 | 6/2017 | Duggan et al. |
| 2017/0169204 A1 | 6/2017 | Fadell et al. |
| 2017/0169287 A1 | 6/2017 | Tokunaga et al. |
| 2017/0180637 A1 | 6/2017 | Lautenbach et al. |
| 2017/0185760 A1 | 6/2017 | Wilder |
| 2017/0187866 A1 | 6/2017 | Li |
| 2017/0193214 A1 | 7/2017 | Shim et al. |
| 2017/0193314 A1 | 7/2017 | Kim et al. |
| 2017/0199997 A1 | 7/2017 | Fadell et al. |
| 2017/0213211 A1 | 7/2017 | Sibert et al. |
| 2017/0235361 A1 | 8/2017 | Rigazio et al. |
| 2017/0235926 A1 | 8/2017 | Fyke et al. |
| 2017/0243054 A1 | 8/2017 | Lee et al. |
| 2017/0244703 A1 | 8/2017 | Lee et al. |
| 2017/0264608 A1 | 9/2017 | Moore et al. |
| 2017/0269792 A1 | 9/2017 | Xu et al. |
| 2017/0286656 A1 | 10/2017 | Kohli |
| 2017/0300897 A1 | 10/2017 | Ferenczi et al. |
| 2017/0318019 A1 | 11/2017 | Gordon et al. |
| 2017/0323141 A1 | 11/2017 | Lee et al. |
| 2017/0329949 A1 | 11/2017 | Civelli |
| 2017/0332035 A1 | 11/2017 | Shah et al. |
| 2017/0339151 A1 | 11/2017 | Van Os et al. |
| 2017/0344251 A1 | 11/2017 | Hajimusa et al. |
| 2017/0357320 A1 | 12/2017 | Chaudhri et al. |
| 2017/0357788 A1 | 12/2017 | Ledvina et al. |
| 2017/0357972 A1 | 12/2017 | Van Os et al. |
| 2018/0004924 A1 | 1/2018 | Tieu |
| 2018/0018514 A1 | 1/2018 | Azam et al. |
| 2018/0021954 A1 | 1/2018 | Fischer et al. |
| 2018/0063249 A1 | 3/2018 | Nguyen |
| 2018/0075439 A1 | 3/2018 | Bak et al. |
| 2018/0082052 A1 | 3/2018 | Swart et al. |
| 2018/0088787 A1 | 3/2018 | Bereza et al. |
| 2018/0096690 A1 | 4/2018 | Mixter et al. |
| 2018/0109629 A1 | 4/2018 | Van Os et al. |
| 2018/0117944 A1 | 5/2018 | Lee |
| 2018/0131721 A1 | 5/2018 | Jones et al. |
| 2018/0144178 A1 | 5/2018 | Han et al. |
| 2018/0150627 A1 | 5/2018 | Rodefer |
| 2018/0158066 A1 | 6/2018 | Van Os et al. |
| 2018/0173928 A1 | 6/2018 | Han et al. |
| 2018/0173929 A1 | 6/2018 | Han et al. |
| 2018/0173930 A1 | 6/2018 | Han et al. |
| 2018/0181201 A1 | 6/2018 | Grant et al. |
| 2018/0181737 A1 | 6/2018 | Tussy |
| 2018/0211030 A1 | 7/2018 | Kim et al. |
| 2018/0211093 A1 | 7/2018 | Bae et al. |
| 2018/0233139 A1 | 8/2018 | Finkelstein et al. |
| 2018/0234242 A1 | 8/2018 | Hindocha et al. |
| 2018/0251183 A1 | 9/2018 | Meermann |
| 2018/0262834 A1 | 9/2018 | Cho et al. |
| 2018/0268747 A1 | 9/2018 | Braun |
| 2018/0276673 A1 | 9/2018 | Van Os et al. |
| 2018/0302786 A1 | 10/2018 | Yu et al. |
| 2018/0302790 A1 | 10/2018 | Cotterill |
| 2018/0321826 A1 | 11/2018 | Bereza et al. |
| 2018/0336326 A1 | 11/2018 | Wallace et al. |
| 2018/0357631 A1 | 12/2018 | Bak et al. |
| 2018/0365898 A1 | 12/2018 | Costa |
| 2019/0020483 A1* | 1/2019 | Meng .................... H04L 9/3247 |
| 2019/0050867 A1 | 2/2019 | Van Os et al. |
| 2019/0053739 A1 | 2/2019 | Inoue et al. |
| 2019/0080066 A1 | 3/2019 | Van Os et al. |
| 2019/0080070 A1 | 3/2019 | Van Os et al. |
| 2019/0080071 A1 | 3/2019 | Van Os et al. |
| 2019/0080072 A1 | 3/2019 | Van Os et al. |
| 2019/0080189 A1 | 3/2019 | Van Os et al. |
| 2019/0124510 A1 | 4/2019 | Cotterill |
| 2019/0156607 A1 | 5/2019 | Tao et al. |
| 2019/0164134 A1 | 5/2019 | Morrow et al. |
| 2019/0180088 A1 | 6/2019 | Norimatsu |
| 2019/0220647 A1 | 7/2019 | Han et al. |
| 2019/0228140 A1 | 7/2019 | Arroyo et al. |
| 2019/0243957 A1 | 8/2019 | Fadell et al. |
| 2019/0272363 A1* | 9/2019 | Suwald ................ G06Q 20/409 |
| 2019/0276051 A1 | 9/2019 | Marti et al. |
| 2019/0278900 A1 | 9/2019 | Yang et al. |
| 2019/0289079 A1 | 9/2019 | Van Os et al. |
| 2019/0333508 A1 | 10/2019 | Rao et al. |
| 2019/0347389 A1* | 11/2019 | Kawakita ................ G06F 21/32 |
| 2019/0347391 A1 | 11/2019 | Kim et al. |
| 2019/0364020 A1 | 11/2019 | Wardell et al. |
| 2019/0370448 A1 | 12/2019 | Devine et al. |
| 2019/0370583 A1 | 12/2019 | Van Os et al. |
| 2019/0392129 A1 | 12/2019 | Tsai et al. |

(56) References Cited

U.S. PATENT DOCUMENTS

| | | |
|---|---|---|
| 2019/0394649 A1 | 12/2019 | Ledvina et al. |
| 2020/0042685 A1 | 2/2020 | Tussy et al. |
| 2020/0065821 A1 | 2/2020 | Van Os et al. |
| 2020/0103963 A1 | 4/2020 | Kelly et al. |
| 2020/0104620 A1 | 4/2020 | Cohen et al. |
| 2020/0120503 A1 | 4/2020 | Cotterill |
| 2020/0142484 A1 | 5/2020 | Maalouf et al. |
| 2020/0234027 A1 | 7/2020 | Han et al. |
| 2020/0280446 A1* | 9/2020 | Matsumoto ........... H04L 9/3234 |
| 2020/0311509 A1 | 10/2020 | Benkley et al. |
| 2020/0356761 A1 | 11/2020 | Gonion et al. |
| 2020/0366742 A1 | 11/2020 | Van Os et al. |
| 2020/0367827 A1 | 11/2020 | Min et al. |
| 2020/0372514 A1 | 11/2020 | Van Os et al. |
| 2020/0401686 A1 | 12/2020 | Duchastel |
| 2021/0014070 A1* | 1/2021 | Gopalakrishnan .... H04L 9/3242 |
| 2021/0042549 A1 | 2/2021 | Van Os et al. |
| 2021/0048883 A1 | 2/2021 | Kelly et al. |
| 2021/0073823 A1 | 3/2021 | Van Os |
| 2021/0105277 A1* | 4/2021 | Epstein ............... H04L 63/1416 |
| 2021/0192530 A1 | 6/2021 | Van Os et al. |
| 2021/0203506 A1* | 7/2021 | Edwards ............... H04L 9/3228 |
| 2022/0012323 A1 | 1/2022 | Moriwaki et al. |
| 2022/0027446 A1 | 1/2022 | Van Os et al. |
| 2022/0058257 A1 | 2/2022 | Cotterill |
| 2022/0067133 A1 | 3/2022 | Fadell et al. |
| 2022/0100841 A1 | 3/2022 | Yang et al. |
| 2022/0124254 A1 | 4/2022 | Dellinger et al. |
| 2022/0180667 A1 | 6/2022 | Cohen et al. |
| 2022/0229895 A1 | 7/2022 | Ranjan et al. |
| 2022/0237274 A1 | 7/2022 | Paul et al. |
| 2022/0244838 A1 | 8/2022 | Bereza et al. |
| 2022/0277063 A1 | 9/2022 | Arroyo et al. |
| 2022/0342972 A1 | 10/2022 | Van Os et al. |
| 2022/0351549 A1 | 11/2022 | Van Os et al. |
| 2022/0382839 A1 | 12/2022 | Vargas et al. |
| 2023/0019250 A1 | 1/2023 | Lee et al. |
| 2023/0021247 A1 | 1/2023 | Han et al. |
| 2023/0089689 A1 | 3/2023 | Pons Bordes et al. |
| 2023/0185373 A1 | 6/2023 | Kelly et al. |
| 2023/0214466 A1 | 7/2023 | Fadell et al. |
| 2023/0252779 A1 | 8/2023 | Gonion et al. |
| 2023/0259598 A1 | 8/2023 | Arroyo et al. |
| 2023/0364936 A1 | 11/2023 | Antonakis |
| 2023/0401032 A1 | 12/2023 | Cohen et al. |
| 2023/0409160 A1 | 12/2023 | Han et al. |
| 2024/0184869 A1 | 6/2024 | Van Os et al. |
| 2024/0310988 A1 | 9/2024 | Bereza et al. |
| 2024/0346817 A1 | 10/2024 | Gonion et al. |
| 2024/0353922 A1 | 10/2024 | Dedonato et al. |

FOREIGN PATENT DOCUMENTS

| | | |
|---|---|---|
| CA | 2949642 A1 | 6/2017 |
| CN | 1163669 A | 10/1997 |
| CN | 1183475 A | 6/1998 |
| CN | 1220433 A | 6/1999 |
| CN | 1335557 A | 2/2002 |
| CN | 1452739 A | 10/2003 |
| CN | 1484425 A | 3/2004 |
| CN | 1183475 C | 1/2005 |
| CN | 1592914 A | 3/2005 |
| CN | 1663174 A | 8/2005 |
| CN | 1685357 A | 10/2005 |
| CN | 1741104 A | 3/2006 |
| CN | 1742252 A | 3/2006 |
| CN | 1801708 A | 7/2006 |
| CN | 1836397 A | 9/2006 |
| CN | 1846221 A | 10/2006 |
| CN | 1908981 A | 2/2007 |
| CN | 1960546 A | 5/2007 |
| CN | 101035335 A | 9/2007 |
| CN | 101039184 A | 9/2007 |
| CN | 101080737 A | 11/2007 |
| CN | 101171604 A | 4/2008 |
| CN | 101268470 A | 9/2008 |
| CN | 101299694 A | 11/2008 |
| CN | 101341718 A | 1/2009 |
| CN | 101341727 A | 1/2009 |
| CN | 101352042 A | 1/2009 |
| CN | 101485128 A | 7/2009 |
| CN | 101730907 A | 6/2010 |
| CN | 101816165 A | 8/2010 |
| CN | 101833651 A | 9/2010 |
| CN | 101847139 A | 9/2010 |
| CN | 101960896 A | 1/2011 |
| CN | 102016877 A | 4/2011 |
| CN | 102065148 A | 5/2011 |
| CN | 102164213 A | 8/2011 |
| CN | 102202192 A | 9/2011 |
| CN | 102209321 A | 10/2011 |
| CN | 102265586 A | 11/2011 |
| CN | 102282578 A | 12/2011 |
| CN | 102396205 A | 3/2012 |
| CN | 102737313 A | 10/2012 |
| CN | 102741874 A | 10/2012 |
| CN | 102804182 A | 11/2012 |
| CN | 102822855 A | 12/2012 |
| CN | 102833423 A | 12/2012 |
| CN | 102859544 A | 1/2013 |
| CN | 102984195 A | 3/2013 |
| CN | 103188280 A | 7/2013 |
| CN | 103209642 A | 7/2013 |
| CN | 103229206 A | 7/2013 |
| CN | 103262108 A | 8/2013 |
| CN | 103294171 A | 9/2013 |
| CN | 103324909 A | 9/2013 |
| CN | 103413218 A | 11/2013 |
| CN | 203299885 U | 11/2013 |
| CN | 103489095 A | 1/2014 |
| CN | 103577982 A | 2/2014 |
| CN | 103635920 A | 3/2014 |
| CN | 103701605 A | 4/2014 |
| CN | 103765861 A | 4/2014 |
| CN | 103778533 A | 5/2014 |
| CN | 103853328 A | 6/2014 |
| CN | 104252675 A | 12/2014 |
| CN | 104321778 A | 1/2015 |
| CN | 104539924 A | 4/2015 |
| CN | 104732396 A | 6/2015 |
| CN | 104935497 A | 9/2015 |
| CN | 105051651 A | 11/2015 |
| CN | 105093526 A | 11/2015 |
| CN | 105099861 A | 11/2015 |
| CN | 105389491 A | 3/2016 |
| CN | 105844462 A | 8/2016 |
| CN | 105874405 A | 8/2016 |
| CN | 105893814 A | 8/2016 |
| CN | 106020436 A | 10/2016 |
| CN | 106095247 A | 11/2016 |
| CN | 106156566 A | 11/2016 |
| CN | 106164934 A | 11/2016 |
| CN | 106355058 A | 1/2017 |
| CN | 106462383 A | 2/2017 |
| CN | 106485123 A | 3/2017 |
| CN | 106503514 A | 3/2017 |
| CN | 106575332 A | 4/2017 |
| CN | 107797657 A | 3/2018 |
| CN | 107870690 A | 4/2018 |
| CN | 108574773 A | 9/2018 |
| CN | 109769397 A | 5/2019 |
| DE | 10153591 A1 | 5/2003 |
| EP | 0593386 A2 | 4/1994 |
| EP | 0923018 A2 | 6/1999 |
| EP | 1229496 A2 | 8/2002 |
| EP | 1422589 A1 | 5/2004 |
| EP | 1599862 A2 | 11/2005 |
| EP | 1626330 A1 | 2/2006 |
| EP | 1645989 A2 | 4/2006 |
| EP | 1736908 A2 | 12/2006 |
| EP | 1835697 A2 | 9/2007 |
| EP | 2173298 A1 | 4/2010 |
| EP | 2180665 A1 | 4/2010 |
| EP | 1835697 A3 | 6/2010 |

(56) References Cited

FOREIGN PATENT DOCUMENTS

| | | |
|---|---|---|
| EP | 2224348 A1 | 9/2010 |
| EP | 2309410 A1 | 4/2011 |
| EP | 1626330 A4 | 1/2012 |
| EP | 2568693 A2 | 3/2013 |
| EP | 2632193 A2 | 8/2013 |
| EP | 2674889 A2 | 12/2013 |
| EP | 2713298 A1 | 4/2014 |
| EP | 2725521 A2 | 4/2014 |
| EP | 2725537 A1 | 4/2014 |
| EP | 2741175 A2 | 6/2014 |
| EP | 2762997 A2 | 8/2014 |
| EP | 2960822 A1 | 12/2015 |
| EP | 2981115 A2 | 2/2016 |
| EP | 2993619 A1 | 3/2016 |
| EP | 2568693 A3 | 7/2016 |
| EP | 3057024 A1 | 8/2016 |
| EP | 3076334 A1 | 10/2016 |
| EP | 3118761 A1 | 1/2017 |
| EP | 3190563 A1 | 7/2017 |
| EP | 2801972 B1 | 1/2018 |
| EP | 1835697 B1 | 5/2018 |
| EP | 3373132 A2 | 9/2018 |
| EP | 2632193 B1 | 10/2018 |
| EP | 2568693 B1 | 12/2019 |
| EP | 3633963 A1 | 4/2020 |
| GB | 2184576 A | 6/1987 |
| GB | 2312040 A | 10/1997 |
| GB | 2313460 A | 11/1997 |
| GB | 2360618 A | 9/2001 |
| GB | 2466038 A | 6/2010 |
| GB | 2500321 A | 9/2013 |
| IN | 201917024374 A | 9/2020 |
| JP | 4-158434 A | 6/1992 |
| JP | 6-284182 A | 10/1994 |
| JP | 7-146942 A | 6/1995 |
| JP | 7-220008 A | 8/1995 |
| JP | 9-128208 A | 5/1997 |
| JP | 9-221950 A | 8/1997 |
| JP | 10-69346 A | 3/1998 |
| JP | 10-232934 A | 9/1998 |
| JP | 10-269358 A | 10/1998 |
| JP | 11-39385 A | 2/1999 |
| JP | 11-73530 A | 3/1999 |
| JP | 11-185016 A | 7/1999 |
| JP | 11-242745 A | 9/1999 |
| JP | 2000-259477 A | 9/2000 |
| JP | 2000-276446 A | 10/2000 |
| JP | 2000-283720 A | 10/2000 |
| JP | 2000-315118 A | 11/2000 |
| JP | 2001-92554 A | 4/2001 |
| JP | 2001-331758 A | 11/2001 |
| JP | 2002-99854 A | 4/2002 |
| JP | 2002-149171 A | 5/2002 |
| JP | 2002-159052 A | 5/2002 |
| JP | 2002-515145 A | 5/2002 |
| JP | 2002-183093 A | 6/2002 |
| JP | 2002-207525 A | 7/2002 |
| JP | 2002-222412 A | 8/2002 |
| JP | 2002-288137 A | 10/2002 |
| JP | 2003-16398 A | 1/2003 |
| JP | 2003-67343 A | 3/2003 |
| JP | 2003-143290 A | 5/2003 |
| JP | 2003-178244 A | 6/2003 |
| JP | 2003-298689 A | 10/2003 |
| JP | 2003-346059 A | 12/2003 |
| JP | 2004-86866 A | 3/2004 |
| JP | 2004-104813 A | 4/2004 |
| JP | 2004-252736 A | 9/2004 |
| JP | 2004-265353 A | 9/2004 |
| JP | 2004-532477 A | 10/2004 |
| JP | 2004-313459 A | 11/2004 |
| JP | 2004-334788 A | 11/2004 |
| JP | 2004-348600 A | 12/2004 |
| JP | 2004-348601 A | 12/2004 |
| JP | 2004-356816 A | 12/2004 |
| JP | 2005-4490 A | 1/2005 |
| JP | 2005-71225 A | 3/2005 |
| JP | 2005-122700 A | 5/2005 |
| JP | 2005-521961 A | 7/2005 |
| JP | 2005-523505 A | 8/2005 |
| JP | 2005-339425 A | 12/2005 |
| JP | 2006-12080 A | 1/2006 |
| JP | 2006-18613 A | 1/2006 |
| JP | 2006-31182 A | 2/2006 |
| JP | 2006-85559 A | 3/2006 |
| JP | 2006-93912 A | 4/2006 |
| JP | 2006-107288 A | 4/2006 |
| JP | 2006-114018 A | 4/2006 |
| JP | 2006-115043 A | 4/2006 |
| JP | 2006-163960 A | 6/2006 |
| JP | 2006-172180 A | 6/2006 |
| JP | 2006-189999 A | 7/2006 |
| JP | 2006-197071 A | 7/2006 |
| JP | 2006-202278 A | 8/2006 |
| JP | 2006-212185 A | 8/2006 |
| JP | 2006-215705 A | 8/2006 |
| JP | 2006-520053 A | 8/2006 |
| JP | 2006-259931 A | 9/2006 |
| JP | 2006-277670 A | 10/2006 |
| JP | 2006-308375 A | 11/2006 |
| JP | 2007-34637 A | 2/2007 |
| JP | 2007-58397 A | 3/2007 |
| JP | 2007-71008 A | 3/2007 |
| JP | 2007-128201 A | 5/2007 |
| JP | 2007-135149 A | 5/2007 |
| JP | 2007-148801 A | 6/2007 |
| JP | 2007-226293 A | 9/2007 |
| JP | 2007-226794 A | 9/2007 |
| JP | 2007-334637 A | 12/2007 |
| JP | 2008-250601 A | 10/2008 |
| JP | 2009-9434 A | 1/2009 |
| JP | 2009-15543 A | 1/2009 |
| JP | 2009-49878 A | 3/2009 |
| JP | 2009-99076 A | 5/2009 |
| JP | 2010-9513 A | 1/2010 |
| JP | 2010-503082 A | 1/2010 |
| JP | 2010-28404 A | 2/2010 |
| JP | 2010-517390 A | 5/2010 |
| JP | 2010-524051 A | 7/2010 |
| JP | 2010-541046 A | 12/2010 |
| JP | 2011-54120 A | 3/2011 |
| JP | 2011-97287 A | 5/2011 |
| JP | 2011-209787 A | 10/2011 |
| JP | 2011-237857 A | 11/2011 |
| JP | 2012-8951 A | 1/2012 |
| JP | 2012-504273 A | 2/2012 |
| JP | 2012-508930 A | 4/2012 |
| JP | 2012-164070 A | 8/2012 |
| JP | 2012-194661 A | 10/2012 |
| JP | 2012-215981 A | 11/2012 |
| JP | 2012-529699 A | 11/2012 |
| JP | 2013-9073 A | 1/2013 |
| JP | 2013-20496 A | 1/2013 |
| JP | 2013-30052 A | 2/2013 |
| JP | 2013-34322 A | 2/2013 |
| JP | 2013-114498 A | 6/2013 |
| JP | 2013-134570 A | 7/2013 |
| JP | 2013-530445 A | 7/2013 |
| JP | 2013-533532 A | 8/2013 |
| JP | 2013-534008 A | 8/2013 |
| JP | 5267966 B2 | 8/2013 |
| JP | 2013-232197 A | 11/2013 |
| JP | 2014-44719 A | 3/2014 |
| JP | 2014-44724 A | 3/2014 |
| JP | 2014-75155 A | 4/2014 |
| JP | 2014-517366 A | 7/2014 |
| JP | 2015-14923 A | 1/2015 |
| JP | 2016-508007 A | 3/2016 |
| JP | 2016-534435 A | 11/2016 |
| JP | 6023162 B2 | 11/2016 |
| JP | 2016-224960 A | 12/2016 |
| JP | 2017-500656 A | 1/2017 |
| JP | 1573356 S | 4/2017 |
| JP | 2018-136886 A | 8/2018 |

(56) References Cited

FOREIGN PATENT DOCUMENTS

| | | |
|---|---|---|
| KR | 10-2001-0019345 A | 3/2001 |
| KR | 10-2001-0074258 A | 8/2001 |
| KR | 2002-0002484 A | 1/2002 |
| KR | 10-2002-0022295 A | 3/2002 |
| KR | 10-2002-0038162 A | 5/2002 |
| KR | 10-2004-0005505 | 1/2004 |
| KR | 10-2004-049502 A | 6/2004 |
| KR | 10-2005-0061975 A | 6/2005 |
| KR | 10-2006-0018063 | 2/2006 |
| KR | 10-2007-0026808 A | 3/2007 |
| KR | 10-2007-081773 | 8/2007 |
| KR | 10-2007-0120125 A | 12/2007 |
| KR | 10-2008-0002837 A | 1/2008 |
| KR | 10-0805341 B1 | 2/2008 |
| KR | 10-2008-0064395 A | 7/2008 |
| KR | 10-2010-0074218 A | 7/2010 |
| KR | 10-1024272 B1 | 3/2011 |
| KR | 10-2011-0056561 A | 5/2011 |
| KR | 10-2011-0101683 A | 9/2011 |
| KR | 10-2011-0114732 A | 10/2011 |
| KR | 10-2012-0040693 A | 4/2012 |
| KR | 10-2012-0127842 A | 11/2012 |
| KR | 10-2013-0027326 A | 3/2013 |
| KR | 10-1253392 B1 | 4/2013 |
| KR | 10-2013-0044292 A | 5/2013 |
| KR | 10-1312097 B1 | 9/2013 |
| KR | 10-2013-0116905 A | 10/2013 |
| KR | 10-1330962 B1 | 11/2013 |
| KR | 10-2014-0018019 A | 2/2014 |
| KR | 10-2014-0026263 A | 3/2014 |
| KR | 10-2014-0055429 A | 5/2014 |
| KR | 10-2014-0063531 A | 5/2014 |
| KR | 10-2014-0137400 A | 12/2014 |
| KR | 10-2015-0013264 A | 2/2015 |
| KR | 10-2015-0029495 A | 3/2015 |
| KR | 10-2016-0012636 A | 2/2016 |
| KR | 10-2016-0014623 A | 2/2016 |
| KR | 10-2016-0026791 A | 3/2016 |
| KR | 10-2016-0045633 A | 4/2016 |
| KR | 10-2016-0048215 A | 5/2016 |
| KR | 10-2016-0054573 A | 5/2016 |
| KR | 10-2016-0099432 A | 8/2016 |
| KR | 10-1820573 B1 | 1/2018 |
| TW | 200529636 A | 9/2005 |
| TW | 200601176 A | 1/2006 |
| TW | 200642408 A | 12/2006 |
| TW | 200919255 A | 5/2009 |
| TW | 201137722 A | 11/2011 |
| TW | 201316247 A | 4/2013 |
| TW | 201324310 A | 6/2013 |
| TW | 201409345 A | 3/2014 |
| WO | 1997/41528 A1 | 11/1997 |
| WO | 1998/58346 A1 | 12/1998 |
| WO | 1999/28701 A1 | 6/1999 |
| WO | 1999/44114 A1 | 9/1999 |
| WO | 00/55812 A1 | 9/2000 |
| WO | 00/68873 A1 | 11/2000 |
| WO | 00/72245 A1 | 11/2000 |
| WO | 01/24103 A1 | 4/2001 |
| WO | 01/57757 A1 | 8/2001 |
| WO | 2001/80017 A1 | 10/2001 |
| WO | 2002/01864 A1 | 1/2002 |
| WO | 2003/038698 A1 | 5/2003 |
| WO | 2003/083793 A2 | 10/2003 |
| WO | 2004/029862 A1 | 4/2004 |
| WO | 2004/079530 A2 | 9/2004 |
| WO | 2004/104813 A1 | 12/2004 |
| WO | 2005/008568 A1 | 1/2005 |
| WO | 2005/020036 A2 | 3/2005 |
| WO | 2005/048832 A1 | 6/2005 |
| WO | 2005/106774 A2 | 11/2005 |
| WO | 2006/004155 A1 | 1/2006 |
| WO | 2006/051462 A1 | 5/2006 |
| WO | 2006/061833 A2 | 6/2006 |
| WO | 2006/113834 A2 | 10/2006 |
| WO | 2006/115518 A1 | 11/2006 |
| WO | 2007/017207 A1 | 2/2007 |
| WO | 2007/029710 A1 | 3/2007 |
| WO | 2007/060102 A1 | 5/2007 |
| WO | 2007/070014 A1 | 6/2007 |
| WO | 2007/072447 A1 | 6/2007 |
| WO | 2007/073422 A1 | 6/2007 |
| WO | 2007/076210 A1 | 7/2007 |
| WO | 2007/116521 A1 | 10/2007 |
| WO | 2008/008101 A2 | 1/2008 |
| WO | 2008/013001 A1 | 1/2008 |
| WO | 2008/024454 A1 | 2/2008 |
| WO | 2008/147457 A1 | 12/2008 |
| WO | 2008/151229 A1 | 12/2008 |
| WO | 2009/042392 A2 | 4/2009 |
| WO | 2009/045335 A2 | 4/2009 |
| WO | 2009/108645 A1 | 9/2009 |
| WO | 2010/039337 A2 | 4/2010 |
| WO | 2010/056484 A2 | 5/2010 |
| WO | 2010/059306 A2 | 5/2010 |
| WO | 2010/086993 A1 | 8/2010 |
| WO | 2010/120972 A1 | 10/2010 |
| WO | 2010/128442 A2 | 11/2010 |
| WO | 2011/119407 A1 | 9/2011 |
| WO | 2011/130422 A2 | 10/2011 |
| WO | 2012/068193 A2 | 5/2012 |
| WO | 2012/083113 A2 | 6/2012 |
| WO | 2012/128750 A1 | 9/2012 |
| WO | 2012/129231 A1 | 9/2012 |
| WO | 2013/000150 A1 | 1/2013 |
| WO | 2013/003372 A1 | 1/2013 |
| WO | 2013/005115 A2 | 1/2013 |
| WO | 2013/019880 A1 | 2/2013 |
| WO | 2013/023224 A2 | 2/2013 |
| WO | 2013/052081 A2 | 4/2013 |
| WO | 2013/066659 A1 | 5/2013 |
| WO | 2013/096943 A1 | 6/2013 |
| WO | 2013/096949 A1 | 6/2013 |
| WO | 2013/097882 A1 | 7/2013 |
| WO | 2013/125222 A1 | 8/2013 |
| WO | 2013/137503 A1 | 9/2013 |
| WO | 2013/169849 A2 | 11/2013 |
| WO | 2013/169877 A2 | 11/2013 |
| WO | 2013/173838 A2 | 11/2013 |
| WO | 2013/177500 A1 | 11/2013 |
| WO | 2013/177548 A1 | 11/2013 |
| WO | 2013/181102 A1 | 12/2013 |
| WO | 2014/004556 A1 | 1/2014 |
| WO | 2014/012456 A1 | 1/2014 |
| WO | 2014/057795 A1 | 4/2014 |
| WO | 2014/078965 A1 | 7/2014 |
| WO | 2014/105274 A1 | 7/2014 |
| WO | 2014/105276 A1 | 7/2014 |
| WO | 2014/115605 A1 | 7/2014 |
| WO | 2014/124332 A2 | 8/2014 |
| WO | 2014/147297 A1 | 9/2014 |
| WO | 2014/193465 A1 | 12/2014 |
| WO | 2015/057320 A1 | 4/2015 |
| WO | 2015/062382 A1 | 5/2015 |
| WO | 2015/069153 A1 | 5/2015 |
| WO | 2015/088141 A1 | 6/2015 |
| WO | 2015/119605 A1 | 8/2015 |
| WO | 2015/120019 A1 | 8/2015 |
| WO | 2015/195216 A1 | 12/2015 |
| WO | 2015/196448 A1 | 12/2015 |
| WO | 2016/013249 A1 | 1/2016 |
| WO | 2016/025036 A1 | 2/2016 |
| WO | 2016/029853 A1 | 3/2016 |
| WO | 2016/036218 A1 | 3/2016 |
| WO | 2016/049439 A1 | 3/2016 |
| WO | 2016/111808 A1 | 7/2016 |
| WO | 2016/123309 A1 | 8/2016 |
| WO | 2016/126374 A1 | 8/2016 |
| WO | 2016/189390 A2 | 12/2016 |
| WO | 2016/196054 A1 | 12/2016 |
| WO | 2016/201037 A1 | 12/2016 |
| WO | 2017/012302 A1 | 1/2017 |
| WO | 2017/030223 A1 | 2/2017 |
| WO | 2017/043314 A1 | 3/2017 |

(56) References Cited

FOREIGN PATENT DOCUMENTS

| | | |
|---|---|---|
| WO | 2017/094052 A1 | 6/2017 |
| WO | 2017/218094 A1 | 12/2017 |
| WO | 2018/048632 A1 | 3/2018 |
| WO | 2018/212801 A1 | 11/2018 |
| WO | 2018/226265 A1 | 12/2018 |
| WO | 2019/033129 A2 | 2/2019 |
| WO | 2021/216044 A1 | 10/2021 |

OTHER PUBLICATIONS

Applicant-Initiated Interview Summary received for U.S. Appl. No. 17/900,734, mailed on Feb. 22, 2024, 3 pages.
amazon.com, "Visual ID on Echo Show", Online Available at: <https://www.amazon.com/b?ie=UTF8&node=23615589011>, retrieved on Aug. 16, 2023, 3 pages.
Decision to Grant received for European Patent Application No. 20198076.0, mailed on Feb. 1, 2024, 4 pages.
Final Office Action received for U.S. Appl. No. 18/105,191, mailed on Feb. 20, 2024, 20 pages.
Krumm et al., "Multi-camera multi-person tracking for easyliving", Third IEEE International Workshop on Visual Surveillance, Available online at: http://mesh.brown.edu/en193s05-2004/pdfs/KrummEtAl-iwvs00.pdf, Jul. 1, 2000, 8 pages.
Notice of Acceptance received for Australian Patent Application No. 2022231779, mailed on Feb. 5, 2024, 3 pages.
Notice of Allowance received for U.S. Appl. No. 17/725,311, mailed on Feb. 14, 2024, 8 pages.
Office Action received for Chinese Patent Application No. 201880003211.7, mailed on Jan. 23, 2024, 20 pages (10 pages of English Translation and 10 pages of Official Copy).
Summons to Attend Oral Proceedings received for European Patent Application No. 20191533.7, mailed on Feb. 13, 2024, 7 pages.
Brief Communication Regarding Oral Proceedings received for European Patent Application No. 20198076.0, mailed on Aug. 28, 2023, 1 page.
Notice of Acceptance received for Australian Patent Application No. 2022206826, mailed on Aug. 24, 2023, 3 pages.
Office Action received for Australian Patent Application No. 2022209019, mailed on Aug. 18, 2023, 4 pages.
Applicant-Initiated Interview Summary received for U.S. Appl. No. 17/496,716, mailed on Sep. 14, 2023, 2 pages.
Office Action received for Australian Patent Application No. 2022200900, mailed on Sep. 8, 2023, 4 pages.
Office Action received for Australian Patent Application No. 2023203469, mailed on Aug. 31, 2023, 5 pages.
Office Action received for German Patent Application No. 112014004134.3, mailed on Jul. 31, 2023, 11 pages (1 page of English Translation and 10 pages of Official Copy).
Brief Communication regarding Oral Proceedings received for European Patent Application No. 20198076.0, mailed on May 2, 2023, 1 page.
Corrected Notice of Allowance received for U.S. Appl. No. 17/409,570, mailed on May 10, 2023, 2 pages.
Non-Final Office Action received for U.S. Appl. No. 17/725,311, mailed on May 10, 2023, 54 pages.
Notice of Allowance received for Korean Patent Application No. 10-2022-7012869, mailed on Apr. 18, 2023, 7 pages (2 pages of English Translation and 5 pages of Official Copy).
Office Action received for Australian Patent Application No. 2022218517, mailed on Apr. 27, 2023, 7 pages.
Applicant-Initiated Interview Summary received for U.S. Appl. No. 17/479,974, mailed on Apr. 4, 2023, 2 pages.
Non-Final Office Action received for U.S. Appl. No. 17/062,941, mailed on Mar. 30, 2023, 6 pages.
Non-Final Office Action received for U.S. Appl. No. 17/863,974, mailed on Apr. 13, 2023, 30 pages.
Notice of Allowance received for U.S. Appl. No. 16/938,362, mailed on Apr. 10, 2023, 7 pages.
Notice of Allowance received for U.S. Appl. No. 17/409,570, mailed on Apr. 11, 2023, 7 pages.
Office Action received for Australian Patent Application No. 2022200900, mailed on Mar. 28, 2023, 3 pages.
Office Action received for Chinese Patent Application No. 201980009669.8, mailed on Mar. 1, 2023, 19 pages (11 pages of English Translation and 8 pages of Official Copy).
Decision to Grant received for European Patent Application No. 20186286.9, mailed on May 11, 2023, 4 pages.
Intention to Grant received for European Patent Application No. 19716254.8, mailed on May 16, 2023, 9 pages.
Notice of Allowance received for Japanese Patent Application No. 2021-084065, mailed on May 15, 2023, 4 pages (1 page of English Translation and 3 pages of Official Copy).
Notice of Allowance received for U.S. Appl. No. 17/955,311, mailed on May 22, 2023, 7 pages.
Office Action received for Australian Patent Application No. 2022235545, mailed on May 11, 2023, 3 pages.
Office Action received for Chinese Patent Application No. 201910109868.8, mailed on Apr. 23, 2023, 29 pages (3 pages of English Translation and 26 pages of Official Copy).
Office Action received for Korean Patent Application No. 10-2022-7029609, mailed on Apr. 28, 2023, 9 pages (4 pages of English Translation and 5 pages of Official Copy).
Office Action received for Japanese Patent Application No. 2022-100394, mailed on Sep. 29, 2023, 6 pages (3 pages of English Translation and 3 pages of Official Copy).
Office Action received for Japanese Patent Application No. 2022-151495, mailed on Sep. 29, 2023, 11 pages (5 pages of English Translation and 6 pages of Official Copy).
Office Action received for Korean Patent Application No. 10-2022-0150750, mailed on Sep. 20, 2023, 15 pages (7 pages of English Translation and 8 pages of Official Copy).
Office Action received for Korean Patent Application No. 10-2023-7024803, mailed on Sep. 19, 2023, 7 pages (3 pages of English Translation and 4 pages of Official Copy).
Applicant-Initiated Interview Summary received for U.S. Appl. No. 17/062,941, mailed on Dec. 14, 2023, 2 pages.
Corrected Notice of Allowance received for U.S. Appl. No. 17/496,716, mailed on Dec. 6, 2023, 2 pages.
Extended European Search Report received for European Patent Application No. 23199594.5, mailed on Nov. 28, 2023, 11 pages.
FSS, "Mobile Banking", Available online at: https://mobile.fssnet.co.in/mpayweb/, Dec. 5, 2023, 2 pages.
Notice of Allowance received for Korean Patent Application No. 10-2022-7033655, mailed on Nov. 29, 2023, 6 pages (2 pages of English Translation and 4 pages of Official Copy).
Notice of Hearing received for Indian Patent Application No. 201618024020, mailed on Nov. 21, 2023, 2 pages.
Notice of Hearing received for Indian Patent Application No. 202018014786, mailed on Nov. 29, 2023, 3 pages.
Numnonda Thanachart, "Mobile payment", Software Park Thailand, Available online at: https://www.slideshare.net/softwarepark/mobile-payment, Nov. 23, 2010, 6 pages.
Office Action received for Australian Patent Application No. 2022200900, mailed on Nov. 30, 2023, 3 pages.
Office Action received for Chinese Patent Application No. 201910246439.5. mailed on Nov. 22. 2023, 20 pages (3 pages of English Translation and 17 pages of Official Copy).
Office Action received for Chinese Patent Application No. 202211283788.2, mailed on Nov. 1, 2023, 10 pages (5 pages of English Translation and 5 pages of Official Copy).
Office Action received for Chinese Patent Application No. 202211285112.7, mailed on Nov. 11, 2023, 6 pages (3 pages of English Translation and 3 pages of Official Copy).
Pouralinazar Behzad, "The System for Secure Mobile Payment Transactions", Available online at: https://www.diva-portal.org/smash/get/diva2:616934/FULLTEXT01.pdf, 2013, 78 pages.
Examiner's Answer to Appeal Brief received for U.S. Appl. No. 17/516,495, mailed on Jul. 28, 2023, 13 pages.
International Preliminary Report on Patentability received for PCT Patent Application No. PCT/US2022/013730, mailed on Aug. 3, 2023, 15 pages.

(56) References Cited

OTHER PUBLICATIONS

Notice of Allowance received for Korean Patent Application No. 10-2022-7014519, mailed on Jul. 28, 2023, 7 pages (2 pages of English Translation and 5 pages of Official Copy).
Notice of Allowance received for Korean Patent Application No. 10-2022-7015289, mailed on Jul. 31, 2023, 8 pages (2 pages of English Translation and 6 pages of Official Copy).
Notice of Allowance received for U.S. Appl. No. 17/863,974, mailed on Aug. 9, 2023, 2 pages.
Office Action received for Australian Patent Application No. 2022218517, mailed on Jul. 24, 2023, 6 pages.
Office Action received for Chinese Patent Application No. 201910901500.5, mailed on Jun. 30, 2023, 27 pages (9 pages of English Translation and 18 pages of Official Copy).
Office Action received for Korean Patent Application No. 10-2022-7033655, mailed on Jul. 27, 2023, 5 pages (2 pages of English Translation and 3 pages of Official Copy).
Applicant-Initiated Interview Summary received for U.S. Appl. No. 18/136,819, mailed on Dec. 20, 2023, 2 pages.
Non-Final Office Action received for U.S. Appl. No. 18/137,985, mailed on Dec. 21, 2023, 8 pages.
Office Action received for Australian Patent Application No. 2023203469, mailed on Dec. 18, 2023, 4 pages.
Office Action received for Japanese Patent Application No. 2022-163568, mailed on Dec. 22, 2023, 8 pages (4 pages of English Translation and 4 pages of Official Copy).
Summons to Attend Oral Proceedings received for European Patent Application No. 19160348.9, mailed on Dec. 19, 2023, 7 pages.
Advisory Action received for U.S. Appl. No. 17/962,369, mailed on Nov. 13, 2023, 4 pages.
Applicant-Initiated Interview Summary received for U.S. Appl. No. 17/900,734, mailed on Nov. 20, 2023, 4 pages.
Decision on Appeal received for Korean Patent Application No. 10-2022-7004578, mailed on Oct. 31, 2023, 26 pages (5 pages of English Translation and 21 pages of Official Copy).
Non-Final Office Action received for U.S. Appl. No. 17/062,941, mailed on Nov. 24, 2023, 8 pages.
Notice of Acceptance received for Australian Patent Application No. 2022209019, mailed on Nov. 15, 2023, 3 pages.
Notice of Allowance received for Korean Patent Application No. 10-2022-7014519, mailed on Nov. 16, 2023, 7 pages (2 pages of English Translation and 5 pages of Official Copy).
Notice of Hearing received for Indian Patent Application No. 201617039493, mailed on Nov. 21, 2023, 3 pages.
Office Action received for Australian Patent Application No. 2022231779, mailed on Nov. 6, 2023, 3 pages.
Supplemental Notice of Allowance received for U.S. Appl. No. 17/496,716, mailed on Nov. 17, 2023, 2 pages.
Corrected Notice of Allowance received for U.S. Appl. No. 17/498,557, mailed on Mar. 15, 2023, 2 pages.
International Search Report and Written Opinion received for PCT Patent Application No. PCT/US2022/042978, mailed on Nov. 29, 2022, 15 pages.
Notice of Allowance received for U.S. Appl. No. 17/193,991, mailed on Mar. 29, 2023, 9 pages.
Search Report received for Danish Patent Application No. 202270438, mailed on Dec. 5, 2022, 9 pages.
Decision to Refuse received for Japanese Patent Application No. 2021-168243, mailed on Aug. 14, 2023, 7 pages (3 pages of English Translation and 4 pages of Official Copy).
Final Office Action received for U.S. Appl. No. 17/962,369, mailed on Aug. 15, 2023, 20 pages.
Notice of Allowance received for Korean Patent Application No. 10-2021-7010306, mailed on Aug. 14, 2023, 7 pages (2 pages of English Translation and 5 pages of Official Copy).
Notice of Allowance received for U.S. Appl. No. 17/062,941, mailed on Aug. 11, 2023, 11 pages.
Office Action received for Australian Patent Application No. 2022231779, mailed on Aug. 7, 2023, 5 pages.
Office Action received for Chinese Patent Application No. 202211283788.2, mailed on Jul. 7, 2023, 7 pages (4 pages of English Translation and 3 pages of Official Copy).
Final Office Action received for U.S. Appl. No. 18/136,819, mailed on Mar. 4, 2024, 10 pages.
Mahfouz et al., "Android users in the wild: Their authentication and usage behavior", Pervasive and Mobile Computing, vol. 32, Jul. 11, 2016, pp. 50-61.
Notice of Allowance received for U.S. Appl. No. 17/732,222, mailed on Mar. 5, 2024, 14 pages.
Notice of Hearing received for Indian Patent Application No. 202018044420, mailed on Feb. 28, 2024, 2 pages.
Office Action received for Chinese Patent Application No. 201911022883.5, mailed on Jan. 6, 2024, 9 pages (4 pages of English Translation and 5 pages of Official Copy).
Office Action received for Chinese Patent Application No. 202110011700.0, mailed on Jan. 24, 2024, 11 pages (5 pages of English Translation and 6 pages of Official Copy).
Office Action received for Korean Patent Application No. 10-2022-0150750, mailed on Feb. 20, 2024, 7 pages (3 pages of English Translation and 4 pages of Official Copy).
Final Office Action received for U.S. Appl. No. 17/479,974, mailed on Jun. 28, 2023, 32 pages.
Non-Final Office Action received for U.S. Appl. No. 17/962,369, mailed on Jun. 9, 2023, 17 pages.
Notice of Allowance received for U.S. Appl. No. 17/519,025, mailed on Jun. 22, 2023, 7 pages.
Office Action received for Chinese Patent Application No. 202211285112.7, mailed on May 18, 2023, 16 pages (6 pages of English Translation and 10 pages of Official Copy).
Advisory Action received for U.S. Appl. No. 17/863,974, mailed on Feb. 15, 2023, 2 pages.
Corrected Notice of Allowance received for U.S. Appl. No. 17/498,557, mailed on Feb. 15, 2023, 4 pages.
Extended European Search Report received for European Patent Application No. 22197752.3, mailed on Feb. 15, 2023, 7 pages.
Extended European Search Report received for European Patent Application No. 22197755.6, mailed on Feb. 20, 2023, 8 pages.
Extended European Search Report received for European Patent Application No. 22212086.7, mailed on Feb. 21, 2023, 10 pages.
Intention to Grant received for European Patent Application No. 20186286.9, mailed on Feb. 17, 2023, 9 pages.
Intention to Grant received for European Patent Application No. 21166287.9, mailed on Feb. 23, 2023, 9 pages.
Non-Final Office Action received for U.S. Appl. No. 17/479,974, mailed on Feb. 22, 2023, 30 pages.
Non-Final Office Action received for U.S. Appl. No. 17/955,311, mailed on Mar. 15, 2023, 6 pages.
Notice of Acceptance received for Australian Patent Application No. 2019268070, mailed on Feb. 27, 2023, 3 pages.
Notice of Allowance received for U.S. Appl. No. 17/519,025, mailed on Mar. 2, 2023, 8 pages.
Office Action received for European Patent Application No. 21166718.3, mailed on Feb. 20, 2023, 7 pages.
Office Action received for Japanese Patent Application No. 2021-168243, mailed on Feb. 6, 2023, 8 pages (4 pages of English Translation and 4 pages of Official Copy).
Office Action received for Korean Patent Application No. 10-2021-7010306, mailed on Feb. 15, 2023, 10 pages (5 pages of English Translation and 5 pages of Official Copy).
Pre-Appeal Review Report received for Japanese Patent Application No. 2020-566978, mailed on Feb. 21, 2023, 4 pages (2 pages of English Translation and 2 pages of Official Copy).
Summons to Attend Oral Proceedings received for European Patent Application No. 20198076.0, mailed on Feb. 16, 2023, 8 pages.
Adractas et al., "The road to mobile payments services", McKinsey on Payments, Online available at: https://www.mckinsey.com.br/~/media/mckinsey/dotcom/client_service/financial%20services/latest%20thinking/reports/the_road_to_mobile_payments_services.pdf, Sep. 2011, pp. 45-52.
Adrianisen, "Samsung Galaxy S8 Face Recognition—Register Your Face Review!", retrieved from: https://www.youtube.com/watch?v=04KVPaCJq94, Apr. 27, 2017, 1 page.

(56) References Cited

OTHER PUBLICATIONS

Advisory Action received for U.S. Appl. No. 12/207,374, mailed on Feb. 25, 2013, 3 pages.
Advisory Action received for U.S. Appl. No. 12/207,374, mailed on May 15, 2014, 3 pages.
Advisory Action received for U.S. Appl. No. 14/311,214, mailed on Feb. 10, 2015, 4 pages.
Advisory Action received for U.S. Appl. No. 14/503,296, mailed on Oct. 2, 2015, 3 pages.
Advisory Action received for U.S. Appl. No. 14/980,344, mailed on Feb. 10, 2020, 5 pages.
Advisory Action received for U.S. Appl. No. 14/980,344, mailed on Mar. 27, 2019, 5 pages.
Advisory Action received for U.S. Appl. No. 15/137,944, mailed on May 11, 2017, 6 pages.
Advisory Action received for U.S. Appl. No. 16/164,561, mailed on Nov. 14, 2019, 2 pages.
Advisory Action received for U.S. Appl. No. 16/422,736, mailed on Mar. 12, 2021, 3 pages.
Advisory Action received for U.S. Appl. No. 15/250,152, mailed on Mar. 25, 2019, 5 pages.
Applicant Initiated Interview Summary received for U.S. Appl. No. 13/243,045, mailed on Oct. 22, 2019, 3 pages.
Applicant Initiated Interview Summary received for U.S. Appl. No. 15/714,887, mailed on Aug. 19, 2020, 4 pages.
Applicant Initiated Interview Summary received for U.S. Appl. No. 15/714,887, mailed on Mar. 17, 2020, 5 pages.
Applicant Initiated Interview Summary received for U.S. Appl. No. 16/147,023, mailed on Oct. 29, 2019, 3 pages.
Applicant Initiated Interview Summary received for U.S. Appl. No. 16/553,622, mailed on Aug. 3, 2020, 3 pages.
Applicant-Initiated Interview Summary received for U.S. Appl. No. 14/612,214, mailed on Feb. 18, 2020, 3 pages.
Applicant-Initiated Interview Summary received for U.S. Appl. No. 16/125,267, mailed on Feb. 8, 2021, 3 pages.
Applicant-Initiated Interview Summary received for U.S. Appl. No. 16/125,267, mailed on Jan. 25, 2022, 5 pages.
Applicant-Initiated Interview Summary received for U.S. Appl. No. 16/125,267, mailed on Jun. 25, 2021, 5 pages.
Applicant-Initiated Interview Summary received for U.S. Appl. No. 16/125,267, mailed on Oct. 25, 2021, 4 pages.
Applicant-Initiated Interview Summary received for U.S. Appl. No. 16/125,267, mailed on Sep. 14, 2020, 5 pages.
Applicant-Initiated Interview Summary received for U.S. Appl. No. 16/369,355, mailed on Jul. 28, 2021, 2 pages.
Applicant-Initiated Interview Summary received for U.S. Appl. No. 16/369,473, mailed on Apr. 16, 2021, 2 pages.
Applicant-Initiated Interview Summary received for U.S. Appl. No. 16/369,473, mailed on Oct. 13, 2020, 5 pages.
Applicant-Initiated Interview Summary received for U.S. Appl. No. 16/369,473, mailed on Oct. 18, 2021, 2 pages.
Applicant-Initiated Interview Summary received for U.S. Appl. No. 16/369,473, mailed on Sep. 21, 2020, 5 pages.
Applicant-Initiated Interview Summary received for U.S. Appl. No. 16/422,736, mailed on Feb. 24, 2021, 3 pages.
Applicant-Initiated Interview Summary received for U.S. Appl. No. 16/422,736, mailed on Sep. 28, 2020, 3 pages.
Applicant-Initiated Interview Summary received for U.S. Appl. No. 16/667,271, mailed on Apr. 8, 2020, 3 pages.
Applicant-Initiated Interview Summary received for U.S. Appl. No. 16/670,949, mailed on Apr. 6, 2021, 2 pages.
Applicant-Initiated Interview Summary received for U.S. Appl. No. 17/087,855, mailed on Feb. 28, 2022, 2 pages.
Applicant-Initiated Interview Summary received for U.S. Appl. No. 17/087,855, mailed on Nov. 5, 2021, 2 pages.
Bao et al., "Location-based and Preference-Aware Recommendation Using Sparse Geo-Social Networking Data", ACM SIGSPATIAL GIS '12, Redondo Beach, CA, USA, Online available at: https://www.microsoft.com/en-us/research/wp-content/uploads/2016/02/LocationRecommendation.pdf, Nov. 6-9, 2012, 10 pages.

Board Decision received for Chinese Patent Application No. 201410407626.4, mailed on Jun. 8, 2020, 17 pages (1 page of English Translation and 16 pages of Official Copy).
Board Decision received for Chinese Patent Application No. 201510284896.5, mailed on Nov. 19, 2021, 14 pages (1 page of English Translation and 13 pages of Official Copy).
Board Decision received for Chinese Patent Application No. 201580043701.6, mailed on Aug. 19, 2021, 2 pages (1 page of English Translation and 1 page of Official Copy).
Board Decision received for Chinese Patent Application No. 201710094150.7, mailed on Dec. 22, 2021, 20 pages (1 page of English Translation and 19 pages of Official Copy).
Board Decision received for Chinese Patent Application No. 201810094316 X, mailed on Dec. 3, 2021, 18 pages (1 page of English Translation and 17 pages of Official Copy).
Board Opinion received for Chinese Patent Application No. 201810094316.X, mailed on Sep. 30, 2021, 11 pages (3 pages of English Translation and 8 pages of Official Copy).
Board Opinion received for Chinese Patent Application No. 201810338826.7, mailed on Jan. 19, 2022, 18 pages (6 pages of English Translation and 12 pages of Official Copy).
Brief Communication Regarding Oral Proceedings received for European Patent Application No. 15727291.5, mailed on Jun. 9, 2020, 12 pages.
Brief Communication Regarding Oral Proceedings received for European Patent Application No. 16201159.7, mailed on Jun. 29, 2021, 13 pages.
Brief Communication regarding Oral Proceedings received for European Patent Application No. 16201205.8, mailed on May 29, 2020, 29 pages.
Brief Communication Regarding Oral Proceedings received for European Patent Application No. 18713408.5, mailed on Sep. 28, 2021, 2 pages.
Brief Communication Regarding Oral Proceedings received for European Patent Application No. 18830326.7, mailed on Jun. 30, 2021, 2 pages.
Brumberg et al., "The Unlock Project: A Python-based framework for practical brain-computer interface communication "app" development", Conf Proc IEEE Eng Med Biol Soc. 2012, doi: 10.1109/EMBC.2012.6346473, Institute of Electrical and Electronics Engineers, 2012, 11 pages.
Certificate of Examination received for Australian Patent Application No. 2017100553, mailed on Jan. 17, 2018, 2 pages.
Corrected Notice of Allowance received for U.S. Appl. No. 12/074,985, mailed on Oct. 10, 2013, 4 pages.
Corrected Notice of Allowance received for U.S. Appl. No. 14/612,214, mailed on May 1, 2020, 2 pages.
Corrected Notice of Allowance received for U.S. Appl. No. 14/719,217, mailed on Apr. 22, 2019, 2 pages.
Corrected Notice of Allowance received for U.S. Appl. No. 14/719,217, mailed on Mar. 20, 2019, 2 pages.
Corrected Notice of Allowance received for U.S. Appl. No. 15/017,436, mailed on Sep. 2, 2016, 5 pages.
Corrected Notice of Allowance received for U.S. Appl. No. 15/137,944, mailed on Jan. 11, 2018, 2 pages.
Corrected Notice of Allowance received for U.S. Appl. No. 15/137,944, mailed on Jan. 19, 2018, 2 pages.
Corrected Notice of Allowance received for U.S. Appl. No. 15/269,801, mailed on Oct. 3, 2017, 4 pages.
Corrected Notice of Allowance received for U.S. Appl. No. 15/294,439, mailed on Mar. 13, 2019, 4 pages.
Corrected Notice of Allowance received for U.S. Appl. No. 15/357,873, mailed on Jan. 19, 2018, 2 pages.
Corrected Notice of Allowance received for U.S. Appl. No. 15/357,873, mailed on Mar. 16, 2018, 2 pages.
Corrected Notice of Allowance received for U.S. Appl. No. 15/845,794, mailed on Feb. 25, 2019, 2 pages.
Corrected Notice of Allowance received for U.S. Appl. No. 15/866,341, mailed on Aug. 21, 2019, 3 pages.
Corrected Notice of Allowance received for U.S. Appl. No. 15/866,341, mailed on Aug. 26, 2019, 3 pages.
Corrected Notice of Allowance received for U.S. Appl. No. 16/125,267, mailed on Mar. 16, 2022, 2 pages.

(56) References Cited

OTHER PUBLICATIONS

Corrected Notice of Allowance received for U.S. Appl. No. 16/241,199, mailed on Sep. 13, 2021, 5 pages.
Corrected Notice of Allowance received for U.S. Appl. No. 16/386,707, mailed on Feb. 19, 2021, 2 pages.
Corrected Notice of Allowance received for U.S. Appl. No. 16/386,707, mailed on Jan. 25, 2021, 2 pages.
Corrected Notice of Allowance received for U.S. Appl. No. 16/422,736, mailed on Jul. 9, 2021, 2 pages.
Corrected Notice of Allowance received for U.S. Appl. No. 16/434,865, mailed on Apr. 28, 2020, 2 pages.
Corrected Notice of Allowance received for U.S. Appl. No. 16/434,865, mailed on Jun. 4, 2020, 2 pages.
Corrected Notice of Allowance received for U.S. Appl. No. 16/456,839, mailed on Apr. 29, 2021, 2 pages.
Corrected Notice of Allowance received for U.S. Appl. No. 16/456,839, mailed on Jul. 20, 2021, 3 pages.
Corrected Notice of Allowance received for U.S. Appl. No. 16/553,622, mailed on Sep. 23, 2020, 5 pages.
Corrected Notice of Allowance received for U.S. Appl. No. 16/670,949, mailed on Sep. 8, 2021, 2 pages.
Corrected Notice of Allowance received for U.S. Appl. No. 16/843,638, mailed on Dec. 22, 2021, 2 pages.
Corrected Notice of Allowance received for U.S. Appl. No. 16/843,638, mailed on Feb. 16, 2022, 2 pages.
Corrected Notice of Allowance received for U.S. Appl. No. 16/987,003, mailed on Sep. 1, 2021, 3 pages.
CV Meerkat, "Extracting Face Orientation in Real-time", Available online at: https://www.youtube.com/watch?v=Ugwfnjx6UYw, Jul. 22, 2016, 3 pages.
Das et al., "A Security Framework for Mobile-to-Mobile Payment Network", International Conference on Personal Wireless Communications, Jan. 25, 2005, pp. 420-423.
Decision from Intellectual Property Tribunal received for Korean Patent Application No. 10-2011-7023152, mailed on Feb. 17, 2015, 22 pages (7 pages of English Translation and 15 pages of Official Copy).
Decision on Appeal received for Korean Patent Application No. 10-2015-7010262, mailed on Dec. 21, 2018, 16 pages (3 pages of English Translation and 13 pages of Official Copy).
Decision on Appeal received for Korean Patent Application No. 10-2016-0152210, mailed on Jun. 23, 2020, 20 pages (2 pages of English Translation and 18 pages of Official Copy).
Decision on Appeal received for Korean Patent Application No. 10-2020-7020782, mailed on Jan. 24, 2022, 22 pages (2 pages of English Translation and 20 pages of Official Copy).
Decision on Appeal received for U.S. Appl. No. 13/243,045, mailed on Mar. 18, 2019, 10 pages.
Decision on Appeal received for U.S. Appl. No. 13/243,045, mailed on May 10, 2021, 11 pages.
Decision on Appeal received for U.S. Appl. No. 14/612,214, mailed on Sep. 3, 2019, 10 pages.
Decision on Appeal received for U.S. Appl. No. 15/714,887, mailed on Feb. 18, 2022, 14 pages.
Decision to Grant received for Danish Patent Application No. PA201670628, mailed on Nov. 20, 2017, 2 pages.
Decision to Grant received for Danish Patent Application No. PA201770418, mailed on Oct. 25, 2019, 3 pages.
Decision to Grant received for Danish Patent Application No. PA201770419, mailed on Oct. 25, 2018, 2 pages.
Decision to Grant received for Danish Patent Application No. PA201770715, mailed on Feb. 15, 2019, 2 pages.
Decision to Grant received for Danish Patent Application No. PA201770782, mailed on Oct. 25, 2019, 2 pages.
Decision to Grant received for Danish Patent Application No. PA201870370, mailed on Mar. 29, 2019, 2 pages.
Decision to Grant received for Danish Patent Application No. PA201870371, mailed on Mar. 29, 2019, 2 pages.
Decision to Grant received for Danish Patent Application No. PA201870855, mailed on Oct. 20, 2020, 2 pages.
Decision to Grant received for Danish Patent Application No. PA201970127, mailed on Aug. 20, 2020, 2 pages.
Decision to Grant received for European Patent Application No. 12773460.6, mailed on Jun. 27, 2019, 2 pages.
Decision to Grant received for European Patent Application No. 13171145.9, mailed on Jul. 11, 2019, 2 pages.
Decision to Grant received for European Patent Application No. 14853215.3, mailed on Sep. 27, 2018, 2 pages.
Decision to Grant received for European Patent Application No. 15168475.0, mailed on Sep. 30, 2021, 2 pages.
Decision to Grant received for European Patent Application No. 15719347.5, mailed on Jun. 24, 2021, 2 pages.
Decision to Grant received for European Patent Application No. 17853654.6, mailed on Apr. 15, 2021, 2 pages.
Decision to Grant received for European Patent Application No. 18190250.3, mailed on Oct. 1, 2020, 2 pages.
Decision to Grant received for European Patent Application No. 18704335.1, mailed on Sep. 24, 2020, 2 pages.
Decision to Grant received for European Patent Application No. 18830326.7, mailed on Nov. 11, 2021, 3 pages.
Decision to Grant received for European Patent Application No. 20196476.4, mailed on Jan. 13, 2022, 2 pages.
Decision to Grant received for Japanese Patent Application No. 2017-075031, mailed on Jul. 1, 2019, 3 pages (1 page of English Translation and 2 pages of Official Copy).
Decision to Grant received for the European Patent Application No. 12181538.5, mailed on Jul. 2, 2015, 1 page.
Decision to Refuse received for European Patent Application No. 08834386.8, mailed on Apr. 8, 2013, 8 pages.
Decision to Refuse received for European Patent Application No. 12770400.5, mailed on Nov. 8, 2018, 12 pages.
Decision to Refuse received for European Patent Application No. 15727291.5, mailed on Jun. 30, 2020, 21 pages.
Decision to Refuse received for European Patent Application No. 15728352.4, mailed on May 28, 2020, 25 pages.
Decision to Refuse received for European Patent Application No. 16201159.7, mailed on Sep. 27, 2021, 22 pages.
Decision to Refuse received for European Patent Application No. 16201195.1, mailed on Mar. 4, 2019, 23 pages.
Decision to Refuse received for European Patent Application No. 16201205.8, mailed on Jun. 30, 2020, 29 pages.
Drareni Jamil, "Face Tracking and Head Pose Estimation with Open CV", Available online at: https://www.youtube.com/watch?v=Etj_aktbnwM, Jun. 9, 2013, 3 pages.
Examination Report received for Australian Patent Application No. 2015202397, mailed on Feb. 29, 2016, 4 pages.
Examiner's Answer to Appeal Brief received for U.S. Appl. No. 13/243,045, mailed on Oct. 26, 2020, 17 pages.
Examiner's Answer to Appeal Brief received for U.S. Appl. No. 15/714,887, mailed on Aug. 27, 2021, 23 pages.
Examiner's Pre-Review Report received for Japanese Patent Application No. 2013-098406, mailed on Oct. 8, 2015, 7 pages (4 pages of English Translation and 3 pages of Official Copy).
Examiner's Pre-Review Report received for Japanese Patent Application No. 2018-113081, mailed on Apr. 28, 2021, 4 pages (2 pages of English Translation and 2 pages of Official Copy).
Examiner's Pre-Review Report received for Japanese Patent Application No. 2019-563560, mailed on Dec. 27, 2021, 4 pages (2 pages of English Translation and 2 pages of Official Copy).
Extended European Search Report (includes Partial European Search Report and European Search Opinion) received for European Patent Application No. 13171145.9, mailed on Feb. 5, 2014, 6 pages.
Extended European Search Report (includes Partial European Search Report and European Search Opinion) received for European Patent Application No. 15168475.0, mailed on Oct. 21, 2015, 6 pages.
Extended European Search Report received for European Patent Application No. 12181538.5, mailed on Oct. 23, 2012, 6 pages.
Extended European Search Report received for European Patent Application No. 14853215.3, mailed on Sep. 13, 2016, 9 pages.
Extended European Search Report received for European Patent Application No. 16177139.9, mailed on Nov. 4, 2016, 7 pages.
Extended European Search Report received for European Patent Application No. 16201159.7, mailed on Mar. 27, 2017, 12 pages.

(56) References Cited

OTHER PUBLICATIONS

Extended European Search Report Received for European Patent Application No. 16201195.1, mailed on Feb. 7, 2017, 13 pages.
Extended European Search Report received for European Patent Application No. 16201205.8, mailed on Jan. 5, 2017, 12 pages.
Extended European Search Report received for European Patent Application No. 17799904.2, mailed on Jul. 30, 2018, 7 pages.
Extended European Search Report received for European Patent Application No. 17853654.6, mailed on Jul. 8, 2019, 9 pages.
Extended European Search Report received for European Patent Application No. 18190250.3, mailed on Nov. 9, 2018, 6 pages.
Extended European Search Report received for European Patent Application No. 18208881.5, mailed on Jan. 8, 2019, 7 pages.
Extended European Search Report received for European Patent Application No. 19150528.8, mailed on May 15, 2019, 9 pages.
Extended European Search Report received for European Patent Application No. 19160344.8, mailed on Jun. 14, 2019, 7 pages.
Extended European Search Report received for European Patent Application No. 19160348.9, mailed on Jul. 19, 2019, 6 pages.
Extended European Search Report received for European Patent Application No. 19186538.5, mailed on Oct. 9, 2019, 10 pages.
Extended European Search Report received for European Patent Application No. 19194828.0, mailed on Dec. 19, 2019, 7 pages.
Extended European Search Report received for European Patent Application No. 20186286.9, mailed on Nov. 2, 2020, 9 pages.
Extended European Search Report received for European Patent Application No. 20191533.7, mailed on Nov. 13, 2020, 8 pages.
Extended European Search Report received for European Patent Application No. 20196476.4, mailed on Nov. 5, 2020, 5 pages.
Extended European Search Report received for European Patent Application No. 20198076.0, mailed on Jan. 13, 2021, 8 pages.
Extended European Search Report received for European Patent Application No. 21166287.9, mailed on Nov. 5, 2021, 10 pages.
Extended European Search Report received for European Patent Application No. 21166718.3, mailed on Jul. 6, 2021, 11 pages.
Extended European Search Report received for European Patent Application No. 21173988.3, mailed on Aug. 23, 2021, 6 pages.
Final Office Action received for U.S. Appl. No. 12/074,985, mailed on Dec. 2, 2011, 19 pages.
Final Office Action received for U.S. Appl. No. 12/207,370, mailed on Dec. 13, 2011, 15 pages.
Final Office Action received for U.S. Appl. No. 12/207,370, mailed on Feb. 15, 2013, 17 pages.
Final Office Action received for U.S. Appl. No. 12/207,374, mailed on Jan. 31, 2014, 12 pages.
Final Office Action received for U.S. Appl. No. 12/207,374, mailed on Nov. 6, 2012, 25 pages.
Final Office Action received for U.S. Appl. No. 12/207,374, mailed on Oct. 21, 2011, 16 pages.
Final Office Action received for U.S. Appl. No. 13/243,045, mailed on Aug. 5, 2015, 10 pages.
Final Office Action received for U.S. Appl. No. 13/243,045, mailed on Jan. 15, 2020, 12 pages.
Final Office Action received for U.S. Appl. No. 13/248,882, mailed on Dec. 4, 2013, 22 pages.
Final Office Action received for U.S. Appl. No. 14/142,669, mailed on Jun. 12, 2015, 14 pages.
Final Office Action received for U.S. Appl. No. 14/285,378, mailed on Jul. 23, 2015, 19 pages.
Final Office Action received for U.S. Appl. No. 14/311,214, mailed on Jan. 8, 2015, 12 pages.
Final Office Action received for U.S. Appl. No. 14/311,214, mailed on Sep. 24, 2015, 15 pages.
Final Office Action received for U.S. Appl. No. 14/479,088, mailed on Mar. 11, 2015, 10 pages.
Final Office Action received for U.S. Appl. No. 14/480,183, mailed on Jun. 28, 2017, 14 pages.
Final Office Action received for U.S. Appl. No. 14/503,072, mailed on Mar. 2, 2017, 9 pages.
Final Office Action received for U.S. Appl. No. 14/503,072, mailed on Sep. 1, 2015, 16 pages.
Final Office Action received for U.S. Appl. No. 14/503,296, mailed on Apr. 24, 2019, 5 pages.
Final Office Action received for U.S. Appl. No. 14/503,296, mailed on Jul. 2, 2015, 7 pages.
Final Office Action received for U.S. Appl. No. 14/503,296, mailed on Jun. 4, 2018, 8 pages.
Final Office Action received for U.S. Appl. No. 14/612,214, mailed on Dec. 7, 2015, 13 pages.
Final Office Action received for U.S. Appl. No. 14/719,217, mailed on Feb. 23, 2017, 37 pages.
Final Office Action received for U.S. Appl. No. 14/980,344, mailed on Dec. 5, 2018, 17 pages.
Final Office Action received for U.S. Appl. No. 14/980,344, mailed on Nov. 25, 2019, 13 pages.
Final Office Action received for U.S. Appl. No. 15/137,944, mailed on Feb. 27, 2017, 10 pages.
Final Office Action received for U.S. Appl. No. 15/470,752, mailed on Mar. 13, 2018, 14 pages.
Final Office Action received for U.S. Appl. No. 15/714,887, mailed on Nov. 13, 2020, 60 pages.
Final Office Action received for U.S. Appl. No. 15/714,887, mailed on Nov. 15, 2019, 55 pages.
Final Office Action received for U.S. Appl. No. 15/866,341, mailed on May 14, 2019, 10 pages.
Final Office Action received for U.S. Appl. No. 15/872,685, mailed on Oct. 26, 2018, 10 pages.
Final Office Action received for U.S. Appl. No. 15/899,966, mailed on Nov. 5, 2018, 10 pages.
Final Office Action received for U.S. Appl. No. 16/125,267, mailed on Aug. 26, 2021, 22 pages.
Final Office Action received for U.S. Appl. No. 16/125,267, mailed on Dec. 10, 2020, 20 pages.
Final Office Action received for U.S. Appl. No. 16/147,023, mailed on Jul. 23, 2019, 18 pages.
Final Office Action received for U.S. Appl. No. 16/147,115, mailed on Jun. 19, 2019, 14 pages.
Final Office Action received for U.S. Appl. No. 16/164,561, mailed on Sep. 5, 2019, 12 pages.
Final Office Action received for U.S. Appl. No. 16/369,473, mailed on Dec. 14, 2020, 17 pages.
Final Office Action received for U.S. Appl. No. 16/369,473, mailed on Jan. 25, 2022, 19 pages.
Final Office Action received for U.S. Appl. No. 16/422,736, mailed on Jan. 11, 2021, 39 pages.
Final Office Action received for U.S. Appl. No. 15/250,152, mailed on Aug. 23, 2017, 24 pages.
Final Office Action received for U.S. Appl. No. 15/250,152, mailed on Nov. 16, 2018, 30 pages.
Han Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages (Official Copy only) See Communication under 37 CFR § 1.98(a) (3).
How to Smartphone, "Samsung Galaxy S7—screen rotation on / off", Available Online at: https://www.youtube.com/watch?v=np54sEEI11E, see video from 1:10 to 1:30, Dec. 12, 2016, 3 pages.
IDEX,"IDEX Fingerprint Sensor Mobile Glass Display", Youtube, available at: https://www.youtube.com/watch?v=X1dAIP5sFzw, Apr. 11, 2013, 2 pages.
Intention to Grant received for Danish Patent Application No. PA201670628, mailed on Aug. 28, 2017, 2 pages.
Intention to Grant received for Danish Patent Application No. PA201770418, mailed on Aug. 22, 2019, 2 pages.
Intention to Grant received for Danish Patent Application No. PA201770418, mailed on Nov. 16, 2018, 3 pages.
Intention to Grant received for Danish Patent Application No. PA201770419, mailed on Mar. 28, 2018, 2 pages.
Intention to Grant received for Danish Patent Application No. PA201770714, mailed on Feb. 15, 2019, 2 pages.

(56) References Cited

OTHER PUBLICATIONS

Intention to Grant received for Danish Patent Application No. PA201770714, mailed on Nov. 2, 2018, 2 pages.
Intention to Grant received for Danish Patent Application No. PA201770715, mailed on Nov. 13, 2018, 2 pages.
Intention to Grant received for Danish Patent Application No. PA201770782, mailed on Aug. 8, 2019, 2 pages.
Intention to Grant received for Danish Patent Application No. PA201870370, mailed on Jan. 2, 2019, 2 pages.
Intention to Grant received for Danish Patent Application No. PA201870371, mailed on Jan. 2, 2019, 2 pages.
Intention to Grant received for Danish Patent Application No. PA201870855, mailed on Jul. 13, 2020, 2 pages.
Intention to Grant received for Danish Patent Application No. PA201970127, mailed on Apr. 21, 2020, 2 pages.
Intention to Grant received for European Patent Application No. 12181538.5, mailed on Feb. 20, 2015, 8 pages.
Intention to Grant received for European Patent Application No. 12773460.6, mailed on Feb. 4, 2019, 8 pages.
Intention to Grant received for European Patent Application No. 12773460.6, mailed on Jun. 17, 2019, 4 pages.
Intention to Grant received for European Patent Application No. 13171145.9, mailed on Feb. 21, 2019, 8 pages.
Intention to Grant received for European Patent Application No. 14853215.3, mailed on Jun. 27, 2018, 9 pages.
Intention to Grant received for European Patent Application No. 15168475.0, mailed on Feb. 4, 2020, 9 pages.
Intention to Grant received for European Patent Application No. 15168475.0, mailed on Jan. 22, 2021, 8 pages.
Intention to Grant received for European Patent Application No. 15168475.0, mailed on Jul. 7, 2021, 8 pages.
Intention to Grant received for European Patent Application No. 15719347.5, mailed on Dec. 8, 2020, 7 pages.
Intention to Grant received for European Patent Application No. 15719347.5, mailed on Jun. 8, 2021, 7 pages.
Intention to Grant received for European Patent Application No. 15719347.5, mailed on May 11, 2021, 8 pages.
Intention to Grant received for European Patent Application No. 17853654.6, mailed on Nov. 23, 2020, 8 pages.
Intention to Grant received for European Patent Application No. 18190250.3, mailed on May 15, 2020, 9 pages.
Intention to grant received for European Patent Application No. 18704335.1, mailed on Apr. 17, 2020, 6 pages.
Intention to Grant received for European Patent Application No. 18713408.5, mailed on Oct. 28, 2021, 10 pages.
Intention to Grant received for European Patent Application No. 18830326.7, mailed on Sep. 15, 2021, 11 pages.
Intention to Grant received for European Patent Application No. 20196476.4, mailed on Aug. 25, 2021, 9 pages.
International Preliminary Report on Patentability received for PCT Patent Application No. PCT/US2018/014658, mailed on Nov. 28, 2019, 14 pages.
International Preliminary Report on Patentability received for PCT Patent Application No. PCT/US2018/049289, mailed on Mar. 19, 2020, 9 pages.
International Preliminary Report on Patentability received for PCT Patent Application No. PCT/US2008/075738, mailed on Jan. 28, 2010, 15 pages.
International Preliminary Report on Patentability received for PCT Patent Application No. PCT/US2012/057319, mailed on Apr. 10, 2014, 6 pages.
International Preliminary Report on Patentability received for PCT Patent Application No. PCT/US2012/057656, mailed on Apr. 10, 2014, 6 pages.
International Preliminary Report on Patentability received for PCT Patent Application No. PCT/US2014/054800, mailed on Mar. 31, 2016, 27 pages.
International Preliminary Report on Patentability received for PCT Patent Application No. PCT/US2015/025188, mailed on Mar. 2, 2017, 8 pages.
International Preliminary Report on Patentability received for PCT Patent Application No. PCT/US2015/033326, mailed on Dec. 8, 2016, 11 pages.
International Preliminary Report on Patentability received for PCT Patent Application No. PCT/US2015/033380, mailed on Dec. 8, 2016, 10 pages.
International Preliminary Report on Patentability received for PCT Patent Application No. PCT/US2017/032240, mailed on Nov. 29, 2018, 29 pages.
International Preliminary Report on Patentability received for PCT Patent Application No. PCT/US2017/049760, mailed on Apr. 4, 2019, 9 pages.
International Preliminary Report on Patentability received for PCT Patent Application No. PCT/US2018/015603, mailed on Mar. 19, 2020, 8 pages.
International Preliminary Report on Patentability received for PCT Patent Application No. PCT/US2019/012571, mailed on Aug. 6, 2020, 10 pages.
International Preliminary Report on Patentability received for PCT Patent Application No. PCT/US2019/035092, mailed on Dec. 17, 2020, 10 pages.
International Preliminary Report on Patentability received for PCT Patent Application No. PCT/US2019/049227, mailed on Apr. 8, 2021, 11 pages.
International Preliminary Report on Patentability received for PCT Patent Application No. PCT/US2019/049239, mailed on Apr. 8, 2021, 12 pages.
International Search Report and Written Opinion received for PCT Application No. PCT/US2015/033326, mailed on Aug. 10, 2015, 13 pages.
International Search Report and Written Opinion received for PCT Patent Application No. PCT/US17/49760, mailed on Jan. 19, 2018, 12 pages.
International Search Report and Written Opinion received for PCT Patent Application No. PCT/US2008/075738, mailed on Jul. 2, 2009, 14 pages.
International Search Report and Written Opinion received for PCT Patent Application No. PCT/US2012/057319, mailed on Feb. 25, 2013, 7 pages.
International Search Report and Written Opinion received for PCT Patent Application No. PCT/US2012/057656, mailed on Feb. 25, 2013, 7 pages.
International Search Report and Written Opinion received for PCT Patent Application No. PCT/US2014/054800, mailed on Jan. 29, 2015, 33 pages.
International Search Report and Written Opinion received for PCT Patent Application No. PCT/US2015/025188, mailed on Jun. 23, 2015, 11 pages.
International Search Report and Written Opinion received for PCT Patent Application No. PCT/US2015/033380, mailed on Aug. 10, 2015, 13 pages.
International Search Report and Written Opinion received for PCT Patent Application No. PCT/US2017/032240, mailed on Sep. 21, 2017, 33 pages.
International Search Report and Written Opinion received for PCT Patent Application No. PCT/US2018/014658, mailed on Jun. 6, 2018, 20 pages.
International Search Report and Written Opinion received for PCT Patent Application No. PCT/US2018/015603, mailed on Jun. 22, 2018, 13 pages.
International Search Report and Written Opinion received for PCT Patent Application No. PCT/US2018/049289, mailed on Feb. 19, 2019, 12 pages.
International Search Report and Written Opinion received for PCT Patent Application No. PCT/US2019/012571, mailed on May 6, 2019, 15 pages.
International Search Report and Written Opinion received for PCT Patent Application No. PCT/US2019/035092, mailed on Jan. 16, 2020, 16 pages.
International Search Report and Written Opinion received for PCT Patent Application No. PCT/US2019/049227, mailed on Dec. 12, 2019, 14 pages.

(56) References Cited

OTHER PUBLICATIONS

International Search Report and Written Opinion received for PCT Patent Application No. PCT/US2019/049239, mailed on Jan. 22, 2020, 18 pages.
Invitation to Pay Addition Fees received for PCT Patent Application No. PCT/US2018/014658, mailed on Apr. 11, 2018, 14 pages.
Invitation to Pay Additional Fee received for PCT Patent Application No. PCT/US17/32240, mailed on Jul. 12, 2017, 2 pages.
Invitation to Pay Additional Fee received for PCT Patent Application No. PCT/US2019/035092, mailed on Nov. 20, 2019, 6 pages.
Invitation to pay Additional fees received for PCT Patent Application No. PCT/US17/49760, mailed on Nov. 21, 2017, 2 pages.
Invitation to Pay Additional Fees received for PCT Patent Application No. PCT/US2014/054800, mailed on Oct. 31, 2014, 2 pages.
Invitation to Pay Additional Fees received for PCT Patent Application No. PCT/US2019/049239, mailed on Dec. 4, 2019, 10 pages.
Invitation to Pay Search Fees received for European Patent Application No. 19731554.2, mailed on Dec. 16, 2021, 3 pages.
IPhone 4S Tips 'N' Tricks: Access the Camera from the Lock Screen—Phones 4u, Youtube, available at: https://www.youtube.com/watch?v=C8eDN4Vu2mg>, Dec. 9, 2011, 2 pages.
Iphoneblog, "iOS 5.0.1 Security Flaw—Bypass the Passcode—Access Camera Roll", Youtube, available at: https://www.youtube.com/watch?v=qd0Fwgaymb0, Feb. 24, 2012, 2 pages.
Komachi Aneem, "Time Attendance—Face Recognition—Biometrics", Available at: https://www.youtube.com/watch?v=asclTiiiSbc, Feb. 9, 2010, 1 page.
Lu Haiyun, "Recommendations Based on Purchase Patterns", International Journal of Machine Learning and Computing, vol. 4, No. 6, Online available at: http://www.ijmlc.org/papers/462-C015.pdf, Dec. 2014, pp. 501-504.
Managing Windows User Accounts on Your Home Computer, Available online at: https://www.informit.com/articles/article.aspx?p=478948&seqNum=8, Jun. 23, 2006, 2 pages.
Minutes of the Oral Proceedings received for European Application No. 12770400.5, mailed on Nov. 6, 2018, 7 pages.
Minutes of the Oral Proceedings received for European Patent Application No. 15727291.5, mailed on Jun. 29, 2020, 8 pages.
Minutes of the Oral Proceedings received for European Patent Application No. 15728352.4, mailed on May 27, 2020, 3 pages.
Minutes of the Oral Proceedings received for European Patent Application No. 16201159.7, mailed on Sep. 23, 2021, 6 pages.
Minutes of the Oral Proceedings received for European Patent Application No. 16201205.8, mailed on Jun. 29, 2020, 6 pages.
Naver Blog, "How to Use Smart Wallet and Registered Card", Online Available at: http://feena74.blog.me/140185758401, Mar. 29, 2013, 20 pages.
Nhdanh—Protocol Corp, "How To Enroll Face Enbioaccess T9 Nitgen Korea—Đăng Ký Khuôn Mặt Enbioaccess T9 Nitgen", Available online at: https://www.youtube.com/watch?v=mFn03PD4NIE, Mar. 30, 2017, 1 page.
Non-Final Office Action received for U.S. Appl. No. 12/207,374, mailed on Apr. 15, 2011, 13 pages.
Non-Final Office Action received for U.S. Appl. No. 12/207,374, mailed on Jun. 7, 2013, 26 pages.
Non-Final Office Action received for U.S. Appl. No. 12/207,374, mailed on May 24, 2012, 20 pages.
Non-Final Office Action received for U.S. Appl. No. 14/311,214, mailed on Apr. 10, 2015, 12 pages.
Non-Final Office Action received for U.S. Appl. No. 14/503,072, mailed on Jan. 26, 2015, 12 pages.
Non-Final Office Action received for U.S. Appl. No. 14/503,296, mailed on Jan. 30, 2015, 16 pages.
Non-Final Office Action received for U.S. Appl. No. 15/899,966, mailed on May 4, 2018, 10 pages.
Non-Final Office Action received for U.S. Appl. No. 15/900,047, mailed on May 8, 2018, 7 pages.
Non-Final Office Action received for U.S. Appl. No. 14/503,364, mailed on Feb. 3, 2016, 16 pages.
Non-Final Office Action received for U.S. Appl. No. 12/074,985, mailed on Apr. 19, 2011, 24 pages.
Non-Final Office Action received for U.S. Appl. No. 12/074,985, mailed on Mar. 18, 2013, 19 pages.
Non-Final Office Action received for U.S. Appl. No. 12/207,370, mailed on Aug. 2, 2012, 16 pages.
Non-Final Office Action received for U.S. Appl. No. 12/207,370, mailed on May 6, 2011, 15 pages.
Non-Final Office Action received for U.S. Appl. No. 12/207,370, mailed on Oct. 17, 2013, 17 pages.
Non-Final Office Action received for U.S. Appl. No. 13/243,045, mailed on Jun. 12, 2019, 11 pages.
Non-Final Office Action received for U.S. Appl. No. 13/243,326, mailed on Feb. 14, 2013, 13 pages.
Non-Final Office Action received for U.S. Appl. No. 13/248,872, mailed on May 19, 2014, 6 pages.
Non-Final Office Action received for U.S. Appl. No. 13/248,882, mailed on Jul. 10, 2013, 14 pages.
Non-Final Office Action received for U.S. Appl. No. 14/090,344, mailed on Jan. 15, 2015, 13 pages.
Non-Final Office Action received for U.S. Appl. No. 14/142,669, mailed on Oct. 28, 2015, 14 pages.
Non-Final Office Action received for U.S. Appl. No. 14/142,669, mailed on Sep. 12, 2014, 11 pages.
Non-Final Office Action received for U.S. Appl. No. 14/285,378, mailed on Dec. 21, 2015, 18 pages.
Non-Final Office Action received for U.S. Appl. No. 14/285,378, mailed on Jan. 21, 2015, 19 pages.
Non-Final Office Action received for U.S. Appl. No. 14/311,214, mailed on Sep. 18, 2014, 10 pages.
Non-Final Office Action received for U.S. Appl. No. 14/479,088, mailed on Jul. 6, 2015, 10 pages.
Non-Final Office Action received for U.S. Appl. No. 14/479,088, mailed on Nov. 18, 2014, 8 pages.
Non-Final Office Action received for U.S. Appl. No. 14/480,183, mailed on Oct. 18, 2016, 12 pages.
Non-Final Office Action received for U.S. Appl. No. 14/503,072, mailed on Jun. 17, 2016, 19 pages.
Non-Final Office Action received for U.S. Appl. No. 14/503,296, mailed on Aug. 28, 2017, 14 pages.
Non-Final Office Action received for U.S. Appl. No. 14/503,296, mailed on Oct. 5, 2016, 11 pages.
Non-Final Office Action received for U.S. Appl. No. 14/503,296, mailed on Sep. 18, 2018, 20 pages.
Non-Final Office Action received for U.S. Appl. No. 14/503,381, mailed on May 13, 2015, 13 pages.
Non-Final Office Action received for U.S. Appl. No. 14/612,214, mailed on Jul. 29, 2015, 12 pages.
Non-Final Office Action received for U.S. Appl. No. 14/612,214, mailed on Nov. 20, 2019, 11 pages.
Non-Final Office Action received for U.S. Appl. No. 14/642,366, mailed on Aug. 24, 2015, 7 pages.
Non-Final Office Action received for U.S. Appl. No. 14/719,217, mailed on Jul. 26, 2018, 40 pages.
Non-Final Office Action received for U.S. Appl. No. 14/719,217, mailed on Jul. 28, 2016, 28 pages.
Non-Final Office Action received for U.S. Appl. No. 14/980,344, mailed on Mar. 14, 2018, 13 pages.
Non-Final Office Action received for U.S. Appl. No. 14/980,344, mailed on May 14, 2019, 11 pages.
Non-Final Office Action received for U.S. Appl. No. 15/134,638, mailed on Sep. 20, 2016, 6 pages.
Non-Final Office Action received for U.S. Appl. No. 15/137,944, mailed on Jul. 27, 2017, 13 pages.
Non-Final Office Action received for U.S. Appl. No. 15/137,944, mailed on Oct. 18, 2016, 10 pages.
Non-Final Office Action received for U.S. Appl. No. 15/269,801, mailed on Dec. 30, 2016, 17 pages.
Non-Final Office Action received for U.S. Appl. No. 15/294,439, mailed on Jan. 26, 2018, 18 pages.
Non-Final Office Action received for U.S. Appl. No. 15/470,752, mailed on Aug. 28, 2018, 12 pages.

(56) References Cited

OTHER PUBLICATIONS

Non-Final Office Action received for U.S. Appl. No. 15/470,752, mailed on Jul. 28, 2017, 11 pages.
Non-Final Office Action received for U.S. Appl. No. 15/714,887, mailed on May 27, 2020, 48 pages.
Non-Final Office Action received for U.S. Appl. No. 15/714,887, mailed on May 30, 2019, 47 pages.
Non-Final Office Action received for U.S. Appl. No. 15/845,794, mailed on Oct. 15, 2018, 8 pages.
Non-Final Office Action received for U.S. Appl. No. 15/866,341, mailed on Nov. 13, 2018, 11 pages.
Non-Final Office Action received for U.S. Appl. No. 15/872,685, mailed on Mar. 27, 2018, 9 pages.
Non-Final Office Action received for U.S. Appl. No. 15/894,221, mailed on Jul. 25, 2018, 21 pages.
Non-Final Office Action received for U.S. Appl. No. 15/903,456, mailed on Sep. 6, 2018, 20 pages.
Non-Final Office Action received for U.S. Appl. No. 15/992,722, mailed on Aug. 6, 2020, 7 pages.
Non-Final Office Action received for U.S. Appl. No. 16/035,419, mailed on Jan. 30, 2019, 24 pages.
Non-Final Office Action received for U.S. Appl. No. 16/125,267, mailed on Jul. 2, 2020, 20 pages.
Non-Final Office Action received for U.S. Appl. No. 16/125,267, mailed on Mar. 26, 2021, 20 pages.
Non-Final Office Action received for U.S. Appl. No. 16/125,267, mailed on Nov. 23, 2021, 21 pages.
Non-Final Office Action received for U.S. Appl. No. 16/147,023, mailed on Dec. 26, 2018, 17 pages.
Non-Final Office Action received for U.S. Appl. No. 16/147,115, mailed on Dec. 13, 2018, 12 pages.
Non-Final Office Action received for U.S. Appl. No. 16/164,561, mailed on Jan. 4, 2019, 14 pages.
Non-Final Office Action received for U.S. Appl. No. 16/241,199, mailed on Aug. 20, 2020, 11 pages.
Non-Final Office Action received for U.S. Appl. No. 16/369,355, mailed on Apr. 29, 2021, 16 pages.
Non-Final Office Action received for U.S. Appl. No. 16/369,473, mailed on Apr. 27, 2020, 12 pages.
Non-Final Office Action received for U.S. Appl. No. 16/369,473, mailed on Jun. 11, 2021, 19 pages.
Non-Final Office Action received for U.S. Appl. No. 16/422,736, mailed on Jun. 23, 2020, 24 pages.
Non-Final Office Action received for U.S. Appl. No. 16/434,865, mailed on Jan. 16, 2020, 9 pages.
Non-Final Office Action received for U.S. Appl. No. 16/542,084, mailed on Jan. 24, 2020, 21 pages.
Non-Final Office Action received for U.S. Appl. No. 16/553,622, mailed on May 29, 2020, 11 pages.
Non-Final Office Action received for U.S. Appl. No. 16/667,271, mailed on Dec. 13, 2019, 8 pages.
Non-Final Office Action received for U.S. Appl. No. 16/670,949, mailed on Dec. 9, 2020, 11 pages.
Non-Final Office Action received for U.S. Appl. No. 16/987,003, mailed on May 10, 2021, 20 pages.
Non-Final Office Action received for U.S. Appl. No. 16/990,974, mailed on Oct. 15, 2020, 6 pages.
Non-Final Office Action received for U.S. Appl. No. 17/087,855, mailed on Dec. 24, 2021, 21 pages.
Non-Final Office Action received for U.S. Appl. No. 17/087,855, mailed on Jul. 12, 2021, 17 pages.
Non-Final Office Action received for U.S. Appl. No. 15/250,152, mailed on Apr. 6, 2018, 31 pages.
Non-Final Office Action received for U.S. Appl. No. 15/250,152, mailed on Mar. 2, 2017, 26 pages.
Non-Final Office Action received for U.S. Appl. No. 15/945,610, mailed on Sep. 20, 2018, 9 pages.
Non-Final Office Action received for U.S. Appl. No. 13/243,045, mailed on Mar. 17, 2015, 9 pages.
Notice of Acceptance received for Australian Patent Application No. 2008305338, mailed on Oct. 27, 2011, 1 page.
Notice of Acceptance received for Australian Patent Application No. 2014334869, mailed on Jan. 3, 2018, 3 pages.
Notice of Acceptance received for Australian Patent Application No. 2015266650, mailed on Jan. 18, 2018, 3 pages.
Notice of Acceptance received for Australian Patent Application No. 2015266693, mailed onJan. 19, 2018, 3 pages.
Notice of Acceptance received for Australian Patent Application No. 2016201310, mailed on Feb. 21, 2018, 3 pages.
Notice of Acceptance received for Australian Patent Application No. 2016203896, mailed on Mar. 2, 2018, 3 pages.
Notice of Acceptance received for Australian Patent Application No. 2016203898 mailed on Feb. 21, 2018, 3 pages.
Notice of Acceptance received for Australian Patent Application No. 2017201064, mailed on Feb. 20, 2018, 3 pages.
Notice of Acceptance received for Australian Patent Application No. 2017266867, mailed on Mar. 6, 2019, 3 pages.
Notice of Acceptance received for Australian Patent Application No. 2017330208, mailed on Nov. 28, 2019, 3 pages.
Notice of Acceptance received for Australian Patent Application No. 2018202559, mailed on Oct. 21, 2019, 3 pages.
Notice of Acceptance received for Australian Patent Application No. 2018229544, mailed on May 4, 2020, 3 pages.
Notice of Acceptance received for Australian Patent Application No. 2018270420, mailed on Jul. 21, 2021, 3 pages.
Notice of Acceptance received for Australian Patent Application No. 2018279788, mailed on Nov. 6, 2019, 3 pages.
Notice of Acceptance received for Australian Patent Application No. 2018312629, mailed on Nov. 7, 2019, 4 pages.
Notice of Acceptance received for Australian Patent Application No. 2019200360, mailed on Mar. 15, 2019, 3 pages.
Notice of Acceptance received for Australian Patent Application No. 2019201101, mailed on May 6, 2019, 3 pages.
Notice of Acceptance received for Australian Patent Application No. 2019203473, mailed on Nov. 7, 2019, 3 pages.
Notice of Acceptance received for Australian Patent Application No. 2019204387, mailed on Dec. 4, 2020, 3 pages.
Notice of Acceptance received for Australian Patent Application No. 2019346842, mailed on Jan. 21, 2021, 3 pages.
Notice of Acceptance received for Australian Patent Application No. 2020200685, mailed on Oct. 29, 2020, 3 pages.
Notice of Acceptance received for Australian Patent Application No. 2020200795, mailed on Feb. 28, 2020, 3 pages.
Notice of Acceptance received for Australian Patent Application No. 2020201306, mailed on Mar. 12, 2020, 3 pages.
Notice of Acceptance received for Australian Patent Application No. 2020201721, mailed on Jul. 6, 2021, 3 pages.
Notice of Acceptance received for Australian Patent Application No. 2020204256, mailed on Oct. 9, 2021, 3 pages.
Notice of Acceptance received for Australian Patent Application No. 2020239783, mailed on Mar. 2, 2021, 3 pages.
Notice of Acceptance received for Australian Patent Application No. 2020289822, mailed on Dec. 22, 2021, 3 pages.
Notice of Allowance received for Australian Patent Application No. 2015202397, mailed on Feb. 15, 2017, 3 pages.
Notice of Allowance received for Chinese Patent Application No. 201280047459.6, mailed on Jan. 31, 2018, 2 pages (1 page of English Translation and 1 page of Official Copy).
Notice of Allowance received for Chinese Patent Application No. 201410407626.4, mailed on Aug. 27, 2020, 2 pages (1 pages of English Translation and 1 pages of Official Copy).
Notice of Allowance received for Chinese Patent Application No. 201480058054.1, mailed on Jul. 8, 2019, 2 pages (1 page of English Translation and 1 page of Official Copy).
Notice of Allowance received for Chinese Patent Application No. 201520357381.9, mailed on Jul. 29, 2015, 4 pages (2 pages of English Translation and 2 pages of Official Copy).
Notice of Allowance received for Chinese Patent Application No. 201520358683.8, issued on Mar. 10, 2016, 5 pages (3 pages of English Translation and 2 pages of Official Copy).

(56) References Cited

OTHER PUBLICATIONS

Notice of Allowance received for Chinese Patent Application No. 201580043701.6, mailed on Jan. 26, 2022, 2 pages (1 page of English Translation and 1 page of Official Copy).
Notice of Allowance received for Chinese Patent Application No. 201620480708.6, mailed on Apr. 20, 2017, 3 pages (2 pages of English Translation and 1 page of Official Copy).
Notice of Allowance received for Chinese Patent Application No. 201620480846.4, mailed on Apr. 20, 2017, 3 pages (2 pages of English Translation and 1 page of Official Copy).
Notice of Allowance received for Chinese Patent Application No. 201710093861.2, mailed on Sep. 24, 2019, 4 pages (1 page of English Translation and 3 pages of Official Copy).
Notice of Allowance received for Chinese Patent Application No. 201710094150.7, mailed on Feb. 23, 2022, 4 pages (1 page of English Translation and 3 pages of Official Copy).
Notice of Allowance received for Chinese Patent Application No. 201780002398.4, mailed on Jun. 17, 2019, 2 pages (1 page of English Translation and 1 page of Official Copy).
Notice of Allowance received for Chinese Patent Application No. 201810338038.8, mailed on Jun. 30, 2020, 2 pages (1 page of English Translation and 1 page of Official Copy).
Notice of Allowance received for Chinese Patent Application No. 201810339290.0, mailed on Mar. 9, 2022, 2 pages (1 page of English Translation and 1 page of Official Copy).
Notice of Allowance received for Chinese Patent Application No. 201810954931.3, mailed on Jun. 23, 2021, 4 pages (1 page of English Translation and 3 pages of Official Copy).
Notice of Allowance received for Chinese Patent Application No. 201810955077.2, mailed on Jul. 14, 2021, 2 pages (1 page of English Translation and 1 page of Official Copy).
Notice of Allowance received for Chinese Patent Application No. 201811460172.1, mailed on Jan. 11, 2021, 2 pages (1 page of English Translation and 1 page of Official Copy).
Notice of Allowance received for Chinese Patent Application No. 201910278273.5, mailed on Nov. 19, 2020, 2 pages (1 page of English Translation and 1 page of Official Copy).
Notice of Allowance received for Chinese Patent Application No. 201910744886.3, mailed on Jun. 3, 2021, 2 pages (1 page of English Translation and 1 page of Official Copy).
Notice of Allowance received for Chinese Patent Application No. 201910899698.8, mailed on Oct. 23, 2020, 4 pages (1 page of English Translation and 3 pages of Official Copy).
Notice of Allowance received for Japanese Patent Application No. 2016-131998, mailed on Nov. 30, 2018, 4 pages (1 page of English Translation and 3 pages of Official copy).
Notice of Allowance received for Japanese Patent Application No. 2016-224506, mailed on Jan. 24, 2020, 4 pages (1 page of English Translation and 3 pages of Official Copy).
Notice of Allowance received for Japanese Patent Application No. 2016-224507, mailed on Mar. 26, 2019, 3 pages (1 page of English Translation and 2 pages of Official Copy).
Notice of Allowance received for Japanese Patent Application No. 2016-540927, mailed on May 14, 2018, 4 pages (1 page of English Translation and 3 pages of Official copy).
Notice of Allowance received for Japanese Patent Application No. 2016-558332, mailed on Jan. 11, 2019, 4 pages (1 page of English Translation and 3 pages of Official Copy).
Notice of Allowance received for Japanese Patent Application No. 2016-569665, mailed on Feb. 22, 2019, 4 pages (1 page of English Translation and 3 Pages of Official Copy).
Notice of Allowance received for Japanese Patent Application No. 2017-085582, mailed on Nov. 30, 2018, 4 pages (1 page of English Translation and 3 pages of Official copy).
Notice of Allowance received for Japanese Patent Application No. 2017-507413, mailed on Jul. 22, 2019, 4 pages (1 page of English Translation and 3 pages of Official Copy).
Notice of Allowance received for Japanese Patent Application No. 2018-113081, mailed on Nov. 8, 2021, 15 pages (1 page of English Translation and 14 pages of Official Copy).
Notice of Allowance received for Japanese Patent Application No. 2018-241505, mailed on Oct. 4, 2019, 4 pages (1 page of English Translation and 3 pages of Official Copy).
Notice of Allowance received for Japanese Patent Application No. 2018-551159, mailed on Jun. 15, 2020, 5 pages (2 pages of English Translation and 3 pages of Official Copy).
Notice of Allowance received for Japanese Patent Application No. 2018-560107, mailed on Dec. 6, 2019, 4 pages (1 page of English Translation and 3 pages of Official Copy).
Notice of Allowance received for Japanese Patent Application No. 2019-053379, mailed on Nov. 16, 2020, 5 pages (2 pages of English Translation and 3 pages of Official Copy).
Notice of Allowance received for Japanese Patent Application No. 2019-107235, mailed on May 15, 2020, 5 pages (2 pages of English Translation and 3 pages of Official Copy).
Notice of Allowance received for Japanese Patent Application No. 2019-116580, mailed on Oct. 2, 2020, 4 pages (1 page of English Translation and 3 pages of Official Copy).
Notice of Allowance received for Japanese Patent Application No. 2019-194603, mailed on Apr. 19, 2021, 4 pages (1 page of English Translation and 3 pages of Official Copy).
Notice of Allowance received for Japanese Patent Application No. 2019-238894, mailed on Oct. 5, 2020, 4 pages (1 page of English Translation and 3 pages of Official Copy).
Notice of Allowance received for Japanese Patent Application No. 2019-510416, mailed on Oct. 12, 2020, 5 pages (2 pages of English Translation and 3 pages of Official Copy).
Notice of Allowance received for Japanese Patent Application No. 2019-511975, mailed on Dec. 14, 2020, 4 pages (1 page of English Translation and 3 pages of Official Copy).
Notice of Allowance received for Japanese Patent Application No. 2020-103213, mailed on Oct. 25, 2021, 5 pages (2 pages of English Translation and 3 pages of Official Copy).
Notice of Allowance received for Japanese Patent Application No. 2020-126751, mailed on Aug. 16, 2021, 5 pages (2 pages of English Translation and 3 pages of Official Copy).
Notice of allowance received for Japanese Patent Application No. 2020-159979, mailed on Nov. 8, 2021, 5 pages (2 pages of English Translation and 3 pages of Official Copy).
Notice of Allowance received for Japanese Patent Application No. 2020-183773, mailed on Dec. 23, 2021, 4 pages (1 page of English Translation and 3 pages of Official Copy).
Notice of Allowance received for Japanese Patent Application No. 2020-569806, mailed on Jul. 12, 2021, 4 pages (1 page of English Translation and 3 pages of Official Copy).
Notice of Allowance received for Japanese Patent Application No. 2021-015128, mailed on Sep. 3, 2021, 4 pages (1 page of English Translation and 3 pages of Official Copy).
Notice of Allowance received for Japanese Patent Application No. 2021-163037, mailed on Dec. 6, 2021, 4 pages (1 page of English Translation and 3 pages of Official Copy).
Notice of Allowance received for Korean Patent Application No. 10-2010-7008899, mailed on Feb. 12, 2016, 3 pages (1 page of English Translation and 2 pages of official copy).
Notice of Allowance received for Korean Patent Application No. 10-2014-7004771, mailed on Oct. 29, 2015, 3 pages (1 page of English Translation and 2 pages of Official Copy).
Notice of Allowance received for Korean Patent Application No. 10-2014-7004772, mailed on Feb. 12, 2016, 4 pages (1 page of English Translation and 3 pages of Official Copy).
Notice of Allowance received for Korean Patent Application No. 10-2014-7004773, mailed on Jan. 7, 2016, 3 pages (1 page of English Translation and 2 pages of Official Copy).
Notice of Allowance received for Korean Patent Application No. 10-2014-7025441, issued on Feb. 26, 2016, 3 pages (1 page of English Translation and 2 pages of Official Copy).
Notice of Allowance received for Korean Patent Application No. 10-2015-7004548, issued on Feb. 26, 2016, 3 pages (1 page of English Translation and 2 pages of Official Copy).
Notice of Allowance received for Korean Patent Application No. 10-2016-7009347, mailed on May 10, 2018, 4 pages (1 page of English Translation and 3 pages of official copy).

(56) References Cited

OTHER PUBLICATIONS

Notice of Allowance received for Korean Patent Application No. 10-2016-7009632, mailed on Aug. 17, 2018, 4 pages (1 page of English Translation and 3 pages of Official copy).
Notice of Allowance received for Korean Patent Application No. 10-2016-7035555, mailed on Sep. 23, 2019, 3 pages (1 page of English Translation and 2 pages of Official Copy).
Notice of Allowance received for Korean Patent Application No. 10-2017-0022365, mailed on Mar. 27, 2018, 4 pages (1 page of English Translation and 3 pages of Official copy).
Notice of Allowance received for Korean Patent Application No. 10-2017-0022546, mailed on Feb. 27, 2018, 4 pages (1 page of English Translation and 3 pages of Official Copy).
Notice of Allowance received for Korean Patent Application No. 10-2017-0022582, mailed on Feb. 27, 2020, 5 pages (2 pages of English Translation and 3 pages of Official Copy).
Notice of Allowance received for Korean Patent Application No. 10-2017-7012145, mailed on Oct. 30, 2019, 3 pages (1 page of English Translation and 2 pages of Official Copy).
Notice of Allowance received for Korean Patent Application No. 10-2017-7015582, mailed on Dec. 27, 2018, 5 pages (2 pages of English Translation and 3 pages of Official copy).
Notice of Allowance received for Korean Patent Application No. 10-2018-7022895, mailed on Feb. 22, 2019, 4 pages (1 page of English Translation and 3 pages of Official Copy).
Notice of Allowance received for Korean Patent Application No. 10-2018-7028845, mailed on Apr. 16, 2020, 5 pages (2 pages of English Translation and 3 pages of Official Copy).
Notice of Allowance received for Korean Patent Application No. 10-2018-7032467, mailed on Jan. 28, 2019, 4 pages (1 page of English Translation and 3 pages of Official Copy).
Notice of Allowance received for Korean Patent Application No. 10-2018-7033301, mailed on Feb. 20, 2019, 5 pages ( 2 Pages of English Translation and 3 Pages of Official Copy).
Notice of Allowance received for Korean Patent Application No. 10-2019-7003374, mailed on Oct. 4, 2019, 10 pages (3 pages of English Translation and 7 pages of Official Copy).
Notice of Allowance received for Korean Patent Application No. 10-2019-7003836, mailed on Oct. 4, 2019, 6 pages (3 pages of English Translation and 3 pages of Official Copy).
Notice of Allowance received for Korean Patent Application No. 10-2019-7004734, mailed on Oct. 24, 2019, 7 pages (3 pages of English Translation and 4 pages of Official Copy).
Notice of Allowance received for Korean Patent Application No. 10-2019-7005136, mailed on Feb. 19, 2021, 5 pages (2 pages of English Translation and 3 pages of Official Copy).
Notice of Allowance received for Korean Patent Application No. 10-2019-7005925, mailed on Jan. 21, 2020, 7 pages (3 pages of English Translation and 4 pages of Official Copy).
Notice of Allowance received for Korean Patent Application No. 10-2019-7014494, mailed on Mar. 19, 2020, 4 pages (1 page of English Translation and 3 pages of Official Copy).
Notice of Allowance received for Korean Patent Application No. 10-2019-7014988, mailed on Jan. 19, 2020, 4 pages (1 page of English Translation and 3 pages of Official Copy).
Notice of Allowance received for Korean Patent Application No. 10-2019-7038021, mailed on May 2, 2020, 7 pages (3 pages of English Translation and 4 pages of Official Copy).
Notice of Allowance received for Korean Patent Application No. 10-2020-0048600, mailed on Apr. 30, 2020, 5 pages (2 pages of English Translation and 3 pages of Official Copy).
Notice of Allowance received for Korean Patent Application No. 10-2020-0097418, mailed on Apr. 27, 2021, 5 pages (2 pages of English Translation and 3 pages of Official Copy).
Notice of Allowance received for Korean Patent Application No. 10-2020-7002929, mailed on Nov. 26, 2020, 3 pages (1 page of English Translation and 2 pages of Official Copy).
Notice of Allowance received for Korean Patent Application No. 10-2020-7011172, mailed on Aug. 25, 2020, 9 pages (4 pages of English Translation and 5 pages of Official Copy).
Notice of Allowance received for Korean Patent Application No. 10-2020-7011424, mailed on Jan. 21, 2021, 4 pages (1 page of English Translation and 3 pages of Official Copy).
Notice of Allowance received for Korean Patent Application No. 10-2020-7017803, mailed on Nov. 5, 2020, 6 pages (2 pages of English Translation and 4 pages of Official Copy).
Notice of Allowance received for Korean Patent Application No. 10-2020-7022596, mailed on Jan. 27, 2022, 7 pages (2 pages of English Translation and 5 pages of Official Copy).
Notice of Allowance received for Korean Patent Application No. 10-2020-7027862, mailed on Jun. 29, 2021, 7 pages (3 pages of English Translation and 4 pages of Official Copy).
Notice of Allowance received for Korean Patent Application No. 10-2020-7034180, mailed on Feb. 22, 2022, 8 pages (2 pages of English Translation and 6 pages of Official Copy).
Notice of Allowance received for Korean Patent Application No. 10-2020-7036748, mailed on Jan. 25, 2021, 3 pages (1 page of English Translation and 2 pages of Official Copy).
Notice of Allowance received for Korean Patent Application No. 10-2021-0099243, mailed on Oct. 30, 2021, 4 pages (1 page of English Translation and 3 pages of Official Copy).
Notice of Allowance received for Korean Patent Application No. 10-2021-7005691, mailed on Mar. 29, 2021, 3 pages (1 page of English Translation and 2 pages of Official Copy).
Notice of Allowance received for Korean Patent Application No. 10-2021-7011888, mailed on Jan. 27, 2022, 5 pages (1 page of English Translation and 4 pages of Official Copy).
Notice of Allowance received for Korean Patent Application No. 10-2021-7015473, mailed on Feb. 24, 2022, 5 pages (1 page of English Translation and 4 pages of Official Copy).
Notice of Allowance received for Korean Patent Application No. 10-2021-7020549, mailed on Jul. 13, 2021, 3 pages (1 page of English Translation and 2 pages of Official Copy).
Notice of Allowance received for Korean Patent Application No. 10-2021-7024020, mailed on Jan. 14, 2022, 4 pages (1 page of English Translation and 3 pages of Official Copy).
Notice of Allowance received for Korean Patent Application No. 10-2014-7008348, mailed on Feb. 21, 2019, 5 pages (2 Pages of English Translation and 3 Pages of Official Copy).
Notice of Allowance received for Taiwanese Patent Application No. 103136545, mailed on Nov. 27, 2017, 4 pages (1 page of English Translation of Search Report and 3 pages of Official Copy).
Notice of Allowance received for Taiwanese Patent Application No. 104117508, mailed on Sep. 18, 2019, 5 pages (2 pages of English Translation and 3 pages of Official Copy).
Notice of Allowance received for Taiwanese Patent Application No. 106141250, mailed on May 24, 2018, 7 pages (3 pages of English Translation and 4 pages of Official Copy).
Notice of Allowance received for Taiwanese Patent Application No. 107121719, mailed on Sep. 27, 2018, 7 pages (3 pages of English Translation and 4 pages of Official Copy).
Notice of Allowance received for Taiwanese Patent Application No. 107138003, mailed on Aug. 30, 2019, 4 pages (1 page of English Translation and 3 pages of Official Copy).
Notice of Allowance received for the U.S. Appl. No. 14/503,381, mailed on Dec. 16, 2015, 8 pages.
Notice of Allowance received for U.S. Appl. No. 14/142,661, mailed on Aug. 3, 2015, 10 pages.
Notice of Allowance received for U.S. Appl. No. 14/479,088, mailed on Nov. 12, 2015, 7 pages.
Notice of Allowance received for U.S. Appl. No. 12/074,985, mailed on Jul. 30, 2013, 8 pages.
Notice of Allowance received for U.S. Appl. No. 12/207,370, mailed on Jun. 7, 2013, 9 pages.
Notice of Allowance received for U.S. Appl. No. 12/207,370, mailed on Mar. 6, 2014, 5 pages.
Notice of Allowance received for U.S. Appl. No. 12/207,374, mailed on Aug. 29, 2014, 8 pages.
Notice of Allowance received for U.S. Appl. No. 12/207,374, mailed on Dec. 4, 2014, 8 pages.
Notice of Allowance received for U.S. Appl. No. 13/243,045, mailed on Aug.4, 2021, 8 pages.

(56) References Cited

OTHER PUBLICATIONS

Notice of Allowance received for U.S. Appl. No. 13/243,326, mailed on Sep. 23, 2013, 11 pages.
Notice of Allowance received for U.S. Appl. No. 13/248,872, mailed on Dec. 4, 2014, 7 pages.
Notice of Allowance received for U.S. Appl. No. 13/248,882, mailed on Mar. 13, 2014, 16 pages.
Notice of Allowance received for U.S. Appl. No. 14/090,344, mailed on Aug. 26, 2015, 7 pages.
Notice of Allowance received for U.S. Appl. No. 14/142,657, mailed on Jan. 8, 2015, 5 pages.
Notice of Allowance received for U.S. Appl. No. 14/142,657, mailed on Jul. 23, 2015, 2 pages.
Notice of Allowance received for U.S. Appl. No. 14/142,657, mailed on Jun. 29, 2015, 7 pages.
Notice of Allowance received for U.S. Appl. No. 14/142,657, mailed on Sep. 10, 2014, 9 pages.
Notice of Allowance received for U.S. Appl. No. 14/142,661, mailed on Sep. 28, 2015, 9 pages.
Notice of Allowance received for U.S. Appl. No. 14/142,669, mailed on Aug. 25, 2016, 2 pages.
Notice of Allowance received for U.S. Appl. No. 14/142,669, mailed on Jun. 14, 2016, 5 pages.
Notice of Allowance received for U.S. Appl. No. 14/142,669, mailed on Sep. 21, 2016, 2 pages.
Notice of Allowance received for U.S. Appl. No. 14/142,674, mailed on Feb. 18, 2015, 7 pages.
Notice of Allowance received for U.S. Appl. No. 14/142,674, mailed on Jan. 23, 2015, 7 pages.
Notice of Allowance received for U.S. Appl. No. 14/142,674, mailed on Sep. 26, 2014, 18 pages.
Notice of Allowance received for U.S. Appl. No. 14/255,765, mailed on Jun. 12, 2014, 10 pages.
Notice of Allowance received for U.S. Appl. No. 14/285,378, mailed May 19, 2016, 10 pages.
Notice of Allowance received for U.S. Appl. No. 14/479,088, mailed on Mar. 9, 2016, 2 pages.
Notice of Allowance received for U.S. Appl. No. 14/480,183, mailed on Nov. 29, 2017, 7 pages.
Notice of Allowance received for U.S. Appl. No. 14/503,072, mailed on Jun. 4, 2018, 6 pages.
Notice of Allowance received for U.S. Appl. No. 14/503,072, mailed on Mar. 26, 2018, 6 pages.
Notice of Allowance received for U.S. Appl. No. 14/503,296, mailed on Aug. 28, 2019, 12 pages.
Notice of Allowance received for U.S. Appl. No. 14/503,364, mailed on Jun. 16, 2016, 11 pages
Notice of Allowance received for U.S. Appl. No. 14/612,214, mailed on Apr. 15, 2020, 8 pages.
Notice of Allowance received for U.S. Appl. No. 14/642,366, mailed on Jan. 14, 2016, 8 pages.
Notice of Allowance received for U.S. Appl. No. 14/661,796, mailed on Jul. 7, 2015, 10 pages.
Notice of Allowance received for U.S. Appl. No. 14/661,796, mailed on Jul. 23, 2015, 2 pages.
Notice of Allowance received for U.S. Appl. No. 14/719,217, mailed on Feb. 13, 2019, 13 pages.
Notice of Allowance received for U.S. Appl. No. 14/980,344, mailed on Mar. 23, 2020, 9 pages.
Notice of allowance received for U.S. Appl. No. 15/017,436, mailed on May 27, 2016, 17 pages.
Notice of Allowance received for U.S. Appl. No. 15/134,638, mailed on Apr. 10, 2018, 7 pages.
Notice of Allowance received for U.S. Appl. No. 15/134,638, mailed on Jul. 27, 2018, 7 pages.
Notice of Allowance received for U.S. Appl. No. 15/137,944, mailed on Dec. 21, 2017, 8 pages.
Notice of Allowance received for U.S. Appl. No. 15/250,152, mailed on May 1, 2019, 12 pages.
Notice of Allowance received for U.S. Appl. No. 15/269,801, mailed on May 3, 2017, 6 pages.
Notice of Allowance received for U.S. Appl. No. 15/269,801, mailed on Sep. 7, 2017, 5 pages.
Notice of Allowance received for U.S. Appl. No. 15/294,439, mailed on Jan. 8, 2019, 8 pages.
Notice of Allowance received for U.S. Appl. No. 15/294,439, mailed on Sep. 10, 2018, 9 pages.
Notice of Allowance received for U.S. Appl. No. 15/357,873, mailed on Aug. 23, 2017, 10 pages.
Notice of Allowance received for U.S. Appl. No. 15/357,873, mailed on Jan. 8, 2018, 9 pages.
Notice of Allowance received for U.S. Appl. No. 15/470,752, mailed on Feb. 7, 2019, 11 pages.
Notice of Allowance received for U.S. Appl. No. 15/845,794, mailed on Feb. 14, 2019, 6 pages.
Notice of Allowance received for U.S. Appl. No. 15/866,341, mailed on Jul. 26, 2019, 8 pages.
Notice of Allowance received for U.S. Appl. No. 15/872,685, mailed on Mar. 8, 2019, 10 pages.
Notice of Allowance received for U.S. Appl. No. 15/894,221, mailed on Apr. 11, 2019, 5 pages.
Notice of Allowance received for U.S. Appl. No. 15/894,221, mailed on Aug. 13, 2019, 2 pages.
Notice of Allowance received for U.S. Appl. No. 15/894,221, mailed on Feb. 1, 2019, 5 pages.
Notice of Allowance received for U.S. Appl. No. 15/894,221, mailed on Mar. 4, 2019, 2 pages.
Notice of Allowance received for U.S. Appl. No. 15/899,966, mailed on Mar. 21, 2019, 7 pages.
Notice of Allowance received for U.S. Appl. No. 15/899,996, mailed on Apr. 24, 2018, 9 pages.
Notice of Allowance received for U.S. Appl. No. 15/900,047, mailed on Dec. 5, 2018, 10 pages.
Notice of Allowance received for U.S. Appl. No. 15/903,456, mailed on May 1, 2019, 6 pages.
Notice of Allowance received for U.S. Appl. No. 15/945,610, mailed on May 20, 2019, 7 pages.
Notice of Allowance received for U.S. Appl. No. 15/992,722, mailed on Oct. 19, 2020, 5 pages.
Notice of Allowance received for U.S. Appl. No. 16/035,419, mailed on May 24, 2019, 14 pages.
Notice of Allowance received for U.S. Appl. No. 16/125,267, mailed on Mar. 3, 2022, 10 pages.
Notice of Allowance received for U.S. Appl. No. 16/131,767, mailed on Sep. 6, 2019, 7 pages.
Notice of Allowance received for U.S. Appl. No. 16/147,023, mailed on Apr. 3, 2020, 2 pages.
Notice of Allowance received for U.S. Appl. No. 16/147,023, mailed on Aug. 13, 2020, 2 pages.
Notice of Allowance received for U.S. Appl. No. 16/147,023, mailed on Feb. 27, 2020, 2 pages.
Notice of Allowance received for U.S. Appl. No. 16/147,023, mailed on Jan. 31, 2020, 7 pages.
Notice of Allowance received for U.S. Appl. No. 16/147,023, mailed on Jul. 2, 2020, 2 pages.
Notice of Allowance received for U.S. Appl. No. 16/147,023, mailed on Jul. 21, 2020, 2 pages.
Notice of Allowance received for U.S. Appl. No. 16/147,023, mailed on Jun. 1, 2020, 2 pages.
Notice of Allowance received for U.S. Appl. No. 16/147,023, mailed on Jun. 18, 2020, 2 pages.
Notice of Allowance received for U.S. Appl. No. 16/147,023, mailed on Mar. 27, 2020, 2 pages.
Notice of Allowance received for U.S. Appl. No. 16/147,023, mailed on May 5, 2020, 2 pages.
Notice of Allowance received for U.S. Appl. No. 16/147,023, mailed on May 20, 2020, 7 pages.
Notice of Allowance received for U.S. Appl. No. 16/147,115, mailed on Oct. 30, 2019, 10 pages.
Notice of Allowance received for U.S. Appl. No. 16/164,561, mailed on Apr. 8, 2020, 5 pages.

(56) References Cited

OTHER PUBLICATIONS

Notice of Allowance received for U.S. Appl. No. 16/241,199, mailed on May 13, 2021, 9 pages.
Notice of Allowance received for U.S. Appl. No. 16/369,355, mailed on Sep. 1, 2021, 10 pages.
Notice of Allowance received for U.S. Appl. No. 16/386,707, mailed on Dec. 31, 2020, 18 pages.
Notice of Allowance received for U.S. Appl. No. 16/422,736, mailed on Apr. 20, 2021, 12 pages.
Notice of Allowance received for U.S. Appl. No. 16/422,736, mailed on Jun. 15, 2021, 13 pages.
Notice of Allowance received for U.S. Appl. No. 16/434,865, mailed on Apr. 7, 2020, 5 pages.
Notice of Allowance received for U.S. Appl. No. 16/456,839, mailed on Apr. 15, 2021, 8 pages.
Notice of Allowance received for U.S. Appl. No. 16/456,839, mailed on Dec. 11, 2020, 10 pages.
Notice of Allowance received for U.S. Appl. No. 16/542,084, mailed on May 20, 2020, 7 pages.
Notice of Allowance received for U.S. Appl. No. 16/553,622, mailed on Sep. 11, 2020, 8 pages.
Notice of Allowance received for U.S. Appl. No. 16/667,271, mailed on May 12, 2020, 11 pages.
Notice of Allowance received for U.S. Appl. No. 16/670,949, mailed on May 27, 2021, 7 pages.
Notice of Allowance received for U.S. Appl. No. 16/670,949, mailed on Sep. 14, 2021, 7 pages.
Notice of Allowance received for U.S. Appl. No. 16/843,638, mailed on Feb. 4, 2022, 7 pages.
Notice of Allowance received for U.S. Appl. No. 16/843,638, mailed on Oct. 29, 2021, 28 pages.
Notice of Allowance received for U.S. Appl. No. 16/987,003, mailed on Aug. 18, 2021, 9 pages.
Notice of Allowance received for U.S. Appl. No. 16/990,974, mailed on Apr. 28, 2021, 5 pages.
Notice of Allowance received for U.S. Appl. No. 16/990,974, mailed on Jan. 22, 2021, 7 pages.
Notice of Allowance received for U.S. Appl. No. 17/015,429, mailed on Dec. 13, 2021, 2 pages.
Notice of Allowance received for U.S. Appl. No. 17/015,429, mailed on Dec. 24, 2021, 2 pages.
Notice of Allowance received for U.S. Appl. No. 17/015,429, mailed on Feb. 16, 2022, 5 pages.
Notice of Allowance received for U.S. Appl. No. 17/015,429, mailed on Jun. 17, 2021, 10 pages.
Notice of Allowance received for U.S. Appl. No. 17/015,429, mailed on Mar. 4, 2022, 2 pages.
Notice of Allowance received for U.S. Appl. No. 17/015,429, mailed on Nov. 24, 2021, 2 pages.
Notice of Allowance received for U.S. Appl. No. 17/015,429, mailed on Oct. 8, 2021, 5 pages.
Notice of Allowance received for U.S. Appl. No. 17/015,429, mailed on Oct. 22, 2021, 2 pages.
Notice of Allowance received for U.S. Appl. No. 17/015,429, mailed on Sep. 22, 2021, 6 pages.
Notice of Allowance received for U.S. Appl. No. 14/311,214, mailed on Jan. 21, 2016, 7 pages.
Notice of Allowance received for U.S. Appl. No. 14/142,661, mailed on Dec. 3, 2015, 2 pages.
Notice of Allowance received for U.S. Appl. No. 14/479,088, mailed on Dec. 23, 2015, 5 pages.
Notice of Allowance received for U.S. Appl. No. 14/479,088, mailed on Jan. 11, 2016, 2 pages.
Notice of Allowance received for U.S. Appl. No. 14/873,023, mailed on Dec. 23, 2015, 10 pages.
Notice of Allowance received for U.S. Appl. No. 14/873,023, mailed on Jan. 14, 2016, 2 pages.
Notice of Preliminary Rejection received for Korean Patent Application No. 10-2014-7025441, mailed on Jun. 12, 2015, 9 pages (4 pages of English Translation and 5 pages of Official Copy).
Notice of Preliminary Rejection received for Korean Patent Application No. 10-2015-7004548, mailed on Jun. 12, 2015, 8 pages (4 pages of English Translation and 4 pages of Official Copy).
Notice of Preliminary Rejection received from Korean Patent Application No. 10-2015-7010262, mailed on Jun. 12, 2015, 5 pages (2 pages of English Translation and 3 pages of Official Copy).
Office Action received for European Patent Application No. 15168475.0, mailed on Oct. 5, 2018, 4 pages.
Office Action received for European Patent Application No. 15728352.4, mailed on Jan. 25, 2018, 10 pages.
Office Action received for Japanese Patent Application No. 2016-224507, mailed on Dec. 1, 2017, 14 pages (7 pages of English Translation and 7 pages of Official Copy).
Office Action received for Australian Patent Application No. 2008305338, mailed on Mar. 21, 2011, 3 pages.
Office Action received for Australian Patent Application No. 2008305338, mailed on Oct. 19, 2010, 3 pages.
Office Action received for Australian Patent Application No. 2012200716, issued on Jul. 16, 2014, 4 pages.
Office Action received for Australian Patent Application No. 2012200716, mailed on Nov. 15, 2013, 3 pages.
Office Action received for Australian Patent Application No. 2014204462, issued on May 8, 2015, 4 pages.
Office Action received for Australian Patent Application No. 2014204462, mailed on Apr. 29, 2016, 3 pages.
Office Action received for Australian Patent Application No. 2014334869, mailed on Jan. 11, 2017, 4 pages.
Office Action received for Australian Patent Application No. 2015100708, issued on Sep. 8, 2015, 4 pages.
Office Action received for Australian Patent Application No. 2015100709, issued on Sep. 9, 2015 (Examination Report 1), 4 pages.
Office Action received for Australian Patent Application No. 2015100709, issued on Sep. 9, 2015 (Examination Report 2), 4 pages.
Office Action received for Australian Patent Application No. 2015266650, mailed on Apr. 10, 2017, 4 pages.
Office Action received for Australian Patent Application No. 2015266693, mailed on Apr. 10, 2017, 4 pages.
Office Action received for Australian Patent Application No. 2015302298, mailed on Apr. 4, 2018, 3 pages.
Office Action received for Australian Patent Application No. 2015302298, mailed on Jul. 20, 2018, 3 pages.
Office Action received for Australian Patent Application No. 2015302298, mailed on Sep. 14, 2017, 3 pages.
Office Action received for Australian Patent Application No. 2015302298, mailed on Sep. 4, 2018, 5 pages.
Office Action received for Australian Patent Application No. 2016100367, issued on May 25, 2016, 3 pages.
Office Action received for Australian Patent Application No. 2016100367, mailed on Oct. 26, 2016, 3 pages.
Office Action received for Australian Patent Application No. 2016100383, issued on Jun. 9, 2016, 2 pages.
Office Action received for Australian Patent Application No. 2016100383, issued on Nov. 11, 2016, 3 pages.
Office Action received for Australian Patent Application No. 2016201310, mailed on Feb. 28, 2017, 3 pages.
Office Action received for Australian Patent Application No. 2016203896, mailed on Jan. 19, 2018, 4 pages.
Office Action received for Australian Patent Application No. 2016203896, mailed on Mar. 6, 2017, 3 pages.
Office Action received for Australian Patent Application No. 2016203898, mailed on Dec. 19, 2017, 4 pages.
Office Action received for Australian Patent Application No. 2016203898, mailed on Feb. 17, 2017, 3 pages.
Office Action received for Australian Patent Application No. 2017100070, mailed on Mar. 16, 2017, 6 pages.
Office Action received for Australian Patent Application No. 2017100553, mailed on Aug. 4, 2017, 5 pages.
Office Action received for Australian Patent Application No. 2017201064, mailed on Mar. 9, 2017, 2 pages.
Office Action received for Australian Patent Application No. 2017201068, mailed on Jan. 17, 2018, 5 pages.

(56) References Cited

OTHER PUBLICATIONS

Office Action received for Australian Patent Application No. 2017201068, mailed on Mar. 10, 2017, 2 pages.
Office Action received for Australian Patent Application No. 2017266867, mailed on Dec. 6, 2018, 3 pages.
Office Action received for Australian Patent Application No. 2017330208, mailed on Jul. 25, 2019, 5 pages.
Office Action received for Australian Patent Application No. 2018202559, mailed on Apr. 8, 2019, 4 pages.
Office Action received for Australian Patent Application No. 2018202559, mailed on Jan. 16, 2019, 6 pages.
Office Action received for Australian Patent Application No. 2018202559, mailed on Jul. 19, 2019, 5 pages.
Office Action received for Australian Patent Application No. 2018202712, mailed on Mar. 22, 2019, 5 pages.
Office Action received for Australian Patent Application No. 2018202712, mailed on Nov. 15, 2019, 5 pages.
Office Action received for Australian Patent Application No. 2018202712, mailed on Nov. 20, 2018, 12 pages.
Office Action received for Australian Patent Application No. 2018202712, mailed on Sep. 2, 2019, 4 pages.
Office Action received for Australian Patent Application No. 2018203732, mailed on Feb. 26, 2019, 5 pages.
Office Action received for Australian Patent Application No. 2018203732, mailed on Jun. 6, 2019, 4 pages.
Office Action received for Australian Patent Application No. 2018203732, mailed on Jun. 21, 2018, 3 pages.
Office Action received for Australian Patent Application No. 2018203732, mailed on Nov. 30, 2018, 3 pages.
Office Action received for Australian Patent Application No. 2018229544, mailed on Nov. 15, 2019, 4 pages.
Office Action received for Australian Patent Application No. 2018270420, mailed on Apr. 19, 2021, 4 pages.
Office Action received for Australian Patent Application No. 2018270420, mailed on Jan. 7, 2021, 5 pages.
Office Action received for Australian Patent Application No. 2018270420, mailed on Jul. 21, 2020, 5 pages.
Office Action received for Australian Patent Application No. 2018279788, mailed on Feb. 8, 2019, 4 pages.
Office Action received for Australian Patent Application No. 2018312629, mailed on Feb. 25, 2019, 4 pages.
Office Action received for Australian Patent Application No. 2019201101, mailed on Feb. 28, 2019, 3 pages.
Office Action received for Australian Patent Application No. 2019203473, mailed on Oct. 25, 2019, 2 pages.
Office Action received for Australian Patent Application No. 2019204387, mailed on Jun. 17, 2020, 7 pages.
Office Action received for Australian Patent Application No. 2019268070, mailed on Jan. 27, 2022, 3 pages.
Office Action received for Australian Patent Application No. 2019268070, mailed on Jan. 29, 2021, 6 pages.
Office Action received for Australian Patent Application No. 2019268070, mailed on Sep. 21, 2021, 4 pages.
Office Action received for Australian Patent Application No. 2019281965, mailed on Nov. 30, 2021, 3 pages.
Office Action received for Australian Patent Application No. 2020200685, mailed on Apr. 20, 2020, 3 pages.
Office Action received for Australian Patent Application No. 2020200685, mailed on Aug. 12, 2020, 3 pages.
Office Action received for Australian Patent Application No. 2020200685, mailed on Feb. 10, 2020, 4 pages.
Office Action received for Australian Patent Application No. 2020201721, mailed on Feb. 26, 2021, 7 pages.
Office Action received for Australian Patent Application No. 2020203899, mailed on May 5, 2021, 10 pages.
Office Action received for Australian Patent Application No. 2020203899, mailed on Nov. 26, 2021, 4 pages.
Office Action received for Australian Patent Application No. 2020204256, mailed on Jun. 21, 2021, 2 pages.
Office Action received for Australian Patent Application No. 2020207785, mailed on Dec. 14, 2021, 5 pages.
Office Action received for Australian Patent Application No. 2020207785, mailed on Jul. 13, 2021, 3 pages.
Office Action received for Australian Patent Application No. 2020239783, mailed on Oct. 13, 2020, 4 pages.
Office Action received for Australian Patent Application No. 2020289822, mailed on Aug. 24, 2021, 7 pages.
Office Action received for Australian Patent Application No. 2021200415, mailed on Jan. 18, 2022, 3 pages.
Office Action received for Chinese Patent Application No. 200880108306.1, mailed on Aug. 24, 2011, 10 pages (English Translation only).
Office Action received for Chinese Patent Application No. 200880108306.1, mailed on Mar. 20, 2012, 8 pages (English Translation only).
Office Action received for Chinese Patent Application No. 200880108306.1, mailed on Mar. 27, 2014, 6 pages (3 pages of English Translation and 3 pages of Office Action).
Office Action received for Chinese Patent Application No. 201410407626.4, mailed on May 21, 2018, 13 pages (4 Page of English Translation and 9 pages of Official Copy).
Office Action received for Chinese Patent Application No. 201410407626.4, mailed on Oct. 31, 2016, 10 pages (4 pages of English Translation and 6 pages of Official Copy).
Office Action received for Chinese Patent Application No. 201410407626.4, mailed on Sep. 11, 2017, 11 pages (3 pages of English Translation and 8 pages of Official Copy).
Office Action received for Chinese Patent Application No. 201480058054.1, mailed on Jan. 22, 2019, 6 pages (2 pages of English Translation and 4 pages of Official Copy).
Office Action received for Chinese Patent Application No. 201480058054.1, mailed on May 3, 2018, 18 pages (4 pages of English Translation and 14 pages of Official Copy).
Office Action received for Chinese Patent Application No. 201510284715.9, mailed on Apr. 14, 2020, 19 pages (7 pages of English Translation and 12 pages of Official Copy).
Office Action received for Chinese Patent Application No. 201510284715.9, mailed on Dec. 18, 2019, 24 pages (7 pages of English Translation and 17 pages of Official Copy).
Office Action received for Chinese Patent Application No. 201510284715.9, mailed on Dec. 21, 2018, 22 pages (5 pages of English Translation and 17 pages of Official Copy).
Office Action received for Chinese Patent Application No. 201510284715.9, mailed on Jun. 19, 2019, 26 pages (8 pages of English Translation and 18 pages of Official Copy).
Office Action received for Chinese Patent Application No. 201510284896.5, mailed on Jun. 28, 2018, 15 pages (4 pages of English Translation and 11 pages of Official Copy).
Office Action received for Chinese Patent Application No. 201510284896.5, mailed on Mar. 6, 2019, 13 pages (4 pages of English Translation and 9 pages of Official Copy).
Office Action received for Chinese Patent Application No. 201510284896.5, mailed on Sep. 3, 2019, 9 pages (2 pages of English Translation and 7 pages of Official Copy).
Office Action received for Chinese Patent Application No. 201580043701.6, mailed on Dec. 24, 2018, 20 pages (5 pages of English Translation and 15 pages of Official copy).
Office Action received for Chinese Patent Application No. 201580043701.6, mailed on May 8, 2021, 10 pages (1 page of English Translation and 9 pages of Official Copy).
Office Action received for Chinese Patent Application No. 201580043701.6, mailed on Nov. 4, 2019, 20 pages (6 pages of English Translation and 14 pages of Official Copy).
Office Action received for Chinese Patent Application No. 201580043701.6, mailed on Oct. 12, 2020, 22 pages (5 pages of English Translation and 17 pages of Official Copy).
Office Action received for Chinese Patent Application No. 201580043701.6, mailed on Sep. 10, 2021, 10 pages (5 pages of English Translation and 5 pages of Official Copy).
Office Action received for Chinese Patent Application No. 201610459968.X, mailed on Aug. 23, 2018, 14 pages (6 pages of English Translation and 8 pages of Official Copy).

(56) References Cited

OTHER PUBLICATIONS

Office Action received for Chinese Patent Application No. 201610459968.X, mailed on Aug. 23, 2019, 12 pages (5 pages of English Translation and 7 pages of Official Copy).
Office Action received for Chinese Patent Application No. 201610459968.X, mailed on Feb. 18, 2020, 8 pages (3 pages of English Translation and 5 pages of Official Copy).
Office Action received for Chinese Patent Application No. 201610459968.X, mailed on Feb. 22, 2019, 11 pages (5 Pages of English Translation and 6 pages of Official Copy).
Office Action received for Chinese Patent Application No. 201620480708.6, mailed on Jan. 9, 2017, 3 pages (1 page of English Translation and 2 pages of Official Copy).
Office Action received for Chinese Patent Application No. 201620480708.6, mailed on Sep. 14, 2016, 3 pages (1 page of English Translation and 2 pages of Official Copy).
Office Action received for Chinese Patent Application No. 201620480846.4, mailed on Jan. 9, 2017, 3 pages (1 page of English Translation and 2 pages of Official Copy).
Office Action received for Chinese Patent Application No. 201620480846.4, mailed on Sep. 14, 2016, 3 pages (1 page of English Translation and 2 pages of Official Copy).
Office Action received for Chinese Patent Application No. 201710093861.2, mailed on Mar. 5, 2019, 6 pages (3 pages of English Translation and 3 pages of Official Copy).
Office Action received for Chinese Patent Application No. 201710093861.2, mailed on Sep. 14, 2018, 15 pages (6 pages of English Translation and 9 pages of Official copy).
Office Action received for Chinese Patent Application No. 201710094150.7, mailed on Dec. 19, 2018, 12 Pages (5 pages of English Translation and 7 pages of Official Copy).
Office Action received for Chinese Patent Application No. 201710094150.7, mailed on Jan. 10, 2022, 6 pages (3 pages of English Translation and 3 pages of Official Copy).
Office Action received for Chinese Patent Application No. 201710094150.7, mailed on Jul. 31, 2019, 6 pages (2 pages of English Translation and 4 pages of Official Copy).
Office Action received for Chinese Patent Application No. 201710198190.6, mailed on Jan. 24, 2022, 16 pages (6 pages of English Translation and 10 pages of Official Copy).
Office Action received for Chinese Patent Application No. 201710198190.6, mailed on May 8, 2021, 22 pages (8 pages of English Translation and 14 pages of Official Copy).
Office Action received for Chinese Patent Application No. 201710198190.6, mailed on Oct. 12, 2020, 18 pages (6 pages of English Translation and 12 pages of Official Copy).
Office Action received for Chinese Patent Application No. 201710198190.6, mailed on Sep. 25, 2019, 27 pages (12 pages of English Translation and 15 pages of Official Copy).
Office Action received for Chinese Patent Application No. 201711292804.3, mailed on Aug. 5, 2020, 26 pages (16 pages of English Translation and 10 pages of Official Copy).
Office Action received for Chinese Patent Application No. 201711292804.3, mailed on Feb. 23, 2021, 17 pages (8 pages of English Translation and 9 pages of Official Copy).
Office Action received for Chinese Patent Application No. 201711292804.3, mailed on Sep. 10, 2021, 19 pages (8 pages of English Translation and 11 pages of Official Copy).
Office Action received for Chinese Patent Application No. 201780002398.4, mailed on Feb. 27, 2019, 6 pages (3 pages of English Translation and 3 pages of Official Copy).
Office Action received for Chinese Patent Application No. 201780002398.4, mailed on Sep. 12, 2018, 17 pages (5 pages of English Translation and 12 pages of Official Copy).
Office Action received for Chinese Patent Application No. 201780053143.0, mailed on Dec. 16, 2021, 19 pages (10 pages of English Translation and 9 pages of Official Copy).
Office Action received for Chinese Patent Application No. 201780053143.0, mailed on Dec. 24, 2020, 21 pages (11 pages of English Translation and 10 pages of Official Copy).
Office Action received for Chinese Patent Application No. 201780053143.0, mailed on May 22, 2020, 21 pages (11 pages of English Translation and 10 pages of Official Copy).
Office Action received for Chinese Patent Application No. 201780053143.0, mailed on Sep. 3, 2021, 24 pages (15 pages of English Translation and 9 pages of Official Copy).
Office Action received for Chinese Patent Application No. 201810094316.X, mailed on Apr. 28, 2019, 9 pages (3 pages of English Translation and 6 pages of Official Copy).
Office Action received for Chinese Patent Application No. 201810094316.X, mailed on Aug. 5, 2019, 9 pages (3 pages of English Translation and 6 pages of Official Copy).
Office Action received for Chinese Patent Application No. 201810094316.X, mailed on Oct. 29, 2018, 12 pages (5 pages of English Translation and 7 pages of Official Copy).
Office Action received for Chinese Patent Application No. 201810338038.8, mailed on Jan. 21, 2020, 26 pages (13 pages of English Translation and 13 pages of Official Copy).
Office Action received for Chinese Patent Application No. 201810338038.8, mailed on May 14, 2019, 26 pages (13 pages of English Translation and 13 pages of Official Copy).
Office Action received for Chinese Patent Application No. 201810338040.5, mailed on Jun. 3, 2021, 25 pages (15 pages of English Translation and 10 pages of Official Copy).
Office Action received for Chinese Patent Application No. 201810338040.5, mailed on Oct. 25, 2021, 22 pages (13 pages of English Translation and 9 pages of Official Copy).
Office Action received for Chinese Patent Application No. 201810338826.7, mailed on Apr. 3, 2019, 21 pages (13 pages of English Translation and 8 pages of Official Copy).
Office Action received for Chinese Patent Application No. 201810338826.7, mailed on Jan. 16, 2020, 16 Pages (10 pages of English Translation and 6 pages of Official Copy).
Office Action received for Chinese Patent Application No. 201810338826.7, mailed on Oct. 21, 2019, 19 pages (12 pages of English Translation and 7 pages of Official Copy).
Office Action received for Chinese Patent Application No. 201810339290.0, mailed on Jun. 4, 2021, 20 pages (11 pages of English Translation and 9 pages of Official Copy).
Office Action received for Chinese Patent Application No. 201810339290.0, mailed on Oct. 18, 2021, 20 pages (11 pages of English Translation and 9 pages of Official Copy).
Office Action received for Chinese Patent Application No. 201810954931.3, mailed on Jan. 15, 2021, 11 pages (5 pages of English Translation and 6 pages of Official Copy).
Office Action received for Chinese Patent Application No. 201810955077.2, mailed on Feb. 20, 2021, 19 pages (8 pages of English Translation and 11 pages of Official Copy).
Office Action received for Chinese Patent Application No. 201811460172.1, mailed on Jan. 21, 2020, 17 pages (8 pages of English Translation and 9 pages of Official Copy).
Office Action received for Chinese Patent Application No. 201811460172.1, mailed on Oct. 14, 2020, 7 pages (4 pages of English Translation and 3 pages of Official Copy).
Office Action received for Chinese Patent Application No. 201880000798.6, mailed on Aug. 5, 2020, 18 pages (9 pages of English Translation and 9 pages of Official Copy).
Office Action received for Chinese Patent Application No. 201880000798.6, mailed on Dec. 30, 2021, 10 pages (5 pages of English Translation and 5 pages of Official Copy).
Office Action received for Chinese Patent Application No. 201880000798.6, mailed on Jul. 2, 2021, 15 pages (8 pages of English Translation and 7 pages of Official Copy).
Office Action received for Chinese Patent Application No. 201910070375.8, mailed on Dec. 4, 2019, 23 pages (12 pages of English Translation and 11 pages of Official Copy).
Office Action received for Chinese Patent Application No. 201910070375.8, mailed on Sep. 3, 2020, 8 pages (4 pages of English Translation and 4 pages of Official Copy).
Office Action received for Chinese Patent Application No. 201910109868.8, mailed on Jun. 30, 2020, 15 pages (7 pages of English Translation and 8 pages of Official Copy).

(56) References Cited

OTHER PUBLICATIONS

Office Action received for Chinese Patent Application No. 201910109868.8, mailed on Mar. 16, 2020, 19 pages (10 pages of English Translation and 9 pages of Official Copy).
Office Action received for Chinese Patent Application No. 201910109868.8, mailed on Sep. 19, 2019, 23 pages (11 pages of English Translation and 12 pages of Official Copy).
Office Action received for Chinese Patent Application No. 201910246439.5, mailed on Apr. 23, 2020, 14 pages (7 pages of English Translation and 7 pages of Official Copy).
Office Action received for Chinese Patent Application No. 201910246439.5, mailed on Oct. 15, 2019, 17 pages (9 pages of English Translation and 8 pages of Official Copy).
Office Action received for Chinese Patent Application No. 201910246439.5, mailed on Sep. 2, 2020, 15 pages (8 pages of English Translation and 7 pages of Official Copy).
Office Action received for Chinese Patent Application No. 201910278273.5, mailed on Jan. 3, 2020, 17 pages (10 pages of English Translation and 7 pages of Official Copy).
Office Action received for Chinese Patent Application No. 201910278273.5, mailed on Jun. 9, 2020, 8 pages (5 pages of English Translation and 3 pages of Official Copy).
Office Action received for Chinese Patent Application No. 201910744886.3, mailed on Jan. 18, 2021, 10 pages (4 pages of English Translation and 6 pages of Official Copy).
Office Action received for Chinese Patent Application No. 201910899698.8, mailed on Mar. 23, 2020, 15 pages (9 pages of English Translation and 6 pages of Official Copy).
Office Action received for Chinese Patent Application No. 201910899698.8, mailed on May 27, 2020, 10 pages (6 pages of English Translation and 4 pages of Official Copy).
Office Action received for Chinese Patent Application No. 201911199010.1, mailed on Mar. 29, 2021, 14 pages (8 pages of English Translation and 6 pages of Official Copy).
Office Action received for Chinese Patent Application No. 201911199010.1, mailed on Nov. 4, 2020, 20 pages (10 pages of English Translation and 10 pages of Official Copy).
Office Action received for Chinese Patent Application No. 201911199010.1, mailed on Sep. 3, 2021, 12 pages (7 pages of English Translation and 5 pages of Official Copy).
Office Action received for Chinese Patent Application No. 201980009669.8, mailed on Dec. 3, 2021, 26 pages (12 pages of English Translation and 14 pages of Official Copy).
Office Action received for Chinese Patent Application No. 201980041865.3, mailed on May 24, 2021, 14 pages (8 pages of English Translation and 6 pages of Official Copy).
Office Action received for Chinese Patent Application No. 201410407626.4, mailed on Feb. 12, 2019, 13 pages (3 pages of English Translation and 10 pages of Official Copy).
Office Action received for Danish Patent Application No. PA201670628, mailed on Jun. 6, 2017, 3 pages.
Office Action received for Danish Patent Application No. PA201670628, mailed on Oct. 26, 2016, 7 pages.
Office Action received for Danish Patent Application No. PA201770418, mailed on May 8, 2018, 3 pages.
Office Action received for Danish Patent Application No. PA201770419, mailed on Jan. 10, 2018, 4 pages.
Office Action received for Danish Patent Application No. PA201770712, mailed on Jul. 20, 2018, 4 pages.
Office Action received for Danish Patent Application No. PA201770712, mailed on Mar. 1, 2019, 3 pages.
Office Action received for Danish Patent Application No. PA201770713, mailed on Apr. 18, 2018, 4 pages.
Office Action received for Danish Patent Application No. PA201770713, mailed on Jun. 7, 2019, 4 pages.
Office Action received for Danish Patent Application No. PA201770713, mailed on Nov. 13, 2018, 3 pages.
Office Action received for Danish Patent Application No. PA201770714, mailed on Aug. 17, 2018, 6 pages.
Office Action received for Danish Patent Application No. PA201770714, mailed on Feb. 21, 2018, 3 pages.
Office Action received for Danish Patent Application No. PA201770714, mailed on Oct. 13, 2017, 9 pages.
Office Action received for Danish Patent Application No. PA201770715, mailed on Mar. 8, 2018, 4 pages.
Office Action received for Danish Patent Application No. PA201770715, mailed on Oct. 29, 2018, 4 pages.
Office Action received for Danish Patent Application No. PA201770782, mailed on Jan. 26, 2018, 8 pages.
Office Action received for Danish Patent Application No. PA201770782, mailed on Nov. 22, 2018, 3 pages.
Office Action received for Danish Patent Application No. PA201870370, mailed on Nov. 9, 2018, 4 pages.
Office Action received for Danish Patent Application No. PA201870371, mailed on Nov. 20, 2018, 3 pages.
Office Action received for Danish Patent Application No. PA201870855, mailed on May 14, 2020, 4 pages.
Office Action received for Danish Patent Application No. PA201870855, mailed on Nov. 7, 2019, 4 pages.
Office Action received for Danish Patent Application No. PA201970127, mailed on Dec. 20, 2019, 3 pages.
Office Action received for Danish Patent Application No. PA201970127, mailed on Feb. 24, 2020, 2 pages.
Office Action received for European Patent Application No. 08834386.8, mailed on Aug. 23, 2010, 4 pages.
Office Action received for European Patent Application No. 12181538.5, mailed on Dec. 16, 2013, 4 pages.
Office Action received for European Patent Application No. 12770400.5, mailed on Mar. 10, 2015, 5 pages.
Office Action received for European Patent Application No. 12773460.6, mailed on Feb. 19, 2018, 6 pages.
Office Action received for European Patent Application No. 13171145.9, mailed on Apr. 28, 2016, 5 pages.
Office Action received for European Patent Application No. 13171145.9, mailed on May 3, 2018, 4 pages.
Office Action received for European Patent Application No. 15168475.0, mailed on Dec. 19, 2016, 5 pages.
Office Action received for European Patent Application No. 15168475.0, mailed on May 6, 2020, 5 pages.
Office Action received for European Patent Application No. 15719347.5, mailed on Apr. 9, 2020, 4 pages.
Office Action received for European Patent Application No. 15719347.5, mailed on Jun. 17, 2019, 4 pages.
Office Action received for European Patent Application No. 15727291.5, mailed on Jan. 15, 2018, 8 pages.
Office Action received for European Patent Application No. 16201159.7, mailed on Jun. 12, 2019, 10 pages.
Office Action Received for European Patent Application No. 16201195.1, mailed on Feb. 14, 2018, 12 pages.
Office Action received for European Patent Application No. 16201205.8, mailed on Feb. 16, 2018, 12 pages.
Office Action received for European Patent Application No. 17799904.2, mailed on Oct. 21, 2020, 6 pages.
Office Action received for European Patent Application No. 17853654.6, mailed on Mar. 23, 2020, 4 pages.
Office Action received for European Patent Application No. 18208881.5, mailed on Jun. 11, 2019, 5 pages.
Office Action received for European Patent Application No. 18208881.5, mailed on May 7, 2021, 6 pages.
Office Action received for European Patent Application No. 18704335.1, mailed on Sep. 23, 2019, 7 pages.
Office Action received for European Patent Application No. 18713408.5, mailed on May 20, 2019, 5 pages.
Office Action received for European Patent Application No. 18713408.5, mailed on May 26, 2020, 5 pages.
Office Action received for European Patent Application No. 18713408.5, mailed on Nov. 4, 2020, 6 pages.
Office Action received for European Patent Application No. 18713408.5, mailed on Nov. 20, 2019, 4 pages.
Office Action received for European Patent Application No. 18830326.7, mailed on Apr. 30, 2020, 5 pages.

(56) References Cited

OTHER PUBLICATIONS

Office Action received for European Patent Application No. 18830326.7, mailed on Aug. 13, 2020, 6 pages.
Office Action received for European Patent Application No. 18830326.7, mailed on Aug. 27, 2019, 6 pages.
Office Action received for European Patent Application No. 18830326.7, mailed on Nov. 22, 2019, 8 pages.
Office Action received for European Patent Application No. 18830326.7, mailed on Sep. 16, 2019, 6 pages.
Office Action received for European Patent Application No. 19150528.8, mailed on Jul. 1, 2020, 6 pages.
Office Action received for European Patent Application No. 19160344.8, mailed on Mar. 26, 2021, 7 pages.
Office Action received for European Patent Application No. 19160344.8, mailed on Oct. 7, 2021, 8 pages.
Office Action received for European Patent Application No. 19160348.9, mailed on May 14, 2020, 4 pages.
Office Action received for European Patent Application No. 19160348.9, mailed on Nov. 17, 2020, 6 pages.
Office Action received for European Patent Application No. 19186538.5, mailed on Oct. 12, 2020, 7 pages.
Office Action received for European Patent Application No. 19186538.5, mailed on Oct. 22, 2021, 7 pages.
Office Action received for European Patent Application No. 19194828.0, mailed on May 10, 2021, 6 pages.
Office Action received for European Patent Application No. 19194828.0, mailed on Oct. 15, 2020, 7 pages.
Office Action received for European Patent Application No. 19716254.8, mailed on Aug. 9, 2021, 8 pages.
Office Action received for European Patent Application No. 19769336.9, mailed on Nov. 4, 2021, 6 pages.
Office Action received for European Patent Application No. 20186286.9, mailed on Jan. 25, 2022, 8 pages.
Office Action received for European Patent Application No. 20186286.9, mailed on Jul. 29, 2021, 8 pages.
Office Action received for European Patent Application No. 20198076.0, mailed on Sep. 22, 2021, 6 pages.
Office Action received for German Patent Application No. 202015004267.8, mailed on Nov. 4, 2015, 4 pages (3 pages of English Translation and 1 page of Official Copy).
Office Action received for Indian Patent Application No. 201617006865, mailed on Dec. 11, 2019, 7 pages.
Office Action received for Indian Patent Application No. 201617039493, mailed on Oct. 21, 2019, 6 pages.
Office Action received for Indian Patent Application No. 201618024020, mailed on Sep. 14, 2020, 7 pages.
Office Action received for Indian Patent Application No. 201817036875, mailed on Oct. 29, 2021, 8 pages.
Office Action received for Indian Patent Application No. 201917024374, mailed on Dec. 30, 2021, 10 pages.
Office Action received for Indian Patent Application No. 201918003782, mailed on Nov. 18, 2021, 8 pages.
Office Action received for Indian Patent Application No. 201918027146, mailed on Jan. 4, 2022, 7 pages.
Office Action received for Indian Patent Application No. 202018009834, mailed on Nov. 12, 2021, 6 pages.
Office Action received for Indian Patent Application No. 202018014786, mailed on Nov. 9, 2021, 7 pages.
Office Action received for Indian Patent Application No. 202018038351, mailed on Feb. 25, 2022, 6 pages.
Office Action received for Indian Patent Application No. 202018041558, mailed on Dec. 3, 2021, 7 pages.
Office Action received for Indian Patent Application No. 202018044420, mailed on Jan. 31, 2022, 6 pages.
Office Action received for Indian Patent Application No. 202118009403, mailed on Feb. 21, 2022, 6 pages.
Office Action received for Indian Patent Application No. 202118018461, mailed on Feb. 23, 2022, 6 pages.
Office Action received for Japanese Patent Application No. 2010-525891, mailed on Jun. 12, 2012, 11 pages (5 pages of English Translation and 6 pages of Official Copy).
Office Action received for Japanese Patent Application No. 2013-098406, mailed on Dec. 9, 2013, 12 pages (6 pages of English Translation and 6 pages of Official Copy).
Office Action received for Japanese Patent Application No. 2013-098406, mailed on Dec. 15, 2014, 12 pages (7 pages of English Translation and 5 pages of Official Copy).
Office Action received for Japanese Patent Application No. 2013-098406, mailed on Jul. 19, 2016, 10 pages (5 pages of English Translation and 5 pages of Official Copy).
Office Action received for Japanese Patent Application No. 2015-083696, mailed on Jun. 17, 2016, 12 pages (7 pages of English Translation and 5 pages of Official Copy).
Office Action received for Japanese Patent Application No. 2016-131998, mailed on Aug. 10, 2018, 9 pages (5 pages of English Translation and 4 pages of Official copy).
Office Action received for Japanese Patent Application No. 2016-131998, mailed on Sep. 25, 2017, 10 pages (5 pages of English Translation and 5 pages of Official Copy).
Office Action received for Japanese Patent Application No. 2016-224506, mailed on May 14, 2019, 22 pages (11 pages of English Translation and 11 pages of Official Copy).
Office Action received for Japanese Patent Application No. 2016-224507, mailed on Jun. 16, 2017, 16 pages (8 pages of English Translation and 8 pages of Official Copy).
Office Action received for Japanese Patent Application No. 2016-540927, mailed on Jun. 20, 2017, 12 pages (7 pages of English Translation and 5 pages of Official Copy).
Office Action received for Japanese Patent Application No. 2016-558332, mailed on Dec. 8, 2017, 12 pages (6 pages of English Translation and 6 pages of Official copy).
Office Action received for Japanese Patent Application No. 2016-558332, mailed on Jul. 27, 2018, 9 pages (4 pages of English Translation and 5 pages of Official Copy).
Office Action received for Japanese Patent Application No. 2016-569665, mailed on Aug. 20, 2018, 9 pages (4 pages of English Translation and 5 pages of Official Copy).
Office Action received for Japanese Patent Application No. 2016-569665, mailed on Jan. 19, 2018, 10 pages (5 pages of English Translation and 5 pages of Official Copy).
Office Action received for Japanese Patent Application No. 2017-075031, mailed on Jul. 30, 2018, 16 pages (8 pages of English Translation and 8 pages of Official Copy).
Office Action received for Japanese Patent Application No. 2017-085582, mailed on Jul. 2, 2018, 11 pages (6 pages of English Translation and 5 pages of Official Copy).
Office Action received for Japanese Patent Application No. 2017-507413, mailed on Feb. 22, 2019, 11 pages (5 pages of English Translation and 6 pages of Official Copy).
Office Action received for Japanese Patent Application No. 2017-507413, mailed on May 25, 2018, 14 pages (7 pages of English Translation and 7 pages of Official Copy).
Office Action received for Japanese Patent Application No. 2018-113081, mailed on Apr. 9, 2019, 6 pages (3 pages of English Translation and 3 pages of Official Copy).
Office Action received for Japanese Patent Application No. 2018-113081, mailed on Jan. 10, 2020, 8 pages (4 pages of English Translation and 4 pages of Official Copy).
Office Action received for Japanese Patent Application No. 2018-113081, mailed on Oct. 2, 2020, 7 pages (4 pages of English Translation and 3 pages of Official Copy).
Office Action received for Japanese Patent Application No. 2018-551159, mailed on Jan. 27, 2020, 8 pages (4 pages of English Translation and 4 pages of Official Copy).
Office Action received for Japanese Patent Application No. 2018-551159, mailed on Sep. 30, 2019, 6 pages (3 pages of English Translation and 3 pages of Official Copy).
Office Action received for Japanese Patent Application No. 2018-560107, mailed on Jun. 14, 2019, 26 pages (13 pages of English Translation and 13 pages of Official Copy).

(56) References Cited

OTHER PUBLICATIONS

Office Action received for Japanese Patent Application No. 2019-053379, mailed on May 29, 2020, 11 pages (6 pages of English Translation and 5 pages of Official Copy).
Office Action received for Japanese Patent Application No. 2019-053379, mailed on Oct. 18, 2019, 11 pages (6 pages of English Translation and 5 pages of Official Copy).
Office Action received for Japanese Patent Application No. 2019-107235, mailed on Oct. 18, 2019, 8 pages (4 pages of English Translation and 4 pages of Official Copy).
Office Action received for Japanese Patent Application No. 2019-194603, mailed on Jan. 4, 2021, 8 pages (4 pages of English Translation and 4 pages of Official Copy).
Office Action received for Japanese Patent Application No. 2019-238894, mailed on Mar. 6, 2020, 7 pages (3 pages of English Translation and 4 pages of Official Copy).
Office Action received for Japanese Patent Application No. 2019-510416, mailed on May 15, 2020, 4 pages (2 pages of English Translation and 2 pages of Official Copy).
Office Action received for Japanese Patent Application No. 2019-510416, mailed on Oct. 18, 2019, 4 pages (2 pages of English Translation and 2 pages of Official copy).
Office Action received for Japanese Patent Application No. 2019-511975, mailed on Apr. 10, 2020, 6 pages (3 pages of English Translation and 3 pages of Official Copy).
Office Action received for Japanese Patent Application No. 2019-563560, mailed on Jun. 14, 2021, 6 pages (3 pages of English Translation and 3 pages of Official Copy).
Office Action received for Japanese Patent Application No. 2019-563560, mailed on Nov. 30, 2020, 7 pages (3 pages of English Translation and 4 pages of Official Copy).
Office Action received for Japanese Patent Application No. 2020-028315, mailed on Feb. 7, 2022, 6 pages (3 pages of English Translation and 3 pages of Official Copy).
Office Action received for Japanese Patent Application No. 2020-028315, mailed on Jul. 6, 2020, 18 pages (10 pages of English Translation and 8 pages of Official Copy).
Office Action received for Japanese Patent Application No. 2020-028315, mailed on Nov. 9, 2020, 11 pages (6 pages of English Translation and 5 pages of Official Copy).
Office Action received for Japanese Patent Application No. 2020-126751, mailed on Jan. 5, 2021, 8 pages (4 pages of English Translation and 4 pages of Official Copy).
Office Action received for Japanese Patent Application No. 2020-159979, mailed on May 10, 2021, 9 pages (5 pages of English Translation and 4 pages of Official Copy).
Office Action received for Japanese Patent Application No. 2020-184605, mailed on Feb. 14, 2022, 24 pages (11 pages of English Translation and 13 pages of Official Copy).
Office Action received for Japanese Patent Application No. 2020-566978, mailed on Feb. 4, 2022, 12 pages (6 pages of English Translation and 6 pages of Official Copy).
Office Action received for Japanese Patent Application No. 2021-001028, mailed on Jan. 31, 2022, 10 pages (5 pages of English Translation and 5 pages of Official Copy).
Office Action received for Japanese Patent Application No. 2021-015128, mailed on Jun. 14, 2021, 4 pages (2 pages of English Translation and 2 pages of Official Copy).
Office Action received for Korean Patent Application No. 10-2010-7008899, mailed on Aug. 17, 2014, 7 pages (3 pages of English Translation and 4 pages of Official copy).
Office Action received for Korean Patent Application No. 10-2010-7008899, mailed on Feb. 3, 2015, 7 pages (3 pages of English Translation and 4 pages of Official Copy).
Office Action received for Korean Patent Application No. 10-2010-7008899, mailed on Jan. 28, 2013, 5 pages (2 pages of English Translation and 3 pages of Official Copy).
Office Action received for Korean Patent Application No. 10-2010-7008899, mailed on Jun. 12, 2015, 4 pages(2 pages of English Translation and 2 pages of Official Copy).
Office Action received for Korean Patent Application No. 10-2010-7008899, mailed on Mar. 29, 2012, 6 pages (2 pages of English Translation and 4 pages of Official Copy).
Office Action received for Korean Patent Application No. 10-2010-7008899, mailed on May 30, 2011, 4 pages (2 pages of English Translation and 2 pages of Official copy).
Office Action received for Korean Patent Application No. 10-2011-7023152, mailed on Apr. 22, 2014, 6 pages (3 pages of English Translation and 3 pages of Official copy).
Office Action received for Korean Patent Application No. 10-2014-7004771, mailed on Jun. 12, 2015, 6 pages (3 pages English Translation and 3 pages of Official Copy).
Office Action received for Korean Patent Application No. 10-2014-7004771, mailed on Apr. 22, 2014, 5 pages (2 pages of English Translation and 3 pages of Official copy).
Office Action received for Korean Patent Application No. 10-2014-7004771, mailed on Oct. 21, 2014, 7 pages (3 pages of English Translation and 4 pages of Official copy).
Office Action received for Korean Patent Application No. 10-2014-7004772, mailed on Apr. 22, 2014, 8 pages (3 pages of English Translation and 5 pages of Official Copy).
Office Action received for Korean Patent Application No. 10-2014-7004772, mailed on Oct. 21, 2014, 5 pages (2 pages of English Translation and 3 pages of official copy).
Office Action received for Korean Patent Application No. 10-2014-7004773, mailed on Apr. 22, 2014, 9 pages (4 pages of English Translation and 5 pages of Office Action).
Office Action received for Korean Patent Application No. 10-2014-7004773, mailed on Jun. 12, 2015, 6 pages (3 pages English Translation and 3 pages of Official Copy).
Office Action received for Korean Patent Application No. 10-2014-7004773, mailed on Oct. 21, 2014, 9 pages (4 pages of English Translation and 5 pages of Official Copy).
Office Action received for Korean Patent Application No. 10-2014-7008348, mailed on Jan. 22, 2019, 16 pages (1 page of English Translation and 15 pages of Official Copy).
Office Action received for Korean Patent Application No. 10-2014-7025441, mailed on Oct. 21, 2014, 5 pages (2 pages of English Translation and 3 pages of official copy).
Office Action received for Korean Patent Application No. 10-2015-7010262, mailed on Mar. 8, 2017, 6 pages (3 pages of English Translation and 3 pages of Official Copy).
Office Action received for Korean Patent Application No. 10-2015-7010262, mailed on May 24, 2016, 10 pages (3 pages of English Translation and 7 pages of Official Copy).
Office Action received for Korean Patent Application No. 10-2016-0152210, mailed on Jan. 29, 2019, 7 pages (3 pages of English Translation and 4 pages of Official Copy).
Office Action received for Korean Patent Application No. 10-2016-0152210, mailed on May 14, 2018, 13 pages (6 pages of English Translation and 7 pages of Official Copy).
Office Action received for Korean Patent Application No. 10-2016-0152210, mailed on May 30, 2019, 8 pages (4 pages of English Translation and 4 pages of Official copy).
Office Action received for Korean Patent Application No. 10-2016-7009347, mailed on Feb. 18, 2018, 9 pages (4 pages of English Translation and 5 pages of Official Copy).
Office Action received for Korean Patent Application No. 10-2016-7009632, mailed on Feb. 2, 2018, 11 pages (5 pages of English Translation and 6 pages of Official Copy).
Office Action received for Korean Patent Application No. 10-2016-7035555, mailed on Dec. 26, 2017, 5 pages (2 pages of English Translation and 3 pages of Official Copy).
Office Action received for Korean Patent Application No. 10-2016-7035555, mailed on Jul. 18, 2019, 9 pages (4 pages of English Translation and 5 pages of Official Copy).
Office Action received for Korean Patent Application No. 10-2016-7035555, mailed on Sep. 18, 2018, 9 pages (4 pages of English Translation and 5 pages of Official Copy).
Office Action received for Korean Patent Application No. 10-2017-0022365, mailed on Jun. 26, 2017, 10 pages (4 pages of English Translation and 6 pages of Official Copy).

(56) References Cited

OTHER PUBLICATIONS

Office Action received for Korean Patent Application No. 10-2017-0022546, mailed on Jun. 21, 2017, 12 pages (5 pages of English Translation and 7 pages of Official copy).
Office Action received for Korean Patent Application No. 10-2017-0022582, mailed on Jul. 31, 2019, 5 pages (2 pages of English Translation and 3 pages of Official Copy).
Office Action received for Korean Patent Application No. 10-2017-0022582, mailed on Sep. 19, 2018, 6 pages (2 pages of English Translation and 4 pages of Official Copy).
Office Action received for Korean Patent Application No. 10-2017-7012145, mailed on Jul. 18, 2019, 5 pages (2 Pages of English Translation and 3 Pages of Official Copy).
Office Action received for Korean Patent Application No. 10-2017-7012145, mailed on Sep. 13, 2018, 6 pages (3 pages of English Translation and 3 pages of Official Copy).
Office Action received for Korean Patent Application No. 10-2017-7015582, mailed on Apr. 5, 2018, 8 pages (4 pages of English Translation and 4 pages of Official Copy).
Office Action received for Korean Patent Application No. 10-2017-7015582, mailed on Jun. 12, 2017, 9 pages ( 4 pages of English Translation and 5 pages of Official copy).
Office Action received for Korean Patent Application No. 10-2018-7022895, mailed on Aug. 17, 2018, 8 pages (3 pages of English Translation and 5 pages of Official Copy).
Office Action received for Korean Patent Application No. 10-2018-7028845, mailed on Jun. 19, 2019, 7 pages (3 pages of English Translation and 4 pages of Official Copy).
Office Action received for Korean Patent Application No. 10-2018-7033301, mailed on Dec. 14, 2018, 6 pages (2 pages of English Translation and 4 pages of Official Copy).
Office Action received for Korean Patent Application No. 10-2019-7003374, mailed on Jun. 10, 2019, 7 pages (2 pages of English Translation and 5 pages of official copy).
Office Action received for Korean Patent Application No. 10-2019-7003836, mailed on Jun. 14, 2019, 7 pages (2 pages of English Translation and 5 pages of Official Copy).
Office Action received for Korean Patent Application No. 10-2019-7004734, mailed on Jul. 4, 2019, 7 pages (2 pages of English Translation and 5 pages of Official Copy).
Office Action received for Korean Patent Application No. 10-2019-7005136, mailed on Jan. 28, 2020, 5 pages (2 pages of English Translation and 3 pages of Official Copy).
Office Action received for Korean Patent Application No. 10-2019-7005925, mailed on Jul. 4, 2019, 24 pages (11 pages of English Translation and 13 pages of Official Copy).
Office Action received for Korean Patent Application No. 10-2019-7014494, mailed on Jun. 14, 2019, 11 pages (5 pages of English Translation and 6 pages of Official Copy).
Office Action received for Korean Patent Application No. 10-2019-7014988, mailed on Jul. 19, 2019, 9 pages (4 pages of English Translation and 5 pages of Official Copy).
Office Action received for Korean Patent Application No. 10-2019-7033799, mailed on Apr. 27, 2021, 9 pages (4 pages of English Translation and 5 pages of Official Copy).
Office Action received for Korean Patent Application No. 10-2019-7033799, mailed on Nov. 23, 2021, 6 pages (3 pages of English Translation and 3 pages of Official Copy).
Office Action received for Korean Patent Application No. 10-2020-0097418, mailed on Aug. 28, 2020, 6 pages (2 pages of English Translation and 4 pages of Official Copy).
Office Action received for Korean Patent Application No. 10-2020-7002929, mailed on Mar. 22, 2020, 5 pages (2 pages of English Translation and 3 pages of Official Copy).
Office Action received for Korean Patent Application No. 10-2020-7011424, mailed on Jul. 7, 2020, 6 pages (2 pages of English Translation and 4 pages of Official Copy).
Office Action received for Korean Patent Application No. 10-2020-7020782, mailed on Aug. 19, 2020, 8 pages (4 pages of English Translation and 4 pages of Official Copy).
Office Action received for Korean Patent Application No. 10-2020-7020782, mailed on Mar. 29, 2021, 7 pages (3 pages of English Translation and 4 pages of Official Copy).
Office Action received for Korean Patent Application No. 10-2020-7022596, mailed on Jul. 28, 2021, 26 pages (13 pages of English Translation and 13 pages of Official Copy).
Office Action received for Korean Patent Application No. 10-2020-7027862, mailed on Jan. 29, 2021, 8 pages (3 pages of English Translation and 5 pages of Official Copy).
Office Action received for Korean Patent Application No. 10-2020-7034180, mailed on Aug. 17, 2021, 15 pages (6 pages of English Translation and 9 pages of Official Copy).
Office Action received for Korean Patent Application No. 10-2020-7034405, mailed on Dec. 4, 2021, 15 pages (7 pages of English Translation and 8 pages of Official Copy).
Office Action received for Korean Patent Application No. 10-2021-7011888, mailed on Jul. 27, 2021, 11 pages (5 pages of English Translation and 6 pages of Official Copy).
Office Action received for Korean Patent Application No. 10-2021-7015473, mailed on Aug. 25, 2021, 5 pages (2 page of English Translation and 3 pages of Official Copy).
Office Action received for Korean Patent Application No. 10-2021-7032984, mailed on Feb. 22, 2022, 8 pages (4 pages of English Translation and 4 pages of Official Copy).
Office Action received for Korean Patent Application No. 10-2016-7009347, mailed on Mar. 9, 2017, 15 pages (7 pages of English Translation and 8 pages of Official Copy).
Office Action received for Korean Patent Application No. 10-2018-7028845, mailed on Dec. 10, 2018, 8 pages (4 pages of English Translation and 4 pages of Official copy).
Office Action received for Taiwan Patent Application No. 103136545, mailed on May 25, 2016, 7 pages (3 pages of English Translation and 4 pages of Official Copy).
Office Action received for Taiwan Patent Application No. 103136545, mailed on Nov. 2, 2015, 39 pages (15 pages of English Translation and 24 pages of Official Copy).
Office Action received for Taiwan Patent Application No. 101107082, mailed on Jul. 7, 2014, 21 pages (7 pages of English Translation and 14 pages of Official Copy).
Office Action received for Taiwan Patent Application No. 103131074, mailed on Jul. 21, 2015, 16 pages (7 pages of English Translation and 9 pages of Official Copy).
Office Action received for Taiwanese Patent Application No. 104114953, issued on Feb. 18, 2017, 9 pages (4 pages of English Translation and 5 pages of Official copy).
Office Action received for Taiwanese Patent Application No. 104114953, mailed on Jun. 8, 2016, 11 pages (5 pages of English Translation and 6 pages of Official copy).
Office Action received for Taiwanese Patent Application No. 104117508, issued on Jul. 14, 2017, 9 pages (4 pages of English Translation and 5 pages of Official Copy).
Office Action received for Taiwanese Patent Application No. 104117508, issued on Jul. 20, 2016, 19 pages (8 pages of English Translation and 11 pages of Official Copy).
Office Action received for Taiwanese Patent Application No. 104117508, issued on Mar. 20, 2017, 22 pages (9 pages of English Translation and 13 pages of Official Copy).
Office Action received for Taiwanese Patent Application No. 104117508, mailed on Jan. 25, 2019, 24 pages (5 pages of English Translation and 19 pages of Official Copy).
Office Action received for Taiwanese Patent Application No. 104117508, mailed on May 22, 2019, 7 pages (3 pages of English Translation and 4 pages of Official Copy).
Office Action received for Taiwanese Patent Application No. 107138003, issued on Mar. 20, 2019, 6 pages (3 pages of English Translation and 3 pages of Official Copy).
Office Action received from Japanese Patent Application No. 2013-098406, mailed on May 8, 2015, 14 pages (9 pages of English Translation and 5 pages of Official Copy).
Okazolab, "Kinect Based 3D Head Tracking in Behavioural Research", Available online at: https://www.youtube.com/watch?v=nigRvT9beQw, Aug. 8, 2012, 3 pages.

(56) References Cited

OTHER PUBLICATIONS

Onefacein, "[How It Works] Securing Your Smartphone With OneFaceIn", Biometric Password Manager, Available at: https://www.youtube.com/watch?v=h-JG5SPxBQ0, Dec. 2, 2016, 1 page.
Page Sebastien, "Leaked iOS 11 GM details how you will set up Face ID on your iPhone 8", Online available at: https://www.idownloadblog.com/2017/09/08/leaked-ios-11-gm-details-how-you-will-set-up-face-id-on-your-iphone-8/, Sep. 8, 2017, 9 pages.
Phonebuff, "How To Use Face Unlock On Android 4.0 ICS", Retrieved from: https://www.youtube.com/watch?v=0ASf6jkpFKE, Dec. 15, 2011, 1 page.
Plaisant et al., "Touchscreen Toggle Switches: Push or slide? Design Issues and Usability Study", Technical Report CAR-TR-521, CS-TR-2557, Nov. 1990, pp. 1-10.
PSP Security Ltd, "AccuFACE features", Available online at: https://www.youtube.com/watch?v=p3jvGoEbioY, Oct. 14, 2009, 1 page.
PSP Security Ltd, "PSP Security—AccuFACE Step By Step Enrollment Process", Available online at: https://www.youtube.com/watch?v=0lIF5OOdya0, Oct. 14, 2009, 1 page.
Real Solution of two-step-authentication Password Management for Authentication Enhancement, Fukuda Takao, Nikkei PC, JPN, Nikkei Business Publications, Inc., No. 694, Mar. 24, 2014, 11 pages (3 pages of English Translation and 8 pages of Official Copy).
Record of Oral Hearing received for U.S. Appl. No. 13/243,045, mailed on Apr. 1, 2019, 18 pages.
Record of Oral Hearing received for U.S. Appl. No. 13/243,045, mailed on May 7, 2021, 18 pages.
Record of Oral Hearing received for U.S. Appl. No. 15/714,887, mailed on Feb. 15, 2022, 16 pages.
Result of Consultation received for European Patent Application No. 18713408.5, mailed on Aug. 30, 2021, 5 pages.
Result of Consultation received for European Patent Application No. 18830326.7, mailed on Jun. 21, 2021, 5 pages.
Result of Consultation received for European Patent Application No. 19160344.8, mailed on Feb. 4, 2022, 3 pages.
Riley et al., "Instruction, Feedback and Biometrics: The User Interface for Fingerprint Authentication System", Interact 2009, Part II, LNCS 5727, IFPI International Federation for Information Processing, 2009, pp. 293-305.
Schofield Tim, "Face Unlock Demonstration on the HTC EVO 4G LTE", Retrieved from: https://www.youtube.com/watch?v=TNL9Or_9SWg, May 31, 2012, 1 page.
Search Report and Opinion received for Danish Patent Application No. PA201770418, mailed on Jun. 23, 2017, 8 pages.
Search Report and Opinion received for Danish Patent Application No. PA201770419, mailed on Jun. 19, 2017, 6 pages.
Search Report and Opinion received for Danish Patent Application No. PA201770712, mailed on Oct. 25, 2017, 10 pages.
Search Report and Opinion received for Danish Patent Application No. PA201770713, mailed on Oct. 31, 2017, 9 pages.
Search Report and Opinion received for Danish Patent Application No. PA201770715, issued on Nov. 9, 2017, 10 pages.
Search Report and Opinion received for Danish Patent Application No. PA201870370, mailed on Sep. 7, 2018, 11 pages.
Search Report and Opinion received for Danish Patent Application No. PA201870371, mailed on Sep. 14, 2018, 14 pages.
Search Report and Opinion received for Danish Patent Application No. PA201870855, mailed on Apr. 3, 2019, 12 pages.
Search Report and Opinion received for Danish Patent Application No. PA201970127, mailed on Oct. 4, 2019, 9 pages.
Sensory Trulysecure, "AppLock Face/Voice Recognition", Available at: https://www.youtube.com/watch?v=odax5O51aT0, May 27, 2015, 1 page.
StateofTech, "iPhone 6 Tips—How to Access the Camera from the Lock Screen", Screen captures with generated transcript from YouTube video clip, Online Available at: https://www.youtube.com/watch?v=frB151RYB7U, Jul. 2, 2015, 23 pages.
Summons to Attend Oral Proceedings received for European Patent Application No. 08834386.8, mailed on Aug. 24, 2012, 4 pages.
Summons to Attend Oral Proceedings received for European Patent Application No. 12770400.5, mailed on Mar. 19, 2018, 10 pages.
Summons to Attend Oral Proceedings received for European Patent Application No. 15727291.5, mailed on Jan. 28, 2020, 13 pages.
Summons to Attend Oral Proceedings received for European Patent Application No. 15728352.4, mailed on May 12, 2020, 25 pages.
Summons to Attend Oral Proceedings received for European Patent Application No. 15728352.4, mailed on Nov. 18, 2019, 15 pages.
Summons to Attend Oral Proceedings received for European Patent Application No. 16201159.7, mailed on Feb. 4, 2021, 12 pages.
Summons to Attend Oral Proceedings received for European Patent Application No. 16201195.1, mailed on Sep. 4, 2018, 21 pages.
Summons to Attend Oral Proceedings received for European Patent Application No. 16201205.8, mailed on Jan. 28, 2020, 18 pages.
Summons to Attend Oral Proceedings received for European Patent Application No. 17799904.2, mailed on Dec. 20, 2021, 8 pages.
Summons to Attend Oral Proceedings received for European Patent Application No. 18713408.5, mailed on Apr. 30, 2021, 5 pages.
Summons to Attend Oral Proceedings received for European Patent Application No. 18830326.7, mailed on Feb. 25, 2021, 6 pages.
Summons to Attend Oral Proceedings received for European Patent Application No. 19194828.0, mailed on Feb. 3, 2022, 10 pages.
Summons to Attend Oral Proceedings received for European Patent Application No. 19194828.0, mailed on Feb. 10, 2022, 2 pages.
Supplemental Notice of Allowance received for U.S. Appl. No. 12/207,370, mailed on Aug. 8, 2013, 2 pages.
Supplemental Notice of Allowance received for U.S. Appl. No. 15/899,996, mailed on Jul. 25, 2018, 2 pages.
Thanakulmas Thanit, "MasterCard Identity Check Facial Recognition Biometrics", Available at: https://www.youtube.com/watch?v=g4sMbrkt1gl, Oct. 10, 2016, 1 page.
Third Party Observations received for European Patent Application No. 15168475.0, mailed on Jul. 19, 2016, 4 pages.
USA, Online available at: https://www.microsoft.com/en-us/research/wp-content/uploads/2016/02/LocationRecommendation.pdf, Nov. 6-9, 2012, 10 pages.
Videoreborn, "Motorola Atrix 4g: Wet Fingerprint Scanner Better Than iPhone 5SFinger Print Scanner!", Youtube, available at: https://www.youtube.com/watch?v=MSJIIG93MPg, Mar. 16, 2011, 2 pages.
Wang NA, "Research of Face Detection System Based on Mobile Phone Platform", Video Engineering, vol. 36, No. 11, Nov. 2012, 5 pages (Official Copy Only) See Communication under 37 CFR § 1.98(a) (3).
Applicant-Initiated Interview Summary received for U.S. Appl. No. 17/863,974, mailed on May 25, 2023, 2 pages.
Office Action received for Korean Patent Application No. 10-2022-7004578, mailed on May 11, 2023, 8 pages (4 pages of English Translation and 4 pages of Official Copy).
Supplemental Notice of Allowance received for U.S. Appl. No. 17/955,311, mailed on May 26, 2023, 2 pages.
Applicant-Initiated Interview Summary received for U.S. Appl. No. 17/087,855, mailed on Jul. 5, 2022, 2 pages.
Board Decision received for Chinese Patent Application No. 201510284715.9, mailed on Jul. 21, 2022, 22 pages (2 pages of English Translation and 20 pages of Official Copy).
Board Decision received for Chinese Patent Application No. 201810338826.7, mailed on May 30, 2022, 20 pages (2 pages of English Translation and 18 pages of Official Copy).
Board Opinion received for Chinese Patent Application No. 201510284715.9, mailed on Jun. 6, 2022, 14 pages (3 pages of English Translation and 11 pages of Official Copy).
Brief Communication Regarding Oral Proceedings received for European Patent Application No. 17799904.2, mailed on Sep. 13, 2022, 1 page.
Brief Communication Regarding Oral Proceedings received for European Patent Application No. 19150528.8, mailed on Sep. 5, 2022, 2 pages.
Corrected Notice of Allowance received for U.S. Appl. No. 16/369,473, mailed on Sep. 9, 2022, 2 pages.
Corrected Notice of Allowance received for U.S. Appl. No. 17/208,957, mailed on Jun. 30, 2022, 2 pages.

(56) References Cited

OTHER PUBLICATIONS

Decision on Appeal received for Korean Patent Application No. 10-2019-7033799, mailed on Jul. 19, 2022, 23 pages (3 pages of English Translation and 20 pages of Official Copy).
Decision to Grant received for European Patent Application No. 18713408.5, mailed on Sep. 1, 2022, 3 pages.
Decision to Grant received for European Patent Application No. 19160344.8, mailed on Sep. 1, 2022, 3 pages.
Decision to Grant received for European Patent Application No. 19769336.9, mailed on Oct. 7, 2022, 2 pages.
Decision to Refuse received for European Patent Application No. 17799904.2, mailed on Sep. 19, 2022, 4 pages.
Decision to Refuse received for European Patent Application No. 19150528.8, mailed on Sep. 9, 2022, 4 pages.
Feng et al., "A Prototype Three-Dimensional Position Sensitive CdZnTe Detector Array", IEEE Transactions on Nuclear Science, vol. 54, No. 4, Aug. 2007, 6 pages.
Hwang et al., "Toward Event-Based Haptics: Rendering Contact Using Open-Loop Force Pulses", 12th International Symposium on Haptic Interfaces for Virtual Environment and Teleoperator Systems, 2004, 8 pages.
Intention to Grant received for European Patent Application No. 19194828.0, mailed on Jun. 30, 2022, 9 pages.
Intention to Grant received for European Patent Application No. 20186286.9, mailed on Sep. 15, 2022, 9 pages.
International Search Report and Written Opinion received for PCT Patent Application No. PCT/US2022/013730, mailed on Apr. 8, 2022, 19 pages.
Jianxin et al., "Fingerprint-based Authentication in Networking Environment", Artificial Intelligence Institute of Zhejiang University, Hangzhou Zhejiang 310027, China, Dec. 28, 2001, 4 pages.
Liu et al., "PKI Authentication System Combining with Fingerprint", Computer Engineering, vol. 39, No. 9, May 2005, 3 pages (Official Copy Only) { See Communication under 37 CFR § 1.98(a)(3)}.
Minutes of the Oral Proceedings received for European Patent Application No. 19194828.0, mailed on Jun. 28, 2022, 6 pages.
Non-Final Office Action received for U.S. Appl. No. 16/938,362, mailed on Sep. 14, 2022, 14 pages.
Non-Final Office Action received for U.S. Appl. No. 17/087,855, mailed on Jul. 21, 2022, 23 pages.
Non-Final Office Action received for U.S. Appl. No. 17/193,991, mailed on Oct. 6, 2022, 7 pages.
Non-Final Office Action received for U.S. Appl. No. 17/409,570, mailed on Sep. 21, 2022, 35 pages.
Non-Final Office Action received for U.S. Appl. No. 17/516,495, mailed on Jul. 6, 2022, 10 pages.
Notice of Allowance received for Chinese Patent Application No. 201710198190.6, mailed on Sep. 23, 2022, 7 pages (3 pages of English Translation and 4 pages of Official Copy).
Notice of Allowance received for Chinese Patent Application No. 201980041865.3, mailed on Aug. 16, 2022, 6 pages (3 pages of English Translation and 3 pages of Official Copy).
Notice of Allowance received for Japanese Patent Application No. 2021-001028, mailed on Sep. 9, 2022, 4 pages (1 page of English Translation and 3 pages of Official Copy).
Notice of Allowance received for Japanese Patent Application No. 2022-070240, mailed on Aug. 5, 2022, 4 pages (1 page of English Translation and 3 pages of Official Copy).
Notice of Allowance received for Korean Patent Application No. 10-2021-7032984, mailed on Jun. 29, 2022, 5 pages (2 pages of English Translation and 3 pages of Official Copy).
Notice of Allowance received for Korean Patent Application No. 10-2022-0010942, mailed on Aug. 10, 2022, 6 pages (2 pages of English Translation and 4 pages of Official Copy).
Notice of Allowance received for Korean Patent Application No. 10-2020-7034405, mailed on Jun. 20, 2022, 6 pages (2 pages of English Translation and 4 pages of Official Copy).
Notice of Allowance received for U.S. Appl. No. 17/208,957, mailed on Aug. 17, 2022, 11 pages.
Notice of Hearing received for Indian Patent Application No. 201617039493, mailed on Aug. 10, 2022, 3 pages.
Office Action received for Australian Patent Application No. 2019281965, mailed on Aug. 31, 2022, 5 pages.
Office Action received for Australian Patent Application No. 2021250944, mailed on Sep. 16, 2022, 3 pages.
Office Action received for Australian Patent Application No. 2021254574, mailed on Oct. 15, 2022, 3 pages.
Office Action received for Chinese Patent Application No. 201710198190.6, mailed on Jul. 5, 2022, 7 pages (3 pages of English Translation and 4 pages of Official Copy).
Office Action received for Chinese Patent Application No. 201980009669.8, mailed on Aug. 3, 2022, 19 pages (12 pages of English Translation and 7 pages of Official Copy).
Office Action received for European Patent Application No. 19160348.9, mailed on Aug. 4, 2022, 6 pages.
Office Action received for European Patent Application No. 20198076.0, mailed on Sep. 22, 2022, 7 pages.
Office Action received for Japanese Patent Application No. 2019-563560, mailed on Jul. 4, 2022, 34 pages (15 pages of English Translation and 19 pages of Official Copy).
Office Action received for Japanese Patent Application No. 2020-566978, mailed on Sep. 26, 2022, 4 pages (2 pages of English Translation and 2 pages of Official Copy).
Office Action received for Japanese Patent Application No. 2021-084065, mailed on Jun. 24, 2022, 12 pages (6 pages of English Translation and 6 pages of Official Copy).
Office Action received for Japanese Patent Application No. 2021-131310, mailed on Sep. 2, 2022, 9 pages (5 pages of English Translation and 4 pages of Official Copy).
Office Action received for Korean Patent Application No. 10-2022-7012864, mailed on Jun. 27, 2022, 9 pages (4 pages of English Translation and 5 pages of Official Copy).
Office Action received for Korean Patent Application No. 10-2022-7012869, mailed on Jun. 27, 2022, 11 pages (5 pages of English Translation and 6 pages of Official Copy).
Summons to Attend Oral Proceedings received for European Patent Application No. 15727291.5, mailed on Sep. 12, 2022, 13 pages.
Summons to Attend Oral Proceedings received for European Patent Application No. 16201195.1, mailed on Sep. 12, 2022, 14 pages.
Summons to Attend Oral Proceedings received for European Patent Application No. 18208881.5, mailed on Jun. 29, 2022, 9 pages.
Applicant-Initiated Interview Summary received for U.S. Appl. No. 17/479,974, mailed on Jul. 21, 2023, 2 pages.
Applicant-Initiated Interview Summary received for U.S. Appl. No. 17/962,369, mailed on Jul. 24, 2023, 4 pages.
Non-Final Office Action received for U.S. Appl. No. 17/496,716, mailed on Jul. 18, 2023, 15 pages.
Notice of Allowance received for U.S. Appl. No. 17/193,991, mailed on Jul. 17, 2023, 10 pages.
Notice of Allowance received for U.S. Appl. No. 17/409,570, mailed on Jul. 20, 2023, 7 pages.
Notice of Allowance received for U.S. Appl. No. 17/863,974, mailed on Jul. 21, 2023, 2 pages.
Office Action received for Australian Patent Application No. 2022200900, mailed on Jul. 13, 2023, 3 pages.
Office Action received for Danish Patent Application No. 202270438, mailed on Jul. 10, 2023, 4 pages.
Applicant-Initiated Interview Summary received for U.S. Appl. No. 17/962,369, mailed on Oct. 16, 2023, 4 pages.
Decision to Grant received for European Patent Application No. 19716254.8, mailed on Oct. 6, 2023, 2 pages.
Final Office Action received for U.S. Appl. No. 17/725,311, mailed on Oct. 13, 2023, 66 pages.
Kormann et al., "Risks of the Passport Single Signon Protocol", IEEE Computer Networks, Jul. 2000, 12 pages.
Non-Final Office Action received for U.S. Appl. No. 17/479,974, mailed on Oct. 10, 2023, 20 pages.
Non-Final Office Action received for U.S. Appl. No. 17/900,734, mailed on Oct. 24, 2023, 12 pages.
Non-Final Office Action received for U.S. Appl. No. 18/105,191, mailed on Oct. 13, 2023, 23 pages.

(56) References Cited

OTHER PUBLICATIONS

Notice of Allowance received for Japanese Patent Application No. 2020-184605, mailed on Oct. 10, 2023, 4 pages (1 page of English Translation and 3 pages of Official Copy).
Notice of Allowance received for Japanese Patent Application No. 2021-149549, mailed on Oct. 16, 2023, 4 pages (1 page of English Translation and 3 pages of Official Copy).
Applicant-Initiated Interview Summary received for U.S. Appl. No. 17/479,974, mailed on Nov. 1, 2023, 2 pages.
Intention to Grant received for European Patent Application No. 20198076.0, mailed on Oct. 25, 2023, 11 pages.
Non-Final Office Action received for U.S. Appl. No. 18/136,819, mailed on Nov. 7, 2023, 8 pages.
Notice of Allowance received for Korean Patent Application No. 10-2022-7029609, mailed on Oct. 23, 2023, 8 pages (2 pages of English Translation and 6 pages of Official Copy).
Notice of Allowance received for U.S. Appl. No. 17/496,716, mailed on Nov. 8, 2023, 24 pages.
Office Action received for Australian Patent Application No. 2022203027, mailed on Oct. 25, 2023, 5 pages.
Office Action received for Australian Patent Application No. 2022279466, mailed on Oct. 25, 2023, 3 pages.
Office Action received for Chinese Patent Application No. 201910901500.5, mailed on Sep. 29, 2023, 15 pages (5 pages of English Translation and 10 pages of Official Copy).
Office Action received for Japanese Patent Application No. 2022-140146, mailed on Oct. 20, 2023, 8 pages (4 pages of English Translation and 4 pages of Official Copy).
Applicant Initiated Interview Summary received for U.S. Appl. No. 17/725,311, mailed on Jun. 30, 2023, 5 pages.
Decision to Refuse received for Japanese Patent Application No. 2021-149549, mailed on Jun. 26, 2023, 4 pages (2 pages of English Translation and 2 pages of Official Copy).
Notice of Acceptance received for Australian Patent Application No. 2022235545, mailed on Jun. 27, 2023, 3 pages.
Notice of Allowance received for U.S. Appl. No. 17/863,974, mailed on Jul. 11, 2023, 5 pages.
Office Action received for Australian Patent Application No. 2022206826, mailed on Jul. 4, 2023, 3 pages.
Office Action received for Japanese Patent Application No. 2020-184605, mailed on Jul. 3, 2023, 6 pages (3 pages of English Translation and 3 pages of Official Copy).
Applicant-Initiated Interview Summary received for U.S. Appl. No. 17/062,941, mailed on Apr. 19, 2023, 2 pages.
Extended European Search Report received for European Patent Application No. 23157906.1, mailed on Apr. 6, 2023, 10 pages.
Notice of Allowance received for Japanese Patent Application No. 2022-007217, mailed on Apr. 10, 2023, 4 pages (1 page of English Translation and 3 pages of Official Copy).
Office Action received for Chinese Patent Application No. 201910246439.5, mailed on Apr. 6, 2023, 14 pages (7 pages of English Translation and 7 pages of Official Copy).
Office Action received for Chinese Patent Application No. 202211283788.2, mailed on Mar. 22, 2023, 15 pages (7 pages of English Translation and 8 pages of Official Copy).
Office Action received for European Patent Application No. 19769669.3, mailed on Apr. 18, 2023, 20 pages.
Office Action received for Japanese Patent Application No. 2021-084065, mailed on Apr. 10, 2023, 6 pages (3 pages of English Translation and 3 pages of Official Copy).
Decision to Refuse received for Japanese Patent Application No. 2022-151495, mailed on Jan. 12, 2024, 14 pages (7 pages of English Translation and 7 pages of Official Copy).
Final Office Action received for U.S. Appl. No. 17/479,974, mailed on Jan. 19, 2024, 16 pages.
Final Office Action received for U.S. Appl. No. 17/900,734, mailed on Jan. 19, 2024, 11 pages.
Notice of Allowance received for Japanese Patent Application No. 2022-100394, mailed on Jan. 12, 2024, 4 pages (1 page of English Translation and 3 pages of Official Copy).
Office Action received for Australian Patent Application No. 2023200797, mailed on Jan. 23, 2024, 5 pages.
Supplemental Notice of Allowance received for U.S. Appl. No. 17/496,716, mailed on Feb. 1, 2024, 2 pages.
Applicant-Initiated Interview Summary received for U.S. Appl. No. 17/725,311, mailed on Jan. 16, 2024, 6 pages.
Applicant-Initiated Interview Summary received for U.S. Appl. No. 18/105,191, mailed on Jan. 17, 2024, 2 pages.
Notice of Acceptance received for Australian Patent Application No. 2022279466, mailed on Jan. 10, 2024, 3 pages.
Notice of Hearing received for Indian Patent Application No. 201817036875, mailed on Jan. 11, 2024, 3 pages.
Office Action received for Australian Patent Application No. 2022218517, mailed on Dec. 21, 2023, 5 pages.
Office Action received for Chinese Patent Application No. 201910901500.5, mailed on Dec. 22, 2023, 19 pages (6 pages of English Translation and 13 pages of Official Copy).
Advisory Action received for U.S. Appl. No. 16/369,473, mailed on May 12, 2022, 4 pages.
Board Decision received for Chinese Patent Application No. 201710198190.6, mailed on May 23, 2022, 2 pages (1 page of English Translation and 1 page of Official Copy).
Board Opinion received for Chinese Patent Application No. 201610459968.X, mailed on Mar. 3, 2022, 11 pages (3 pages of English Translation and 8 pages of Official Copy).
Brief Communication Regarding Oral Proceedings received for European Patent Application No. 19194828.0, mailed on May 6, 2022, 1 page.
Corrected Notice of Allowance received for U.S. Appl. No. 16/125,267, mailed on Apr. 4, 2022, 2 pages.
Corrected Notice of Allowance received for U.S. Appl. No. 16/125,267, mailed on May 4, 2022, 3 pages.
Extended European Search Report received for European Patent Application No. 22150595.1, mailed on Apr. 8, 2022, 6 pages.
Final Office Action received for U.S. Appl. No. 17/087,855, mailed on Mar. 31, 2022, 23 pages.
Intention to Grant received for European Patent Application No. 18713408.5, mailed on Mar. 17, 2022, 10 pages.
Intention to Grant received for European Patent Application No. 18713408.5, mailed on May 23, 2022, 10 pages.
Intention to Grant received for European Patent Application No. 19160344.8, mailed on May 13, 2022, 10 pages.
Intention to Grant received for European Patent Application No. 19769336.9, mailed on May 31, 2022, 13 pages.
Notice of Acceptance received for Australian Patent Application No. 2020207785, mailed on May 4, 2022, 3 pages.
Notice of Acceptance received for Australian Patent Application No. 2021200415, mailed on May 9, 2022, 3 pages.
Notice of Acceptance received for Australian Patent Application No. 2021202352, mailed on Jun. 6, 2022, 3 pages.
Notice of Acceptance received for Australian Patent Application No. 2022200617, mailed on May 12, 2022, 3 pages.
Notice of Allowance received for Chinese Patent Application No. 2015102848965, mailed on Jun. 6, 2022, 2 pages (1 page of Engiish Translation and 1 page of Official Copy).
Notice of Allowance received for Chinese Patent Application No. 201810338040.5, mailed on Mar. 30, 2022, 6 pages (2 pages of English Translation and 4 pages of Official Copy).
Notice of Allowance received for Japanese Patent Application No. 2020-028315, mailed on May 27, 2022, 3 pages (1 page of English Translation and 2 pages of Official Copy).
Notice of Allowance received for Japanese Patent Application No. 2021-035572, mailed on Jun. 3, 2022, 4 pages (1 page of English Translation and 3 pages of Official Copy).
Notice of Allowance received for Japanese Patent Application No. 2021-208395, mailed on Mar. 25, 2022, 4 pages (1 page of English Translation and 3 pages of Official Copy).
Notice of Allowance received for U.S. Appl. No. 16/369,473, mailed on Jun. 8, 2022, 7 pages.
Notice of Allowance received for U.S. Appl. No. 17/015,429, mailed on Apr. 4, 2022, 2 pages.
Notice of Allowance received for U.S. Appl. No. 17/015,429, mailed on Apr. 15, 2022, 2 pages.

(56) References Cited

OTHER PUBLICATIONS

Notice of Allowance received for U.S. Appl. No. 17/015,429, mailed on Jun. 1, 2022, 5 pages.
Notice of Allowance received for U.S. Appl. No. 17/015,429, mailed on May 10, 2022, 2 pages.
Notice of Allowance received for U.S. Appl. No. 17/208,957, mailed on Jun. 15, 2022, 12 pages.
Office Action received for Australian Patent Application No. 2019281965, mailed on May 11, 2022, 5 pages.
Office Action received for Australian Patent Application No. 2020203899, mailed on May 5, 2022, 4 pages.
Office Action received for Australian Patent Application No. 2021202352, mailed on Mar. 15, 2022, 3 pages.
Office Action received for Chinese Patent Application No. 201510284896.5, mailed on Mar. 14, 2022, 10 pages (5 pages of English Translation and 5 pages of Official Copy).
Office Action received for Chinese Patent Application No. 201780053143.0, mailed on Mar. 30, 2022, 12 pages (5 pages of English Translation and 7 pages of Official Copy).
Office Action received for Chinese Patent Application No. 201910246400.3, mailed on Apr. 19, 2022, 24 pages (13 pages of English Translation and 11 pages of Official Copy).
Office Action received for Chinese Patent Application No. 201980041865.3, mailed on Apr. 13, 2022, 12 pages (6 pages of English Translation and 6 pages of Official Copy).
Office Action received for European Patent Application No. 19731554.2, mailed on Apr. 19, 2022, 8 pages.
Office Action received for European Patent Application No. 20191533.7, mailed on May 12, 2022, 5 pages.
Office Action received for European Patent Application No. 20198076.0, mailed on Mar. 25, 2022, 5 pages.
Office Action received for Indian Patent Application No. 202018009906, mailed on Apr. 29, 2022, 9 pages.
Office Action received for Korean Patent Application No. 10-2022-0010942, mailed on Apr. 27, 2022, 5 pages (2 pages of English Translation and 3 pages of Official Copy).
Office Action received for Korean Patent Application No. 10-2022-7004578, mailed on Mar. 22, 2022, 11 pages (5 pages of English Translation and 6 pages of Official Copy).
Requirement for Restriction/Election received for U.S. Appl. No. 16/938,362, mailed on May 4, 2022, 6 pages.
Result of Consultation received for European Patent Application No. 19194828.0, mailed on May 9, 2022, 4 pages.
Schürmann et al., "BANDANA—Body Area Network Device-to-Device Authentication Using Natural gAit", Ambient Intelligence, Comnet, Aalto University, DOI: 10.1109/PERCOM.2017.7917865, Dec. 11, 2016, 11 pages.
Summons to Attend Oral Proceedings received for European Patent Application No. 19150528.8, mailed on Mar. 15, 2022, 7 pages.
Weiss et al., "Smartphone and Smartwatch-Based Biometrics using Activities of Daily Living", IEEE Access, DOI: 10.1109/ACCESS.2019.2940729, vol. XX, 2017, 13 pages.
Zhang et al., "WristUnlock: Secure and Usable Smartphone Unlocking with Wrist Wearables", IEEE Conference on Communications and Network Security (CNS), 2019, 9 pages.
Advisory Action received for U.S. Appl. No. 17/193,991, mailed on Jan. 31, 2023, 3 pages.
Appeal Decision received for Australian Patent Application No. 2019268070, mailed on Dec. 22, 2022, 26 pages.
Applicant-Initiated Interview Summary received for U.S. Appl. No. 16/938,362, mailed on Nov. 2, 2022, 2 pages.
Applicant-Initiated Interview Summary received for U.S. Appl. No. 17/409,570, mailed on Dec. 7, 2022, 4 pages.
Applicant-Initiated Interview Summary received for U.S. Appl. No. 17/409,570, mailed on Dec. 27, 2022, 2 pages.
Applicant-Initiated Interview Summary received for U.S. Appl. No. 17/409,570, mailed on Nov. 3, 2022, 5 pages.
Applicant-Initiated Interview Summary received for U.S. Appl. No. 17/409,570, mailed on Nov. 29, 2022, 4 pages.
Applicant-Initiated Interview Summary received for U.S. Appl. No. 17/863,974, mailed on Dec. 9, 2022, 2 pages.
Brief Communication Regarding Oral Proceedings received for European Patent Application No. 19160348.9, mailed on Nov. 8, 2022, 3 pages.
Choong et al., "Fingerprint Self-Captures: Usability of a fingerprint system with real-time feedback.", IEEE Fifth International Conference on Biometrics: Theory, Applications and Systems (BTAS). IEEE, 2012. URL: https://ieeexplore.ieee.orgistamp/stamp.jsp?tp.Szar-munber=6374553, 2012, pp. 16-22.
Corrected Notice of Allowance received for U.S. Appl. No. 16/938,362, mailed on Feb. 7, 2023, 4 pages.
Corrected Notice of Allowance received for U.S. Appl. No. 17/087,855, mailed on Jan. 12, 2023, 6 pages.
Corrected Notice of Allowance received for U.S. Appl. No. 17/087,855, mailed on Jan. 25, 2023, 4 pages.
Corrected Notice of Allowance received for U.S. Appl. No. 17/498,557, mailed on Jan. 11, 2023, 2 pages.
Decision to Grant received for European Patent Application No. 19194828.0, mailed on Oct. 27, 2022, 3 pages.
Decision to Refuse received for European Patent Application No. 18208881.5, mailed on Dec. 23, 2022, 12 pages.
Extended European Search Report received for European Patent Application No. 22188377.0, mailed on Oct. 27, 2022, 8 pages.
Extended European Search Report received for European Patent Application No. 22198902.3, mailed on Jan. 20, 2023, 9 pages.
Final Office Action received for U.S. Appl. No. 17/193,991, mailed on Dec. 22, 2022, 6 pages.
Final Office Action received for U.S. Appl. No. 17/409,570, mailed on Nov. 9, 2022, 37 pages.
Final Office Action received for U.S. Appl. No. 17/516,495, mailed on Nov. 15, 2022, 12 pages.
Final Office Action received for U.S. Appl. No. 17/863,974, mailed on Dec. 16, 2022, 23 pages.
Minutes of Oral Proceedings received for European Patent Application No. 18208881.5, mailed on Dec. 22, 2022, 4 pages.
Non-Final Office Action received for U.S. Appl. No. 17/863,974, mailed on Oct. 24, 2022, 23 pages.
Notice of Acceptance received for Australian Patent Application No. 2021250944, mailed on Nov. 14, 2022, 3 pages.
Notice of Acceptance received for Australian Patent Application No. 2021254574, mailed on Dec. 14, 2022, 3 pages.
Notice of Allowance received for Chinese Patent Application No. 201910246400.3, mailed on Jan. 28, 2023, 5 pages (1 page of English Translation and 4 pages of Official Copy).
Notice of Allowance received for Japanese Patent Application No. 2021-131310, mailed on Dec. 9, 2022, 4 pages (1 pages of English Translation and 3 pages of Official Copy).
Notice of Allowance received for Korean Patent Application No. 10-2022-7012864, mailed on Dec. 15, 2022, 7 pages (2 pages of English Translation and 5 pages of Official Copy).
Notice of Allowance received for U.S. Appl. No. 16/938,362, mailed on Jan. 19, 2023, 8 pages.
Notice of Allowance received for U.S. Appl. No. 17/087,855, mailed on Nov. 25, 2022, 8 pages.
Notice of Allowance received for U.S. Appl. No. 17/409,570, mailed on Jan. 25, 2023, 7 pages.
Notice of Allowance received for U.S. Appl. No. 17/498,557, mailed on Dec. 2, 2022, 9 pages.
Office Action received for Australian Patent Application No. 2019281965, mailed on Nov. 18, 2022, 7 pages.
Office Action received for Australian Patent Application No. 2022200900, mailed on Nov. 30, 2022, 6 pages.
Office Action received for Chinese Patent Application No. 201780053143.0, mailed on Nov. 30, 2022, 13 pages (6 pages of English Translation and 7 pages of Official Copy).
Office Action received for Chinese Patent Application No. 201910109868.8, mailed on Nov. 18, 2022, 32 pages (17 pages of English Translation and 15 pages of Official Copy).
Office Action received for Chinese Patent Application No. 201910901500.5, mailed on Nov. 24, 2022, 22 pages (7 pages of English Translation and 15 pages of Official Copy).

(56) References Cited

OTHER PUBLICATIONS

Office Action received for Chinese Patent Application No. 201980009669.8, mailed on Nov. 22, 2022, 16 pages (10 pages of English Translation and 6 pages of Official Copy).
Office Action received for European Patent Application No. 21173988.3, mailed on Jan. 19, 2023, 5 pages.
Office Action received for German Patent Application No. 112014004134.3, mailed on Dec. 21, 2022, 22 pages (8 pages of English Translation and 14 pages of Official Copy).
Office Action received for Japanese Patent Application No. 2019-563560, mailed on Jan. 20, 2023, 56 pages (25 pages of English Translation and 31 pages of Official Copy).
Office Action received for Japanese Patent Application No. 2020-184605, mailed on Dec. 12, 2022, 9 pages (4 pages of English Translation and 5 pages of Official Copy).
Office Action received for Japanese Patent Application No. 2021-084065, mailed on Nov. 14, 2022, 10 pages (5 pages of English Translation and 5 pages of Official Copy).
Office Action received for Japanese Patent Application No. 2021-149549, mailed on Oct. 21, 2022, 4 pages (2 pages of English Translation and 2 pages of Official Copy).
Office Action received for Korean Patent Application No. 10-2022-7004578, mailed on Jan. 27, 2023, 8 pages (4 pages of English Translation and 4 pages of Official Copy).
Office Action received for Korean Patent Application No. 10-2022-7014519, mailed on Jan. 26, 2023, 9 pages (4 pages of English Translation and 5 pages of Official Copy).
Office Action received for Korean Patent Application No. 10-2022-7015289, mailed on Jan. 28, 2023, 12 pages (5 pages of English translation and 7 pages of Official copy).
Result of Consultation received for European Patent Application No. 18208881.5, mailed on Dec. 6, 2022, 10 pages.
The Youtube Tech Guy, "How to Setup Face Unlock on Your Android", Available online at: https://www.youtube.com/watch?v=iJYFLYkYvTk, Apr. 12, 2012, 1 page.
Brief Communication Regarding Oral Proceedings received for European Patent Application No. 19160348.9, mailed on Jun. 12, 2024, 1 page.
Intention to Grant received for European Patent Application No. 22150595.1, mailed on Jun. 7, 2024, 9 pages.
Non-Final Office Action received for U.S. Appl. No. 18/239,701, mailed on Jun. 7, 2024, 10 pages.
Office Action received for Japanese Patent Application No. 2022-163568, mailed on Jun. 3, 2024, 8 pages (4 pages of English Translation and 4 pages of Official Copy).
Notice of Allowance received for Chinese Patent Application No. 201910901500.5, mailed on May 6, 2024, 4 pages (1 page of English Translation and 3 pages of Official Copy).
Notice of Hearing received for Indian Patent Application No. 201918003782, mailed on May 8, 2024, 2 pages.
Office Action received for Chinese Patent Application No. 201980064012.1, mailed on Mar. 19, 2024, 18 pages (10 pages of English Translation and 8 pages of Official Copy).
Office Action received for Chinese Patent Application No. 202011020666.5, mailed on Apr. 27, 2024, 21 pages (10 pages of English Translation and 11 pages of Official Copy).
Office Action received for European Patent Application No. 19731554.2, mailed on May 8, 2024, 5 pages.
Result of Consultation received for European Patent Application No. 19160348.9, mailed on May 8, 2024, 4 pages.
Applicant-Initiated Interview Summary received for U.S. Appl. No. 18/237,849, mailed on Jul. 19, 2024, 4 pages.
Brief Communication Regarding Oral Proceedings received for European Patent Application No. 20191533.7, mailed on Jul. 17, 2024, 1 page.
Corrected Notice of Allowance received for U.S. Appl. No. 17/516,495, mailed on Jul. 17, 2024, 3 pages.
Notice of Allowance received for Japanese Patent Application No. 2023-001790, mailed on Jul. 5, 2024, 4 pages (1 page of English Translation and 3 pages of Official Copy).

Notice of Allowance received for U.S. Appl. No. 17/516,495, mailed on Jul. 3, 2024, 8 pages.
Notice of Allowance received for U.S. Appl. No. 17/732,222, mailed on Jul. 3, 2024, 14 pages.
Office Action received for Chinese Patent Application No. 202211284989.4, mailed on Jun. 12, 2024, 24 pages (11 pages of English Translation and 13 pages of Official Copy).
Office Action received for Chinese Patent Application No. 202211285799.4, mailed on Jun. 19, 2024, 19 pages (9 pages of English Translation and 10 pages of Official Copy).
Office Action received for Indian Patent Application No. 202218027489, mailed on Jul. 9, 2024, 8 pages.
Office Action received for Japanese Patent Application No. 2023-077990, mailed on Jul. 12, 2024, 8 pages (4 pages of English Translation and 4 pages of Official Copy).
Office Action received for Japanese Patent Application No. 2023-110191, mailed on Jul. 16, 2024, 4 pages (2 pages of English Translation and 2 pages of Official Copy).
Result of Consultation received for European Patent Application No. 20191533.7, mailed on Jul. 9, 2024, 4 pages.
Result of Consultation received for European Patent Application No. 20191533.7, mailed on Jul. 18, 2024, 4 pages.
Advisory Action received for U.S. Appl. No. 17/900,734, mailed on Mar. 21, 2024, 5 pages.
Corrected Notice of Allowance received for U.S. Appl. No. 17/725,311, mailed on Mar. 28, 2024, 2 pages.
Intention to Grant received for European Patent Application No. 21166718.3, mailed on Mar. 25, 2024, 8 pages.
Non-Final Office Action received for U.S. Appl. No. 18/237,849, mailed on Mar. 26, 2024, 47 pages.
Notice of Allowance received for Chinese Patent Application No. 202211285112.7, mailed on Mar. 21, 2024, 2 pages (1 page of English Translation and 1 page of Official Copy).
Notice of Hearing received for Indian Patent Application No. 202118009403, mailed on Mar. 15, 2024, 2 pages.
Office Action received for Chinese Patent Application No. 201880001546.5, mailed on Feb. 24, 2024, 21 pages (11 pages of English Translation and 10 pages of Official Copy).
Office Action received for Korean Patent Application No. 10-2023-7025821, mailed on Mar. 12, 2024, 11 pages (5 pages of English Translation and 6 pages of Official Copy).
Applicant-Initiated Interview Summary received for U.S. Appl. No. 17/479,974, mailed on Mar. 14, 2024, 2 pages.
Applicant-Initiated Interview Summary received for U.S. Appl. No. 18/136,819, mailed on Mar. 19, 2024, 2 pages.
Office Action received for Australian Patent Application No. 2022203027, mailed on Mar. 14, 2024, 3 pages.
Office Action received for Chinese Patent Application No. 201911023090.5, mailed on Jan. 29, 2024, 27 pages (7 pages of English Translation and 20 pages of Official Copy).
Office Action received for European Patent Application No. 22188377.0, mailed on Mar. 7, 2024, 7 pages.
Office Action received for Japanese Patent Application No. 2021-168243, mailed on Mar. 8, 2024, 4 pages (2 pages of English Translation and 2 pages of Official Copy).
Office Action received for Japanese Patent Application No. 2022-140146, mailed on Mar. 1, 2024, 8 pages (4 pages of English Translation and 4 pages of Official Copy).
Office Action received for Japanese Patent Application No. 2023-001790, mailed on Mar. 4, 2024, 10 pages (5 pages of English Translation and 5 pages of Official Copy).
Record of Oral Hearing received for U.S. Appl. No. 17/516,495, mailed on Mar. 5, 2024, 15 pages.
Examiner's Pre-Review Report received for Japanese Patent Application No. 2022-151495, mailed on Jun. 6, 2024, 8 pages (4 pages of English Translation and 4 pages of Official Copy).
Advisory Action received for U.S. Appl. No. 17/479,974, mailed on Apr. 25, 2024, 4 pages.
Advisory Action received for U.S. Appl. No. 17/479,974, mailed on May 6, 2024, 4 pages.
Applicant-Initiated Interview Summary received for U.S. Appl. No. 18/105,191, mailed on Apr. 30, 2024, 2 pages.

(56) References Cited

OTHER PUBLICATIONS

Brief Communication Regarding Oral Proceedings received for European Patent Application No. 19160348.9, mailed on May 2, 2024, 4 pages.
Notice of Allowance received for Japanese Patent Application No. 2021-168243, mailed on Apr. 30, 2024, 4 pages (1 page of English Translation and 3 pages of Official Copy).
Notice of Allowance received for U.S. Appl. No. 17/725,311, mailed on May 1, 2024, 5 pages.
Office Action received for Australian Patent Application No. 2022218517, mailed on Apr. 24, 2024, 4 pages.
Office Action received for Australian Patent Application No. 2023203469, mailed on Apr. 24, 2024, 4 pages.
Office Action received for Chinese Patent Application No. 201910901500.5, mailed on Apr. 19, 2024, 2 pages (1 page of English Translation and 1 page of Official Copy).
Corrected Notice of Allowance received for U.S. Appl. No. 17/587,558, mailed on Apr. 16, 2024, 2 pages.
Examiner's Answer to Appeal Brief received for U.S. Appl. No. 17/962,369, mailed on Apr. 10, 2024, 18 pages.
International Preliminary Report on Patentability received for PCT Patent Application No. PCT/US2022/042978, mailed on Apr. 4, 2024, 12 pages.
Non-Final Office Action received for U.S. Appl. No. 18/136,819, mailed on Apr. 10, 2024, 9 pages.
Notice of Allowance received for U.S. Appl. No. 17/587,558, mailed on Apr. 3, 2024, 19 pages.
Office Action received for Japanese Patent Application No. 2023-009554, mailed on Apr. 1, 2024, 4 pages (2 pages of English Translation and 2 pages of Official Copy).
Applicant-Initiated Interview Summary received for U.S. Appl. No. 18/237,849, mailed on Jul. 30, 2024, 4 pages.
Corrected Notice of Allowance received for U.S. Appl. No. 17/725,311, mailed on Jul. 31, 2024, 2 pages.
Corrected Notice of Allowance received for U.S. Appl. No. 18/105,191, mailed on Aug. 6, 2024, 5 pages.
Decision on Hearing received for Australian Patent Application No. 2019281965, mailed on Jun. 25, 2024, 25 pages.
Notice of Allowance received for U.S. Appl. No. 17/587,558, mailed on Aug. 5, 2024, 10 pages.
Office Action received for Australian Patent Application No. 2022203027, mailed on Jul. 23, 2024, 3 pages.
Office Action received for Chinese Patent Application No. 201911022883.5, mailed on Jun. 20, 2024, 13 pages (6 pages of English Translation and 7 pages of Official Copy).
Office Action received for Chinese Patent Application No. 201911023090.5, mailed on Jun. 25, 2024, 25 pages (6 pages of English Translation and 19 pages of Official Copy).
Office Action received for Chinese Patent Application No. 202111047788.8, mailed on Jun. 26, 2024, 25 pages (8 pages of English Translation and 17 pages of Official Copy).
Office Action received for European Patent Application No. 19160348.9, mailed on Jul. 24, 2024, 9 pages.
Office Action received for Korean Patent Application No. 10-2023-7024803, mailed on Jul. 19, 2024, 11 pages (5 pages of English Translation and 6 pages of Official Copy).
Summons to Attend Oral Proceedings received for European Patent Application No. 20191533.7, mailed on Jul. 25, 2024, 12 pages.
Alexandridis et al., "Forthroid on Android: A QR-code based Information Access System for Smart Phones", 18th IEEE Workshop on Local & Metropolitan Area Networks (LAN MAN)., 2011, 6 pages.
Final Office Action received for U.S. Appl. No. 17/062,941, mailed on Jun. 3, 2024, 12 pages.
Non-Final Office Action received for U.S. Appl. No. 18/137,985, mailed on Jun. 5, 2024, 9 pages.
Notice of Acceptance received for Australian Patent Application No. 2023200797, mailed on May 21, 2024, 3 pages.
Notice of Allowance received for U.S. Appl. No. 18/105,191, mailed on May 22, 2024, 8 pages.
Notice of Hearing received for Indian Patent Application No. 202018041558, mailed on May 20, 2024, 2 pages.
Ohbuchi et al., "Barcode Readers using the Camera Device in Mobile Phones", International Conference on Cyberworlds IEEE, 2004, 6 pages.
Applicant-Initiated Interview Summary received for U.S. Appl. No. 17/862,179, mailed on Nov. 21, 2024, 4 pages.
Applicant-Initiated Interview Summary received for U.S. Appl. No. 18/239,701, mailed on Nov. 22, 2024, 2 pages.
Intention to Grant received for European Patent Application No. 22150595.1, mailed on Nov. 22, 2024, 9 pages.
Notice of Allowance received for Chinese Patent Application No. 201980064012.1, mailed on Nov. 18, 2024, 2 pages (1 page of English Translation and 1 page of Official Copy).
Notice of Allowance received for U.S. Appl. No. 18/436,612, mailed on Nov. 14, 2024, 5 pages.
Office Action received for Chinese Patent Application No. 201880001546.5, mailed on Oct. 24, 2024, 16 pages (10 pages of English Translation and 6 pages of Official Copy).
Office Action received for Chinese Patent Application No. 201911022883.5, mailed on Oct. 17, 2024, 11 pages (5 pages of English Translation and 6 pages of Official Copy).
Office Action received for Indian Patent Application No. 202218045276, mailed on Nov. 19, 2024, 7 pages.
Office Action received for Japanese Patent Application No. 2023-147860, mailed on Nov. 18, 2024, 15 pages (7 pages of English Translation and 8 pages of Official Copy).
Office Action received for Japanese Patent Application No. 2023-149400, mailed on Nov. 18, 2024, 4 pages (2 pages of English Translation and 2 pages of Official Copy).
Office Action received for Japanese Patent Application No. 2024-077446, mailed on Nov. 18, 2024, 14 pages (7 pages of English Translation and 7 pages of Official Copy).
Office Action received for Korean Patent Application No. 10-2023-7025821, mailed on Nov. 11, 2024, 7 pages (3 pages of English Translation and 4 pages of Official Copy).
Office Action received for Korean Patent Application No. 10-2024-0115394, mailed on Nov. 11, 2024, 13 pages (6 pages of English Translation and 7 pages of Official Copy).
Supplemental Notice of Allowance received for U.S. Appl. No. 17/516,495, mailed on Nov. 12, 2024, 3 pages.
Decision on Appeal received for Korean Patent Application No. 10-2022-0150750, mailed on Oct. 22, 2024, 17 pages (3 pages of English Translation and 14 pages of Official Copy).
International Search Report and Written Opinion received for PCT Patent Application No. PCT/US2024/025526, mailed on Aug. 5, 2024, 19 pages,.
Invitation to Pay Additional Fees received for PCT Patent Application No. PCT/US2024/025526, mailed on Jun. 14, 2024, 12 pages.
Notice of Allowance received for U.S. Appl. No. 17/516,495, mailed on Oct. 31, 2024, 6 pages,.
Office Action received for Australian Patent Application No. 2023213252, mailed on Oct. 29, 2024, 6 pages,.
Office Action received for Chinese Patent Application No. 201980009669.8, mailed on Oct. 14, 2024, 18 pages (10 pages of English Translation and 8 pages of Official Copy).
Supplemental Notice of Allowance received for U.S. Appl. No. 17/732,222, mailed on Nov. 1, 2024, 2 pages.
Office Action received for Korean Patent Application No. 10-2023-7035977, mailed on Oct. 28, 2024, 9 pages (3 pages of English Translation and 6 pages of Official Copy).
Notice of Allowance received for Japanese Patent Application No. 2022-140146, mailed on Nov. 5, 2024, 21 pages (1 page of English Translation and 20 pages of Official Copy).
Advisory Action received for U.S. Appl. No. 17/062,941, mailed on Oct. 7, 2024, 2 pages.
Applicant-Initiated Interview Summary received for U.S. Appl. No. 17/062,941, mailed on Sep. 6, 2024, 2 pages.
Applicant-Initiated Interview Summary received for U.S. Appl. No. 18/239,701, mailed on Sep. 9, 2024, 2 pages.
Applicant-Initiated Interview Summary received for U.S. Appl. No. 18/239,701, mailed on Sep. 20, 2024, 2 pages.

(56) References Cited

OTHER PUBLICATIONS

Decision to Grant received for European Patent Application No. 21166718.3, mailed on Aug. 8, 2024, 2 pages.
Examiner's Answer to Appeal Brief received for U.S. Appl. No. 17/479,974, mailed on Oct. 24, 2024, 18 pages.
Final Office Action received for U.S. Appl. No. 18/239,701, mailed on Oct. 29, 2024, 11 pages.
Non-Final Office Action received for U.S. Appl.No. 17/862,179, mailed on Sep. 12, 2024, 39 pages.
Notice of Acceptance received for Australian Patent Application No. 2019281965, mailed on Sep. 20, 2024, 3 pages.
Notice of Acceptance received for Australian Patent Application No. 2022203027, mailed on Oct. 4, 2024, 3 pages.
Notice of Allowance received for Chinese Patent Application No. 202110011700.0, mailed on Sep. 14, 2024, 2 pages (1 page of English Translation and 1 page of Official Copy).
Notice of Allowance received for Japanese Patent Application No. 2023-009554, mailed on Oct. 18, 2024, 4 pages (1 page of English Translation and 3 pages of Official Copy).
Notice of Allowance received for U.S. Appl. No. 18/237,849, mailed on Aug. 12, 2024, 13 pages.
Notice of Allowance received for U.S. Appl. No. 18/436,612, mailed on Sep. 5, 2024, 9 pages.
Notice of Hearing received for Indian Patent Application No. 201918027146, mailed on Sep. 17, 2024, 2 pages.
Office Action received for Australian Patent Application No. 2023213252, mailed on Jul. 30, 2024, 4 pages.
Office Action received for Chinese Patent Application No. 201880003211.7, mailed on Sep. 7, 2024, 18 pages (10 pages of English Translation and 8 pages of Official Copy).
Office Action received for European Patent Application No. 22785826.3, mailed on Aug. 1, 2024, 7 pages.
Office Action received for Korean Patent Application No. 10-2022-0150750, mailed on May 27, 2024, 8 pages (4 pages of English Translation and 4 pages of Official Copy).
Office Action received for Korean Patent Application No. 10-2023-7032989, mailed on Sep. 23, 2024, 8 pages (3 pages of English Translation and 5 pages of Official Copy).
Supplemental Notice of Allowance received for U.S. Appl. No. 18/237,849, mailed on Sep. 11, 2024, 3 pages.
Supplemental Notice of Allowance received for U.S. Appl. No. 18/436,612, mailed on Oct. 9, 2024, 2 pages.

\* cited by examiner

700

702
While the computer system is connected to an external device, receive a first request to enroll a biometric feature for use in authorizing a secure operation at the computer system.

704
In response to receiving the first request:

706
In accordance with a determination that the first request satisfies a first set of one or more criteria, the first set of one or more criteria includes a first criterion that is met when data about the biometric feature that is to be enrolled is detected via a biometric sensor that is integrated with the external device, display, via the display generation component, a first user interface object prompting a user to provide an authorization input to the computer system, via the one or more input devices physically connected to the computer system.

708
In accordance with a determination that the first request does not satisfy the first set of one or more criteria, enable the biometric sensor that is integrated with the external device to be used to authorize secure operations at the computer system without requiring the user to provide the authorization input to the computer system.

710
While displaying the first user interface object, receiving, via the one or more input devices physically connected to the computer system, user input.

USER INTERFACE FOR ENROLLING A BIOMETRIC FEATURE

CROSS-REFERENCE TO RELATED APPLICATIONS

This application claims priority to U.S. Provisional Patent Application No. 63/156,847, entitled "USER INTERFACE FOR ENROLLING A BIOMETRIC FEATURE," filed Mar. 4, 2021, the contents of which is hereby incorporated by reference in its entirety.

FIELD

The present disclosure relates generally to computer user interfaces, and more specifically to techniques for enrolling a biometric feature for use with a peripheral device.

BACKGROUND

Electronic devices include a variety of techniques that provide increased security for sensitive information stored on, and/or otherwise accessible via, the electronic devices. For example, electronic devices can require a user to input a password and/or to provide biometric information, such as a fingerprint or an image of the user's face, before providing access to sensitive information. In addition, electronic devices can require the user to input a password and/or to provide biometric information prior to performing a particular operation, such as completing a transaction. Electronic devices can also be connected to peripheral and/or external devices that provide users with increased flexibility for providing inputs to respective electronic devices.

BRIEF SUMMARY

Some techniques for enrolling a biometric feature for use with a peripheral device using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for enrolling a biometric feature for use with a peripheral device. Such methods and interfaces optionally complement or replace other methods for enrolling a biometric feature for use with a peripheral device. Such methods and interfaces reduce the cognitive burden on a user and produce a more efficient human-machine interface. For battery-operated computing devices, such methods and interfaces conserve power and increase the time between battery charges. In addition, such methods and interfaces provide enhanced security by confirming that a user enrolling a biometric feature for use with a peripheral device is in possession of both the peripheral device and the electronic device.

In accordance with some embodiments, a method performed at a computer system that is in communication with a display generation component and one or more input devices physically connected to the computer system is described. The method comprises: while the computer system is connected to an external device, receiving a first request to enroll a biometric feature for use in authorizing a secure operation at the computer system; in response to receiving the first request, in accordance with a determination that the first request satisfies a first set of one or more criteria, where the first set of one or more criteria includes a first criterion that is met when data about the biometric feature that is to be enrolled is detected via a biometric sensor that is integrated with the external device, displaying, via the display generation component, a first user interface object prompting a user to provide an authorization input to the computer system, via the one or more input devices physically connected to the computer system; while displaying the first user interface object, receiving, via the one or more input devices physically connected to the computer system, user input; and in response to receiving the user input, in accordance with a determination that the user input includes the authorization input, initiating a process to enroll the biometric feature using data about the biometric feature detected via the biometric sensor that is integrated with the external device.

In accordance with some embodiments, a non-transitory computer-readable storage medium storing one or more programs configured to be executed by one or more processors of a computer system that is in communication with a display generation component and one or more input devices physically connected to the computer system is described. The one or more programs include instructions for: while the computer system is connected to an external device, receiving a first request to enroll a biometric feature for use in authorizing a secure operation at the computer system; in response to receiving the first request, in accordance with a determination that the first request satisfies a first set of one or more criteria, where the first set of one or more criteria includes a first criterion that is met when data about the biometric feature that is to be enrolled is detected via a biometric sensor that is integrated with the external device, displaying, via the display generation component, a first user interface object prompting a user to provide an authorization input to the computer system, via the one or more input devices physically connected to the computer system; while displaying the first user interface object, receiving, via the one or more input devices physically connected to the computer system, user input; and in response to receiving the user input, in accordance with a determination that the user input includes the authorization input, initiating a process to enroll the biometric feature using data about the biometric feature detected via the biometric sensor that is integrated with the external device.

In accordance with some embodiments, a transitory computer-readable storage medium storing one or more programs configured to be executed by one or more processors of a computer system that is in communication with a display generation component and one or more input devices physically connected to the computer system is described. The one or more programs include instructions for: while the computer system is connected to an external device, receiving a first request to enroll a biometric feature for use in authorizing a secure operation at the computer system; in response to receiving the first request, in accordance with a determination that the first request satisfies a first set of one or more criteria, where the first set of one or more criteria includes a first criterion that is met when data about the biometric feature that is to be enrolled is detected via a biometric sensor that is integrated with the external device, displaying, via the display generation component, a first user interface object prompting a user to provide an authorization input to the computer system, via the one or more input devices physically connected to the computer system; while displaying the first user interface object, receiving, via the one or more input devices physically connected to the computer system, user input; and in response to receiving the user input, in accordance with a determination that the user input includes the authorization input, initiating a process to enroll the biometric feature using data about the biometric feature detected via the biometric sensor that is integrated with the external device.

In accordance with some embodiments, a computer system comprising a display generation component, one or more input devices physically connected to the computer system, one or more processors, and memory storing one or more programs configured to be executed by the one or more processors is described. The one or more programs include instructions for: while the computer system is connected to an external device, receiving a first request to enroll a biometric feature for use in authorizing a secure operation at the computer system; in response to receiving the first request, in accordance with a determination that the first request satisfies a first set of one or more criteria, where the first set of one or more criteria includes a first criterion that is met when data about the biometric feature that is to be enrolled is detected via a biometric sensor that is integrated with the external device, displaying, via the display generation component, a first user interface object prompting a user to provide an authorization input to the computer system, via the one or more input devices physically connected to the computer system; while displaying the first user interface object, receiving, via the one or more input devices physically connected to the computer system, user input; and in response to receiving the user input, in accordance with a determination that the user input includes the authorization input, initiating a process to enroll the biometric feature using data about the biometric feature detected via the biometric sensor that is integrated with the external device.

In accordance with some embodiments, a computer system is described. The computer system comprises: a display generation component, one or more input devices physically connected to the computer system, means for, while the computer system is connected to an external device, receiving a first request to enroll a biometric feature for use in authorizing a secure operation at the computer system; means for, in response to receiving the first request, in accordance with a determination that the first request satisfies a first set of one or more criteria, where the first set of one or more criteria includes a first criterion that is met when data about the biometric feature that is to be enrolled is detected via a biometric sensor that is integrated with the external device, displaying, via the display generation component, a first user interface object prompting a user to provide an authorization input to the computer system, via the one or more input devices physically connected to the computer system; means for, while displaying the first user interface object, receiving, via the one or more input devices physically connected to the computer system, user input; and means for, in response to receiving the user input, in accordance with a determination that the user input includes the authorization input, initiating a process to enroll the biometric feature using data about the biometric feature detected via the biometric sensor that is integrated with the external device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for enrolling a biometric feature for use with a peripheral device, thereby increasing the security, effectiveness, efficiency, and user satisfaction with such devices. Such methods and interfaces may complement or replace other methods for enrolling a biometric feature for use with a peripheral device.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7C is a flow diagram illustrating a method enrolling a biometric feature for use with a peripheral device in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for enrolling a biometric feature for use with a peripheral device. For example, there is a need for efficient methods and interfaces for securely enrolling a biometric feature for use with a peripheral that ensure that a user enrolling the biometric feature for use with the peripheral is the same user associated with an electronic device connected to the peripheral. For another example, there is a need for efficient methods and interfaces that reduce an amount of user inputs required to enroll a biometric feature for use with the peripheral, while ensuring that the user enrolling the biometric feature is the same user associated with an electronic device connected to the peripheral. Such techniques can reduce the cognitive burden on a user who enrolls the biometric feature, thereby enhancing productivity. Further, such techniques can reduce processor and battery power otherwise wasted on redundant user inputs.

Figure 6A:
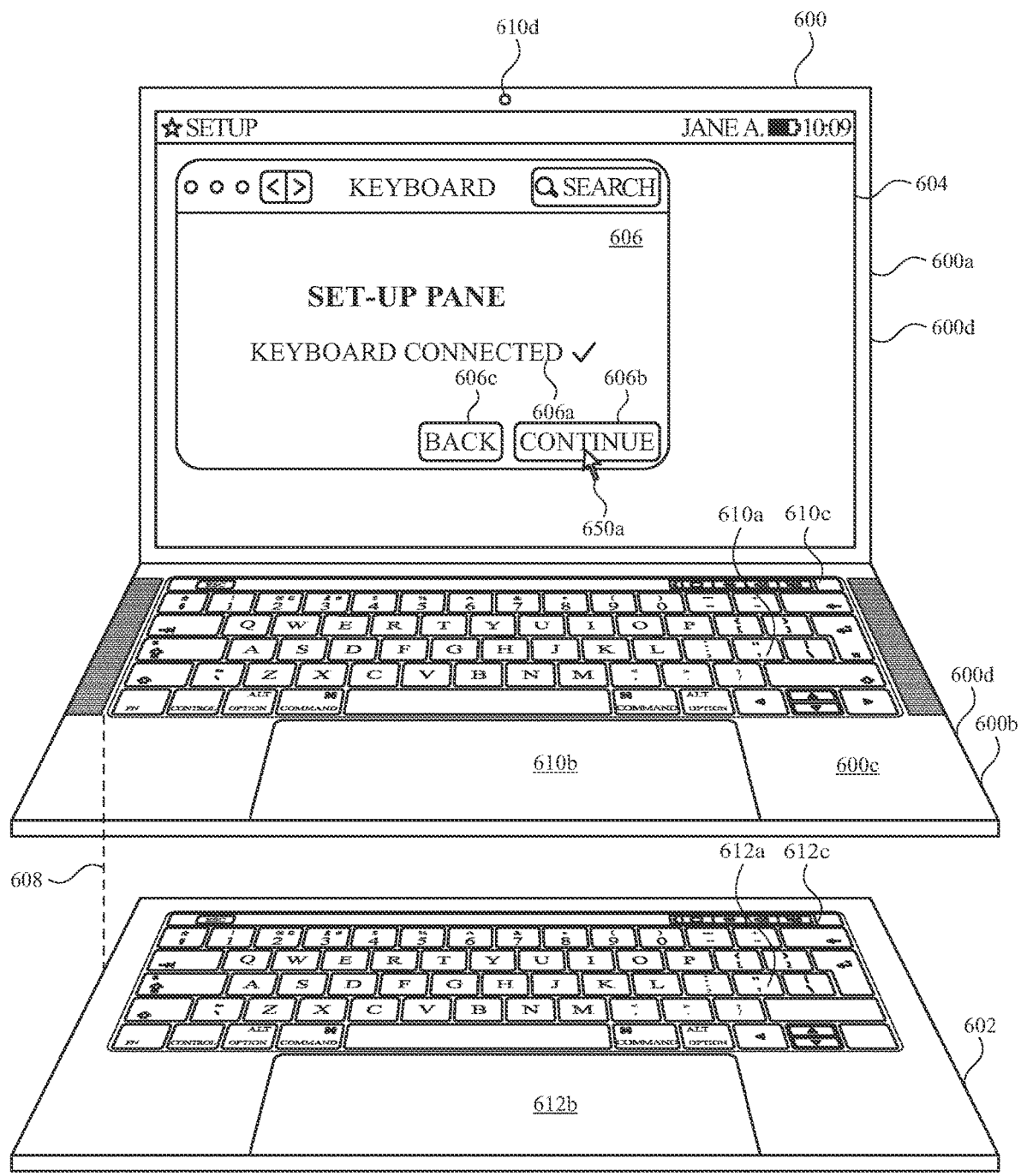
FIGS. 6A-6U illustrate exemplary user interfaces for enrolling a biometric feature for use with a peripheral device in accordance with some embodiments.
Figure 6U:
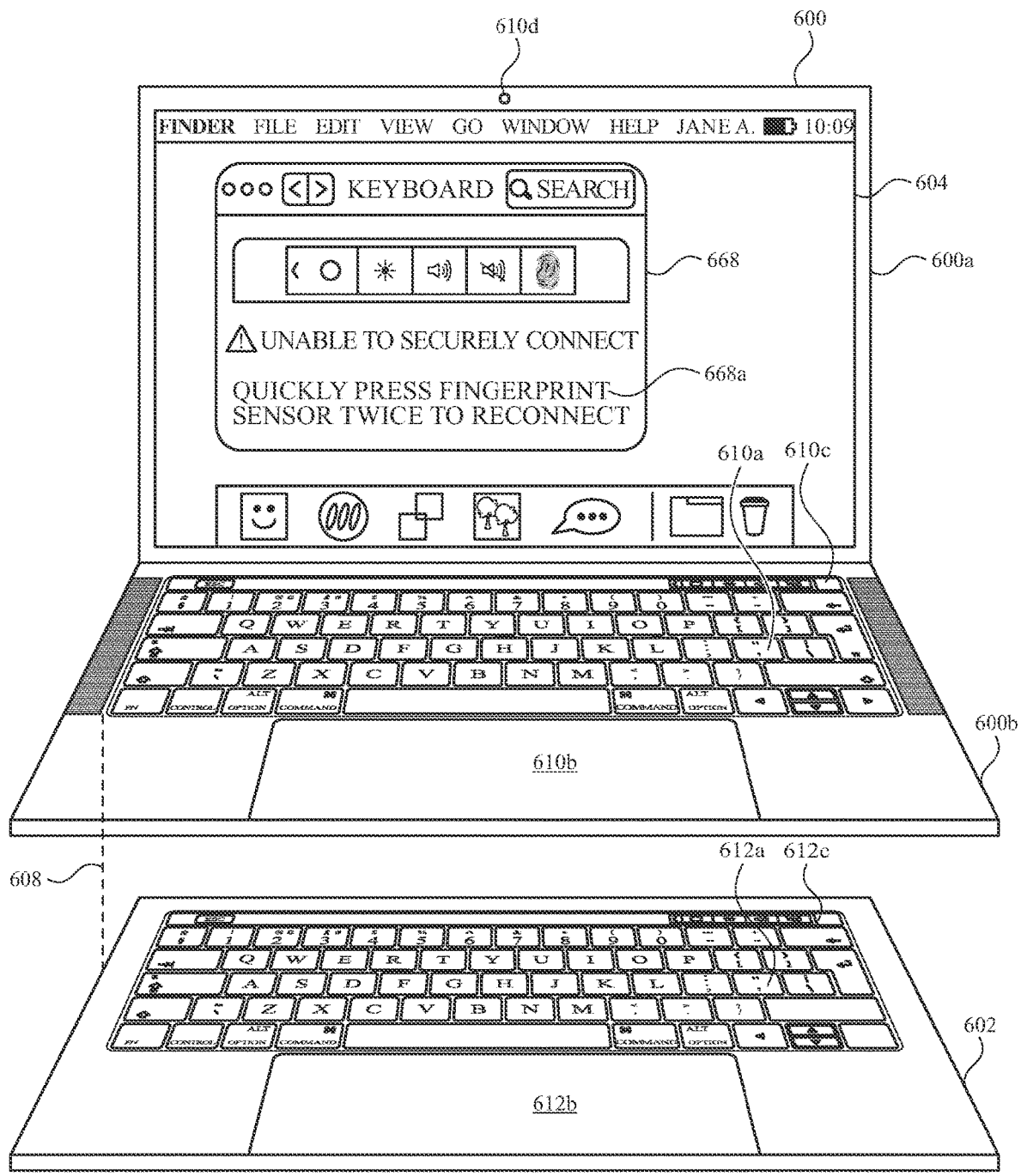
Figure 7B:
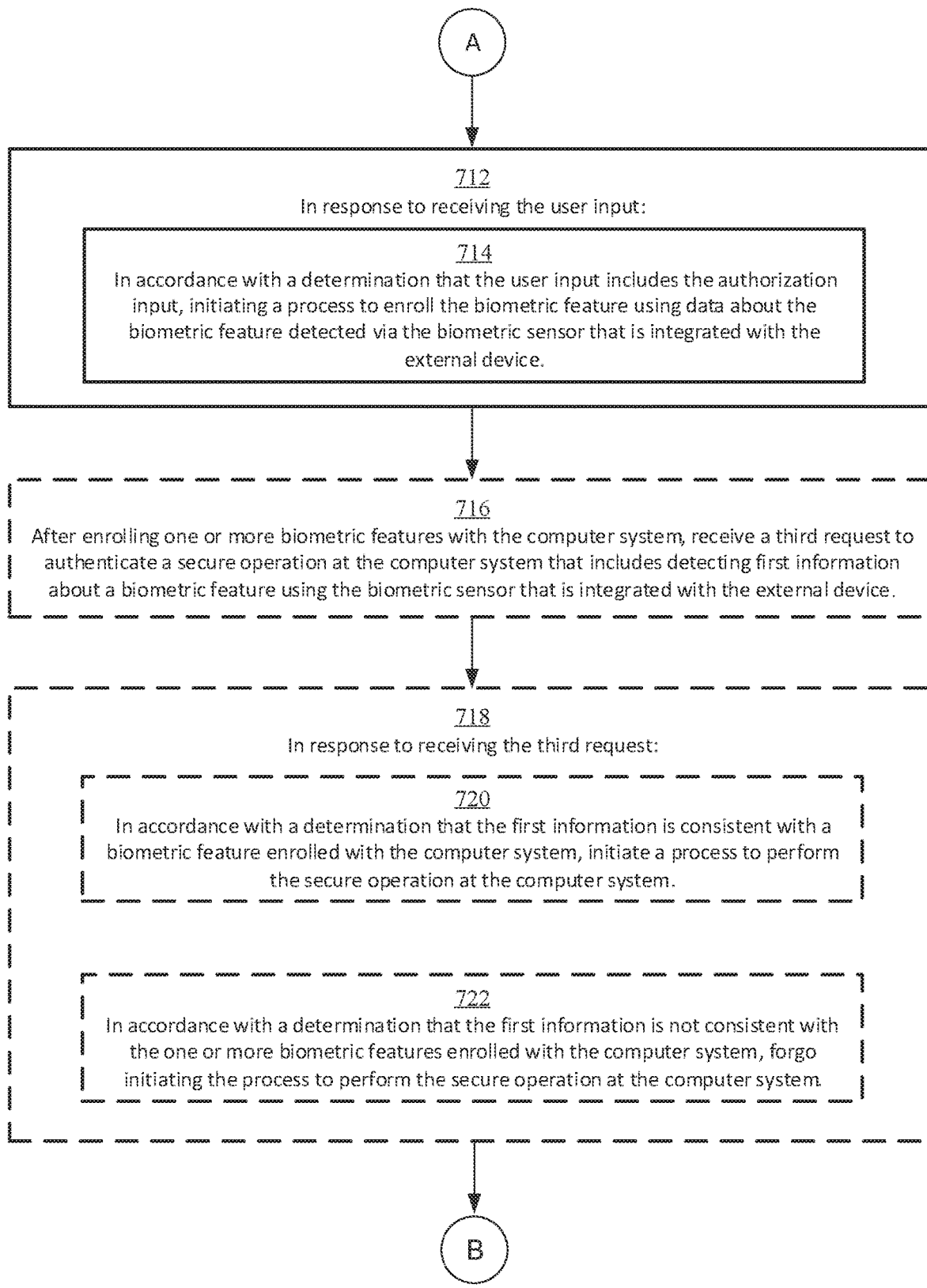
Figure 7C:
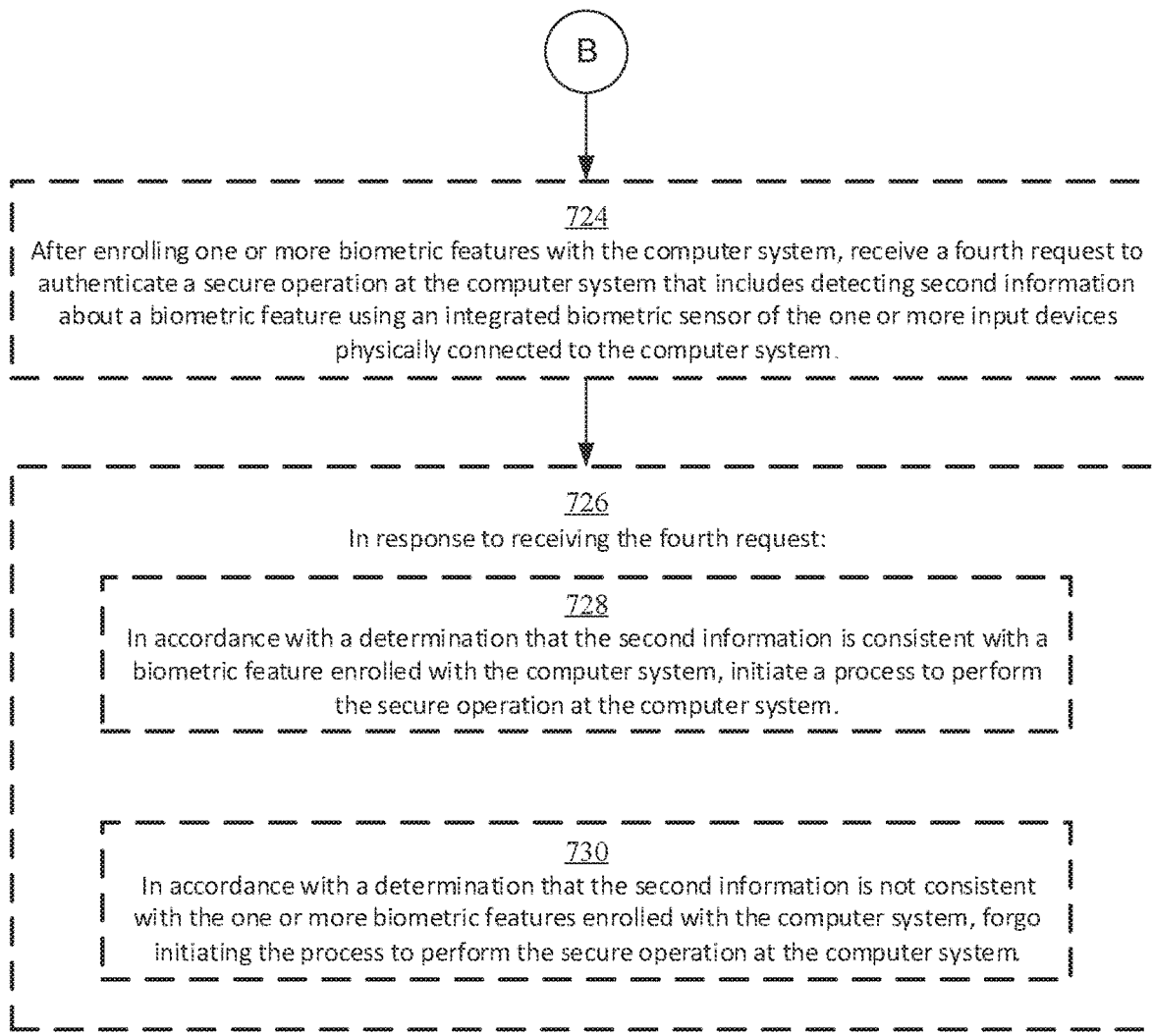

Below, FIGS. 1A-1B, 2, 3, 4A-4B, and 5A-5B provide a description of exemplary devices for performing the techniques for enrolling a biometric feature for use with a peripheral device. FIGS. 6A-6U illustrate exemplary user interfaces for enrolling a biometric feature for use with a peripheral device. FIGS. 7A-7C are a flow diagram illustrating methods of enrolling a biometric feature for use with a peripheral device in accordance with some embodiments. The user interfaces in FIGS. 6A-6U are used to illustrate the processes described below, including the processes in FIGS. 7A-7C.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
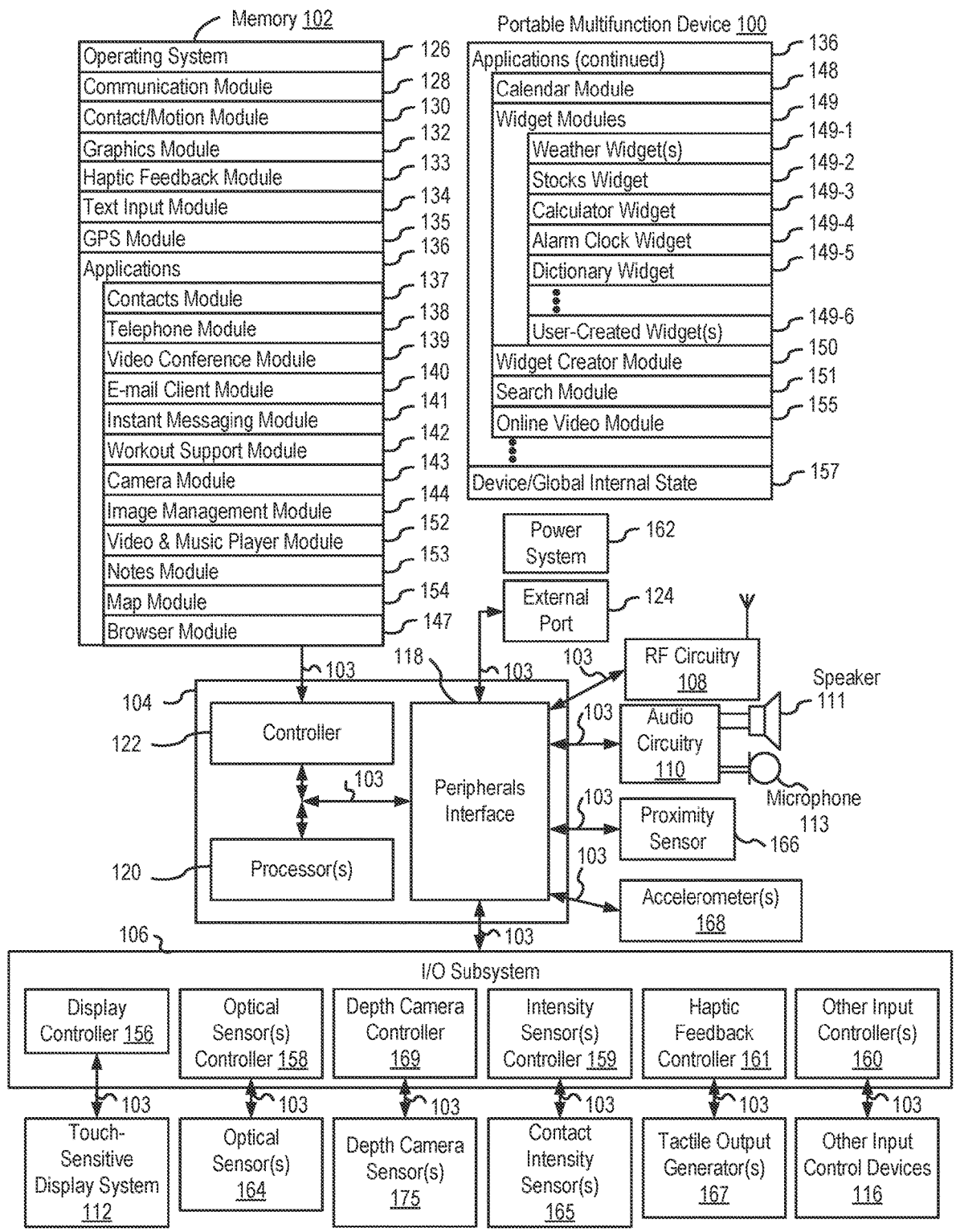
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
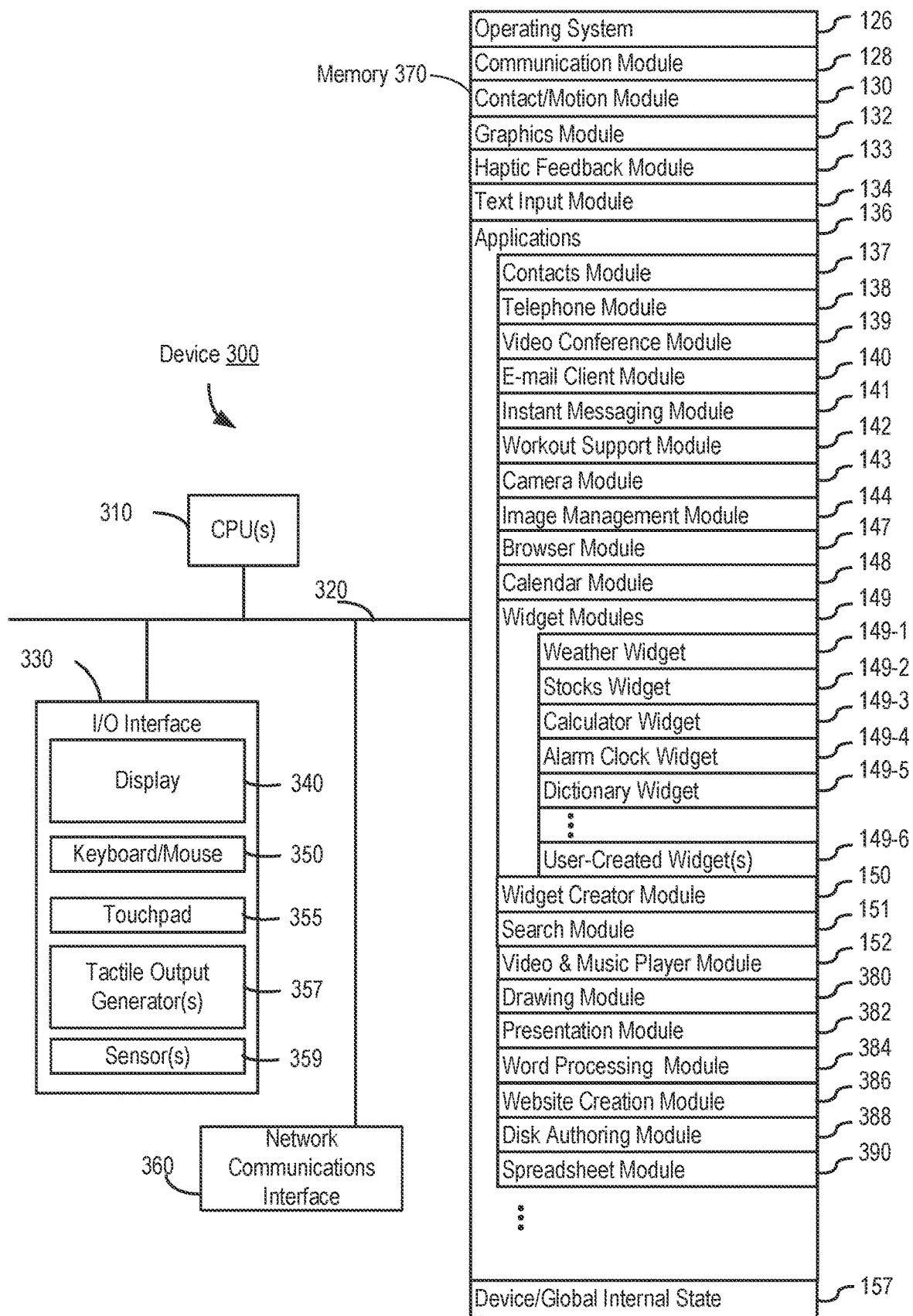
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music
player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
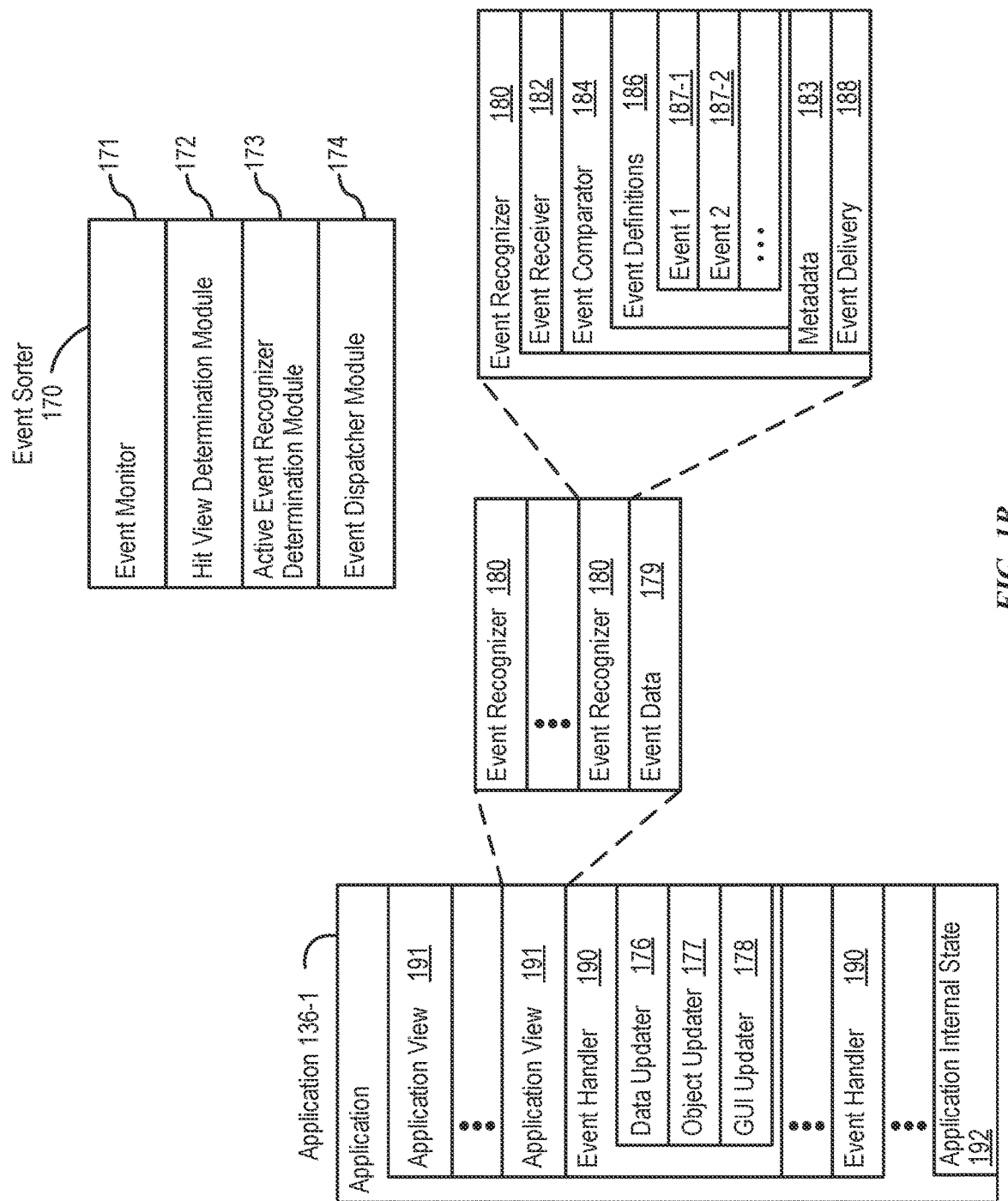
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
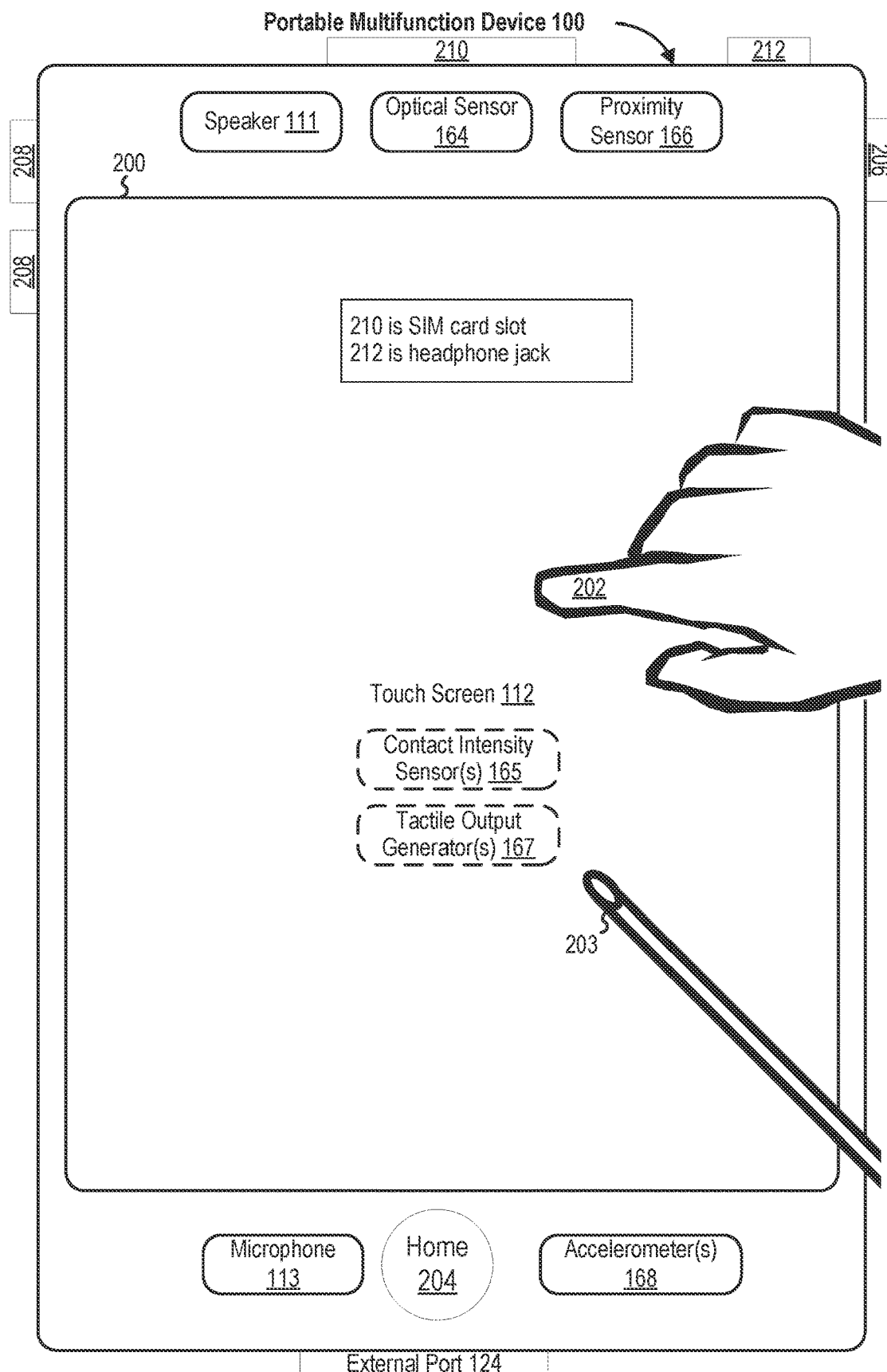
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
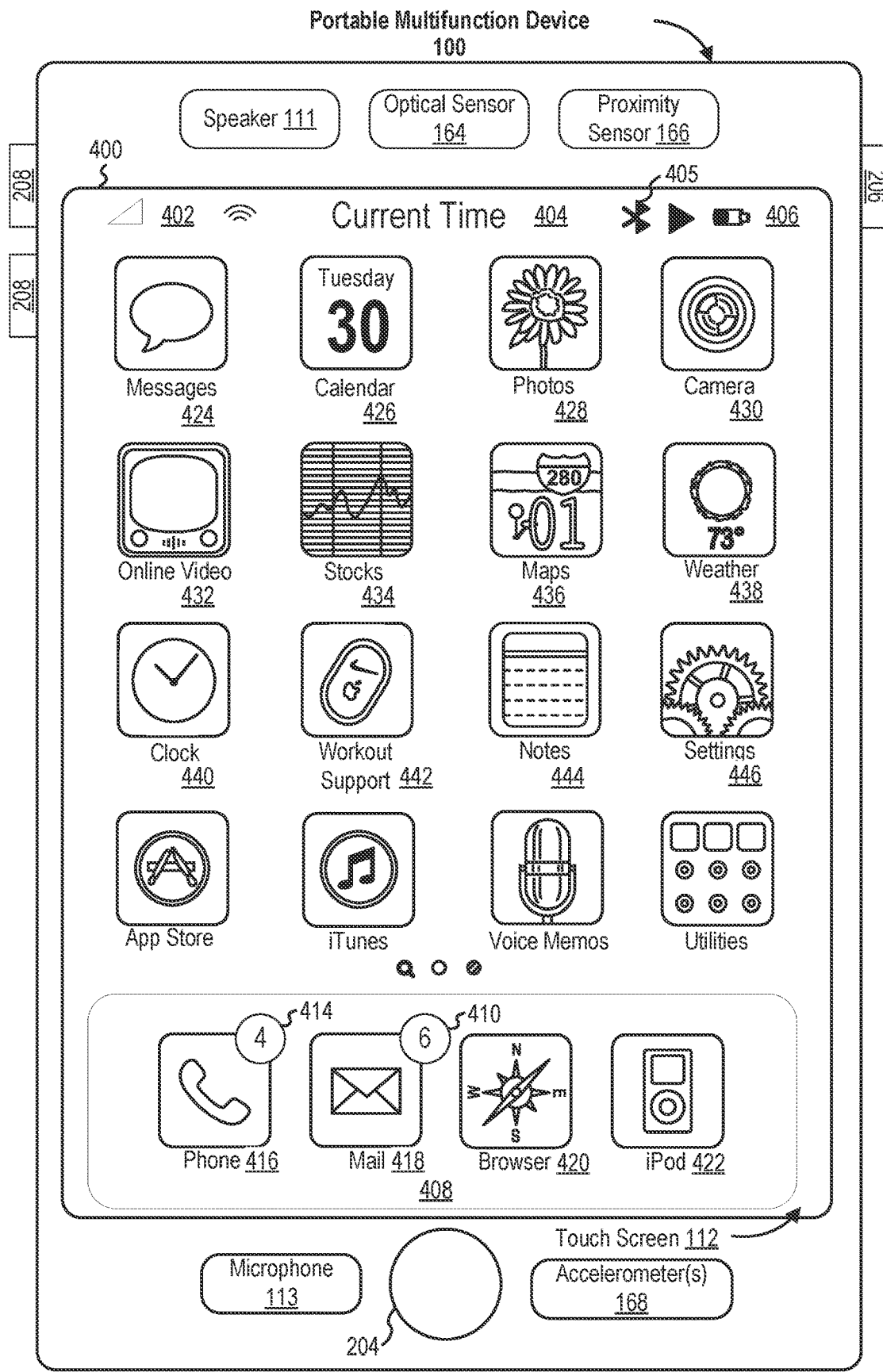
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
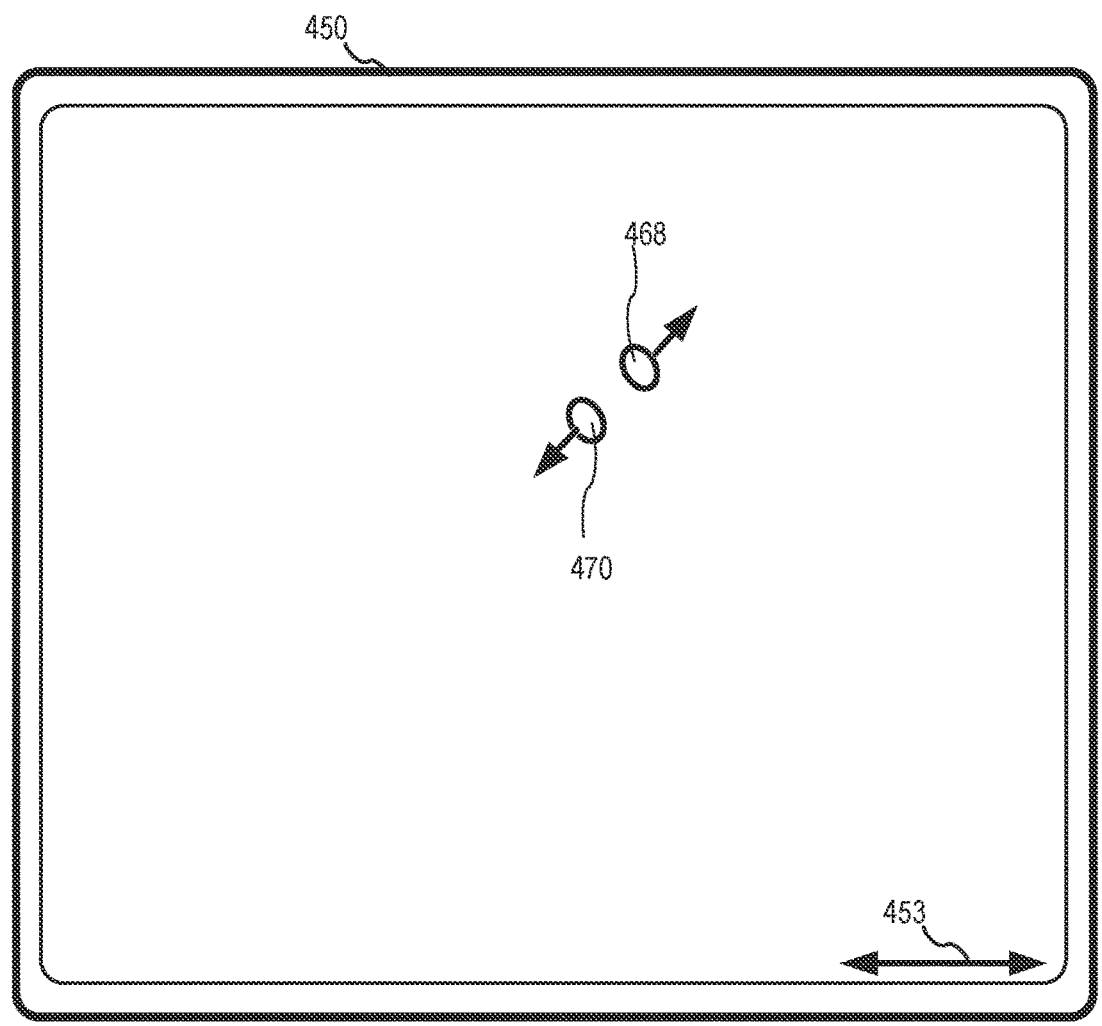
FIG. 4B illustrates an exemplary user interface for a multifunction device with a touch-sensitive surface that is separate from the display in accordance with some embodiments.
Figure 4B:
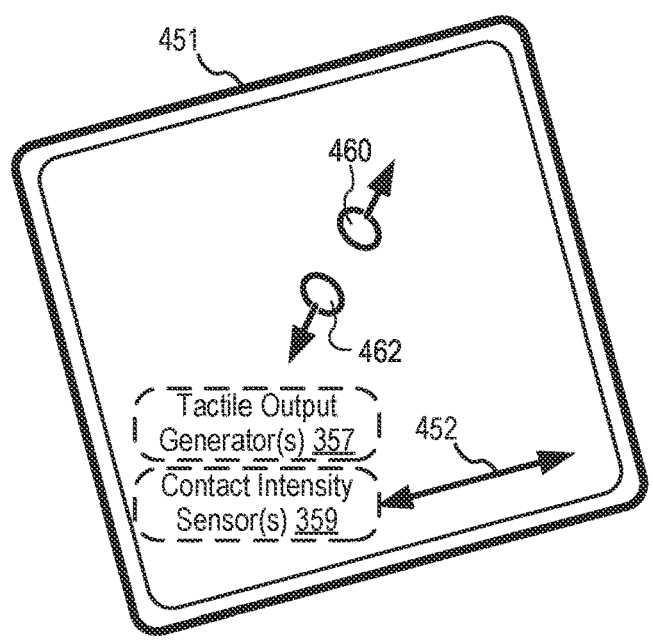

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
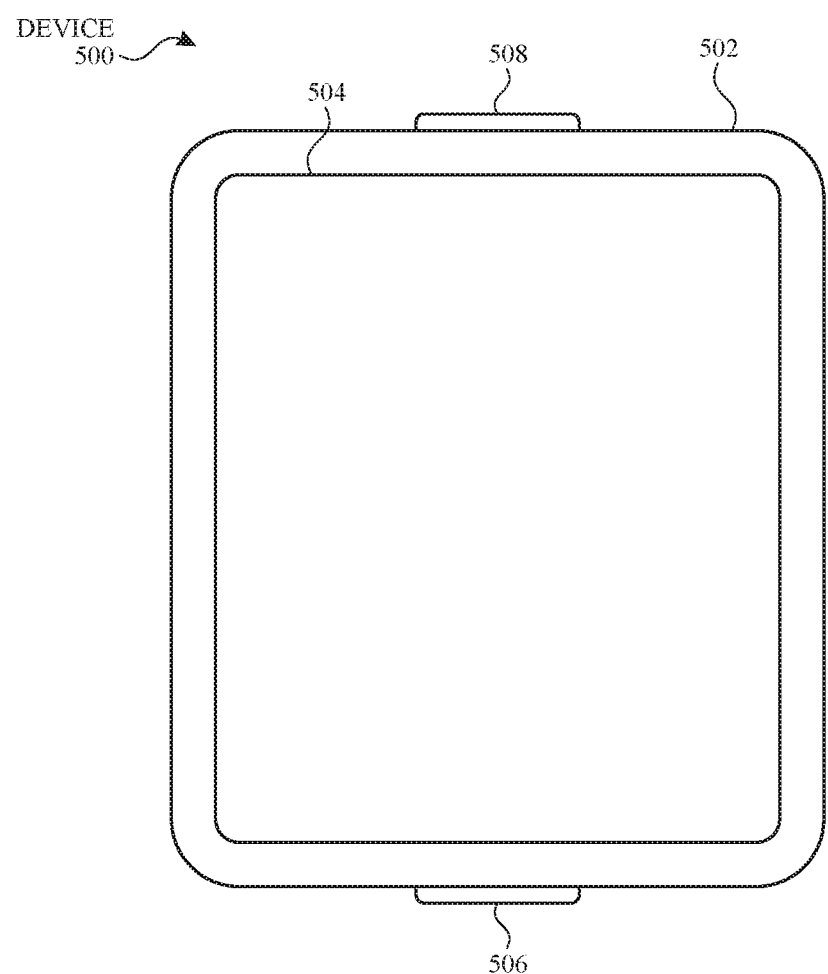
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
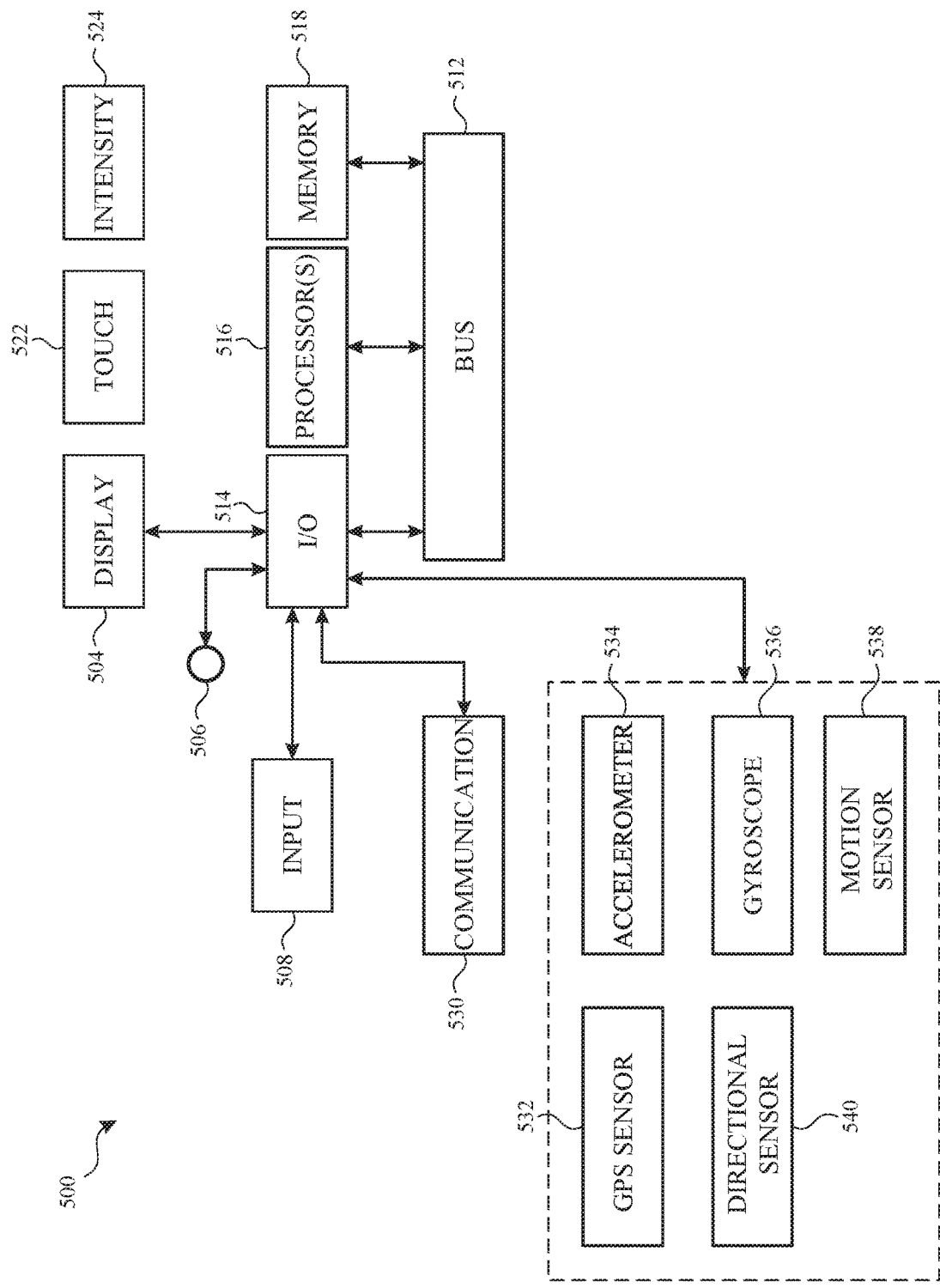
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, device 500, computer system 600, or computer system 654.

FIGS. 6A-6U illustrate exemplary user interfaces for enrolling a biometric feature for use with a peripheral device, in accordance with some embodiments. The user interfaces in these figures are used to illustrate the processes described below, including the processes in FIGS. 7A-7C.

FIG. 6A illustrates computer system 600 connected to peripheral device 602 (e.g., an external keyboard that is not integrated with computer system) and displaying, via display 604, setup user interface 606. At FIG. 6A, computer system 600 is wirelessly connected to peripheral device 602, as indicated by dashed line 608. When computer system 600 is connected to peripheral device 602 (e.g., wirelessly connected), computer system 600 is configured to detect user inputs at one or more input devices (e.g., keys of a keyboard) of peripheral device 602 and to perform corresponding operations based on the detected user inputs. As discussed in detail below, even when computer system 600 is connected to peripheral device 602, computer system 600 can prompt (e.g., require) a user to provide an authorization input (e.g., an input that confirms a user is in possession of both computer system 600 and peripheral device 602) before enabling peripheral device 602 to be used to authenticate a secure operation at computer system 600. While dashed line 608 is shown in FIG. 6A, it should be understood that dashed line 608 indicates a wireless communication (e.g., wireless transmission of data) between computer system 600 and peripheral device 602 and does not represent a physical device, a physical item, and/or an object displayed via display 604 (e.g., dashed line 608 does not represent a physical connection between computer system 600 and peripheral device 602, such as a wire establishing a wired connection). In some embodiments, the wireless connection between computer system 600 and peripheral device 602 includes a short-range communication technique (e.g., a Bluetooth connection). In some embodiments, the wireless connection between computer system 600 and peripheral device 602 includes a Wi-Fi connection, a Zigbee connection, and/or another suitable wireless connection.

At FIG. 6A, computer system 600 is a notebook computer system (e.g., a laptop computer) that includes first portion 600a having display 604 and second portion 600b having at least one input device of input devices 610 physically connected to computer system 610. First portion 600a and second portion 600b are connected to one another via a hinged connection (e.g., first portion 600a and/or second portion 600b are configured to at least partially rotate about an axis at a connection point between first portion 600a and second portion 600b). At FIG. 6A, computer system 600 is in an open position (e.g., first portion 600a and second portion 600b are positioned with respect to one another to form an angle that is between 30 degrees and 150 degrees, between 45 degrees and 135 degrees, or between 60 degrees and 120 degrees), such that input devices 610 are accessible by, and/or capable of interaction via, a user associated with computer system 600 and display 604 is visible. First portion 600a (and/or second portion 600b) can be manually adjusted to a second position (e.g., a closed position illustrated at FIG. 6G), such that first portion 600a covers surface 600c (e.g., a surface that enables access to and/or user interaction with input devices 610) of second portion 600b and second portion 600b covers display 604.

Input devices 610 of computer system 600 include keyboard 610a (e.g., a physical keyboard that includes depressible buttons), trackpad 610b (e.g., a touch-sensitive surface and/or component that detects finger contacts and/or movements of the finger contacts of a user), integrated biometric sensor 610c (e.g., a fingerprint sensor), and camera 610d. In some embodiments, integrated biometric sensor 610c includes a depressible button in addition to a biometric sensor (e.g., the biometric sensor includes a film and/or scanning device deposited on and/or within the depressible button). In some embodiments, integrated biometric sensor 610c is a power button of computer system 600 that is configured to cause computer system 600 to transition between an on state, an off state, and/or an idle state in response to detecting user input (e.g., powering down the computer system in response to detecting that the power button has been depressed for at least a threshold duration of time). At FIG. 6A, integrated biometric sensor 610c is included within housing 600d (e.g., at least partially disposed within housing 600d) of computer system 600 (e.g., second portion 600b of computer system 600). In other words, integrated biometric sensor 610c is physically connected to computer system 600 and is not intended to be removed during normal operation of computer system 600 and/or integrated biometric sensor 610c is part of computer system 600. In some embodiments, integrated biometric sensor 610c is physically connected, via a wired connection, to one or more processors included within housing 600d (e.g., completely disposed within housing 600d). In some embodiments, integrated biometric sensor 610c is configured to detect user inputs and/or cause computer system 600 to perform particular actions using an operating system software of computer system 600 (e.g., computer system 600 does not require software in addition to the operating system software to be installed in order for computer system 600 to detect user inputs directed at the integrated biometric sensor 610c).

In some embodiments, camera 610d is included within housing 600d (e.g., at least partially disposed within housing 600d) of computer system 600 (e.g., first portion 600a of computer system 600). In other words, camera 610d is physically connected to computer system 600, camera 610d is not intended to be removed during normal operation of computer system 600, and/or camera 610d is part of computer system 600. In some embodiments, camera 610d is physically connected, via a wired connection, to one or more processors included within housing 600d (e.g., completely disposed within housing 600d). In some embodiments, camera 610d is configured to capture one or more images in response to instructions of an operating system software of computer system 600 (e.g., computer system 600 does not require software in addition to the operating system software to be installed in order for camera 610d to capture images that include biometric features of a user for authenticating a secure operation at computer system 600).

In addition, peripheral device 602 includes input devices 612 that, when selected via user input, are configured to cause computer system 600 to perform various functions when peripheral device 602 is connected to computer system 600. Input devices 612 of peripheral device 602 include keyboard 612a (e.g., a physical keyboard that includes depressible buttons), trackpad 612b (e.g., a surface and/or component that detects finger contacts and/or movements of the finger contacts of a user), and biometric sensor 612c (e.g., a biometric sensor that is integrated with (e.g., disposed in a housing of) peripheral device 602). In some embodiments, peripheral device 602 further includes a camera and/or a microphone as input devices 612. In some embodiments, input devices 612 of peripheral device 602 cause computer system 600 to perform similar (or the same) functions as keyboard 610a, trackpad 610b, and integrated biometric sensor 610c of computer system (e.g., when peripheral device 602 is connected to computer system 600). For instance, integrated biometric sensor 610c and biometric sensor 612c are both configured to detect data about a biometric feature (e.g., a fingerprint) when a user places a body part (e.g., a finger) in proximity to, and/or in contact with, integrated biometric sensor 610c and biometric sensor 612c. In response to detecting the data about the biometric feature, computer system 600 receives the data (e.g., from integrated biometric sensor 610c and/or biometric sensor 612c) and compares the data to data about an enrolled biometric feature of computer system 600. When the data about the biometric feature corresponds to and/or matches data about the enrolled biometric feature of computer system 600, computer system 600 can perform a secure operation (e.g., an operation that requires authorization of a user associated with computer system 600). As set forth below, the secure operation can include completion of a transaction, a transition of computer system 600 between operating modes (e.g., a locked mode and an unlocked mode), and/or accessing secure documents, an account, and/or software of computer system 600.

At FIG. 6A, setup user interface 606 includes connection indicator 606a, continue user interface object 606b, and back user interface object 606c. While setup user interface 606 is displayed as a window that partially covers an area of display 604, in some embodiments, setup user interface 606 covers an entire area of display 604 (e.g., setup user interface 606 is displayed, via display 604, as a maximized window). In some embodiments, setup user interface 606 is one user interface that is included in a series of user interfaces during an initial setup process of computer system 600 (e.g., a setup process initiated by computer system 600 upon first powering on computer system 600, a setup process initiated by computer system 600 upon resetting one or more operating parameters of computer system 600, and/or a setup process initiated by computer system 600 upon adding and/or associating a new user account with computer system).

At FIG. 6A, setup user interface 606 corresponds to a keyboard connection step of the setup process. Connection indicator 606a includes a visual indication (e.g., a textual indication and/or a check mark) that peripheral device 602 has successfully been connected to computer system 600. In some embodiments, a previous step of the setup process prompts the user associated with computer system 600 to initiate the connection between peripheral device 602 and computer system 600 (e.g., the user is prompted to provide user input to an input device of input devices 610 and/or an input device of input devices 612 to initiate the connection between peripheral device 602 and computer system 600). In some embodiments, in response to detecting that a connection has been established between peripheral device 602 and computer system 600, computer system 600 displays, via display 604, setup user interface 606.

At FIG. 6A, computer system 600 detects user input 650a (e.g., a mouse click, a tap and/or press gesture on trackpad 610b and/or trackpad 612b, a tap gesture on display 604 (such as when display 604 is a touch-sensitive display), and/or a press gesture on a particular key (e.g., an "Enter" and/or "Return" key) of keyboard 610a and/or keyboard 612a). In response to detecting user input 650a, computer system 600 displays, via display 604, enrollment user interface 614 (e.g., biometric feature enrollment user interface), as shown at FIGS. 6B and 6C.

In some embodiments, computer system 600 displays enrollment user interface 614 in accordance with a determination that computer system 600 does not include data associated with an enrolled biometric feature. In other words, computer system 600 displays enrollment user interface 614, which prompts a user to enroll a biometric feature, when computer system 600 does not include an enrolled biometric feature. An enrolled biometric feature optionally includes data about a biometric feature (e.g., a fingerprint, one or more facial features and/or characteristics, one or more iris features and/or characteristics, and/or speech characteristics of the user associated with the computer system) that is stored in memory of computer system 600 (e.g., and/or memory accessible by computer system 600). Computer system 600 utilizes the stored data about the enrolled biometric feature to make a determination as to whether data about a detected biometric feature (e.g., data detected via integrated biometric sensor 610*c* and/or biometric sensor 612*c*) matches (e.g., completely matches, partially matches, and/or a threshold amount of data matches) the stored data about the enrolled biometric feature.

When computer system 600 determines that the data about the detected biometric feature matches the stored data about the enrolled biometric feature, computer system 600 is configured to authorize a secure operation (e.g., completing of a transaction, transitioning computer system 600 between one or more modes of operation (e.g., a locked mode, an idle mode, a normal operating mode, and/or an unlocked mode), initiating downloading software, and/or providing access to a document and/or application) to be performed at computer system 600. When computer system 600 determines that the data about the detected biometric feature does not match the stored data about the enrolled biometric feature, computer system 600 does not authorize the secure operation at computer system 600 (and, instead, computer system 600 optionally displays, via display 604, an error user interface, a rejection user interface, and/or a user interface prompting the user to provide and/or re-provide a user input that includes data associated with a biometric feature (e.g., a finger contact on integrated biometric sensor 610*c* and/or biometric sensor 612*c*)).

Figure 6B:
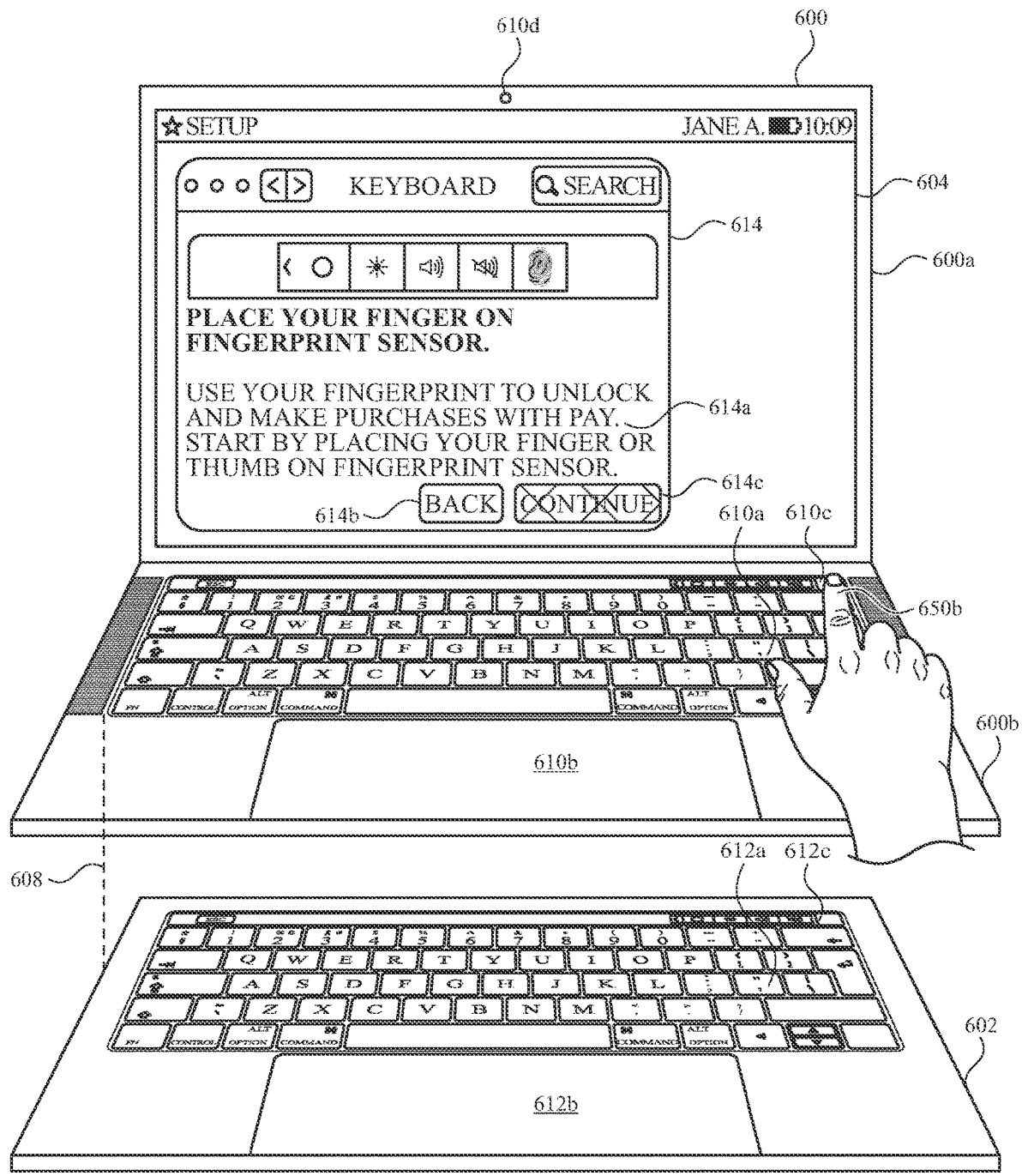
Figure 6C:
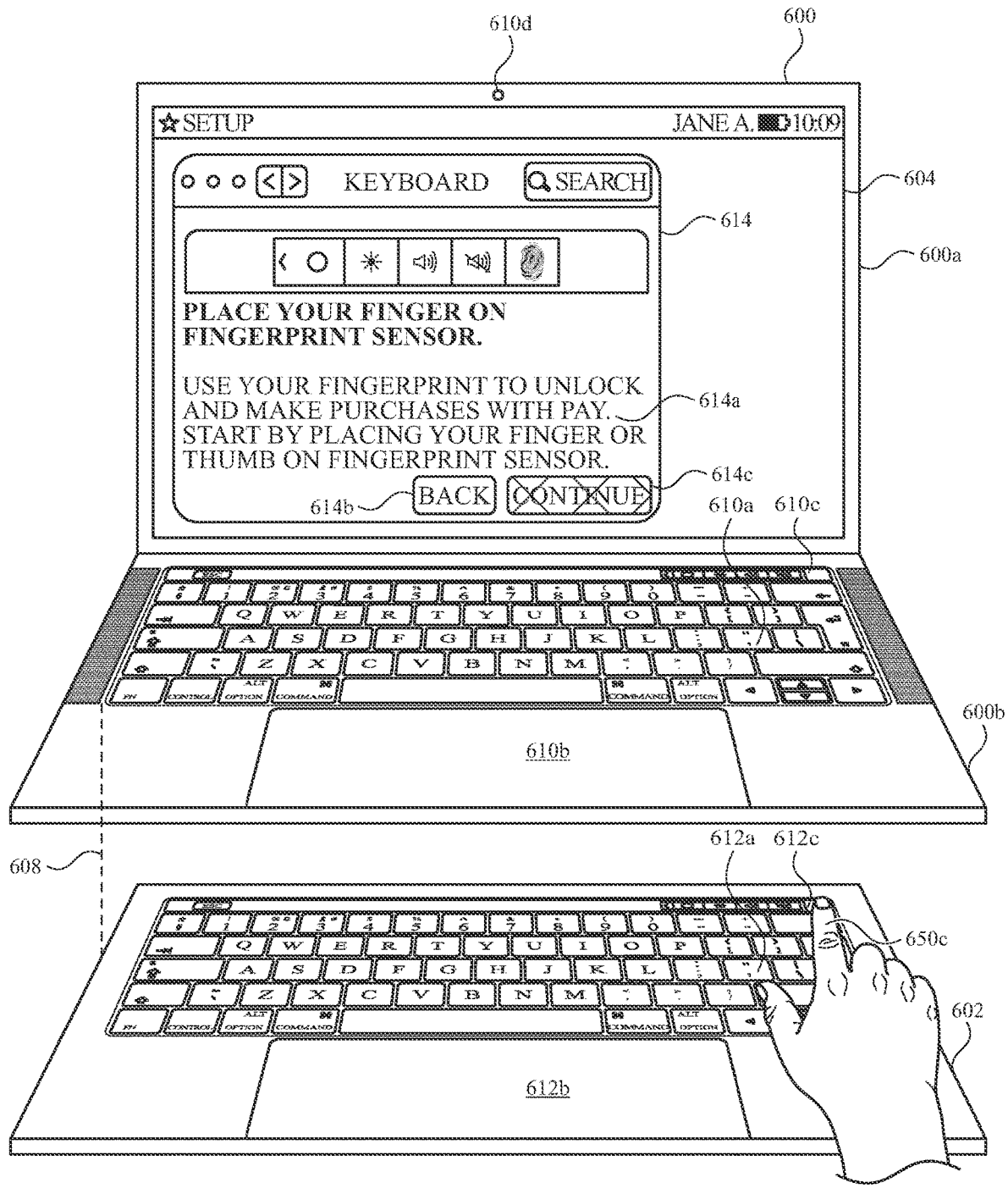

At FIGS. 6B and 6C, enrollment user interface 614 includes visual indicator 614*a* (e.g., textual indication) prompting a user to provide a user input (e.g., a finger contact) on integrated biometric sensor 610*c* and/or biometric sensor 612*c*, back user interface object 614*b*, and continue user interface object 614*c*. As shown at FIGS. 6B and 6C, continue user interface object 614*c* includes an appearance (e.g., a greyed coloring and/or dimmed brightness level) that is different from an appearance of back user interface object 614*b* (e.g., a non-grey coloring and/or a normal brightness level). As such, computer system 600 indicates that to proceed with the setup process, the user should provide the user input prompted by visual indicator 614*a* (e.g., user cannot select continue user interface object 614*c* before providing the user input prompted by visual indicator 614*a*). In some embodiments, enrollment user interface 614 also includes a skip user interface object that enables a user to skip (e.g., bypass and/or not complete) a sub-process for enrolling a biometric feature and continue with the setup process. In such embodiments, a user can enroll a biometric feature at a later time by accessing a settings user interface of computer system 600.

At FIG. 6B, computer system 600 detects user input 650*b* (e.g., a finger contact) on integrated biometric sensor 610*c* of computer system 600. In response to detecting user input 650*b*, computer system 600 receives data about a biometric feature (e.g., a fingerprint) from user input 650*b*. In some embodiments, integrated biometric sensor 610*c* is a capacitive sensor that collects data about the biometric feature using one or more capacitor circuits. In some embodiments, integrated biometric sensor 610*c* is an optical sensor and collects data about the biometric feature using a camera and/or light emissions. In response to receiving data about the biometric feature, computer system 600 displays acquisition user interface 618, as shown at FIG. 6E.

At FIG. 6C, computer system 600 displays enrollment user interface 614 and detects user input 650*c* (e.g., a finger contact) on biometric sensor 612*c* of peripheral device 602. Similar to FIG. 6B, in response to detecting user input 650*c*, computer system 600 receives data about a biometric feature (e.g., a fingerprint) from user input 650*c*. In contrast to FIG. 6B, computer system 600 displays verification user interface 616, at FIG. 6D, in response to receiving data about the biometric feature from user input 650*c* and/or based on a determination that user input 650*c* was detected at biometric sensor 612*c* of peripheral device 602. Because peripheral device 602 is a separate component from, and/or not integrated with, computer system 600, computer system 600 displays verification user interface 616 to confirm that a user in possession of peripheral device is the same user in possession of computer system 600. Thus, by displaying verification user interface 616, computer system 600 includes enhanced security by preventing and/or blocking a user that is not in possession of computer system 600 from enrolling a biometric feature that can be used to authorize secure operations at computer system 600.

Figure 6D:
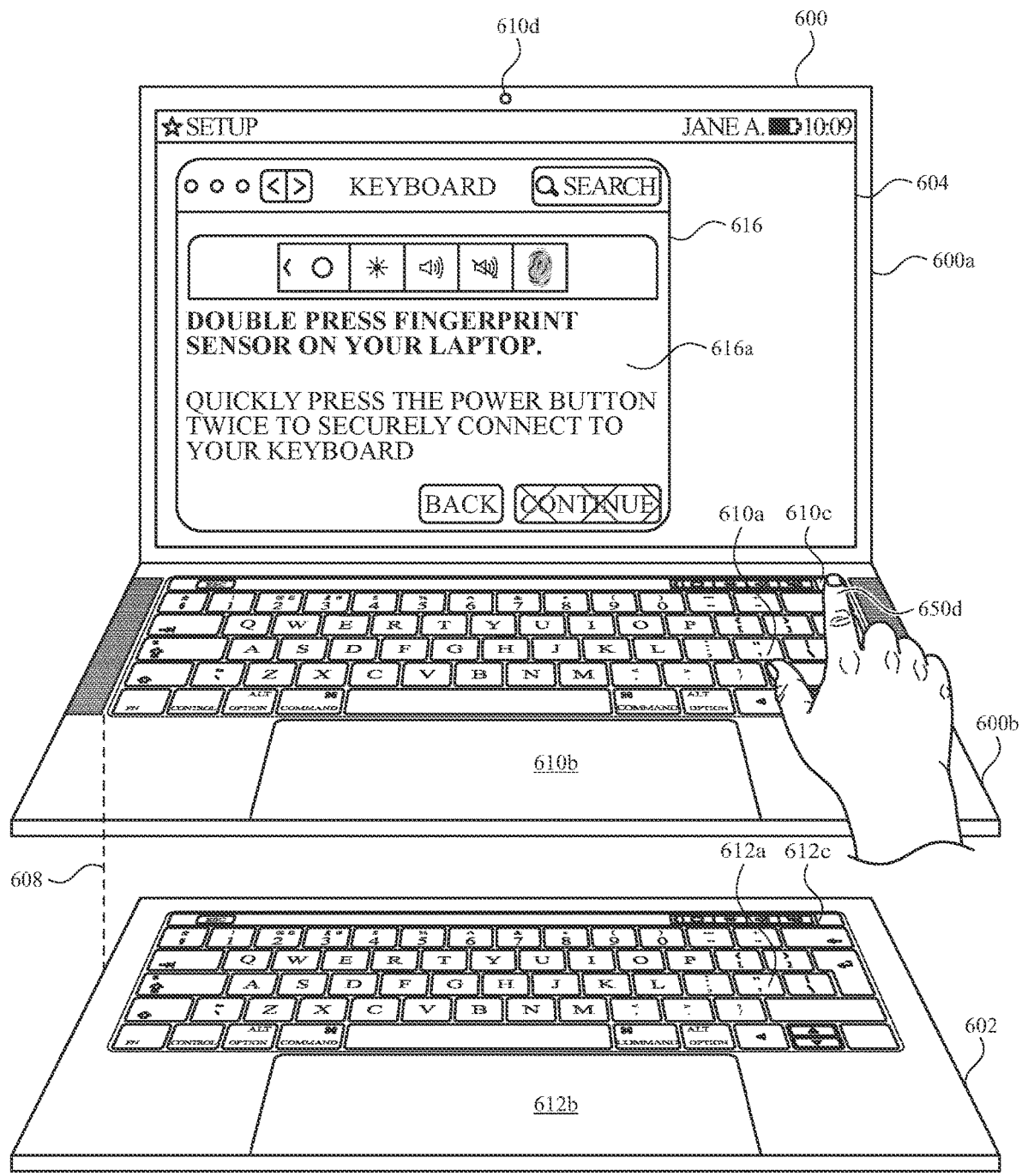
Figure 6E:
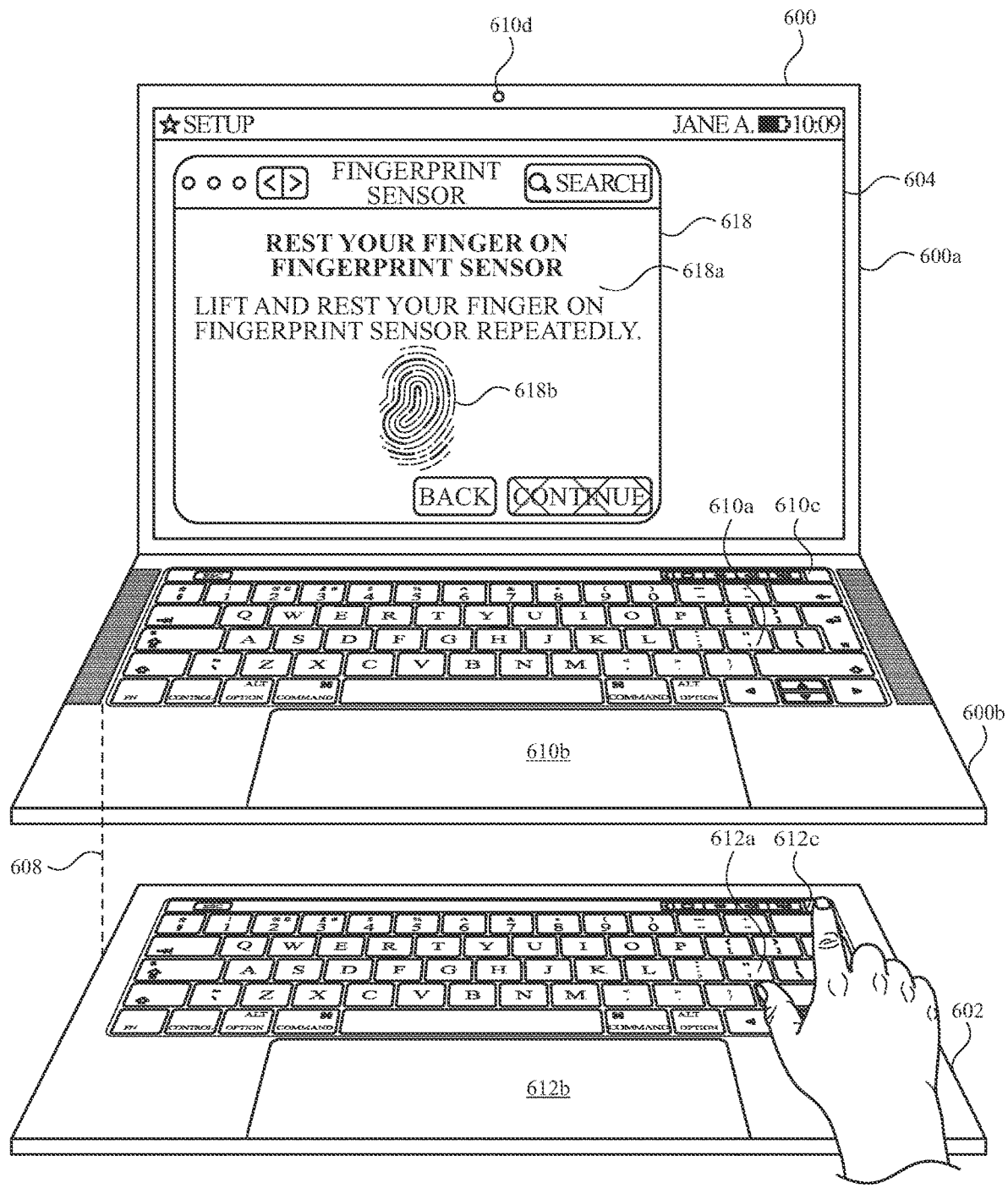

For instance, at FIG. 6D, verification user interface 616 includes visual indicator 616*a* (e.g., textual indications) prompting a user to provide an authorization input (e.g., an authorization user input) corresponding to an input device of input devices 610 of computer system 600. Because input devices 610 are integrated with (e.g., physically connected to and/or a part of) computer system 600, detecting an input at an input device of input devices 610 of computer system 600 ensures that the user enrolling the biometric feature using biometric sensor 612*c* of peripheral device is also in possession of (e.g., and/or in close proximity to) computer system 600. At FIG. 6D, visual indicator 616*a* prompts a user to perform the authorization input by double pressing integrated biometric sensor 610*c*. As set forth above, integrated biometric sensor 610*c* can also be a power button of computer system 600.

In some embodiments, visual indicator 616*a* optionally prompts the user to perform the authorization input via a single press of integrated biometric sensor 610*c*, a single press and/or a double press of a button of keyboard 610*b*, a tap gesture and/or press gesture on trackpad 610*b*, and/or another user input on one of input devices 610 that are part of and/or physically connected to computer system 600.

At FIG. 6D, computer system 600 detects user input 650*d*, which includes the authorization input prompted via verification user interface 616 (e.g., a double press of integrated biometric sensor 616*c*). In response to detecting user input 650*d* and based on a determination that user input 650*d* includes the authorization input, computer system 600 displays acquisition user interface 618, as shown at FIG. 6E.

At FIG. 6E, computer system 600 displays acquisition user interface 618, which enables a user to complete the enrollment process of the biometric feature that is detected via integrated biometric sensor 610*c* (e.g., from user input 650*b*) and/or biometric sensor 612*c* (e.g., from user input 650*c*). Acquisition user interface 618 includes visual indicator 618*a* (e.g., textual indications) providing instructions to the user associated with computer system to perform one or more user inputs and/or actions to complete enrollment of the biometric feature. At FIG. 6E, visual indicator 618*a* indicates that a user should rest their finger on integrated biometric sensor 610*c* and/or biometric sensor 612*c*. Further, visual indicator 618*a* instructs the user to lift and re-position (e.g., rest) their finger on integrated biometric sensor 610*c* and/or biometric sensor 612*c*. In some embodiments, enrollment indicator 618*b* of acquisition user interface 618 is updated in response to integrated biometric sensor 610*c* and/or biometric sensor 612*c* detecting one or more finger contacts of the user (e.g., a sequence of finger contacts (e.g., a user resting their finger) separated by lift-offs of the finger contacts). For example, enrollment indicator 618b can emphasize (e.g., change a color, thickness, size, and/or brightness of) one or more portions of enrollment indicator 618b (e.g., represented as grooves and/or ridges of a fingerprint) in response to a finger contact detected by integrated biometric sensor 610c and/or biometric sensor 612c. Updating enrollment indicator 618b provides an indication of a progress toward completion of the enrollment process (e.g., indicates how many additional finger contacts a user should provide in order to complete enrollment of their fingerprint).

Figure 6F:
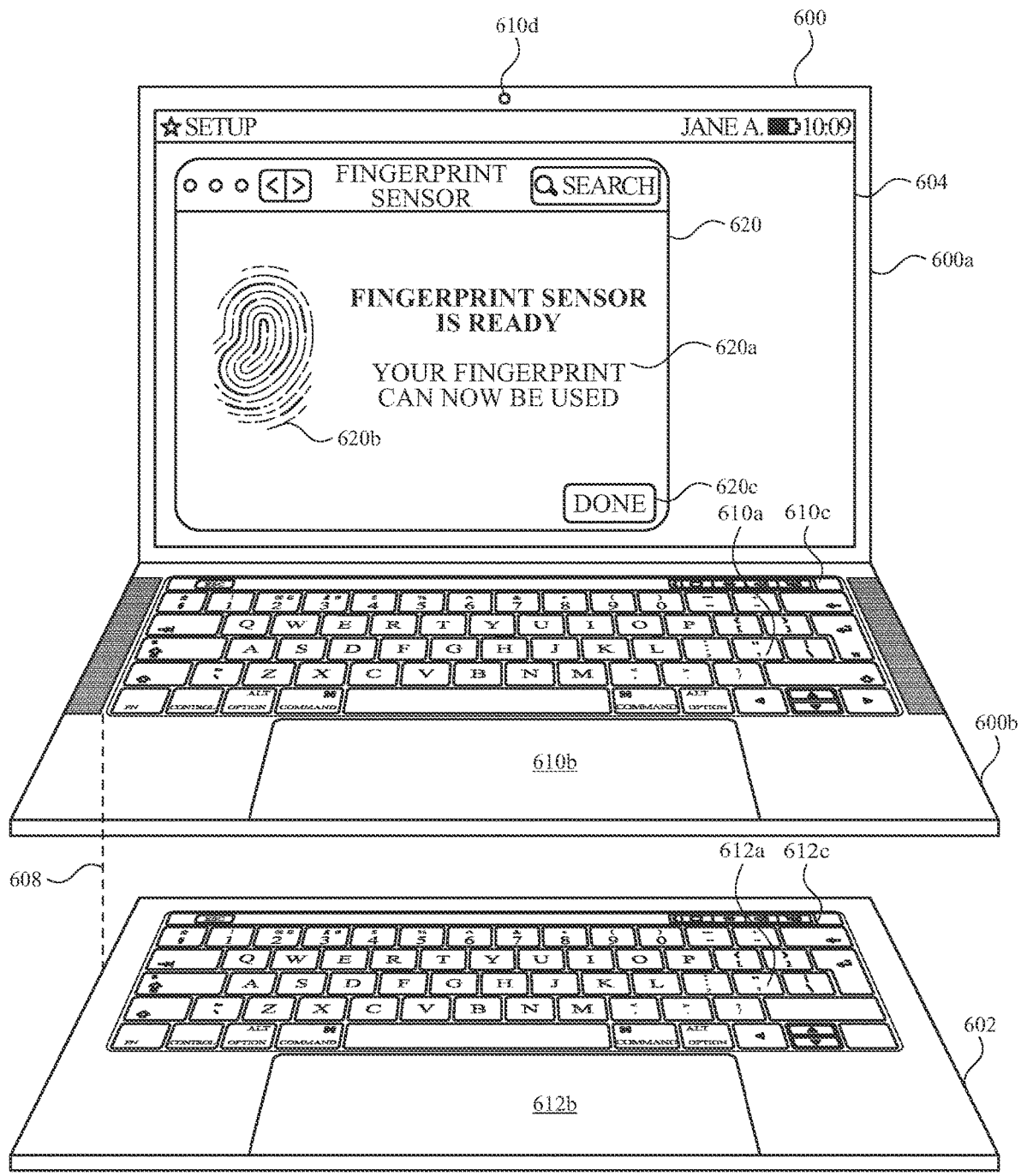

In response to detecting that the biometric feature of the user has been completed (e.g., a sufficient number of finger contacts separated by finger lift-offs have been detected by integrated biometric feature 610c and/or biometric sensor 612c to identify a fingerprint of the user), computer system 600 displays confirmation user interface 620, as shown at FIG. 6F. At FIG. 6F, confirmation user interface 620 includes visual indicator 620a (e.g., textual indication) indicating that the biometric feature has been successfully enrolled, visual indicator 620b (e.g., a graphic and/or image) indicating a type of biometric feature enrolled (e.g., fingerprint), and done user interface object 620c. Visual indicator 620a and visual indicator 620b provide confirmation to the user that the biometric feature has been successfully enrolled and that the user may utilize the biometric feature (e.g., the fingerprint of the user) to authorize computer system 600 to perform a secure operation. In some embodiments, in response to detecting user input corresponding to done user interface object 620c, computer system 600 continues the setup process and displays an additional user interface corresponding to the next step of the setup process. In some embodiments, in response to detecting user input corresponding to done user interface object 620c, computer system 600 displays a home screen user interface and/or a desktop user interface corresponding to a normal operating mode of computer system (e.g., an unlocked mode).

While, FIGS. 6B-6F illustrate enrolling a fingerprint as the biometric feature, in some embodiments, the enrolled biometric feature may be a face (e.g., one or more facial features and/or characteristics), eyes (e.g., one or more features and/or characteristics of an iris), and/or speech (e.g., one or more characteristics of a voice) of a user. Accordingly, in some embodiments, computer system 600 detects and/or receives data about a biometric feature via camera 610d (and/or a camera of peripheral device 602) and/or a microphone of computer system 600 (and/or a microphone of peripheral device 602). In such embodiments, enrollment user interface 614 can include one or more indicators prompting a user to position their face and/or eyes within a particular field of view of camera 610d and/or to speak one or more words (e.g., to be detected via a microphone of computer system). As such, it should be understood that the present disclosure is not limited to enrolling a fingerprint and subsequently using the fingerprint to authorize secure operations at computer system 600.

As set forth above, computer system 600 includes first portion 600a and second portion 600b, which can be rotated with respect to one another to place computer system 600 in a closed position. At FIG. 6G, computer system 600 is in the closed position and connected to external display 622 (as represented by dashed line 624), as well as connected to peripheral device 602 (as represented by dashed line 608). When connected to external display 622, computer system 600 is configured to display user interfaces and/or user interface objects associated with instructions stored in memory of computer system on external display 622. At FIG. 6G, computer system 600 and external display 622 are connected to one another via a wireless connection, as indicated by dashed line 624. In some embodiments, the wireless connection between computer system 600 and external display 622 is a short-range communication (e.g., a Bluetooth connection). In some embodiments, the wireless connection between computer system 600 and external display 622 is a Zigbee and/or Wi-Fi connection. In some embodiments, computer system 600 and external display 622 are connected to one another via a wired connection. In some embodiments, computer system 600 is connected to external display 622 via a docking device (e.g., a physical component that is configured to establish communication (e.g., transfer of data) between computer system and external display 622).

In some embodiments, computer system 600 is connected to external display 622 and connected to peripheral device 602 during the initial setup process and/or when computer system 600 does not include an enrolled biometric feature (e.g., computer system 600 does not store and/or have access to stored data about an enrolled biometric feature; the user has not completed the enrollment process for a biometric feature, such as the process described above with reference to FIG. 6B, FIG. 6E, and/or FIG. 6F). In some embodiments, computer system 600 is connected to external display 622 and connected to peripheral device 602 after completing the initial setup process and/or when computer system 600 includes an enrolled biometric feature (e.g., computer system stores and/or has access to stored data about an enrolled biometric feature; the user has completed the enrollment process for a biometric feature, such as the process described above with reference to FIG. 6B, FIG. 6E, and/or FIG. 6F).

Figure 6G:
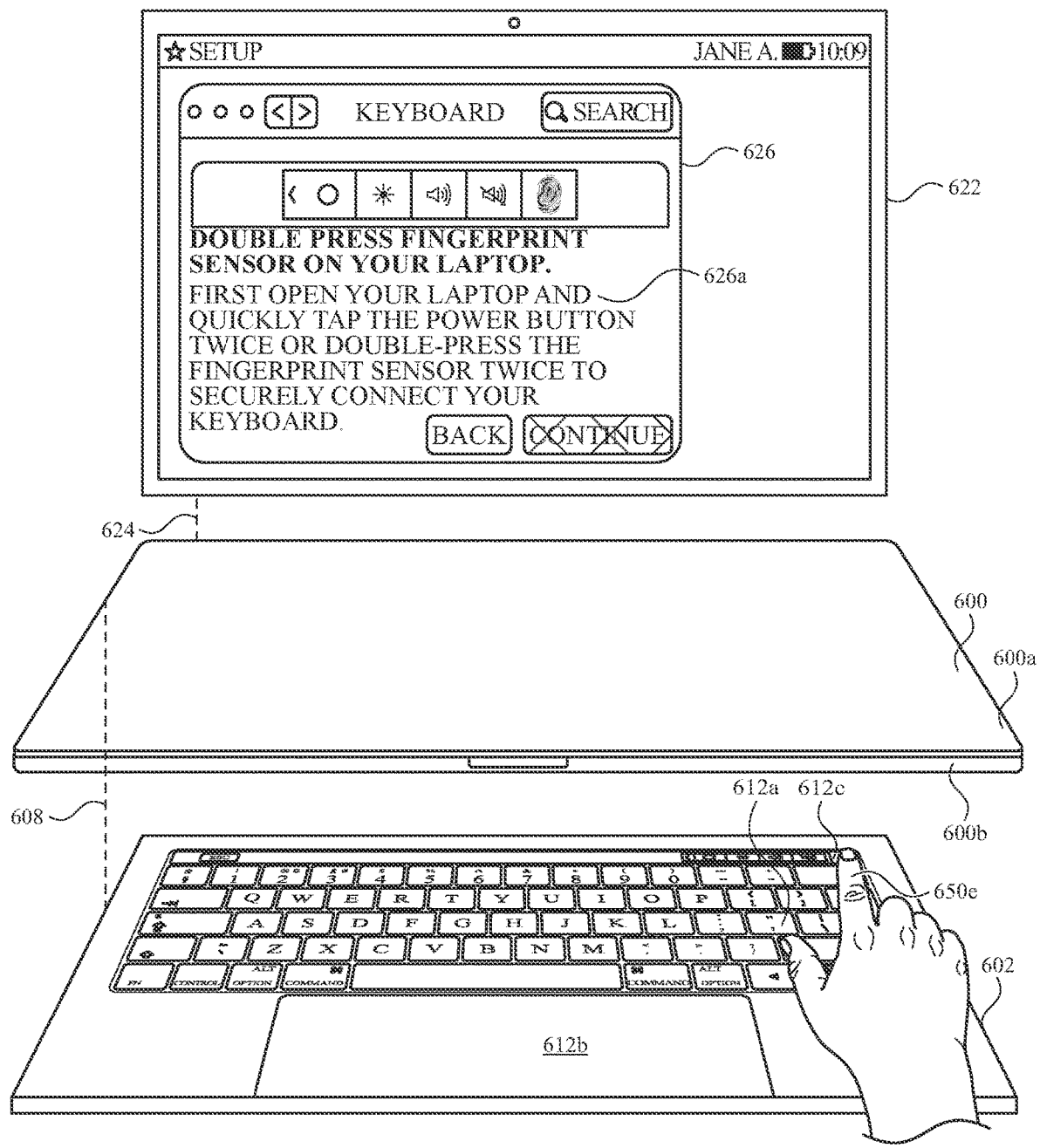

At FIG. 6G, computer system detects user input 650e (e.g., a finger contact) on biometric sensor 612c of peripheral device 602. In response to detecting user input 650e, computer system 600 determines whether computer system 600 includes an enrolled biometric feature. At FIG. 6G, computer system 600 determines that computer system 600 does not include an enrolled biometric feature and/or that data about a biometric feature received from user input 650e (e.g., detected by biometric sensor 612c) does not correspond to (e.g., match) data about the enrolled biometric feature. Based on the determination that computer system 600 does not include an enrolled biometric feature and/or that the data about the biometric feature received from user input 650e (e.g., detected by biometric sensor 612c) does not correspond to data about the enrolled biometric feature, computer system 600 displays, via external display 622, verification user interface 626.

At FIG. 6G, because computer system 600 is in the closed position (e.g., first portion 600a of computer system 600 covers and/or blocks access to integrated biometric sensor 610c), verification user interface 626 includes visual indicator 626a (e.g., textual indicator) prompting a user to adjust a position of computer system 600 (e.g., adjust a position of first portion 600a and/or second portion 600b with respect to one another) to the open position (e.g., the position of computer system 600 in FIGS. 6A-6F; a position of computer system 600 where first portion 600a does not cover and/or block access to integrated biometric sensor 610c of computer system 600). In addition, visual indicator 626a prompts the user to provide the authorization input (e.g., a double press gesture on integrated biometric sensor 610c) to an input device of the input devices 610 physically connected to computer system 600. As set forth above, the authorization input provides confirmation to computer system 600 that a user providing user input 650e is in possession of both computer system 600 and peripheral device 602

(e.g., the user is in close proximity to and/or is the same user of both computer system 600 and peripheral device 602), thereby improving a security of computer system 600 (e.g., by preventing an unauthorized user from enrolling a biometric feature with peripheral device 602).

As set forth above, in some embodiments, computer system 600 is connected to external display 622 and connected to peripheral device 602 when computer system 600 includes an enrolled biometric feature. Based on a determination that data about the biometric feature received via user input 650e corresponds to data about the enrolled biometric feature of computer system 600, computer system 600 enables the enrolled biometric feature to be used by peripheral device 602 (e.g., via input detected by biometric sensor 612c) to authorize a secure operation at computer system 600. In other words, when computer system 600 includes an enrolled biometric feature and when data about a detected biometric feature received via user input on biometric sensor 612c of peripheral device 602 corresponds to data about the enrolled biometric feature, computer system 600 enables user inputs that authorize secure operations at computer system 600 to be received and/or detected at peripheral device 602. In addition, computer system 600 does not display verification user interface 626 based on a determination that data about the detected biometric feature corresponds data about the enrolled biometric feature. As such, computer system 600 determines that the user of peripheral device 602 is the same user as computer system 600 because data about the detected biometric feature corresponds to data about the enrolled biometric feature (e.g., the fingerprint detected at biometric sensor 612c is determined to match an enrolled fingerprint of computer system 600). In some embodiments, computer system 600 enables the enrolled biometric feature to be utilized by peripheral device 602 to authorize a secure operation at computer system 600 and forgoes displaying verification user interface 626 (and/or verification user interface 616) when data about the detected biometric feature (e.g., detected via biometric sensor 612c of peripheral device 602) corresponds to data about the enrolled biometric feature regardless of a position of computer system 600 (e.g., regardless of whether computer system 600 is in the open position or the closed position).

As set forth above with reference to FIGS. 6A-6F, computer system 600 and peripheral device 602 are connected to one another via a wireless connection (e.g., as represented by dashed line 608). However, computer system 600 and peripheral device 602 can also be connected to one another via a wired connection (e.g., a wired communication). At FIG. 6H, computer system 600 and peripheral device 602 are connected via cable 628 that establishes the wired connection between computer system 600 and peripheral device 602. At FIG. 6H, computer system 600 displays, via display 604, enrollment user interface 629 prompting a user to provide an enrollment input (e.g., a finger contact on integrated biometric sensor 610c and/or a finger contact on biometric sensor 612c).

Figure 6H:
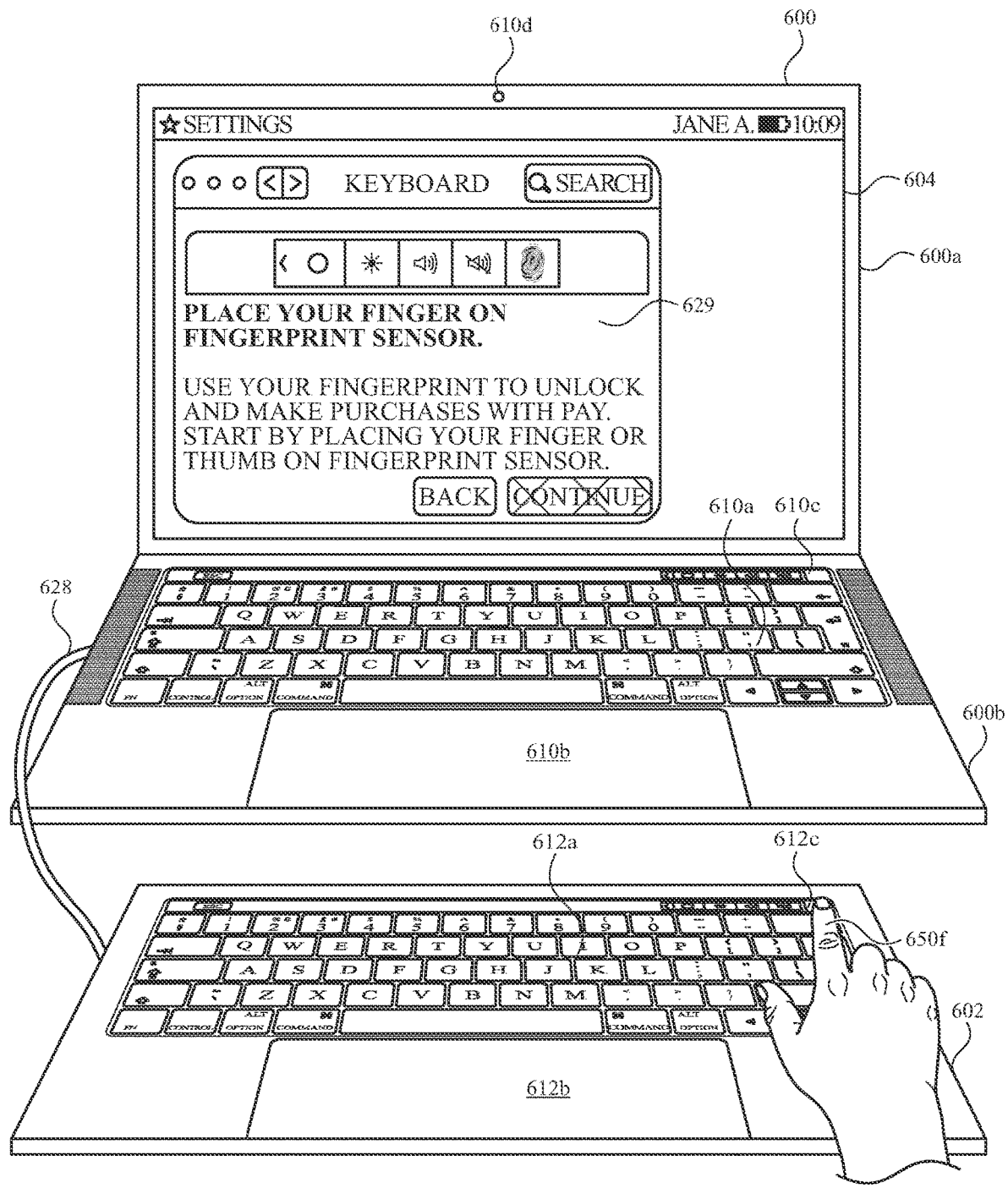

At FIG. 6H, computer system 600 detects user input 650f at biometric sensor 612c of peripheral device 602. Regardless of whether computer system 600 includes an enrolled biometric feature (and, optionally, regardless of whether computer system 600 is in the open position or the closed position), in response to detecting user input 650f, computer system 600 forgoes displaying a verification user interface and enrolls (or begins to enroll) a detected biometric feature of user input 650f and/or enables use of biometric sensor 612c of peripheral device 602 to authorize a secure operation at computer system 600 (e.g., without requiring and/or detecting the authorization input). Computer system 600 forgoes displaying verification user interface because computer system 600 determines that peripheral device 602 is connected via cable 628, and therefore, that the user associated with computer system 600 connected peripheral device 602 and/or that the user associated with computer system 600 is in possession of (e.g., in close proximity to) system 600 and peripheral device 602. Accordingly, computer system 600 does not display verification user interface because the wired connection between computer system 600 and peripheral device 602 confirms that a user is in possession of both computer system 600 and peripheral device 602.

Figure 6I:
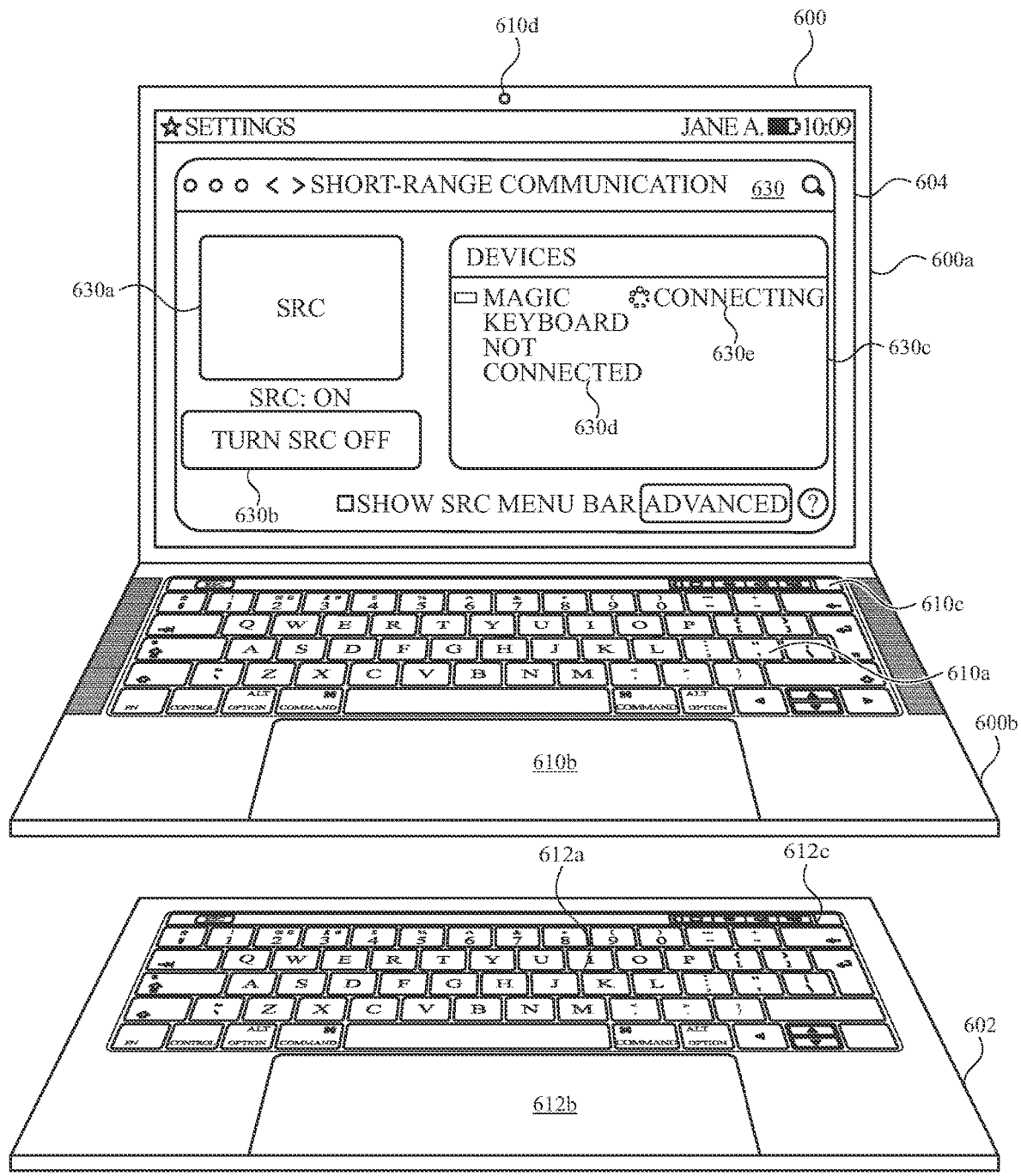
Figure 6J:
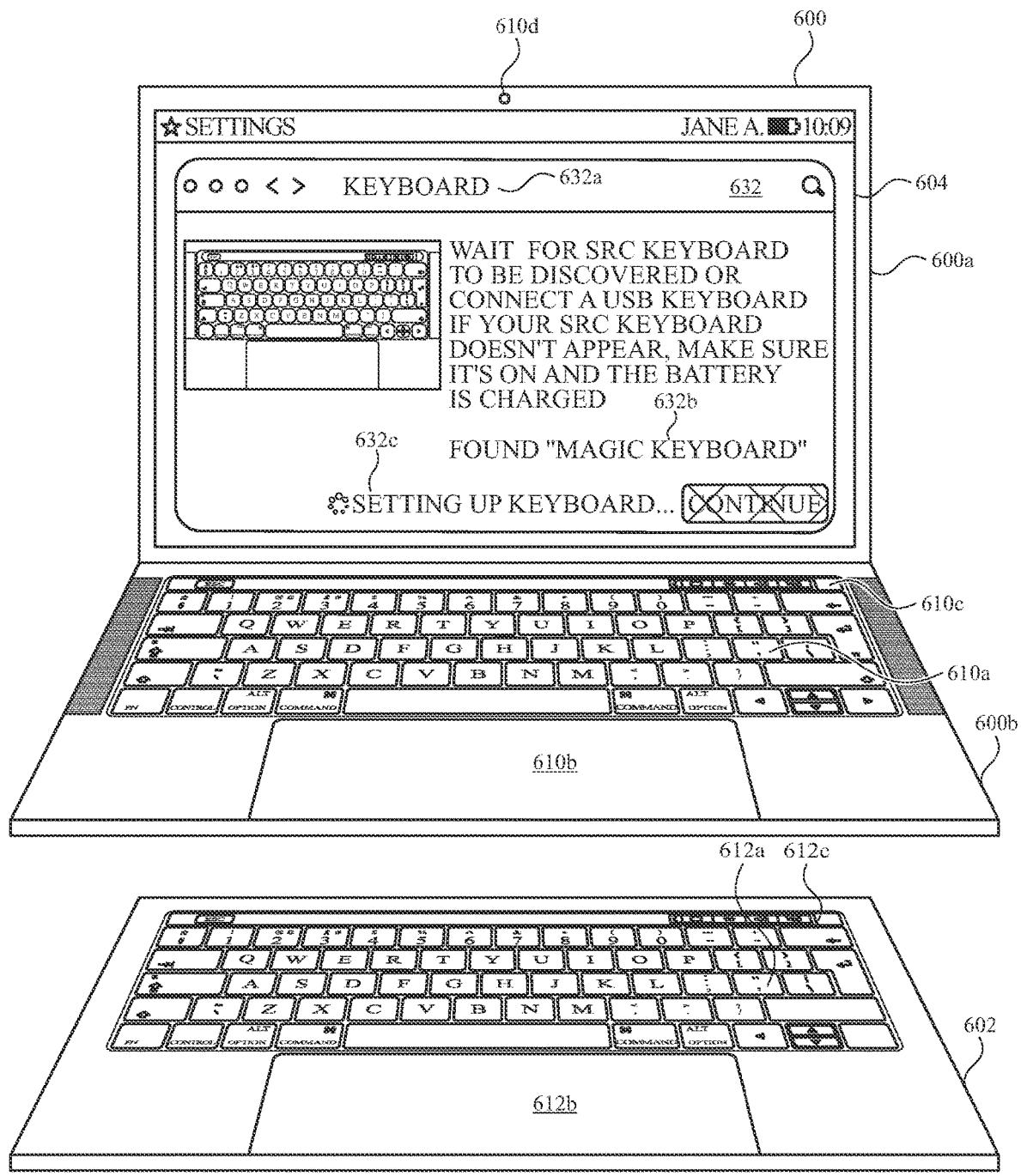

As set forth above, peripheral device 602 can be connected to computer system 600 after the setup process (e.g., the initial setup process of computer system 600). FIGS. 6I and 6J illustrate exemplary embodiments for connecting peripheral device 602 to computer system 600 after the setup process. At FIG. 6I, computer system 600 displays, via display 604 (and/or, in some embodiments, via external display 622, instead), first settings user interface 630 (e.g., Bluetooth settings user interface). First settings user interface 630 includes first settings indicator 630a (e.g., a visual indicator of a first setting of computer system 600 (e.g., Bluetooth setting)), first settings user interface object 630b, and device user interface object 630c. At FIG. 6I, first settings user interface 630 corresponds to a short-range communication settings user interface that enables computer system 600 to connect to one or more external devices via a short-range communication connection (e.g., a wireless, Bluetooth connection). In response to detecting user input corresponding to selection of first settings user interface object 630b, computer system 600 is configured to enable and/or disable detection of external devices capable of connecting to computer system 600 via a short-range communication connection. At FIG. 6I, first settings user interface object 630b is in an active position indicating that computer system 600 is detecting external devices within range (e.g., a threshold distance of) computer system 600 that are capable of connecting to computer system 600 via a short-range communication connection.

Figure 6K:
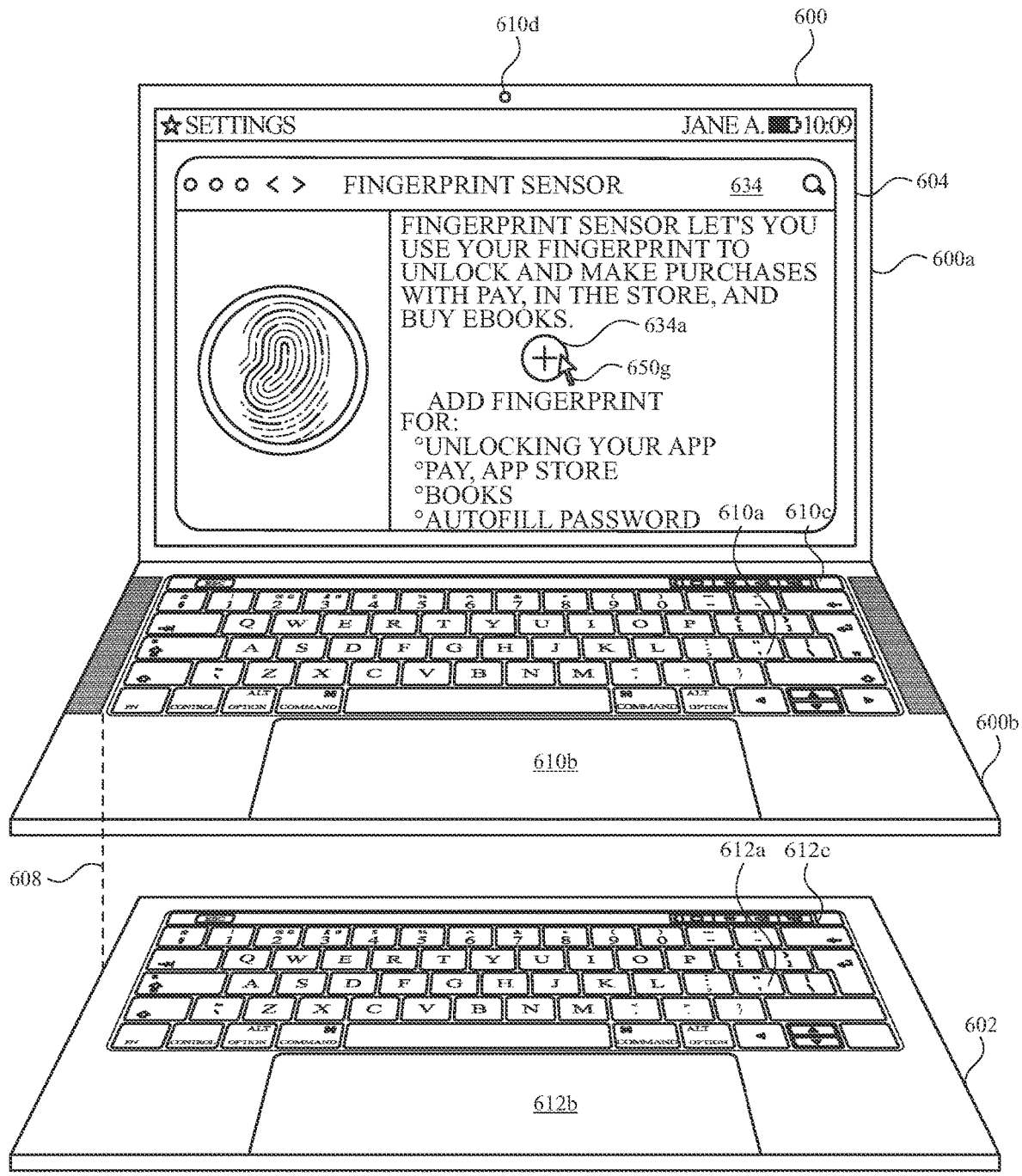

Device user interface object 630c includes a list of one or more external devices detected by computer system 600, one or more external devices with which computer system 600 has previously established a short-range communication connection, and/or one or more external devices with which computer system 600 has an established short-range communication connection. At FIG. 6I, device user interface object 630c includes first device user interface object 630d corresponding to peripheral device 602. In addition, computer system 600 displays connection status indicator 630e indicating that computer system 600 is currently establishing a short-range communication connection with peripheral device 602. In some embodiments, prior to displaying connections status indicator 630e, computer system 600 displays a connect user interface object in place of connection status indicator 630e, that, when selected via user input, initiates the short-range communication connection with peripheral device 602. In response to detecting an established connection between computer system 600 and peripheral device 602, computer system 600 displays enrollment user interface 634, as shown at FIG. 6K. In some embodiments, computer system 600 displays enrollment user interface 634 in response to detecting the established connection between computer system 600 and peripheral device 602 and in response to detecting that peripheral device 602 includes a biometric sensor, such as biometric sensor 612c.

At FIG. 6J, computer system 600 displays, via display 604 (and/or, in some embodiments, via external display 622), second settings user interface 632 (e.g., keyboard settings user interface). Second settings user interface 630 includes second settings indicator 632a (e.g., a visual indicator of a second setting of computer system 600 (e.g., keyboard setting)), device indicator 632b (e.g., a textual indication of one or more external keyboard devices detected by computer system 600), and connection status indicator 632c. At FIG. 6J, second settings user interface 632 corresponds to a keyboard settings user interface that enables computer system 600 to connect to one or more keyboards (e.g., via a wireless connection, such as a Bluetooth connection, a Wi-Fi connection, and/or a Zigbee connection, and/or via a wired connection). In some embodiments, in response to a request to display second settings user interface 632, computer system 600 is configured to detect external keyboard devices that are capable of connecting to computer system 600. For instance, device indicator 632b indicates that computer system 600 detected peripheral device 602. In addition, connection status indicator 632c indicates that computer system 600 is establishing a connection with peripheral device 602 (e.g., via a wireless connection). In some embodiments, prior to displaying connection status indicator 632c, computer system 600 displays a connect user interface object in place of connection status indicator 632c, that, when selected via user input, initiates the connection between computer system 600 and peripheral device 602. In response to detecting an established connection between computer system 600 and peripheral device 602, computer system 600 displays enrollment user interface 634, as shown at FIG. 6K. In some embodiments, computer system 600 displays enrollment user interface 634 in response to detecting the established connection between computer system 600 and peripheral device 602 and in response to detecting that peripheral device 602 includes a biometric sensor, such as biometric sensor 612c.

At FIG. 6K, enrollment user interface 634 includes initiate enrollment user interface object 634a (e.g., a "+" symbol) and is configured to, when selected via user input, enable a user to enroll a biometric feature for use with peripheral device 602 (e.g., computer system 600 receives data from biometric sensor 612c of peripheral device 602 to authorize a secure operation at computer system 600). In some embodiments, computer system 600 forgoes display of enrollment user interface 634 based on a determination that computer system 600 includes an enrolled biometric feature.

At FIG. 6K, computer system 600 detects user input 650g (e.g., mouse click on initiate enrollment user interface object 634a, such as a tap gesture and/or press gesture on trackpad 610b and/or trackpad 612b, and/or a touch gesture on initiate enrollment user interface object 634a detected via display 604). In response to detecting user input 650g, computer system 600 displays acquisition user interface 636, as shown at FIG. 6L.

Figure 6L:
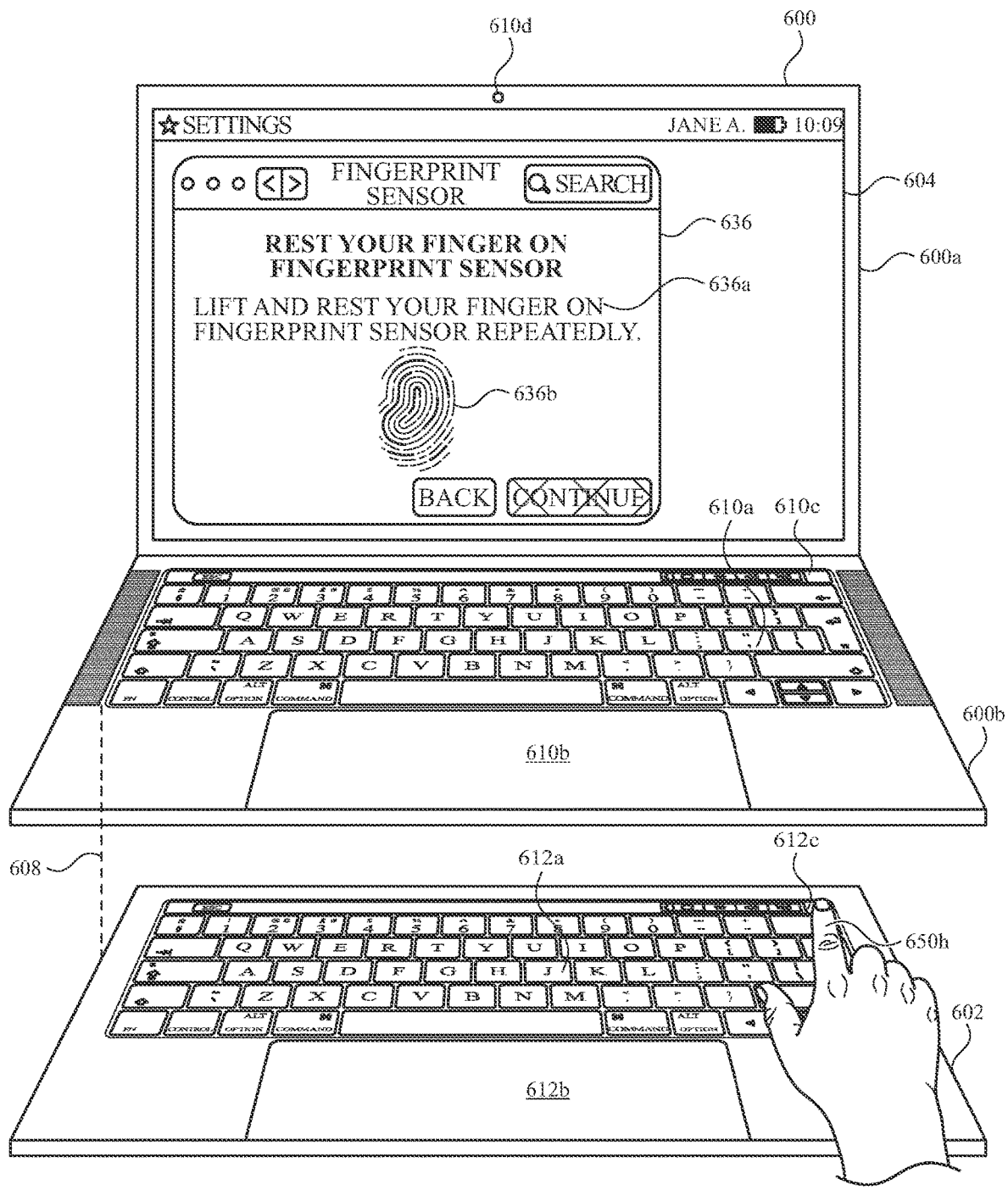
Figure 6M:
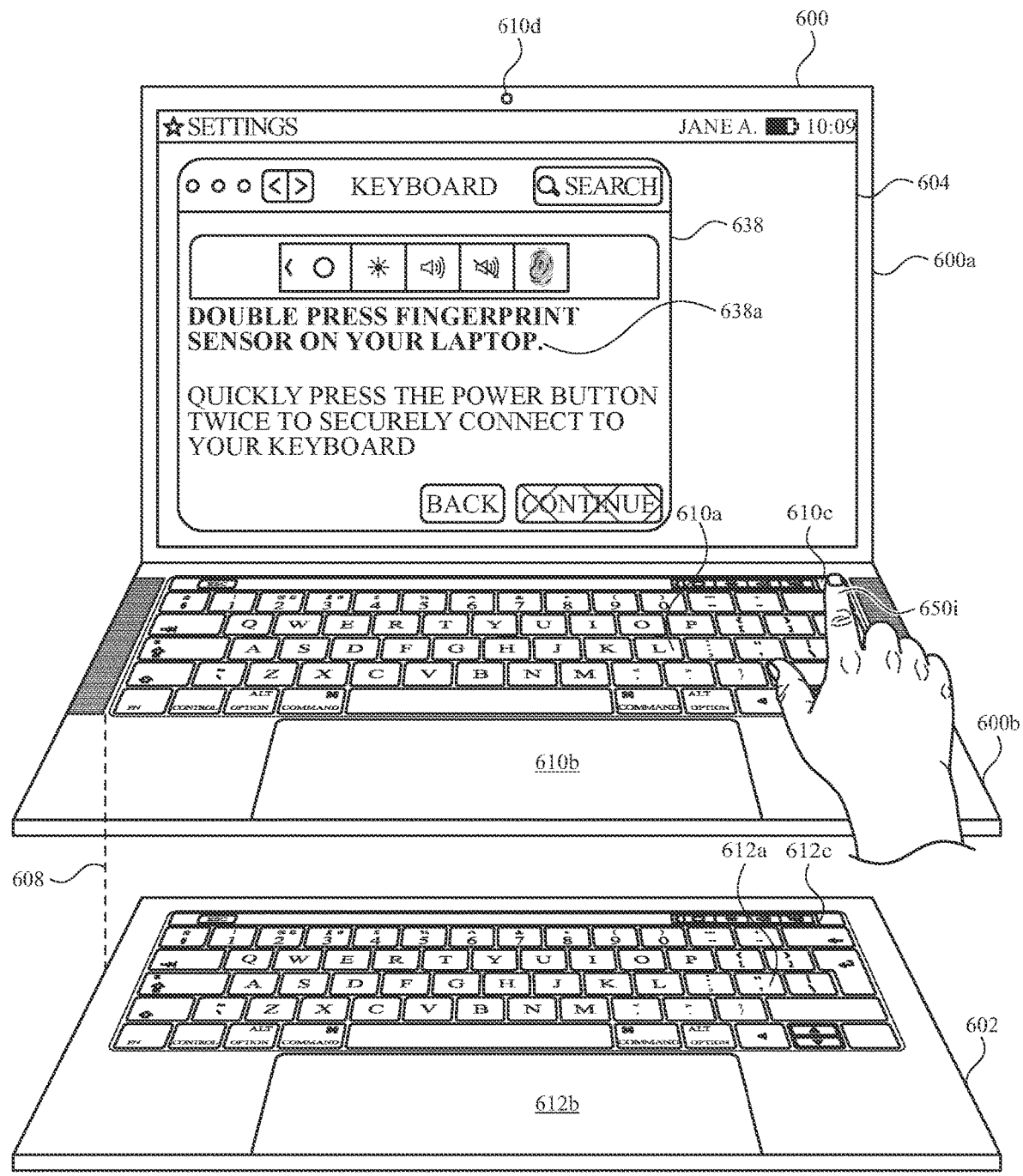

At FIG. 6L, computer system 600 displays acquisition user interface 636, which enables a user to complete the enrollment process of a biometric feature that is detected via integrated biometric sensor 610c and/or biometric sensor 612c. Acquisition user interface 636 includes visual indicator 636a (e.g., textual indications) providing instructions to the user associated with computer system to perform various user inputs and/or actions to complete enrollment of the biometric feature. At FIG. 6L, visual indicator 636a prompts a user to rest their finger on integrated biometric sensor 610c and/or biometric sensor 612c. Further, visual indicator 636a prompts the user to lift and re-position (e.g., rest) their finger on integrated biometric sensor 610c and/or biometric sensor 612c. In some embodiments, computer system 600 detects user input via integrated biometric sensor 610c. In response to detecting user input via integrated biometric sensor 610c, enrollment indicator 636b of acquisition user interface 636 is updated as integrated biometric sensor 610c detects one or more finger contacts of the user (e.g., a sequence of finger contacts (e.g., a user resting their finger) separated by lift-offs of the finger contacts). For example, enrollment indicator 636b can emphasize (e.g., change a color, thickness, size, and/or brightness of) one or more portions of enrollment indicator 636b (e.g., represented as grooves and/or ridges of a fingerprint) in response to a finger contact detected by integrated biometric sensor 610c. Updating enrollment indicator 636b provides an indication of a progress toward completion of the enrollment process (e.g., indicates how many additional finger contacts and/or lift-offs of finger contacts a user should provide in order to complete enrollment of their fingerprint). When computer system 600 detects user input via integrated biometric sensor 610c, computer system 600 enables the enrollment of the biometric feature (e.g., a fingerprint) without displaying verification user interface 638 (e.g., as shown at FIG. 6M) and without requiring an authorization input to enroll the biometric feature for use with peripheral device 602. In addition, computer system 600 enables both integrated biometric sensor 610c and biometric sensor 612c to detect data about a biometric feature for use in authenticating the user and authorizing a secure operation at computer system 600.

At FIG. 6L, computer system 600 detects user input 650h (e.g., a finger contact on biometric sensor 612c) via biometric sensor 612c. In some embodiments (e.g., when computer system 600 includes data about an enrolled biometric feature), in response to detecting user input 650h, computer system 600 compares data about a detected biometric feature (e.g., via biometric sensor 612c) to data about an enrolled biometric feature of computer system 600. When the data about the detected biometric feature corresponds to (e.g., matches and/or a threshold amount of data matches) the data about the enrolled biometric feature, computer system 600 enables peripheral device 602 to be used to authenticate and/or authorize secure operations at computer system 600 (e.g., using biometric feature(s) previously enrolled on computer system 600, including biometric features that do not match the data about the detected biometric feature provided via user input 650h). In some embodiments, when the data about the detected biometric feature does not correspond to (e.g., does not match and/or a threshold amount of data does not match) the data about the enrolled biometric feature, computer system 600 displays verification user interface 638, as set forth below. In some embodiments, when the data about the detected biometric feature does not correspond to (e.g., does not match and/or a threshold amount of data does not match) the data about the enrolled biometric feature, computer system 600 displays an error user interface and/or a user interface prompting a user to provide and/or re-provide the user input on biometric sensor 612c.

In response to detecting user input 650h (and in some embodiments, based on a determination that computer system 600 does not include an enrolled biometric feature and/or that data about a biometric feature detected via biometric sensor 612c does not correspond to data about an enrolled biometric feature), computer system 600 displays verification user interface 638, as shown at FIG. 6M. Because peripheral device 602 is a separate component from, and/or not integrated with, computer system 600, computer system 600 displays verification user interface 638 to confirm that a user in possession of peripheral device is the same user that is in possession of computer system 600. Thus, by displaying verification user interface 638, computer system 600 includes enhanced security by preventing and/or blocking a user that is not in possession of computer system 600 from enrolling a biometric feature that can be used to authorize secure operations at computer system 600 (e.g., via peripheral device 602).

For instance, at FIG. 6M, verification user interface 638 includes visual indicator 638*a* (e.g., textual indications) prompting a user to provide an authorization input (e.g., an authorization user input) corresponding to one of input devices 610 of computer system 600 (e.g., an input device integrated with and/or physically connected to computer system 600). Because input devices 610 are integrated with (e.g., physically connected to and/or a part of) computer system 600, detecting an input at one of input devices 610 of computer system 600 ensures that the user enrolling the biometric feature using biometric sensor 612*c* of peripheral device 602 is in possession of (e.g., and/or in close proximity to) computer system 600. At FIG. 6M, visual indicator 638*a* prompts a user to perform the authorization input by double pressing integrated biometric sensor 610*c*. As set forth above, integrated biometric sensor 610*c* can also be a power button of computer system 600. In some embodiments, visual indicator 638*a* can prompt the user to perform the authorization input via a single press of integrated biometric sensor 610*c*, a single press and/or a double press of a button included on keyboard 610*b*, a tap gesture and/or press gesture on trackpad 610*b*, and/or another user input on one of input devices 610 that are part of and/or physically connected to computer system 600.

At FIG. 6M, computer system 600 detects user input 650*i* via integrated biometric sensor 610*c*. Based on a determination that user input 650*i* includes the authorization input (e.g., a double press gesture on integrated biometric sensor 610*c*), computer system 600 enables enrollment of the biometric feature detected via biometric sensor 612*c* of peripheral device 602, as set forth above. In some embodiments, based on a determination that user input 650*i* does not include the authorization input (e.g., a gesture that is not a double press gesture on integrated biometric sensor 610*c*), computer system 600 displays, via display 604, error user interface 668, as shown at FIG. 6U. In some embodiments, based on a determination that user input 650*i* does not include the authorization input, computer system 600 maintains display of, via display 604, verification user interface 638 and/or displays another user interface prompting a user to provide and/or re-provide the authorization input.

In some embodiments, computer system 600 includes an enrolled biometric feature and the authorization input includes authenticating the enrolled biometric feature. For example, in response to detecting user input 650*g* at FIG. 6K, computer system 600 displays, via display 604, acquisition user interface 636, which enables a user to complete the enrollment process of a biometric feature that is detected via integrated biometric sensor 610*c* and/or biometric sensor 612*c*, as shown at FIG. 6N.

Figure 6N:
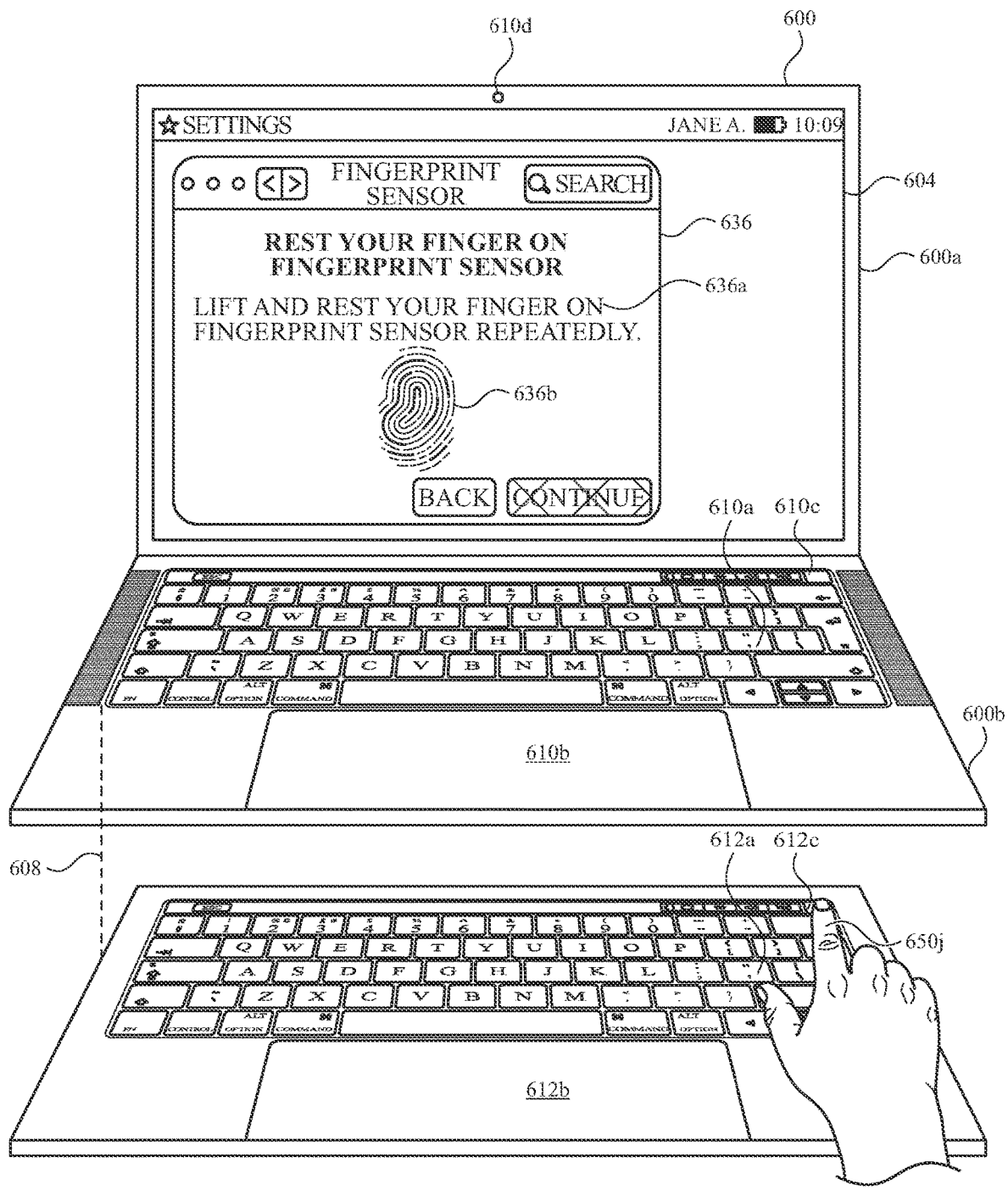

At FIG. 6N, computer system 600 detects user input 650*j* via biometric sensor 610*c* of peripheral device 602, where user input 650*j* includes data about a fingerprint of the user's index finger. In response to detecting user input 650*j*, computer system 600 determines whether the data about the fingerprint of the user's index finger corresponds to (e.g., matches and/or a threshold amount of data matches) data about the enrolled biometric feature. In some embodiments, when computer system 600 determines that data about the fingerprint of the user's index finger corresponds to data about the enrolled biometric feature, computer system 600 completes the enrollment process and enables peripheral device 602 to be used to authenticate and/or authorize secure operations at computer system 600 (e.g., using biometric feature(s) previously enrolled on computer system 600, including biometric features that do not match the data about the detected biometric feature provided via user input 650*j*).

At FIG. 6N, computer system 600 determines that data about the user's index finger does not correspond to data about the enrolled biometric feature. Based on the determination that the data about the user's index finger does not correspond to data about the enrolled biometric feature, computer system 600 displays verification user interface 640, as shown at FIG. 6O.

Figure 6O:
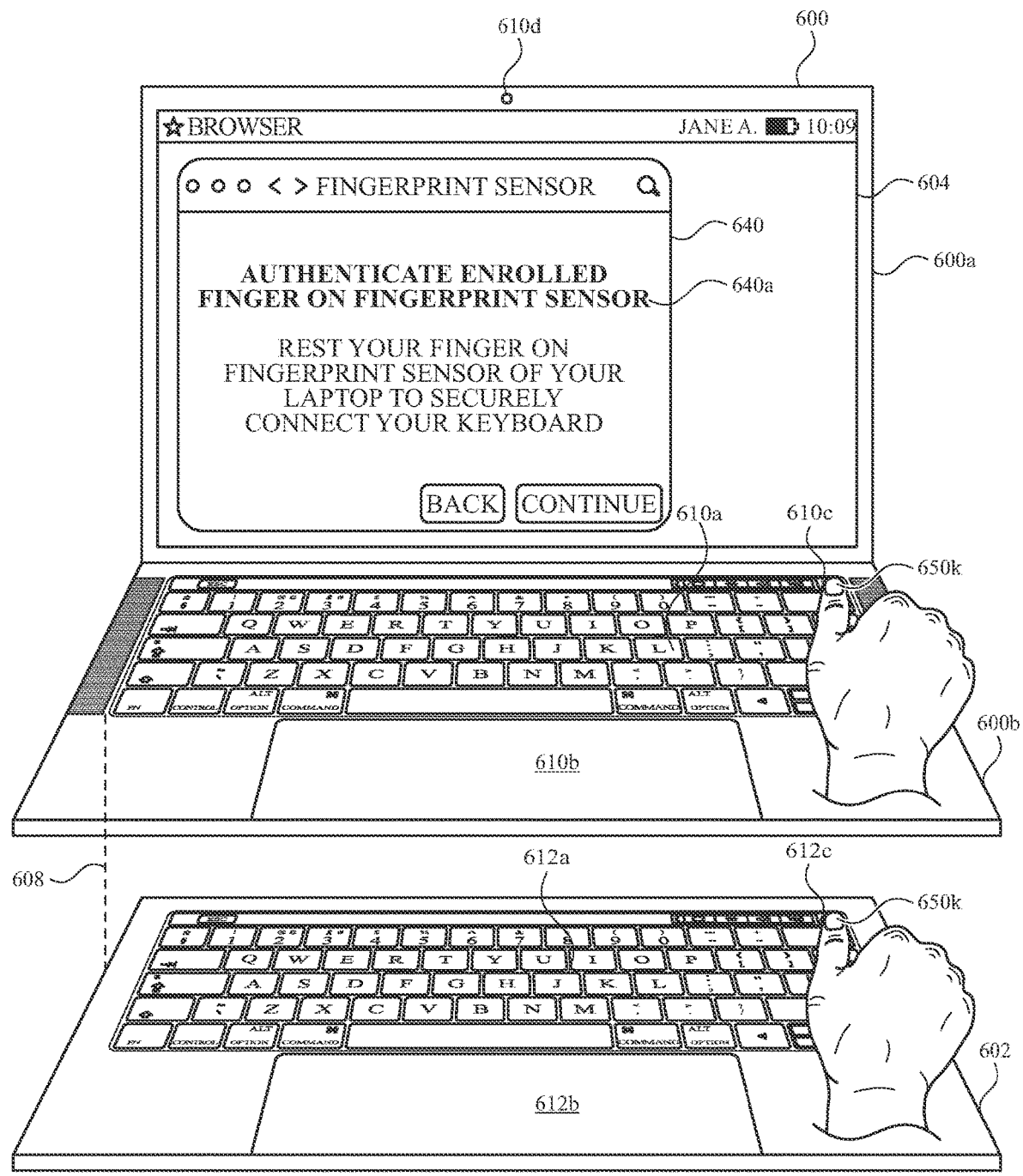

At FIG. 6O, computer system 600 displays verification user interface 640 because computer system 600 is unable to authenticate data about a detected biometric feature (e.g., the user's index finger) to an enrolled biometric feature. In addition, user input 650*j* is detected via an input device of input devices 612 of peripheral device 602, which can be in the possession of a different user from a user associated with computer system 600. Therefore, computer system 600 prompts the user to provide the authorization input, which includes an input (e.g., finger contact) on integrated biometric sensor 610*c* and/or an input (e.g., finger contact) on biometric sensor 612*c*, as shown in FIG. 6O.

At FIG. 6O, verification user interface 640 includes visual indicator 640*a* (e.g., textual indicator) prompting the user to authenticate an enrolled biometric feature. At FIG. 6O, computer system 600 detects user input 650*k* on integrated biometric sensor 610*c* (e.g., a contact of a user's thumb on integrated biometric sensor 610*c*) and/or user input 650*l* on biometric sensor 612*c* of peripheral device 602 (e.g., a contact of a user's thumb on integrated biometric sensor 612*c* of peripheral device 602). In response to detecting user input 650*k* and/or user input 650*l*, computer system 600 compares data about a detected biometric feature (e.g., a fingerprint of a user's thumb detected via integrated biometric sensor 610*c* and/or biometric sensor 612*c*) to data about the enrolled biometric feature. When computer system 600 determines that data about the detected biometric feature corresponds to (e.g., matches and/or a threshold amount of data matches) the data about the enrolled biometric feature, computer system 600 enables peripheral device 602 to be used to authorize a secure operation at computer system 600 (e.g., via user input detected by biometric sensor 612*c*). When computer system 600 determines that data about the detected biometric feature does not correspond to (e.g., does not match and/or a threshold amount of data does not match) the data about the enrolled biometric feature, computer system 600 does not enable peripheral device 602 to be used to authorize a secure operation at computer system 600. In addition, in some embodiments, when computer system 600 determines that data about the detected biometric feature does not correspond to (e.g., does not match and/or a threshold amount of data does not match) the data about the enrolled biometric feature, computer system 600 displays, via display 604, an error user interface and/or a user interface prompting the user to provide and/or re-provide the authorization input.

After enrolling a biometric feature and/or enabling peripheral device 602 to be used to authorize a secure operation at computer system 600, computer system 600 is configured to perform secure operations in response to detecting an authentication input (e.g., a user input that includes data about a detected biometric feature that corresponds to (e.g., matches and/or a threshold amount of data matches) data about an enrolled biometric feature) via integrated biometric sensor 610c and/or biometric sensor 612c. The authentication input as described below with reference to FIGS. 6P and 6Q includes a finger contact on integrated biometric sensor 610c and/or biometric sensor 612c. In some embodiments, the authentication input includes positioning a body part (e.g., a face and/or an eye) of a user associated with computer system 600 into a field of view of camera 610d (and/or a camera of peripheral device 602). In some embodiments, the authentication input includes speech of a user detected by a microphone of computer system 600 (and/or a microphone of peripheral device 602).

Figure 6P:
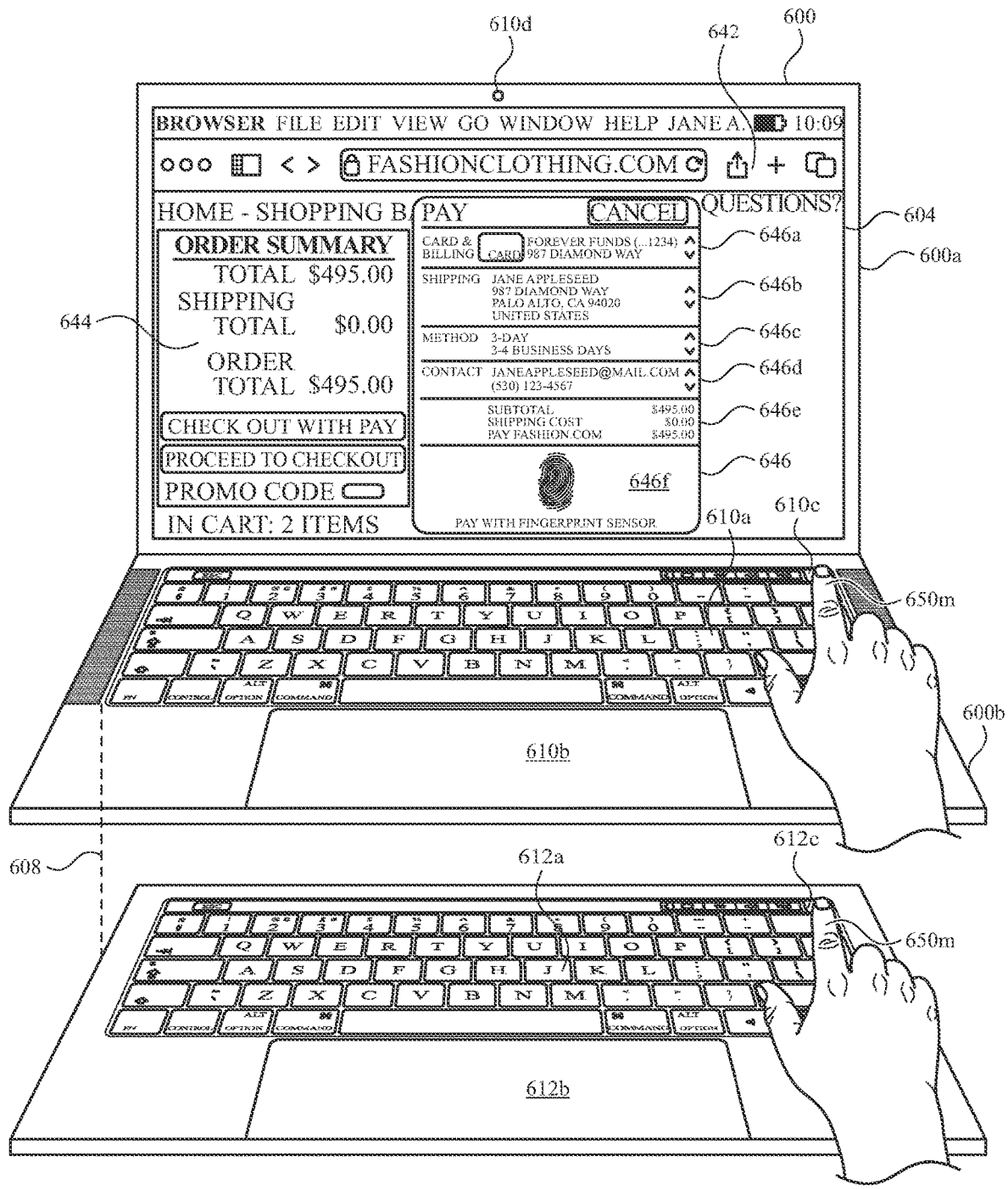

At FIG. 6P, computer system displays, via display 604, browser user interface 642 associated with a browser application of computer system 600 (e.g., an application configured to access the Internet). Browser user interface 642 includes shopping user interface 644 (e.g., a webpage of a retailer) that enables computer system 600 to perform an electronic transaction. In response to one or more user inputs corresponding to a request to perform the electronic transaction, computer system 600 displays authentication user interface 646. At FIG. 6P, authentication user interface 646 includes transaction details indicators 646a-646e, which provide visual indications (e.g., textual indications) of a form of payment for the electronic transaction, price details of the electronic transaction, shipping details of the electronic transaction, and/or information of a user associated with computer system. In addition, authentication user interface 646 includes authentication indicator 646f that prompts a user to provide an authentication input to complete the electronic transaction. For instance, authentication indicator 646f includes an image of a fingerprint and/or text prompting the user to provide a finger contact at integrated biometric sensor 610c and/or biometric sensor 612c.

At FIG. 6P, computer system 600 detects user input 650m via integrated biometric sensor 610c and/or biometric sensor 612c. Because peripheral device 602 is enabled to detect user inputs for authorization of a secure operation, user input 650m at biometric sensor 612c can be detected by computer system 600 and computer system 600 can determine whether user input 650m includes data about a biometric feature that corresponds to data about an enrolled biometric feature (e.g., user input 650m at biometric sensor 612c can be the authentication input used to complete the electronic transaction) to authenticate the electronic transaction. Alternatively or in addition, computer system 600 can determine whether user input 650m at integrated biometric sensor 610c includes data about a biometric feature that corresponds to an enrolled biometric feature of computer system 600 to authenticate the electronic transaction. Thus, computer system 600 can receive the authentication input via integrated biometric sensor 610c and biometric sensor 612c.

When computer system 600 determines that data about a biometric feature detected by integrated biometric sensor 610c and/or biometric sensor 612c corresponds to data about the enrolled biometric feature, computer system 600 can initiate a process for completing the electronic transaction (e.g., authenticate and/or authorize completion of the electronic transaction). When computer system 600 determines that the data about the biometric feature detected by integrated biometric sensor 610c and/or biometric sensor 612c does not correspond to data about the enrolled biometric feature, computer system forgoes initiating the process for completing (and/or completion of) the electronic transaction (e.g., and, optionally, displays an error user interface object).

Figure 6Q:
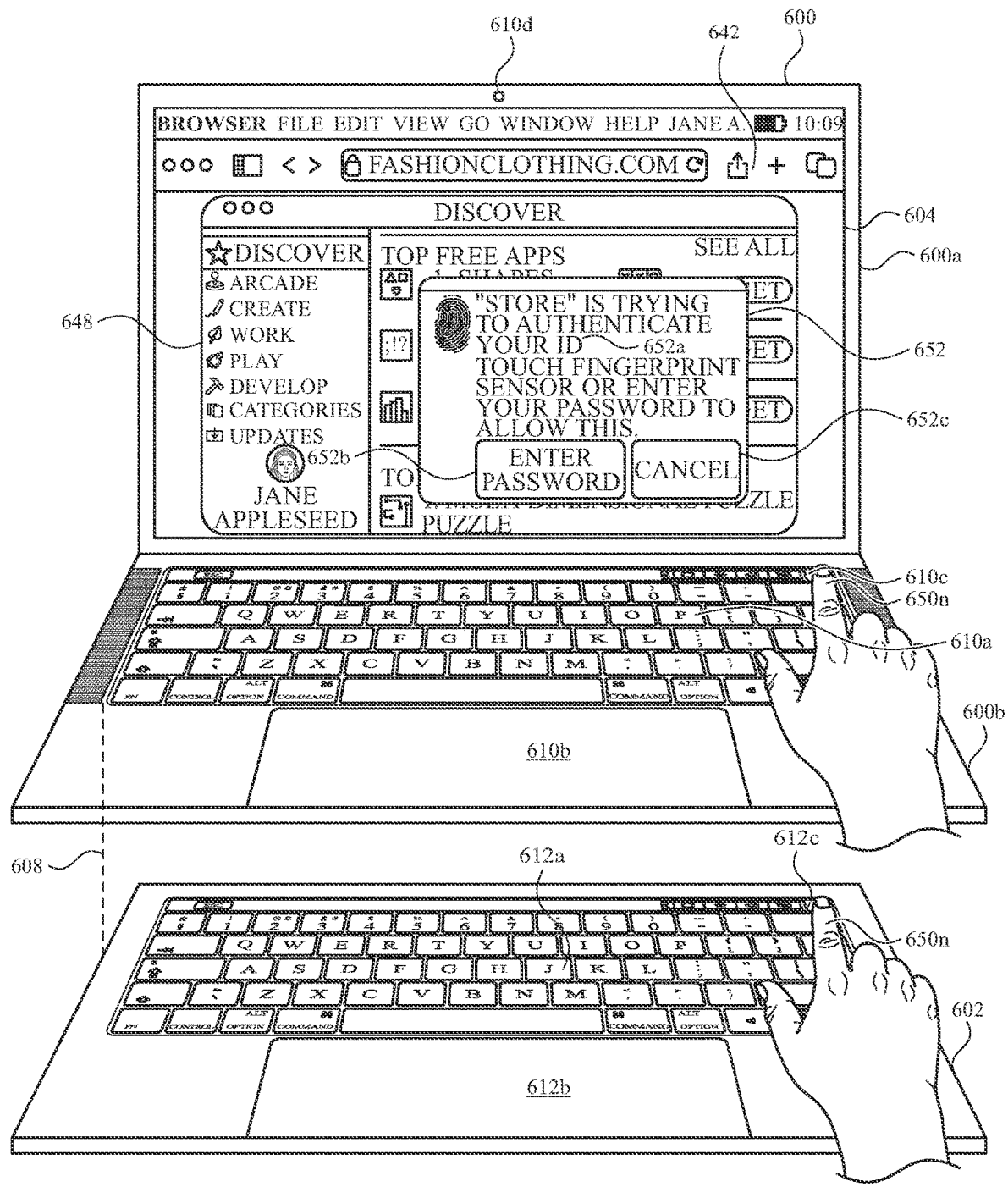

At FIG. 6Q, computer system 600 displays, via display 604, browser user interface 642 associated with a browser application of computer system 600 (e.g., an application configured to access the Internet). Browser user interface 642 includes application user interface 648 that enables computer system 600 to download and/or otherwise obtain access to a particular application and/or software program. In response to one or more user inputs corresponding to a request to download the application and/or software program, computer system 600 displays authentication user interface 652. At FIG. 6Q, authentication user interface 652 includes authentication indicator 652a that prompts a user to provide an authentication input to initiate the process for downloading the application and/or software program. For instance, authentication indicator 652a includes an image of a fingerprint and/or text prompting the user to provide a finger contact at integrated biometric sensor 610c and/or biometric sensor 612c. At FIG. 6Q, authentication user interface 652 also includes password user interface object 652b and cancel user interface object 652c. In response to detecting user input corresponding to selection of password user interface object 652b, computer system 600 enables a user to enter an alphanumeric password (e.g., via keyboard 610a and/or keyboard 612a) instead of providing the authentication input. In response to detecting user input corresponding to selection of cancel user interface object 652c, computer system 600 ceases to display authentication user interface 652 and does not download a selected application and/or software program.

At FIG. 6Q, computer system 600 detects user input 650n via integrated biometric sensor 610c and/or biometric sensor 612c. Because peripheral device 602 is enabled to detect user inputs for authorization of a secure operation, user input 650n at biometric sensor 612c can be detected by computer system 600 and computer system 600 can determine whether user input 650n includes data about a biometric feature that corresponds to data about an enrolled biometric feature (e.g., user input 650n at biometric sensor 612c can be the authentication input used to initiate downloading the application and/or software program) to authenticate downloading of the application and/or software program. Alternatively, computer system 600 can determine whether user input 650n at integrated biometric sensor 610c includes data about a biometric feature that corresponds to an enrolled biometric feature of computer system 600 to authenticate downloading the application and/or software program. Thus, computer system 600 can receive the authentication input via integrated biometric sensor 610c and biometric sensor 612c.

When computer system 600 determines that data about a biometric feature detected by integrated biometric sensor 610c and/or biometric sensor 612c corresponds to data about the enrolled biometric feature, computer system 600 can initiate a process for downloading a selected application and/or software program. When computer system 600 determines that the data about the biometric feature detected by integrated biometric sensor 610c and/or biometric sensor 612c does not correspond to data about the enrolled biometric feature, computer system forgoes initiating the process for downloading a selected application and/or software program (e.g., and, optionally, displays an error user interface object).

Figure 6R:
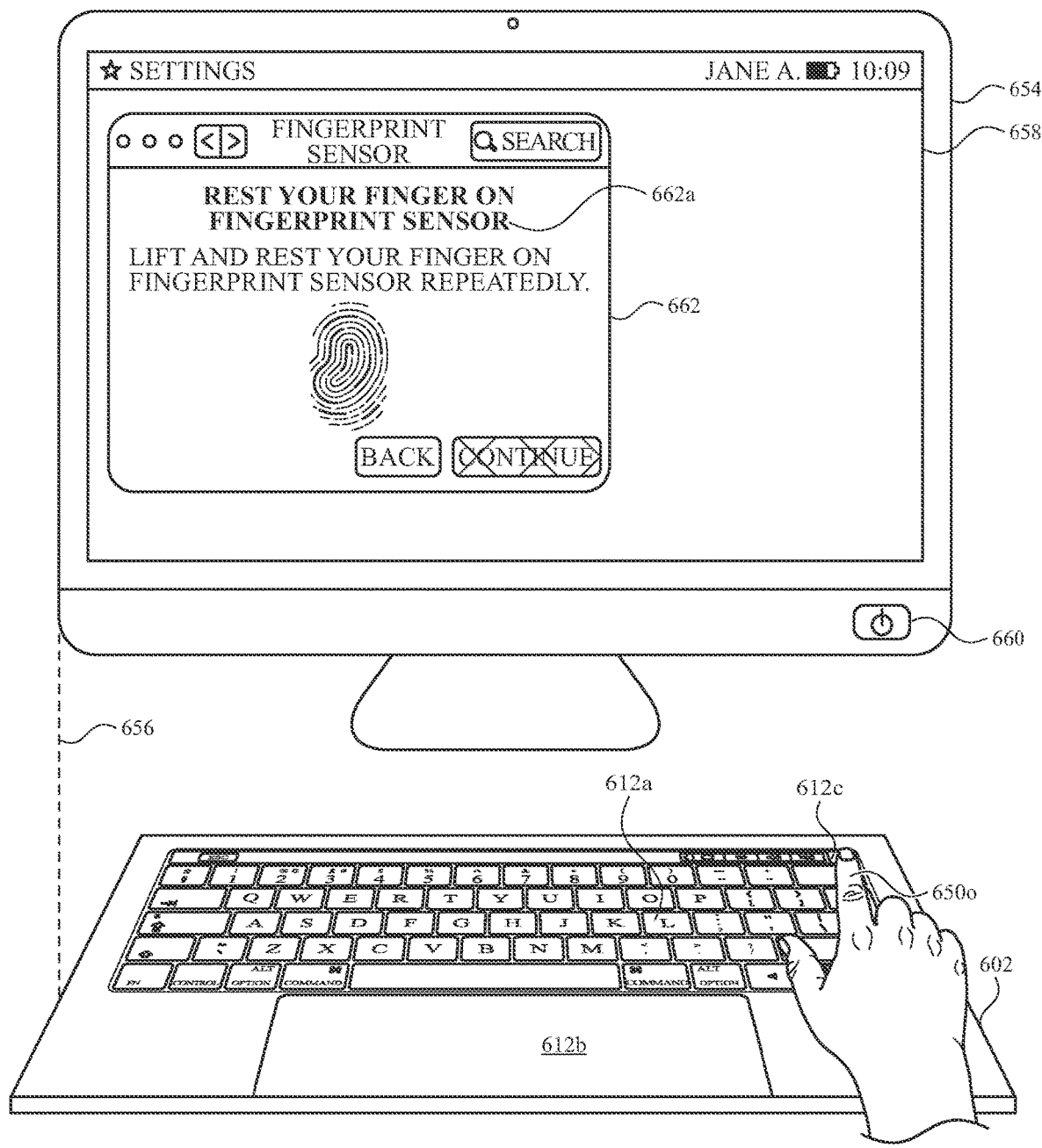
Figure 6S:
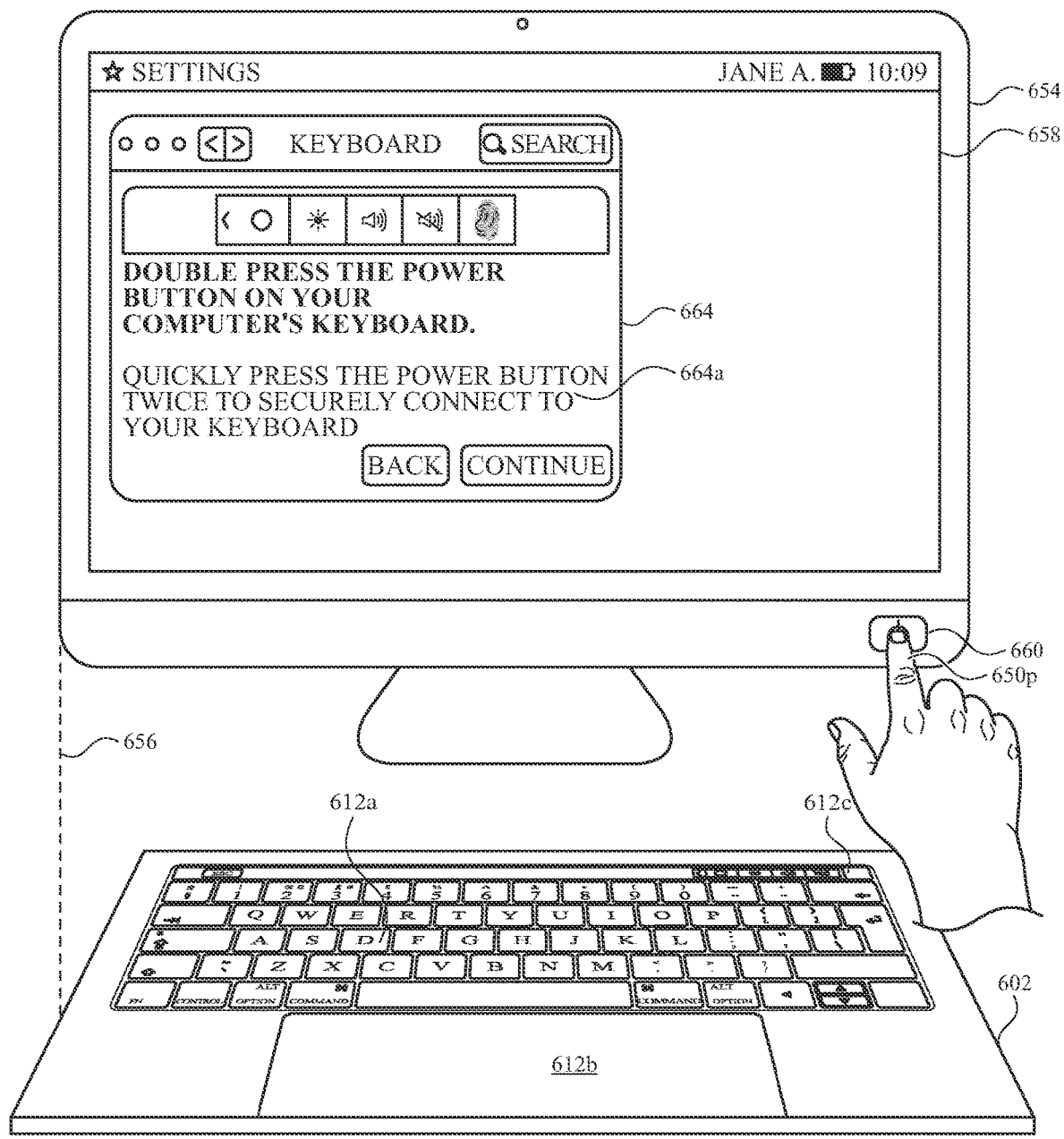
Figure 6T:
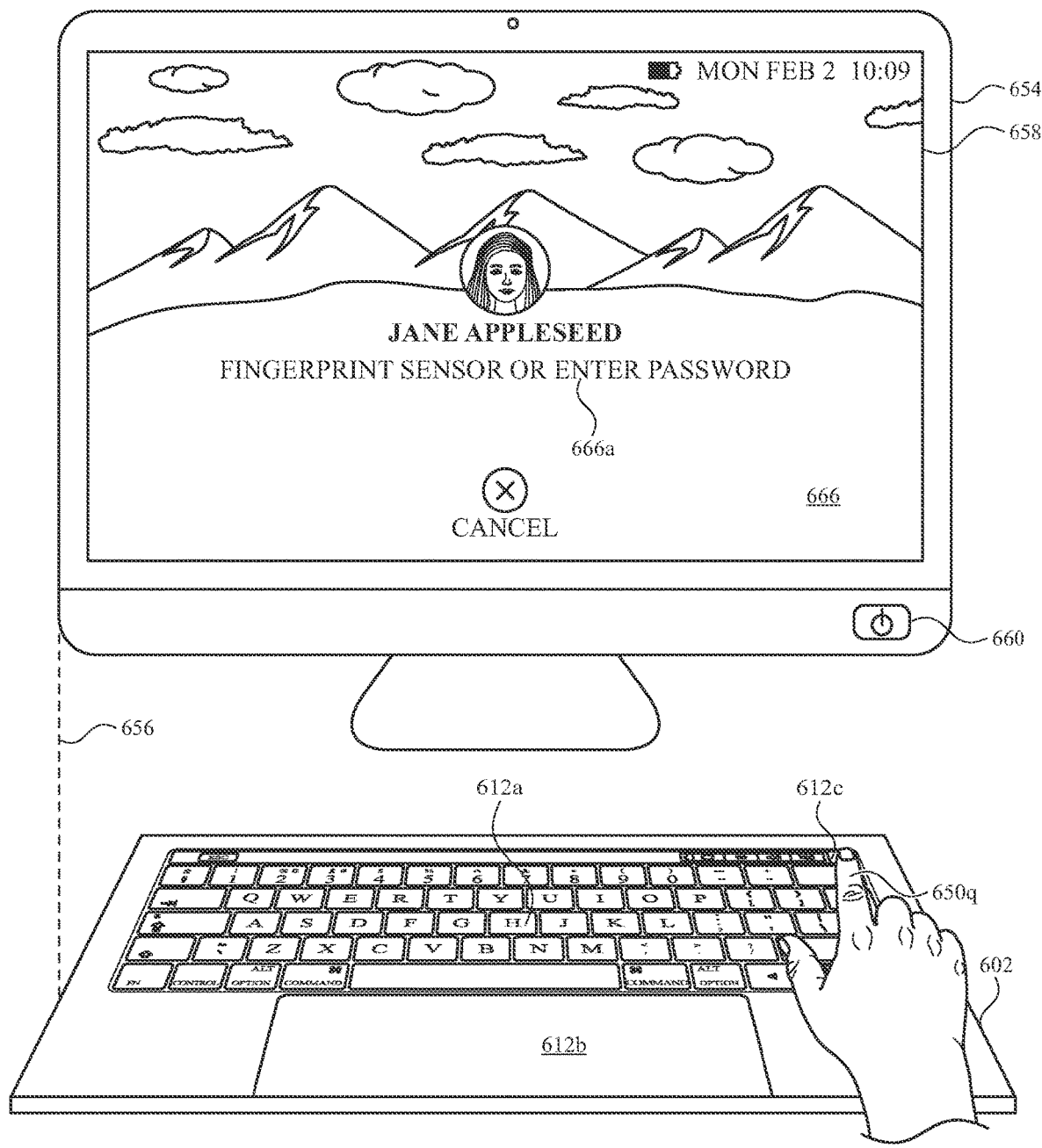

FIGS. 6R-6T illustrate exemplary embodiments of peripheral device 602 connected to computer system 654, which is a desktop computer. A process for enrolling a biometric feature for use by peripheral device 602 to authorize a secure operation at computer system 654 is similar to the process described above with reference to FIGS. 6A-6Q.

However, because computer system 654 does not include an integrated biometric sensor (such as 610c), computer system 654 optionally does not enroll a biometric feature without detecting an authorization input at an input device of computer system 654 (e.g., an input device that is physically connected to, integrated into a housing of, and/or part of computer system 654) and/or without detecting that data about a biometric feature detected by biometric sensor 612c corresponds to data about an enrolled biometric feature of computer system 654.

At FIG. 6R, peripheral device 602 is connected to computer system 654, as represented by dashed line 656. Dashed line 656 represents a wireless connection between peripheral device 602 and computer system 654, such as a short-range communication connection (e.g., Bluetooth, Wi-Fi, and/or Zigbee). Computer system 654 includes display 658 and power button 660. At FIG. 6R, computer system 654 displays, via display 658, enrollment user interface 662. In some embodiments, computer system 654 displays enrollment user interface 662 in response to detecting an established connection between computer system 654 and peripheral device 602. In some embodiments, computer system 654 displays enrollment user interface 662 in response to one or more user inputs corresponding to a request to enroll a biometric feature.

Enrollment user interface 662 includes visual indicator 662a (e.g., textual indications) providing instructions to the user associated with computer system to perform various user inputs and/or actions to complete enrollment of the biometric feature. At FIG. 6R, visual indicator 662a prompts a user to rest their finger on biometric sensor 612c. Further, visual indicator 662a prompts the user to lift and re-position (e.g., rest) their finger on biometric sensor 612c.

At FIG. 6R, computer system 654 detects user input 650o via biometric sensor 612c of peripheral device 602. In response to detecting user input 650o (and/or, optionally, as part of a setup process), computer system 654 displays verification user interface 664, as shown at FIG. 6S. Because peripheral device 602 is a separate component from, and/or not integrated with, computer system 654, computer system 654 displays verification user interface 664 to confirm that a user in possession of peripheral device 602 is the same user that is in possession of computer system 654. Thus, by displaying verification user interface 664, computer system 654 includes enhanced security by preventing and/or blocking a user that is not in possession of computer system 654 from enrolling a biometric feature that can be used to authorize secure operations at computer system 654 (e.g., via peripheral device 602).

For instance, at FIG. 6S, verification user interface 664 includes visual indicator 664a (e.g., textual indications) prompting a user to provide an authorization input (e.g., an authorization user input) corresponding to power button 660 of computer system 654. Because power button 660 is integrated with (e.g., physically connected to and/or a part of) computer system 654, detecting an input at power button 660 of computer system 654 ensures that the user enrolling the biometric feature using biometric sensor 612c of peripheral device 602 is in possession of (e.g., and/or in close proximity to) computer system 654. At FIG. 6S, visual indicator 664a prompts a user to perform the authorization input by double pressing power button 660. In some embodiments, visual indicator 664a can prompt the user to perform the authorization input via a single press of power button 660 and/or an input corresponding to another input device physically connected to computer system 654.

At FIG. 6S, computer system 654 detects user input 650p via power button 660. Based on a determination that user input 650p includes the authorization input (e.g., a double press gesture on power button 660), computer system 654 enables enrollment of the biometric feature detected via biometric sensor 612c of peripheral device 602. In some embodiments, based on a determination that user input 650p does not include the authorization input (e.g., a gesture/input that is not a double press gesture on power button 660), computer system 654 displays, via display 658, an error user interface (e.g., similar to error user interface 668 shown at FIG. 6U). In some embodiments, based on a determination that user input 650p does not include the authorization input, computer system 654 maintains display of, via display 658, verification user interface 664 and/or displays another user interface prompting a user to provide and/or re-provide the authorization input.

After enrolling the biometric feature (e.g., after storing data about a detected biometric feature received via biometric sensor 612c), computer system 654 can authorize a secure operation to be performed at computer system 654 in response to detecting an authentication input via biometric sensor 612c. At FIG. 6T, computer system 654 displays locked mode user interface 666 (e.g., a lock screen of computer system 654). Locked mode user interface 666 includes authentication indicator 666a (e.g., a textual indicator) prompting a user to provide an authentication input to biometric sensor 612c in order to unlock computer system 654 and transition computer system 654 from a locked mode to an unlocked mode (e.g., a normal operating mode).

At FIG. 6T, computer system 654 detects user input 650q via biometric sensor 612c. Because peripheral device 602 is enabled to detect user inputs for authorization of a secure operation, user input 650q at biometric sensor 612c can be detected by computer system 654 and computer system 654 can determine whether user input 650q includes data about a biometric feature that corresponds to data about an enrolled biometric feature (e.g., user input 650q at biometric sensor 612c can be the authentication input used to unlock computer system 654).

When computer system 654 determines that data about a biometric feature detected by biometric sensor 612c corresponds to data about the enrolled biometric feature, computer system 654 can initiate a process to transition from a locked mode to an unlocked mode (e.g., transition from locked mode user interface 666 to an unlocked mode user interface). When computer system 654 determines that the data about the biometric feature detected by biometric sensor 612c does not correspond to data about the enrolled biometric feature, computer system forgoes initiating the process to transition from the locked mode to the unlocked mode (e.g., and, optionally, displays an error user interface object).

As set forth above, computer system 600 and/or computer system 654 is configured to display, via display 604 and/or display 658, error user interface 668 based on a determination that a detected user input does not include the authorization input (e.g., a double press of integrated biometric sensor 610c, a double press of power button 660, and/or another suitable authorization input). At FIG. 6U, error user interface 668 includes indicator 668a (e.g., a textual indicator) prompting the user to re-provide the authorization input to computer system 600 and/or computer system 654. In some embodiments, while displaying error user interface 668, in response to detecting the authorization input (e.g., a double press of integrated biometric sensor 610c, a double press of power button 660, and/or another suitable authorization input), computer system 600 displays, via display 604, enrollment user interface 618 and/or confirmation user interface 620. In some embodiments, in response to detecting a user input that does not include the authorization input, computer system 600 maintains display, via display 604, of error user interface 668.

FIGS. 7A-7C are a flow diagram illustrating a method for enrolling a biometric feature for use with a peripheral device using an electronic device in accordance with some embodiments. Method 700 is performed at a device (e.g., 100, 300, 500, 600, and/or 654) with a display generation component (e.g., 604, 622, and/or 658) and one or more input devices physically connected to the device (e.g., 610*a*, 610*b*, 610*c*, 610*d*, and/or 660). Some operations in method 700 are, optionally, combined, the orders of some operations are, optionally, changed, and some operations are, optionally, omitted.

As described below, method 700 provides an intuitive way for enrolling a biometric feature for use with a peripheral device. The method reduces the cognitive burden on a user for enrolling a biometric feature for use with a peripheral device, thereby creating a more efficient human-machine interface. For battery-operated computing devices, enabling a user to enrolling a biometric feature for use with a peripheral device faster and more efficiently conserves power and increases the time between battery charges.

A computer system (e.g., 100, 300, 500, 600, and/or 654) (e.g., an electronic device; a smart device, such as a smartphone or a smartwatch; a mobile device; and/or a wearable device) is in communication with a display generation component (e.g., 604, 622, and/or 658) and one or more input devices (e.g., 610*a*, 610*b*, 610*c*, 610*d*, and/or 660) physically connected to (e.g., integrated with such as by being permanently or semi-permanently mechanically and/or electrically connected to or coupled to; incorporated into and/or attached to a housing of, such as a physical, depressible button; connected via a wired connection with; connected to without requiring software that is different from (or in addition to) an operating system of the computer system; a hardware component of; connected to and positioned in close proximity to the display generation component of; a part of; and/or mechanically fastened to a housing of) the computer system (e.g., one or more input devices that are part of the computer system (e.g., integrated into a housing of the computer system) and/or connected to the computer system via a wired connection, such as a trackpad and/or mousepad, physical buttons integrated into a housing of the computer system, a touch-sensitive display, and/or a biometric sensor (e.g., a facial recognition sensor (e.g., a camera), an iris detection sensor (e.g., a camera), a fingerprint sensor, and/or a speech recognition sensor (e.g., a microphone))).

While the computer system is connected to (e.g., paired to via a wireless, such as Bluetooth, connection and/or connected to via a wired connection) an external device (e.g., 602) (e.g., an external device configured to provide input signals to the computer system, such as an external keyboard (e.g., a keyboard that is separate from a housing of the computer system) that is not integrated with and/or physically connected to the computer system), the computer system receives (702) a first request (e.g., 650*b*, 650*c*, 650*e*, 650*f*, 650*h*, 650*j*, and/or 650*o*) (e.g., an input received by the external device and transmitted to the computer system, such as an input on a biometric sensor integrated with the external device, and/or an input received by (and at) the computer system requesting to enroll a biometric feature using the external device) to enroll a biometric feature (e.g., one or more biometric features of a user, such as one or more facial features, iris features, a fingerprint, and/or characteristics of a user's voice and/or speech) for use in authorizing a secure operation at the computer system (e.g., an operation configured to be performed by the computer system for which authorization is required) (e.g., using the computer system to authenticate a credit card and/or other form of payment to complete a transaction, using the computer system to view and/or access a protected document, and/or causing the computer system to transition between a locked and/or secure mode of operation to an unlocked and/or normal mode of operation).

In response to receiving (704) the first request and in accordance with a determination that the first request satisfies a first set of one or more criteria (e.g., that the first request is received and/or detected by an input device of the external device, that the external device is wirelessly connected to the computer system, and/or that the first request is received at the external device and the first request is not associated with a biometric feature already enrolled on the computer system), the first set of one or more criteria includes a first criterion that is met when data about the biometric feature that is to be enrolled is detected via a biometric sensor that is integrated with the external device (e.g., 612*c*) (e.g., a biometric sensor that is mechanically connected to the external device, part of the external device, and/or integrated into a housing of the external device), the computer system displays (706), via the display generation component, a first user interface object (e.g., 616, 626, 638, 640, and/or 664) (e.g., a push notification, a pop-up window, and/or a user interface associated with the connection between the computer system and the external device) prompting a user to provide an authorization input to the computer system, via the one or more input devices (e.g., 610*a*, 610*b*, 610*c*, 610*d*, and/or 660) physically connected to the computer system (e.g., visual instructions (e.g., images and/or text) for the user to follow to provide a particular input that is configured to be received by the one or more input devices physically connected to the computer system and not an input to one or more additional input devices (e.g., keys and/or sensors) of the external device).

In some embodiments, in accordance with a determination that the first request does not satisfy the first set of one or more criteria, the computer system forgoes displaying, via the display generation component, the first user interface object prompting the user to provide the authorization input, via the one or more input devices physically connected to the computer system. In some embodiments, the computer system enrolls a biometric feature and/or initiates a process to enroll a biometric feature for the external device in accordance with the determination that the first request does not satisfy the first set of one or more criteria. In some embodiments, the computer system displays an error message in accordance with the determination that the first request does not satisfy the first set of one or more criteria. In some embodiments, the computer system continues and/or completes a set-up process for the external device so that the external device can be used with the computer system in accordance with the determination that the first request does not satisfy the first set of one or more criteria.

In some embodiments, the first set of one or more criteria includes a third criterion that is met when the data about the biometric feature that is to be enrolled does not correspond to (e.g., does not match and/or a threshold amount of data does not match) data about an enrolled biometric feature of the computer system. Further, in some embodiments, in response to receiving the first request and in accordance with a determination that the first request does not satisfy the first set of one or more criteria (e.g., when the data about the biometric feature that is to be enrolled corresponds to (e.g., matches and/or a threshold amount of data matches) data about an enrolled biometric feature of the computer system), the computer system enables (708) the biometric sensor that is integrated with the external device (e.g., 612*c*) to be used to authorize secure operations at the computer system without requiring the user to provide the authorization input to the computer system (e.g., without displaying the first user interface object prompting the user to provide the authorization input to the computer system) (e.g., the biometric sensor integrated with the external device can be utilized to detect data about a biometric feature for authenticating a secure operation at the computer system without requiring the authorization input detected via the one or more input devices physically connected to the computer system).

Forgoing displaying the first user interface object prompting the user to provide an authorization input to the one or more input devices physically connected to the computer system when data about the biometric feature that is to be enrolled corresponds to data about an enrolled biometric feature enhances a security of the computer system by confirming that a user initiating the first request is in possession of both the computer system and the external device and reduces the number of inputs required to enable the external device to be used to authorize the secure operation at the computer system. Enhancing a security of the computer system and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While the computer system displays the first user interface object, the computer system receives (710), via the one or more input devices (e.g., 610*a*, 610*b*, 610*c*, 610*d*, and/or 660) physically connected to the computer system, user input (e.g., 650*d*, 650*i*, 650*k*, and/or 650*p*).

In response to receiving the user input (712) and in accordance with a determination that the user input includes the authorization input (e.g., 650*d*, 650*i*, 650*k*, and/or 650*p*), the computer system initiates (714) a process to enroll the biometric feature using data about the biometric feature detected via the biometric sensor that is integrated with the external device (e.g., 612*c*) (e.g., providing an additional user interface object prompting the user to provide one or more inputs to the biometric sensor that is integrated with the external device, where the one or more inputs enable the external device and/or the computer system to confirm the data about the biometric feature detected via the biometric sensor that is integrated with the external device and/or receive data about a biometric feature associated with the user, such that the computer system and/or the external device may be utilized to receive the biometric information and authorize the computer system to perform the secure operation). In some embodiments, in response to receiving the user input and in accordance with a determination that the user input does not include the authorization input (e.g., the user input includes a different type of input than what the user interface object prompted the user to provide), the computer system does not initiate the process to enroll credentials for the external device (e.g., displays an error message, maintains display of the first user interface object prompting the user to provide the authorization input, and/or re-displays the first user interface object prompting the user to provide the authorization input).

Displaying the first user interface object prompting the user to provide an authorization input to the one or more input devices physically connected to the computer system enhances a security of the computer system by confirming that a user initiating the first request is in possession of both the computer system and the external device. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the authorization input includes an authentication user input (e.g., 650*k*) (e.g., placing a finger on a biometric sensor of the one or more input devices physically connected to the computer system and/or adjusting a position of the user and/or the computer system to place a body part (e.g., face, eyes, and/or finger) of the user within a detectable area of a biometric sensor of the one or more input devices physically connected to the computer system) detected by the one or more input devices (e.g., 610*c*) physically connected to the computer system (e.g., an integrated biometric sensor (e.g., fingerprint sensor) of the computer system), wherein the authentication user input includes data about a biometric feature that corresponds to (e.g., matches and/or a threshold amount of data matches) data about a previously enrolled biometric feature that was previously enrolled on the computer system (e.g., data (e.g., stored in memory of the computer system) about a fingerprint that, when detected via a biometric sensor (e.g., an integrated fingerprint sensor of the computer system), authorizes a secure operation to be performed by the computer system).

Receiving an authorization input at an input device that is physically connected to the computer system, such as an integrated biometric sensor of the one or more input devices that are physically connected to the computer system, enhances a security of the computer system by confirming that a user initiating the first request is in possession of both the computer system and the external device. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the authorization input includes user interaction (e.g., 650*d*, 650*i*, 650*k*, and/or 650*p*) (e.g., user input, such as a single press gesture, single double gesture, and/or tap gesture detected by a button and/or touch-sensitive display of the one or more input devices physically connected to the computer system, and/or movement of the user and/or the computer system that is detected by the one or more input devices physically connected to the computer system (e.g., motion sensors and/or a camera)) detected by (e.g., sensed and/or received by) an input device (e.g., 610*a*, 610*b*, 610*c*, 610*d*, and/or 660) of the one or more input devices physically connected to the computer system.

Receiving an authorization input at an input device that is physically connected to the computer system, such as a button of the one or more input devices that are physically connected to the computer system, enhances a security of the computer system by confirming that a user initiating the first request is in possession of both the computer system and the external device. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input device (e.g., 610a, 610b, 610c, 610d, and/or 660) of the one or more input devices physically connected to the computer system is integrated into a housing (e.g., 600d) of the computer system (e.g., a physical button that is incorporated into a housing of the computer system, where the housing of the computer system includes one or more components of the computer system, such as a processor, memory, and/or the display generation component, such as a power button, a volume button, or the like) (e.g., and the user interaction includes user input (e.g., a press gesture and/or a tap gesture) detected by the input device integrated into the housing of the computer system).

Receiving an authorization input at an input device that is physically connected to the computer system, such as a button of the one or more input devices that are physically connected to the computer system, enhances a security of the computer system by confirming that a user initiating the first request is in possession of both the computer system and the external device. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input device of the one or more input devices physically connected to the computer system is a button (e.g., 610c and/or 660) (e.g., a physical, depressible button that is integrated into a housing of the computer system) (e.g., and the user interaction includes user input (e.g., a press gesture on the button and/or a depression of the button) corresponding to an interaction with the button).

The input device being a button enables the computer system to detect the authorization input as a specific input to a specific input device, such that the authorization input is not unintentionally detected via a non-physical user input (e.g., a voice input), thereby improving security of the computer system. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input device of the one or more input devices physically connected to the computer system is a button (e.g., 610c and/or 660) (e.g., a physical, depressible button that is integrated into a housing of the computer system), and wherein the user interaction includes a double press gesture (e.g., 650d, 650i, and/or 650p) (e.g., two presses of the second button that occur within a predefined amount of time, such as within 0.05 seconds, 0.1 seconds, 0.2 seconds, 0.3 seconds, 0.5 seconds, 1 second, 2 seconds, 3 seconds, 4 seconds, and/or 5 seconds of one another) of the button (e.g., 610c and/or 660).

The authorization input including a double press gesture of a button further improves security of the computer system because the computer system does not recognize merely any input to the button as the authorization input. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input device of the one or more input devices physically connected to the computer system is a power button (e.g., 610c and/or 660) (e.g., a physical, depressible button that is integrated into a housing of the computer system and is configured to adjust and/or control an on/off setting of the computer system and/or configured to control a power supply to one or more components of the computer system) (e.g., and the user interaction includes user input (e.g., a press gesture, a tap gesture, and/or a depression of the power button) corresponding to an interaction with the power button). In some embodiments, the user input does not cause the computer system to adjust and/or control an off/setting of the computer system and/or to change a power supply to one or more components of the computer system. In some embodiments, the user input is detected as the authorization input and does not change an operating mode of the computer system, does not put the computer system into a sleep and/or idle mode, does not take the computer system out of a sleep and/or idle mode, does not turn off the computer system, and/or does not turn on the computer system. In some embodiments, the computer system is configured to change an operating mode (e.g., cause the computer system to operate in a sleep and/or idle mode, cause the computer system to transition out of the sleep and/or idle mode, cause the computer system to turn off, and/or cause the computer system to turn on) in response to detecting a user input that is different from the authorization input, such as a long press gesture detected at the power button.

Receiving an authorization input at a power button enhances a security of the computer system by using an input device that is not frequently interacted with by a user during normal operation of the computer system, and thus, a user is unlikely to inadvertently provide a user input to the power button and unintentionally provide the authentication input. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input device of the one or more input devices physically connected to the computer system is a button (e.g., a physical, depressible button incorporated into a housing of the computer system) having an integrated biometric sensor (e.g., 610c) (e.g., in addition to being a physical, depressible button, the third button includes one or more sensors that are configured to detect and/or sense a biometric feature of a user, such as a fingerprint, vein pattern, heart rate, facial features, iris features, and/or speech characteristics) (e.g., and the user interaction includes user input (e.g., a press gesture, a tap gesture, placement of a finger on the third button, movement of the user in front of the biometric sensor, and/or speech of a user) corresponding to an interaction with the third button having the integrated biometric sensor).

Receiving an authorization input at a button having an integrated biometric sensor enhances a security of the computer system because the integrated biometric sensor can optionally be used to provide further confirmation that the user providing the authorization input is a user associated with the computer system. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of one or more criteria includes a second criterion that is met when the data about the biometric feature that is to be enrolled does not correspond to (e.g., does not match and/or a threshold amount of data does not match) data about an enrolled biometric feature (e.g., data about a biometric feature of a user of the computer system that is stored in memory of the computer system and is compared to data about a biometric feature detected via an authorized biometric sensor (e.g., the biometric sensor integrated with the external device and/or a biometric sensor of the one or more input devices physically connected to the computer system) to authorize a secure operation at the computer system) of the computer system (e.g., the computer system displays the prompt in response to receiving a request that includes data about the biometric feature that is to be enrolled and that is detected via a biometric sensor that is integrated with the external device and in accordance with a determination that the data about the biometric feature detected by the biometric sensor that is integrated with the external device does not match data about an enrolled biometric feature). In some embodiments, the data about the biometric feature that is to be enrolled and that is detected via the biometric sensor integrated with the external device is enrolled in response to receiving the user input that includes the authorization input. In some embodiments, the data about the biometric feature that is to be enrolled and that is detected via the biometric sensor integrated with the external device is enrolled, such that data about a biometric feature that is detected via the biometric sensor integrated with the external device and/or a biometric sensor of the one or more input devices physically connected to the computer system is used to authenticate a secure operation at the computer system.

Displaying the first user interface prompting the user to provide the authorization input indicates to the user that the external device needs to be authenticated, thereby improving security of the computer system. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to the computer system receiving the first request and in accordance with a determination that an integrated biometric sensor (e.g., 610c) of the one or more input devices physically connected to the computer system (e.g., a biometric sensor that is integrated with and/or incorporated into a housing of the computer system) is available (e.g., the computer system operates in a first mode of operation (e.g., a foldable lid of the computer system is in an open position), the computer system includes an integrated biometric sensor that is available for selection (e.g., not covered by the foldable lid of the computer system), and/or the computer system includes a connection with (e.g., an established connection with) a biometric sensor different from the biometric sensor that is integrated with the external device), the computer system collects biometric information for the user with the integrated biometric sensor (e.g., 610c) of the one or more input devices physically connected to the computer system (e.g., without collecting biometric information for the user with the biometric sensor that is integrated with the external device). In addition, prior to the computer system receiving the first request and in accordance with a determination that the integrated biometric sensor (e.g., 610c) of the one or more input devices physically connected to the computer system is not available (e.g., the computer system operates in a second mode of operation (e.g., a foldable lid of the computer system is in a closed position), different from the first mode of operation, the computer system does not include an integrated biometric sensor, and/or the computer system does not include a connection with (e.g., an established connection with) a biometric sensor different from the biometric sensor that is integrated with the external device), the computer system collects biometric information for the user with the biometric sensor that is integrated with the eternal device (e.g., 612c) (e.g., without collecting biometric information for the user with the integrated biometric sensor of the one or more input devices physically connected to the computer system).

Enabling the integrated biometric sensor of the one or more input devices physically connected to the computer system to read biometric information when the integrated biometric sensor is available reduces the number of inputs required to enable the external device to be used to authorize the secure operation at the computer system because the computer system does not receive the authorization input before initiating the process to enroll the biometric feature. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the integrated biometric sensor (e.g., 610c) of the one or more input devices physically connected to the computer system is not available when the computer system is a notebook computer (e.g., 600) (e.g., a laptop computer having a foldable lid (e.g., a first portion of a housing of the computer system that is connected to a second portion of the housing of the computer system with a hinge or other flexible connection)) having an integrated display (e.g., 604) (e.g., the display generation component is integrated with and/or incorporated into the foldable lid (e.g., the first portion of the housing of the computer system)) and the integrated display is closed (e.g., the integrated display and/or the foldable lid is in a closed position (e.g., the integrated biometric sensor of the one or more input devices physically connected to the computer system is blocked and/or obstructed via the integrated display and/or the foldable lid) and/or the computer system is operating in a clamshell mode). In some embodiments (e.g., in the clamshell mode), the computer system is connected to an external display that displays content while the integrated display of the computer system is closed and does not display content.

The integrated sensor being unavailable when the integrated display is closed allows the computer system to monitor for inputs at input devices are available and to not monitor for inputs at input devices that are not available, thereby reducing the power required to monitor for inputs, such as the authorization input. Reducing the power required to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the integrated biometric sensor (e.g., 610c) of the one or more input devices physically connected to the computer system is available when the computer system is the notebook computer (e.g., 600) (e.g., a laptop computer having a foldable lid (e.g., a first portion of a housing of the computer system that is connected to a second portion of the housing of the computer system via a hinge or other flexible connector)) having the integrated display (e.g., 604) (e.g., the display generation component is integrated with and/or incorporated into the foldable lid (e.g., the first portion of the housing of the computer system)) and the integrated display is open (e.g., the integrated display and/or the foldable lid is in an open position (e.g., the integrated biometric sensor of the one or more input devices physically connected to the computer system is not blocked and/or obstructed via the integrated display and/or the foldable lid) and/or the computer system is not operating in a clamshell mode).

The integrated sensor being available when the integrated display is open allows the computer system to monitor for inputs at input devices are available and to not monitor for inputs at input devices that are not available, thereby reducing the power required to monitor for inputs, such as the authorization input. Reducing the power required to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to the computer system receiving the first request and in accordance with a determination that the first request satisfies a second set of one or more criteria, the second set of one or more criteria including a fourth criterion that is met when data about the biometric feature that is to be enrolled is detected via an integrated biometric sensor (e.g., 610c) of the one or more input devices physically connected to the computer system e.g., a biometric sensor that is integrated with and/or incorporated into a housing of the computer system instead of the biometric sensor that is integrated with the external device), the computer system initiates a process to enroll the biometric feature for use in authorizing the secure operation at the computer system via an authenticated input (e.g., 650m, 650n, and/or 650q) (e.g., an input that that includes data about the enrolled biometric feature detected via the biometric sensor that is integrated with the external device and/or via the integrated biometric sensor of the one or more input devices physically connected to the computer system). In some embodiments, the second set of one or more criteria includes a criterion that is met when the computer system does not include an enrolled biometric feature.

Enabling enrollment of a biometric feature via the integrated biometric sensor of the one or more input devices physically connected to the computer system improves security of the computer system by enrolling a biometric feature via an input that is detected at an input device of the computer system. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to connecting the external device (e.g., 602) to the computer system (e.g., and prior to receiving the first request), the computer system receives a second request to connect (e.g., pair) the external device to the computer system (e.g., user input corresponding to a request to search for one or more external devices via a wireless connection (e.g., Bluetooth, Wi-Fi, and/or Zigbee) and/or detecting a wired connection between the external device and the computer system). In response to receiving the second request and in accordance with a determination that the computer system is not associated with an enrolled biometric feature (e.g., the computer system does not include (e.g., has not received) data about a biometric feature stored in memory of the computer system and/or in memory accessible to the computer system (e.g., memory of a server associated with an account of a user associated with the computer system), where the enrolled biometric feature includes data corresponding to a biometric feature of a user associated with the computer system), the computer system initiates a process to connect the external device to the computer system (e.g., establishing a wireless and/or wired connection between the external device and the computer system) and displays a third user interface object (e.g., 634, 636, 638, and/or 640) prompting the user to provide an enrollment input (e.g., visual instructions (e.g., images and/or text) for the user to follow to provide one or more particular inputs that are configured to be received by the one or more input devices physically connected to the computer system and/or configured to be received by the biometric sensor that is integrated with the external device). In response to receiving the second request and in accordance with a determination that the computer system is associated with an enrolled biometric feature (e.g., the computer system includes (e.g., has received) data about a biometric feature stored in memory of the computer system and/or in memory accessible to the computer system (e.g., memory of a server associated with an account of a user associated with the computer system), where the enrolled biometric feature includes data corresponding to a biometric feature of a user associated with the computer system), the computer system initiates a process to connect the external device to the computer system without displaying the third user interface object (e.g., 634, 636, 638, and/or 640) prompting the user to provide the enrollment input (e.g., a wireless and/or wired connection between the external device and the computer system is established without displaying a visual indication instructing a user to provide one or more inputs to enroll a biometric feature).

Initiating the process to connect the external device to the computer system when the computer system includes an enrolled biometric feature enables the computer system to utilize the enrolled biometric feature as the authentication input and/or as further confirmation that the authentication input is valid (e.g., via fingerprint matching), thereby increasing a security of the computer system. Displaying the third user interface prompting the user to provide the enrollment input when the computer system does not include an enrolled biometric feature enables the computer system to include an enrolled biometric feature for authorizing secure operations at the computer system, thereby increasing a security of the computer system. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second request to connect the external device (e.g., 602) to the computer system includes initiating a process to connect the external device to the computer system via a short-range communication protocol (e.g., Bluetooth, a personal area network) (e.g., initiating the process to connect the external device to the computer system via a settings user interface of the computer system, a Bluetooth settings user interface of the computer system, and/or a keyboard settings user interface of the computer system).

Displaying the first user interface prompting the user to provide the authorization input when the external device and the computer system are connected via short-range protocol improves a security of the computer system because an unauthorized user may attempt to connect an unauthorized external device to the computer system via the short-range communication connection. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the first request and in accordance with a determination that the external device is in wired communication (e.g., via cable 628) with the computer system (e.g., the computer system detects an electrical connection between the external device and the computer system based on a user inserting a connection cable into a reception port of the computer system) (e.g., the first set of one or more criteria include a criterion that is not met when the external device is in wired communication with the computer system (e.g., the external device is connected to and/or in communication with the external device via a cable)), the computer system enables the biometric sensor that is integrated with the external device (e.g., 612c) to be used to authorize secure operations at the computer system without requiring the user to provide the authorization input (e.g., 650d, 650i, 650k, and/or 650p) to the computer system (e.g., without displaying the first user interface object prompting the user to provide the authorization input to the computer system) (e.g., the biometric sensor that is integrated with the external device is configured to detect and/or receive data about a biometric feature and use the data to authorize a secure operation at the computer system without requiring the authorization input).

Forgoing displaying the first user interface object prompting the user to provide an authorization input to the one or more input devices physically connected to the computer system when the external device is in wired communication with the computer system enhances a security of the computer system by confirming that a user initiating the first request is in possession of both the computer system and the external device and reduces the number of inputs required to enable the external device to be used to authorize the secure operation at the computer system. Enhancing a security of the computer system and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the biometric sensor that is integrated with the external device (e.g., 612c) (e.g., and/or the integrated biometric sensor of the one or more input devices physically connected to the computer system) is selected from the group consisting of: a fingerprint sensor (e.g., an optical sensor, a capacitance sensor, an ultrasonic sensor, and/or a thermal sensor), a face detection sensor (e.g., a camera), and an iris detection sensor (e.g., a camera).

Using a fingerprint sensor, a face detection sensor, or an iris detection sensor improves a security of the computer system by authorizing secure operations at the computer system via a secure sensor that identifies unique features of an authorized user of the computer system. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after enrolling one or more biometric features with the computer system (e.g., using data about the biometric feature detected using either the biometric sensor that is integrated with the external device or the biometric sensor that is integrated with the external device), the computer system receives (716) a third request (e.g., 650m, 650n, and/or 650q) to authenticate a secure operation at the computer system that includes detecting first information about a biometric feature using the biometric sensor that is integrated with the external device (e.g., 612c) (e.g., detecting, via the biometric sensor that is integrated with the external device a user input that includes data about a biometric feature).

In response to receiving the third request (718) and in accordance with a determination that the first information is consistent with a biometric feature enrolled with the computer system (e.g., the data about the biometric feature that is detected via the biometric sensor that is integrated with the external device matches the data about the enrolled biometric feature and/or at least a threshold amount of the data about the biometric feature that is detected via the biometric sensor that is integrated with the external device matches the data about the enrolled biometric feature), the computer system initiates (720) a process to perform the secure operation at the computer system (e.g., authorization to complete a transaction, authorization to provide access a protected document, and/or authorization to cause the computer system to transition between a locked and/or secure mode of operation to an unlocked and/or normal mode of operation).

In response to receiving the third request (718) and in accordance with a determination that the first information is not consistent with the one or more biometric features enrolled with the computer system (e.g., the data about the biometric feature that is detected via the biometric sensor that is integrated with the external device does not match the data about the one or more enrolled biometric features and/or at least a threshold amount of the data about the biometric feature that is detected via the biometric sensor that is integrated with the external device does not match the data about the one or more enrolled biometric sensors), the computer system forgoes (722) initiating the process to perform the secure operation at the computer system (e.g., blocking completion of the secure operation at the computer system and/or displaying an error notification (e.g., a visual indication prompting the user to perform the third request again and/or prompting the user to authorize the secure operation in another manner, such as entering a password)). In some embodiments, the one or more biometric features enrolled with the computer system correspond to an account of a particular user of the computer system. For example, the computer system can include enrolled biometric features that are associated with a variety of different user accounts. When a particular user account is active (e.g., the computer system is logged into a particular user account and/or the computer system is attempting to perform the secure operation with a particular user account), the computer system determines whether the first information about the biometric feature is consistent with enrolled biometric features corresponding to the active user account. In other words, the computer system determines that the first information is not consistent with the one or more biometric features enrolled with the computer system when the first information is consistent with an enrolled biometric feature that corresponds to a user account that is not the active user account (e.g., a user account that is not being used to perform the secure operation and/or a user account that the computer system is not logged into).

Using the enrolled biometric feature to authorize a secure operation at the computer system enhances a security of the computer system by confirming that a user requesting performance of the secure operation is an authorized user of the computer system. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after enrolling one or more biometric features (e.g., using data about the biometric feature detected using either the biometric sensor that is integrated with the external device via the biometric sensor that is integrated with the external device), the computer system receives (724) a fourth request (e.g., 650*m* and/or 650*n*) to authenticate a secure operation at the computer system that includes detecting second information about a biometric feature using an integrated biometric sensor (e.g., 610*c*) of the one or more input devices physically connected to the computer system (e.g., detecting, via integrated biometric sensor of the one or more input devices physically connected to the computer system, a user input that includes data about a biometric feature).

In response to receiving the fourth request (726) and in accordance with a determination that the second information is consistent with a biometric feature enrolled with the computer system (e.g., the data about the biometric feature that is detected via the integrated biometric sensor of the one or more input devices physically connected to the computer system matches the data about the enrolled biometric feature and/or at least a threshold amount of the data about the biometric feature that is detected via the integrated biometric sensor of the one or more input devices physically connected to the computer system matches the data about the enrolled biometric feature), the computer system initiates (728) a process to perform the secure operation at the computer system (e.g., authorization to complete a transaction, authorization to provide access a protected document, and/or authorization to cause the computer system to transition between a locked and/or secure mode of operation to an unlocked and/or normal mode of operation).

In response to receiving the fourth request (726) and in accordance with a determination that the second information is not consistent with the one or more biometric features enrolled with the computer system (e.g., the data about the biometric feature that is detected via the integrated biometric sensor of the one or more input devices physically connected to the computer system does not match the data about the one or more enrolled biometric features and/or at least a threshold amount of the data about the biometric feature that is detected via the integrated biometric sensor of the one or more input devices physically connected to the computer system does not match the data about the one or more enrolled biometric sensors), the computer system forgoes (730) initiating the process to perform the secure operation at the computer system (e.g., blocking completion of the secure operation at the computer system and/or displaying an error notification (e.g., a visual indication prompting the user to perform the third request again and/or prompting the user to authorize the secure operation in another manner, such as entering a password)). In some embodiments, the one or more biometric features enrolled with the computer system correspond to an account of a particular user of the computer system. For example, the computer system can include enrolled biometric features that are associated with a variety of different user accounts. When a particular user account is active (e.g., the computer system is logged into a particular user account and/or the computer system is attempting to perform the secure operation with a particular user account), the computer system determines whether the first information about the biometric feature is consistent with enrolled biometric features corresponding to the active user account. In other words, the computer system determines that the first information is not consistent with the one or more biometric features enrolled with the computer system when the first information is consistent with an enrolled biometric feature that corresponds to a user account that is not the active user account (e.g., a user account that is not being used to perform the secure operation and/or a user account that the computer system is not logged into).

Using the enrolled biometric feature to authorize a secure operation at the computer system enhances a security of the computer system by confirming that a user requesting performance of the secure operation is an authorized user of the computer system. Enhancing a security of the computer system enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to facilitate a user's ability to authorize a secure operation at a computer system. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), biometric information, date of birth, or any other identifying or personal information.

The present disclosure recognizes that the use of such personal information data, in the present technology, can be used to the benefit of users. For example, the personal information data can be used to facilitate authorization of a secure transaction at a computer system.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of enrolling biometric features, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a user can choose to limit credentials for authorizing a secure operation at a computer system to non-personal information data or a bare minimum amount of personal information, such as the content being requested by the device associated with a user, other non-personal information, or publicly available information.

What is claimed is:

1. A computer system, comprising:
   a display generation component;
   one or more input devices physically connected to the computer system;
   one or more processors; and
   memory storing one or more programs configured to be executed by the one or more processors, the one or more programs including instructions for:
   while the computer system is connected to an external device, receiving a first request to enroll a biometric feature for use in authorizing a secure operation at the computer system;
   in response to receiving the first request,
   in accordance with a determination that the first request satisfies a first set of one or more criteria, wherein the first set of one or more criteria includes a first criterion that is met when the first request to enroll the biometric feature for use in authorizing the secure operation at the computer system includes a request to enroll the biometric feature via a biometric sensor that is integrated with the external device, displaying, via the display generation component, a first user interface object prompting a user to provide an authorization input to the computer system via the one or more input devices physically connected to the computer system; and in accordance with a determination that the first request does not satisfy the first set of one or more criteria, forgoing display of the first user interface object prompting the user to provide an authorization input to the computer system via the one or more input devices physically connected to the computer system;

while displaying the first user interface object in accordance with the determination that the first request satisfies the first set of one or more criteria, receiving, via the one or more input devices physically connected to the computer system, user input; and in response to receiving the user input:
in accordance with a determination that the user input includes the authorization input, initiating a process to enroll the biometric feature using data about the biometric feature detected via the biometric sensor that is integrated with the external device.

2. The computer system of claim 1, wherein the authorization input includes an authentication user input detected by the one or more input devices physically connected to the computer system, wherein the authentication user input includes data about a biometric feature that corresponds to data about a previously enrolled biometric feature that was previously enrolled on the computer system.

3. The computer system of claim 1, wherein the authorization input includes user interaction detected by an input device of the one or more input devices physically connected to the computer system.

4. The computer system of claim 3, wherein the input device of the one or more input devices physically connected to the computer system is integrated into a housing of the computer system.

5. The computer system of claim 3, wherein the input device of the one or more input devices physically connected to the computer system is a button.

6. The computer system of claim 3, wherein the input device of the one or more input devices physically connected to the computer system is a button, and wherein the user interaction includes a double press gesture of the button.

7. The computer system of claim 1, wherein the first set of one or more criteria includes a second criterion that is met when the data about the biometric feature does not correspond to data about an enrolled biometric feature of the computer system.

8. The computer system of claim 1, wherein the first set of one or more criteria includes a third criterion that is met when the data about the biometric feature does not correspond to data about an enrolled biometric feature of the computer system, and wherein the one or more programs further include instructions for:

in response to receiving the first request:
in accordance with a determination that the first request does not satisfy the first set of one or more criteria, enabling the biometric sensor that is integrated with the external device to be used to authorize secure operations at the computer system without requiring the user to provide the authorization input to the computer system.

9. The computer system of claim 1, wherein the one or more programs further include instructions for:
prior to receiving the first request:
in accordance with a determination that an integrated biometric sensor of the one or more input devices physically connected to the computer system is available, collecting biometric information for the user with the integrated biometric sensor of the one or more input devices physically connected to the computer system; and in accordance with a determination that the integrated biometric sensor of the one or more input devices physically connected to the computer system is not available, collecting biometric information for the user with the biometric sensor that is integrated with the external device.

10. The computer system of claim 9, wherein:
the integrated biometric sensor of the one or more input devices physically connected to the computer system is not available when the computer system is a notebook computer having an integrated display and the integrated display is closed, and
the integrated biometric sensor of the one or more input devices physically connected to the computer system is available when the computer system is the notebook computer having the integrated display and the integrated display is open.

11. The computer system of claim 1, wherein the one or more programs further include instructions for:
in response to receiving the first request:
in accordance with a determination that the first request satisfies a second set of one or more criteria, wherein the second set of one or more criteria include a fourth criterion that is met when data about the biometric feature is detected via an integrated biometric sensor of the one or more input devices physically connected to the computer system, initiating a process to enroll the biometric feature for use in authorizing the secure operation at the computer system via an authenticated input.

12. The computer system of claim 1, wherein the one or more programs further include instructions for:
prior to connecting the external device to the computer system, receiving a second request to connect the external device to the computer system;
in response to receiving the second request:
in accordance with a determination that the computer system is not associated with an enrolled biometric feature:
initiating a process to connect the external device to the computer system; and
displaying a third user interface object prompting the user to provide an enrollment input; and
in accordance with a determination that the computer system is associated with an enrolled biometric feature, initiating a process to connect the external device to the computer system without displaying the third user interface object prompting the user to provide the enrollment input.

13. The computer system of claim 12, wherein the second request to connect the external device to the computer system includes initiating a process to connect the external device to the computer system via a short-range communication protocol.

14. The computer system of claim 1, wherein the one or more programs further include instructions for:
in response to receiving the first request:
in accordance with a determination that the external device is in wired communication with the computer system, enabling the biometric sensor that is integrated with the external device to be used to authorize secure operations at the computer system without requiring the user to provide the authorization input to the computer system.

15. The computer system of claim 1, wherein the one or more programs further include instructions for:
after enrolling one or more biometric features with the computer system, receiving a third request to authenticate a secure operation at the computer system that includes detecting first information about a biometric feature using the biometric sensor that is integrated with the external device;
in response to receiving the third request:
in accordance with a determination that the first information is consistent with a biometric feature enrolled with the computer system, initiating a process to perform the secure operation at the computer system; and
in accordance with a determination that the first information is not consistent with the one or more biometric features enrolled with the computer system, forgoing initiating the process to perform the secure operation at the computer system.

16. The computer system of claim 1, wherein the one or more programs further include instructions for:
after enrolling one or more biometric features, receiving a fourth request to authenticate a secure operation at the computer system that includes detecting second information about a biometric feature using an integrated biometric sensor of the one or more input devices physically connected to the computer system;
in response to receiving the fourth request:
in accordance with a determination that the second information is consistent with a biometric feature enrolled with the computer system, initiating a process to perform the secure operation at the computer system; and
in accordance with a determination that the second information is not consistent with the one or more biometric features enrolled with the computer system, forgoing initiating the process to perform the secure operation at the computer system.

17. A non-transitory computer-readable storage medium storing one or more programs configured to be executed by one or more processors of a computer system that is in communication with a display generation component and one or more input devices physically connected to the computer system, the one or more programs including instructions for:
while the computer system is connected to an external device, receiving a first request to enroll a biometric feature for use in authorizing a secure operation at the computer system;
in response to receiving the first request,
in accordance with a determination that the first request satisfies a first set of one or more criteria, wherein the first set of one or more criteria includes a first criterion that is met when the first request to enroll the biometric feature for use in authorizing the secure operation at the computer system includes a request to enroll the biometric feature via a biometric sensor that is integrated with the external device, displaying, via the display generation component, a first user interface object prompting a user to provide an authorization input to the computer system, via the one or more input devices physically connected to the computer system; and
in accordance with a determination that the first request does not satisfy the first set of one or more criteria, forgoing display of the first user interface object prompting the user to provide an authorization input to the computer system via the one or more input devices physically connected to the computer system;
while displaying the first user interface object in accordance with the determination that the first request satisfies the first set of one or more criteria, receiving, via the one or more input devices physically connected to the computer system, user input; and
in response to receiving the user input:
in accordance with a determination that the user input includes the authorization input, initiating a process to enroll the biometric feature using data about the biometric feature detected via the biometric sensor that is integrated with the external device.

18. The non-transitory computer-readable storage medium of claim 17, wherein the authorization input includes an authentication user input detected by the one or more input devices physically connected to the computer system, wherein the authentication user input includes data about a biometric feature that corresponds to data about a previously enrolled biometric feature that was previously enrolled on the computer system.

19. The non-transitory computer-readable storage medium of claim 17, wherein the authorization input includes user interaction detected by an input device of the one or more input devices physically connected to the computer system.

20. The non-transitory computer-readable storage medium of claim 19, wherein the input device of the one or more input devices physically connected to the computer system is integrated into a housing of the computer system.

21. The non-transitory computer-readable storage medium of claim 19, wherein the input device of the one or more input devices physically connected to the computer system is a button.

22. The non-transitory computer-readable storage medium of claim 19, wherein the input device of the one or more input devices physically connected to the computer system is a button, and wherein the user interaction includes a double press gesture of the button.

23. The non-transitory computer-readable storage medium of claim 17, wherein the first set of one or more criteria includes a second criterion that is met when the data about the biometric feature does not correspond to data about an enrolled biometric feature of the computer system.

24. The non-transitory computer-readable storage medium of claim 17, wherein the first set of one or more criteria includes a third criterion that is met when the data about the biometric feature does not correspond to data about an enrolled biometric feature of the computer system, and wherein the one or more programs further include instructions for:
in response to receiving the first request:
in accordance with a determination that the first request does not satisfy the first set of one or more criteria, enabling the biometric sensor that is integrated with the external device to be used to authorize secure operations at the computer system without requiring the user to provide the authorization input to the computer system.

25. The non-transitory computer-readable storage medium of claim 17, wherein the one or more programs further include instructions for:
prior to receiving the first request:
in accordance with a determination that an integrated biometric sensor of the one or more input devices physically connected to the computer system is available, collecting biometric information for the user with the integrated biometric sensor of the one or more input devices physically connected to the computer system; and
in accordance with a determination that the integrated biometric sensor of the one or more input devices physically connected to the computer system is not available, collecting biometric information for the user with the biometric sensor that is integrated with the external device.

26. The non-transitory computer-readable storage medium of claim 25, wherein:
the integrated biometric sensor of the one or more input devices physically connected to the computer system is not available when the computer system is a notebook computer having an integrated display and the integrated display is closed, and
the integrated biometric sensor of the one or more input devices physically connected to the computer system is available when the computer system is the notebook computer having the integrated display and the integrated display is open.

27. The non-transitory computer-readable storage medium of claim 17, wherein the one or more programs further include instructions for:
in response to receiving the first request:
in accordance with a determination that the first request satisfies a second set of one or more criteria, wherein the second set of one or more criteria include a fourth criterion that is met when data about the biometric feature is detected via an integrated biometric sensor of the one or more input devices physically connected to the computer system, initiating a process to enroll the biometric feature for use in authorizing a secure operation at the computer system via an authenticated input.

28. The non-transitory computer-readable storage medium of claim 17, wherein the one or more programs further include instructions for:
prior to connecting the external device to the computer system, receiving a second request to connect the external device to the computer system;
in response to receiving the second request:
in accordance with a determination that the computer system is not associated with an enrolled biometric feature:
initiating a process to connect the external device to the computer system; and
displaying a third user interface object prompting the user to provide an enrollment input; and
in accordance with a determination that the computer system is associated with an enrolled biometric feature, initiating a process to connect the external device to the computer system without displaying the third user interface object prompting the user to provide the enrollment input.

29. The non-transitory computer-readable storage medium of claim 28, wherein the second request to connect the external device to the computer system includes initiating a process to connect the external device to the computer system via a short-range communication protocol.

30. The non-transitory computer-readable storage medium of claim 17, wherein the one or more programs further include instructions for:
in response to receiving the first request:
in accordance with a determination that the external device is in wired communication with the computer system, enabling the biometric sensor that is integrated with the external device to be used to authorize secure operations at the computer system without requiring the user to provide the authorization input to the computer system.

31. The non-transitory computer-readable storage medium of claim 17, wherein the one or more programs further include instructions for:
after enrolling one or more biometric features with the computer system, receiving a third request to authenticate a secure operation at the computer system that includes detecting first information about a biometric feature using the biometric sensor that is integrated with the external device;
in response to receiving the third request:
in accordance with a determination that the first information is consistent with a biometric feature enrolled with the computer system, initiating a process to perform the secure operation at the computer system; and
in accordance with a determination that the first information is not consistent with the one or more biometric features enrolled with the computer system, forgoing initiating the process to perform the secure operation at the computer system.

32. The non-transitory computer-readable storage medium of claim 17, wherein the one or more programs further include instructions for:
after enrolling one or more biometric features, receiving a fourth request to authenticate a secure operation at the computer system that includes detecting second information about a biometric feature using an integrated biometric sensor of the one or more input devices physically connected to the computer system;
in response to receiving the fourth request:
in accordance with a determination that the second information is consistent with a biometric feature enrolled with the computer system, initiating a process to perform the secure operation at the computer system; and
in accordance with a determination that the second information is not consistent with the one or more biometric features enrolled with the computer system, forgoing initiating the process to perform the secure operation at the computer system.

33. A method, comprising:
at a computer system that is in communication with a display generation component and one or more input devices physically connected to the computer system:
while the computer system is connected to an external device, receiving a first request to enroll a biometric feature for use in authorizing a secure operation at the computer system;
in response to receiving the first request,
in accordance with a determination that the first request satisfies a first set of one or more criteria, wherein the first set of one or more criteria includes a first criterion that is met when the first request to enroll the biometric feature for use in authorizing the secure operation at the computer system includes a request to enroll the biometric feature via a biometric sensor that is integrated with the external device, displaying, via the display generation component, a first user interface object prompting a user to provide an authorization input to the computer system, via the one or more input devices physically connected to the computer system; and in accordance with a determination that the first request does not satisfy the first set of one or more criteria, forgoing display of the first user interface object prompting the user to provide an authorization input to the computer system via the one or more input devices physically connected to the computer system;

while displaying the first user interface object in accordance with the determination that the first request satisfies the first set of one or more criteria, receiving, via the one or more input devices physically connected to the computer system, user input; and in response to receiving the user input:

in accordance with a determination that the user input includes the authorization input, initiating a process to enroll the biometric feature using data about the biometric feature detected via the biometric sensor that is integrated with the external device.

34. The method of claim 33, wherein the authorization input includes an authentication user input detected by the one or more input devices physically connected to the computer system, wherein the authentication user input includes data about a biometric feature that corresponds to data about a previously enrolled biometric feature that was previously enrolled on the computer system.

35. The method of claim 33, wherein the authorization input includes user interaction detected by an input device of the one or more input devices physically connected to the computer system.

36. The method of claim 35, wherein the input device of the one or more input devices physically connected to the computer system is integrated into a housing of the computer system.

37. The method of claim 35, wherein the input device of the one or more input devices physically connected to the computer system is a button.

38. The method of claim 35, wherein the input device of the one or more input devices physically connected to the computer system is a button, and wherein the user interaction includes a double press gesture of the button.

39. The method of claim 33, wherein the first set of one or more criteria includes a second criterion that is met when the data about the biometric feature does not correspond to data about an enrolled biometric feature of the computer system.

40. The method of claim 33, wherein the first set of one or more criteria includes a third criterion that is met when the data about the biometric feature does not correspond to data about an enrolled biometric feature of the computer system, the method further comprising:

in response to receiving the first request:

in accordance with a determination that the first request does not satisfy the first set of one or more criteria, enabling the biometric sensor that is integrated with the external device to be used to authorize secure operations at the computer system without requiring the user to provide the authorization input to the computer system.

41. The method of claim 33, further comprising:

prior to receiving the first request:

in accordance with a determination that an integrated biometric sensor of the one or more input devices physically connected to the computer system is available, collecting biometric information for the user with the integrated biometric sensor of the one or more input devices physically connected to the computer system; and in accordance with a determination that the integrated biometric sensor of the one or more input devices physically connected to the computer system is not available, collecting biometric information for the user with the biometric sensor that is integrated with the external device.

42. The method of claim 41, wherein:

the integrated biometric sensor of the one or more input devices physically connected to the computer system is not available when the computer system is a notebook computer having an integrated display and the integrated display is closed, and the integrated biometric sensor of the one or more input devices physically connected to the computer system is available when the computer system is the notebook computer having the integrated display and the integrated display is open.

43. The method of claim 33, further comprising:

in response to receiving the first request:

in accordance with a determination that the first request satisfies a second set of one or more criteria, wherein the second set of one or more criteria include a fourth criterion that is met when data about the biometric feature is detected via an integrated biometric sensor of the one or more input devices physically connected to the computer system, initiating a process to enroll the biometric feature for use in authorizing the secure operation at the computer system via an authenticated input.

44. The method of claim 33, further comprising:

prior to connecting the external device to the computer system, receiving a second request to connect the external device to the computer system;

in response to receiving the second request:

in accordance with a determination that the computer system is not associated with an enrolled biometric feature:

initiating a process to connect the external device to the computer system; and displaying a third user interface object prompting the user to provide an enrollment input; and in accordance with a determination that the computer system is associated with an enrolled biometric feature, initiating a process to connect the external device to the computer system without displaying the third user interface object prompting the user to provide the enrollment input.

45. The method of claim 44, wherein the second request to connect the external device to the computer system includes initiating a process to connect the external device to the computer system via a short-range communication protocol.

46. The method of claim 33, further comprising:
in response to receiving the first request:
in accordance with a determination that the external device is in wired communication with the computer system, enabling the biometric sensor that is integrated with the external device to be used to authorize secure operations at the computer system without requiring the user to provide the authorization input to the computer system.

47. The method of claim 33, further comprising:
after enrolling one or more biometric features with the computer system, receiving a third request to authenticate a secure operation at the computer system that includes detecting first information about a biometric feature using the biometric sensor that is integrated with the external device;
in response to receiving the third request:
in accordance with a determination that the first information is consistent with a biometric feature enrolled with the computer system, initiating a process to perform the secure operation at the computer system; and
in accordance with a determination that the first information is not consistent with the one or more biometric features enrolled with the computer system, forgoing initiating the process to perform the secure operation at the computer system.

48. The method of claim 33, further comprising:
after enrolling one or more biometric features, receiving a fourth request to authenticate a secure operation at the computer system that includes detecting second information about a biometric feature using an integrated biometric sensor of the one or more input devices physically connected to the computer system;
in response to receiving the fourth request:
in accordance with a determination that the second information is consistent with a biometric feature enrolled with the computer system, initiating a process to perform the secure operation at the computer system; and
in accordance with a determination that the second information is not consistent with the one or more biometric features enrolled with the computer system, forgoing initiating the process to perform the secure operation at the computer system.

\* \* \* \* \*